United States Patent [19]

Wagner et al.

[11] Patent Number: 5,424,938
[45] Date of Patent: Jun. 13, 1995

[54] METHOD AND APPARATUS FOR PROVIDING ACCESS TO A PLURALITY OF PAYMENT NETWORKS

[75] Inventors: Christopher L. Wagner, Glencoe; Carol J. Wetmore, Chicago; Martha A. Liddy; Lori A. Nelson, both of Evanston, all of Ill.

[73] Assignee: First Chicago Corporation, Chicago, Ill.

[21] Appl. No.: 960,978

[22] Filed: Oct. 13, 1992

[51] Int. Cl.⁶ ............................................... G06F 15/30
[52] U.S. Cl. .................................. 364/408; 364/401; 364/402; 235/379; 235/382; 235/382.5
[58] Field of Search ..................... 364/401, 402, 408; 235/379, 380, 381, 382

[56] References Cited

U.S. PATENT DOCUMENTS

| | | | |
|---|---|---|---|
| 4,346,442 | 8/1982 | Musmanno | 364/408 |
| 4,642,768 | 2/1987 | Roberts | 364/408 |
| 4,674,044 | 6/1987 | Kalmus et al. | 364/408 |
| 4,722,055 | 1/1988 | Roberts | 364/408 |
| 4,739,478 | 4/1988 | Roberts et al. | 364/408 |
| 4,751,640 | 6/1988 | Lucas et al. | 364/408 |
| 5,220,501 | 6/1993 | Lawlor et al. | 364/408 |

*Primary Examiner*—Gail O. Hayes
*Assistant Examiner*—Gita Shingala
*Attorney, Agent, or Firm*—Willian Brinks Hofer Gilson & Lione

[57] ABSTRACT

An interface system for providing access to a plurality of payment networks is provided that displays to a user a single transaction entry screen capable of initiating a monetary payment transaction over any of a number of differing payment networks. The interface is coupled to a display of a remote computer operated by the user. A plurality of such remote computers are coupled to a central computer, which transfers payment requests initiated by the user to the various selected payment networks. Selection logic is provided at the remote computers to allow the operator to select the particular payment network desired for each particular transaction. Upon selection of the desired payment initiation routine, the interface dynamically prompts the user only for data applicable and necessary to complete the particular transaction.

41 Claims, 12 Drawing Sheets

FIG. 3

TRANSACTION ENTRY 98

FILE TRANSACTION HELP

| PC REF CUR | AMOUNT SETUP NAME | BENE/RECEIVER | STATUS |
|---|---|---|---|
| 80  81 | 80 | 80 | 80 |

- SETUP NAME: 60  82  SESSION: 6  PC REF: 82
- ACCOUNT: 62
- TRANS. TYPE: 64    ACH CODE: 68
- AMOUNT: 66   0.00   VALUE DATE:
- BENEFICIARY: 70    ID CODE: 86
- CITY | STATE | COUNTRY
- ACCOUNT NUM: 72    82    82
- ACCOUNT/W BK: 74    ROUTING CODE: 88
- CITY: 90 | STATE | COUNTRY  94
- INTERMEDIARY: 76   92    ROUTING CODE: 88
- TEXT  CITY: 90 | STATE | COUNTRY  94

78

DOCUMENT REF: 84    CUT-OFF

[MORE] [ACCEPT] [CLEAR] 84    84 [TOTAL]

ADDITIONAL TRANSACTION DETAILS 90

MEMO:
INSTRUCTIONS TO FNBC:    94

SETTLEMENT TYPE
- ☐ FEDWIRE
- ☐ CHIPS
92

TERMS
- ☐ PRIORITY TRANSFER
- ☐ DEDUCT CHARGES FROM BENIFICIARY
- ☐ CONDITIONAL PAYMENT
- ☐ DEDUCT CORRESPONDENT CHARGES

- BENEFICIARY:    ID CODE:
- ADDRESS:
-     ☐ FINANCIAL INSTITUTION
- CITY | STATE | COUNTRY
- ACCOUNT/W BK:    ROUTING CODE: ABA
- ADDRESS:
-     SPECIAL INSTRUCTIONS:
- CITY | STATE | COUNTRY
- INTERMEDIARY:    ROUTING CODE:
- CITY | STATE | COUNTRY

84 [OK]    [CLEAR]    [HELP]

FIG. 5

| ACH CCD + ADDITIONAL INFORMATION | | |
|---|---|---|
| MEMO | | DISC DATA |

| REF. CODE | | |
|---|---|---|
| INFORMATION | | |

| DATE QUALIFIER | | DATE | TIME |
|---|---|---|---|
| DATE QUALIFIER | | DATE | TIME |

| REF. QUALIFIER | | | |
|---|---|---|---|
| REF. NUMBER | | INVOICE AMT. | 0.00 |
| SUBJ. TO DISC | 0.00 | ADJUSTMENT | 0.00 |
| AMT. PAID | 0.00 | TERMS DISC. AMT. | 0.00 |
| ADJ. CODE | | DISC AMT. TAKEN | 0.00 |
| DESCRIPTION | | | |

| REF. QUALIFIER | |
|---|---|
| REF. NUMBER | |
| DESCRIPTION | |

[ OK ] [ CLEAR ] [ HELP ]

FIG. 6

| ACH PPD ADDITIONAL INFORMATION | |
|---|---|
| MEMO | DISC DATA |

SELECT ADDENDA TYPE
● NOTE  ○ DATE/TIME

| REF. CODE | |
|---|---|
| INFORMATION | |

| DATE QUALIFIER | | DATE | TIME |
|---|---|---|---|
| DATE QUALIFIER | | DATE | TIME |

[ OK ] [ CLEAR ] [ HELP ]

FIG. 7

```
ACH TXP ADDITIONAL INFORMATION
MEMO          [                                    ]
DISC DATA     [ ]
STATE TAX
FORMAT        [NY NEW YORK              ▽]
TAXPAYER ID   [            ]  TAX CODE [WT  TAX          ▽]
TAX PERIOD
END DATE      [            ] YYMMDD
AMOUNT TYPE   [                        ▽]  AMOUNT  [   0.00]
AMOUNT TYPE   [                        ▽]  AMOUNT  [   0.00]
AMOUNT TYPE   [                        ▽]  AMOUNT  [   0.00]
AMOUNT TYPE   [                        ▽]  AMOUNT  [   0.00]
TAXPAYER
VERIFICATION  [   ]
              [ OK ]   [ CLEAR ]                   [ HELP ]
```

FIG. 8

```
ACH CTP ADDITIONAL INFORMATION
MEMO [                                      ]    DISC DATA [ ]
SEQ TYPE REFERENCE NUMBER     DOC DATE    DOC AMOUNT
[                                                          ▽]

PAYMENT TYPE  [                ▽]   REF. NUMBER [           ]
REF. DOC.     [                ▽]   REF. DATE   [           ]
DOC AMOUNT    [     0.00]           DISCOUNT    [     0.00]
ADJUSTMENT    [     0.00]           NET AMOUNT

ADJUSTMENT CODE/AMOUNT
[              ]    CODE   [                    ▽]
                    AMOUNT [  0.00]
                    [ ADD ]  [ MODIFY ]  [ DELETE ]

NOTE
[                                                          ]

[ ACCEPT ] [ CLEAR ] [ DELETE ]    [ OK ]          [ HELP ]
```

FIG. 9

```
ACH CTX ADDITIONAL INFORMATION
MEMO [                    ]          DISC DATA [    ]
SEQ  REF QUALIFIER AND NUMBER   INVOICE AMOUNT   AMOUNT PAID
```

| | | | |
|---|---|---|---|
| REF. CODE | [▽] | | |
| INFORMATION | | | |
| DATE QUALIFIER | [▽] | DATE | TIME |
| DATE QUALIFIER | [▽] | DATE | TIME |
| REF. QUALIFIER | [▽] | | |
| REF. NUMBER | | INVOICE AMT | 0.00 |
| SUBJ. TO DISC | 0.00 | ADJUSTMENT | 0.00 |
| AMT PAID | 0.00 | TERMS DISC. AMT | 0.00 |
| ADJ. CODE | [▽] | DISC. AMT TAKEN | 0.00 |
| DESCRIPTION | | | |
| REF. QUALIFIER | [▽] | | |
| REF. NUMBER | | | |
| DESCRIPTION | | | |

[ACCEPT] [CLEAR] [DELETE]         [OK] [HELP]

FIG. 10

TRANSACTION APPROVAL (100)

FILE  TRANSACTION  HELP

| PC REF | CUR | AMOUNT | SETUP NAME | BENE/RECEIVER | STATUS |
|---|---|---|---|---|---|
| 2 | USD | 9,999,999,999.00 | 108 | LORI NELSON | PIA |
| 3 | USD | 100,000,000.00 | | MARTHA LIDDY | PIA |
| 4 | USD | 9,999,999,999.00 | | CAROL WETMORE | PIA |
| 6 | USD | 987.00 | | ROYAL BANK OF SCOT | PIA |
| 15 | USD | 9,900.00 | | ACME CORPORATION | PIA |
| 16 | USD | 88,999.00 | | ABC COMPANY | PIA |

102  104   105                     110          112

[TOTALS] [APPROVE] [DELETE] [REJECT] [DETAIL]   — 84

TRANSACTION ENTRY SCREEN

CHECK VALIDITY OF A FUNDS TRANSFER

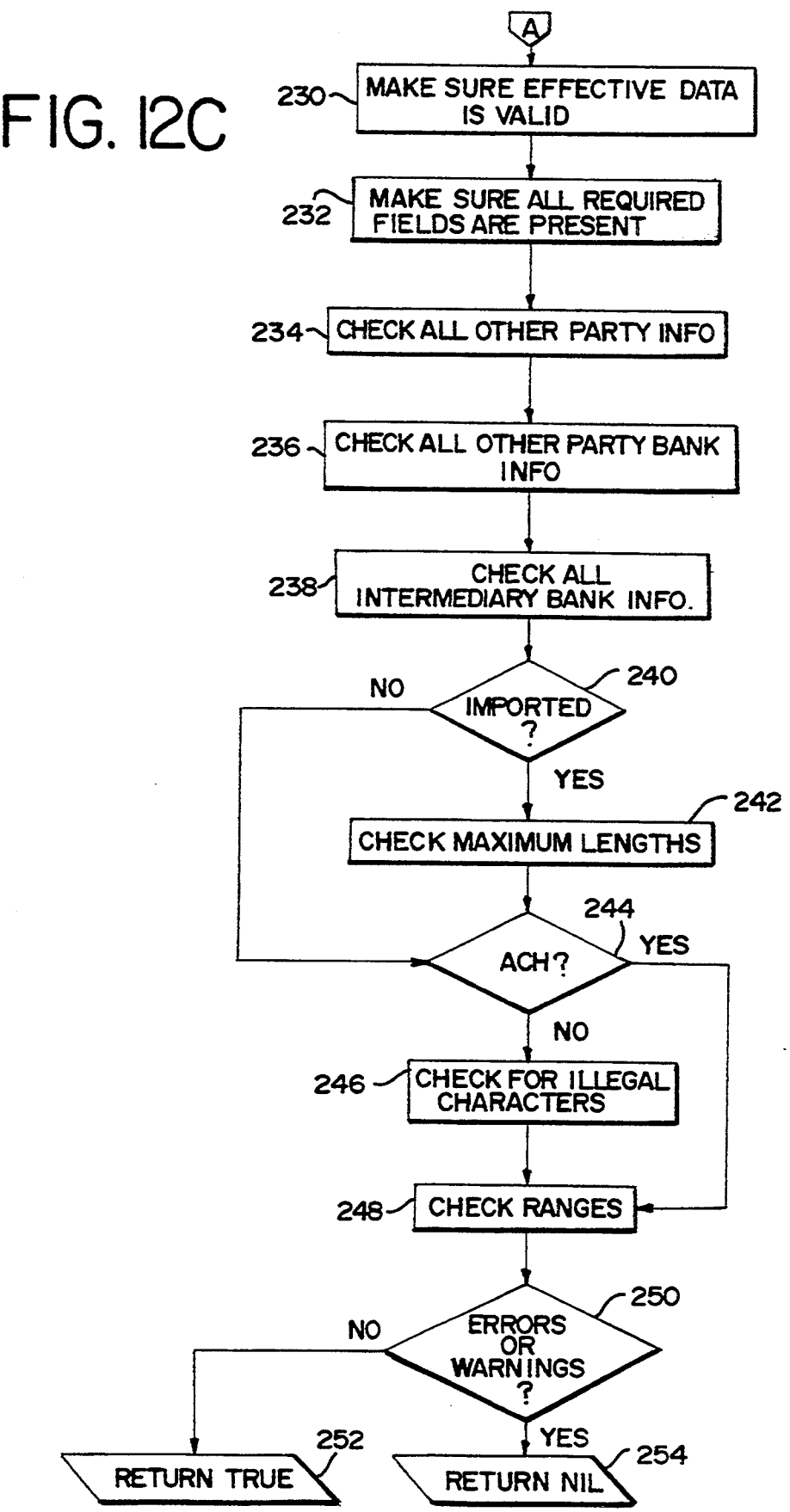

CUT OFF TIME CALCULATION

METHOD AND APPARATUS FOR PROVIDING ACCESS TO A PLURALITY OF PAYMENT NETWORKS

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The invention relates generally to computer systems for completing monetary transactions, and in particular, to a computer interface for providing access to a plurality of transaction payment networks.

BACKGROUND OF THE INVENTION

There exist a number of domestic and international payment networks available to facilitate the completion of monetary transactions. An individual payment network allows the user to affect a payment to individuals and/or corporations through the banking system. For example, the Federal Reserve Bank's Fedwire system is a payment network that allows users to transfer funds via the United States Federal Reserve Bank network. Other such payment networks include the Automated Clearing House ("ACH") payment network, the New York Clearing House Interbank Payment System ("CHIPS") and the Society for Worldwide Interbank Financial Telecommunication System ("SWIFT").

In the initiation of payments and transfers between various entities, certain banks have provided access to the various payment networks to their customers. Accordingly, a customer can choose a preferred method of payment to complete a transaction depending on the nature of the transaction and the location of the entities involved. Some transactions may need to be completed within a definite time frame, such as twenty-four hours, and thus only a specific or limited number of payment networks may be employed to complete the transaction in the time required. Further, certain payment networks are more convenient or efficient than others depending on whether the transaction must be completed nationally or internationally.

To facilitate the use of such payment networks, banks have provided various data processing products to their customer base. Employing a data communications network and various types of computers monetary transactions can be completed quickly and safely without the need for significant bank intervention. Banks have, therefore, provided access to their customers to individual payment networks through the use of mainframe and personal computers, and local area networks or other forms of communication networks. A customer subscribing to one of these products would thus have access to a specific payment network to complete a certain type of payment transaction. Such customers typically include corporations, which employ personal computers or the like to communicate with the payment network subscribed to.

Over the years, therefore, a plurality of differing and sometimes incompatible payment network interfaces have been developed. Due to the differing nature of the various national and international payment networks, customers who subscribe to several network interfaces need to learn the proper protocol with which to access each system. Where many payment transactions need to be completed on a daily basis using various payment networks, the differing protocols for each can be confusing and difficult to master. Moreover, since the interface systems and the networks themselves include differing architectures, several forms of computer hardware are required to communicate with the host of payment networks available. This requires that a customer purchase or lease sometimes redundant computer hardware to communicate with differing systems. In addition to the increase in cost, such hardware also takes up valuable space.

What is lacking, therefore, is a single user interface that would allow customers to communicate with any of the payment networks. Such an interface would provide access to any or all of the available payment networks employing a minimal amount of hardware. In addition, such an interface would use a common protocol to initiate payment transactions over the various payment networks, thus eliminating the need to learn the protocol employed by each and every differing network. Preferably, such an interface would provide access to all of the payment networks through a single user interface appearing on a computer display terminal.

It is, therefore, an objective of the invention to provide a single display interface to initiate and complete monetary transfers over any of a plurality of payment networks.

It is also an objective of the present invention to provide access to the various payment networks employing a protocol that is common to initiate transactions over all networks.

It is further an objective of the invention to provide access to the various payment networks through a single transaction entry screen.

SUMMARY OF THE INVENTION

In view of the above, there is provided a system for providing access to a plurality of payment networks. The system includes a display for displaying a single transaction entry screen comprising a plurality of data input fields. Each data input field prompts for and displays data applicable to the plurality of payment network. Input means are provided to supply the data relevant to a particular transaction. Selection means are also provided to select one of the plurality of payment networks to be employed with the transaction and to generate a signal indicating the payment network selected. This signal is received by interface logic to interface to and complete the transaction employing the particular payment network selected.

In one presently preferred embodiment of the invention, a central computer is employed to receive signals from a remote computer, where each signal represents a particular transaction and a particular payment network to be employed with the transaction. A transaction entry screen having data input fields common to each payment network is displayed on a display coupled to the remote computer. In the preferred embodiment, a modem is employed to couple the central computer to the remote computer.

In another aspect of the invention, a method for providing access to a plurality of payment networks is provided. The method includes presenting an operator with a display having a single transaction entry screen comprising a plurality of data input fields. Each field prompts for and displays data applicable to the plurality of payment networks. An input device is employed, coupled to this display, for inputting the data relevant to a particular transaction. With the input device, a user also enters a selection of the desired payment network to be employed with the transaction. A signal is generated from the input device representing the payment network selected. This signal is received by interface logic employed to interface with and complete the transaction over the particular payment network selected.

The invention thus combines on a single display an operator interface common to the plurality of payment networks. Providing the customer with a display displaying a single transaction entry screen eliminates the need for redundant computer equipment and the need to learn and employ differing protocols for each payment network. According to the invention, the single transaction entry screen allows the user to initiate a payment over any of the payment networks. Combining access to all of the various payment networks in a common product also eliminates the need to service, maintain and support a plurality of differing information processing products.

These and other advantages will be apparent on consideration of the following detailed description of the preferred embodiments of the invention, taken in conjunction with the appended drawings.

BRIEF DESCRIPTION OF THE DRAWINGS

FIG. 3 is a preferred transaction entry screen appearing on the remote computer shown in FIG. 1;

FIG. 4 is an additional transaction detail screen appearing on the remote computer shown in FIG. 1;

FIGS. 5-9 are additional information screens for use with the ACH payment network displayed on the remote computer of FIG. 1;

FIG. 10 illustrates a transaction approval screen appearing on the remote computer of FIG. 1;

FIGS. 12A-12D are a detailed flow chart of the transaction entry routine of the invention, where FIG. 12A shows the initiation of transaction entry, FIGS. 12B-12C show validity verification, and FIG. 12D shows the cut-off time sub-routine.

DETAILED DESCRIPTION OF THE PRESENTLY PREFERRED EMBODIMENTS

Figure 1:
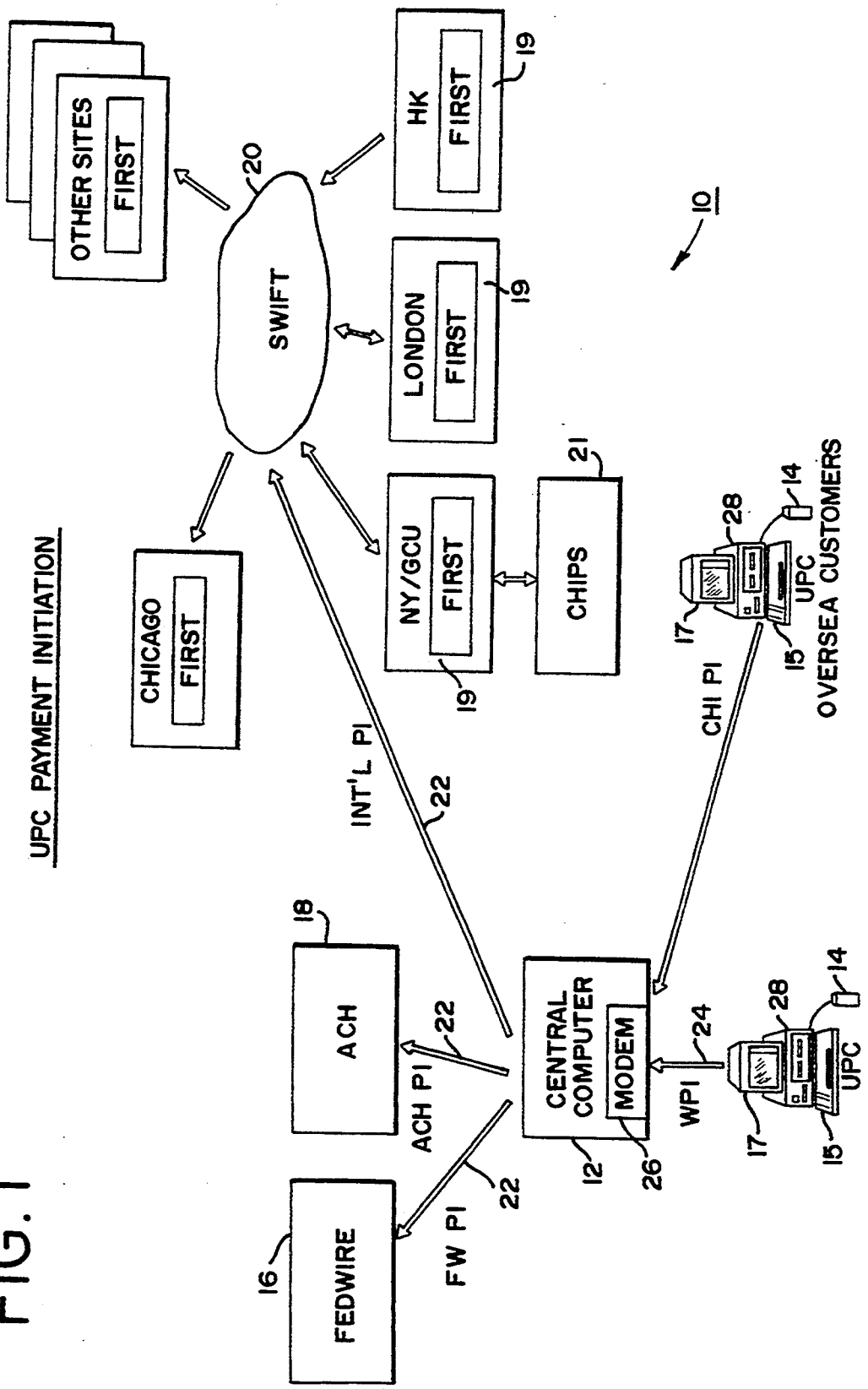
FIG. 1 is a block diagram of a system for providing access to a plurality of payment networks made according to the invention.

Referring now to the drawings, where like elements receive like reference numerals throughout, a block diagram of a system 10 for providing access to a plurality of payment networks is shown in FIG. 1. In the preferred embodiment of the system 10, a central computer 12 is provided to communicate with any one of a plurality of payment networks. Examples of such payment networks employed in a preferred embodiment of the invention include the Federal Reserve Bank Fedwire network 16, the ACH network 18, and the SWIFT network 20. Also shown in FIG. 1, the networks can be employed to complete transactions between the bank housing the central computer 12 and other regional, affiliated or branch banks 19. Thus, the SWIFT network 20 can be used to communicate transactions through a branch bank to another payment network such as the CHIPS network 21.

As those skilled in the art will appreciate, the payment networks illustrated in FIG. 1 are provided only by way of example, and any number of the available payment networks or systems can be employed with the invention without departing from its spirit or essential scope. Examples of such further payment networks and systems include various settlement networks in foreign countries and networks allowing for customer drawdowns from their own accounts.

To communicate with the plurality of payment networks, a network interface 22 is provided between the central computer 12 and the payment networks themselves. The network interface 22 can comprise a variety of communications and information transfer techniques. The network interface 22 can even comprise differing interfaces as dictated by each particular payment network. In the preferred embodiment of the invention, the central computer 12 includes interface software and hardware to communicate with the various interfaces required by the available payment networks and to complete transactions over each interface.

The central computer 12 also includes a user interface to facilitate user access to the plurality of payment networks. In the preferred embodiment, the central computer 12 includes a modem 26, which allows communication over the telephone lines 24 to one or more remote computers 28, which employs the DynaComm for Windows communications program, version 3.00.40, manufactured by Future Soft Engineering, Inc. of Houston, Tex. Although in the preferred embodiment the central computer 12 communicates with a plurality of remote computers 28, as those skilled in the art will appreciate the computers 28 need not be remote and can comprise any number of computers from a single computer to the maximum number capable of support by the central computer 12. Moreover, although a modem 26 and telephone lines 24 are the preferred method of communication to the remote computers 28, as those skilled in the art will also appreciate any number of communication interfaces will suffice for communication to the remote computers 28. For example, the telephone lines 24 can be replaced by a local area network or other known means of data communication.

In the preferred embodiment, the central computer 12 comprises a Tandem VLX Hardware Model Number C30 mainframe computer manufactured by Tandem Computers, Cupertino, Calif. The VLX Model C30 is capable of supporting the transaction throughput required over the system 10. The remote computers 28 are preferably personal computers such as the IBM PC manufactured by International Business Machines Corp. (or equivalent clone thereof). It is also preferred that the IBM PC include an 80386 microprocessor chip, four megabytes of RAM, a 20-megabyte local hard disk drive, a 1200 bits/second modem, a VGA color monitor and a compatible mouse 14. As those skilled in the art will appreciate, however, other similar computers can be employed without departing from the spirit and scope of the invention.

As will be described in more detail below, the system 10 includes software to implement the user interface between the remote computers 28 and the plurality of payment networks. The software provided in the system 10 is distributed between the remote computers 28 and the central computer 12. The software executing on the central computer 12 provides the functions necessary for completing the requested payments received from the remote computers 28 over the various payment networks. The software executing at the remote computers 28 provides the unique user interface of the invention to allow users access to the plurality of payment networks. This unique user interface allows access to any number of dissimilar payment networks through a single video display screen appearing at the remote computers 28 and using a single data input protocol.

Figure 2:
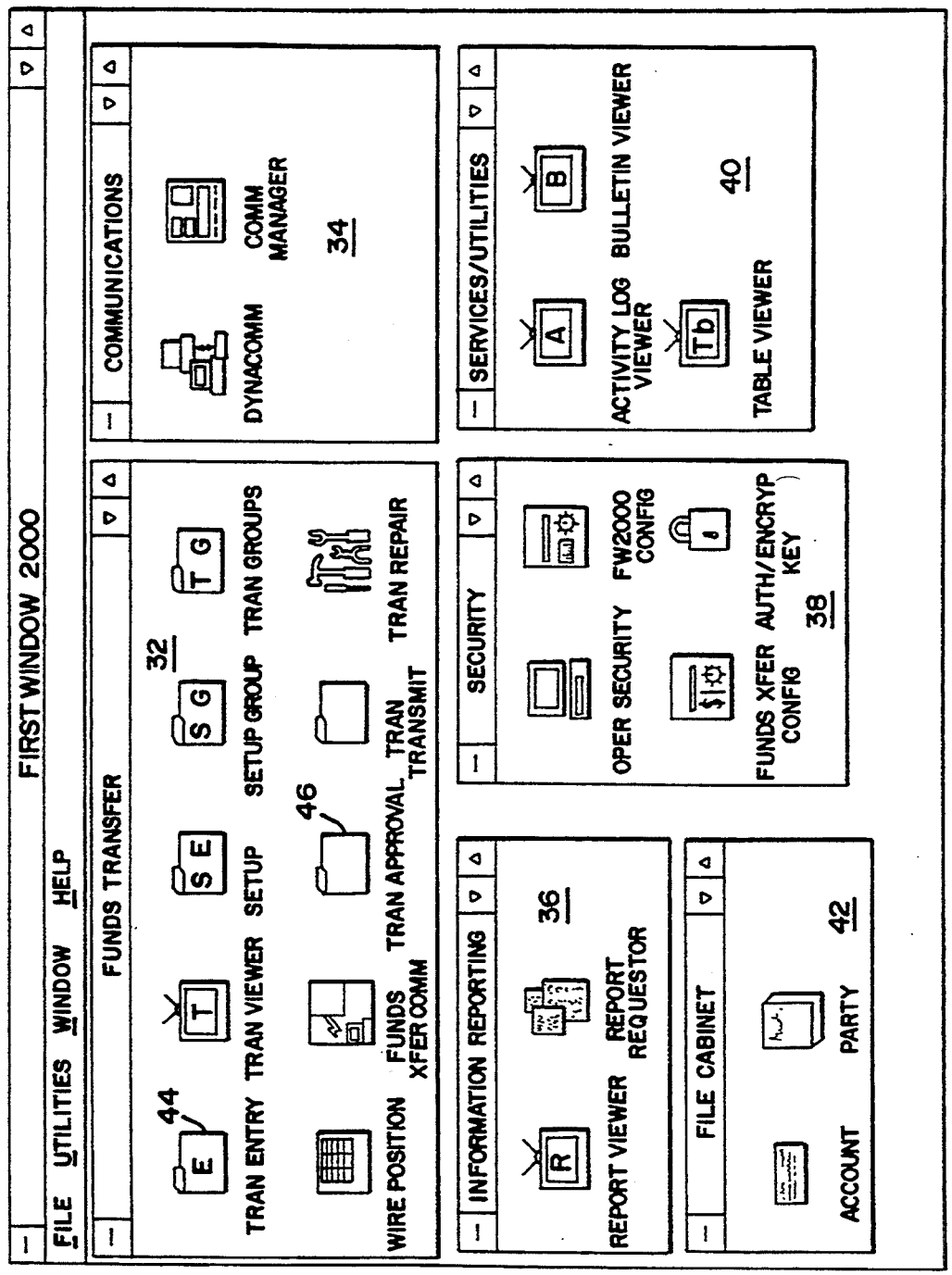
FIG. 2 is a desk top screen provided on the remote computer shown in FIG. 1 illustrating the various routines available on the system.

Turning now to the user interface of the invention, an example of one preferred desk top screen displayed at the remote computer 28 is illustrated in FIG. 2. In the preferred embodiment of the invention, the software interface provided at the remote computers 28 is accomplished using the Microsoft Windows version 3.1 operating system manufactured by the Microsoft Corporation. As those skilled in the art will appreciate, therefore, various facilities are provided within the Windows 3.1 operating system that allow for file access and program initiation. As shown in FIG. 2, the interface program executing at the remote computers 28 provides facilities for all the various functions necessary to initiate a payment transfer, as well as other system maintenance or communications functions, required by the system 10. These functions include funds transfer, communications, information reporting, security, services/utilities and file management, and are subdivided into various windows 32-42 appearing on the desk top screen 30. The communications 34, information reporting 36, security 38, services/utilities 40 and file handling 42 aspects of the software interface are handled in conventional manners and need not be discussed further herein. The funds transfer screen 32, however, includes the sub-routines of the user interface that provide access to the plurality of payment networks and is described in more detail below.

In the funds transfer window 32 a plurality of icons including a transaction entry icon 44 are displayed to the user. In the preferred embodiment of the invention, the mouse 14 can be used to manipulate a cursor across the display screen displaying the desk top screen of FIG. 2. Using the mouse 14, or the keyboard 15, the user selects the transaction entry icon 44 appearing in the funds transfer window 32 of FIG. 2. Selecting the transaction entry icon 44 accesses the appropriate sub-routine of the software interface to initiate a payment transfer over one of the payment networks. Selecting the transaction entry icon 44 also brings up a separate transaction entry screen. An example of the preferred transaction entry screen, appearing on the remote computer 28 upon selection of the transaction entry icon 44, is shown in FIG. 3.

Once a payment transaction has been input by the user using the transaction entry screen of FIG. 3, approval of the transaction takes place. The approval process also occurs at the remote computers 28 and employs the transaction approval sub-routine of the software interface. Thus, in a similar manner the transaction approval routine is initiated by selecting the transaction approval icon 46 shown in FIG. 2. The approval of a transaction initiated by the user is discussed in more detail below in connection with FIG. 10.

The transaction entry screen 48 shown in FIG. 3 allows both free-form and repetitive entry techniques as methods of initiating a payment transfer. In the free-form entry of data, the user inputs data through a keyboard 15 coupled to the display 17 of the remote computer 28. In the repetitive entry of transaction data, previous transactions over the system 10 can be stored under a specific setup name for future use. To initiate a repetitive transaction, therefore, the setup name previously entered by the user is typed in the "Setup Name" field 60 shown in FIG. 3. In the repetitive transaction initiation format, the remaining fields appearing in FIGS. 3 and 4 will be filled in using stored data provided from the stored setup, including a selection of the appropriate payment network. In the free-form manner of transaction initiation, the fields appearing in FIGS. 3 and 4 must be individually completed and filled in by the user.

In the free-form manner of transaction initiation, the fields necessary to be completed by the user include an account field 62, a transaction type field 64, and an amount field 66. The account field 62 represents the user's account at the bank housing the central computer 12 or a related bank. The transaction type field 64 that allows the user to specify the particular payment network desired for completion of the particular transaction. The amount field 66 provided in a transaction entry screen 48 can include a default amount or simply be blank in amount awaiting input of the transaction amount.

Based on the specific transaction type selected by the user or identified in the transaction type field 64, the various other fields appearing throughout the transaction entry screen, as well as other successive screens (see FIGS. 5-9), are dynamically enabled or disabled as determined by the software interface for the particular payment network chosen. In the transaction entry screen 48, these fields include a beneficiary field 70, an account number field 72, an account-with bank field 74, an intermediary field 76 and a text field 80. One or more of these fields may be appropriate to the particular payment network chosen by the user for completion of a particular transaction. For ACH payment network transactions, an ACH code field 68 is also provided, as will be described in more detail below.

As those skilled in the art will appreciate, several other features and functions are provided on the transaction entry screen of FIG. 3, which form a part of the software interface. These features and functions are facilitated by the Windows 3.1 operating system and include drop-down lists 80, field pick-data buttons 82 and system function buttons 84. These features are well-known in the art and need not be described in detail herein.

After the user fills in the account field 62 and the transaction type field 64, certain of the remaining fields appearing in the transaction entry screen 48 will change dynamically. For example, certain fields may change in terminology or length of valid input allowed, or may become "grayed out" to indicate their inapplicability to the specific transfer type selected. (In the display shown in FIG. 3, most of the fields appear grayed out as the interface awaits input of either a setup name or account number, at which time the appropriate fields of the transaction entry screen 48 are converted to normal video.) Examples of those fields that may change in valid input length include the text field 78, the beneficiary field 70 and the account-with bank field 74. Those fields that may be grayed out based on the transaction type selected by the user include the intermediary field 76; the ID code field 6; the ACH code field 68; the routing code fields 88; the account-with bank field 74; and the city field 90, state field 92 and county fields 94.

As can be seen, the various fields appearing on the transaction entry screen 48 may require differing formats depending on the transaction type selected. For example, the text field 78 is different for every type of transaction. Some transaction types such as the Federal Reserve Bank Fedwire network allow a free-format text area for the text field 78. Other transaction types such as the ACH network require a set format for the text field 78.

In the repetitive mode of transaction initiation, the user may select from a variety of stored payment transfers identified by various setup names. Accordingly, the setup name field 60 has associated therewith a pick-data button 82. As each payment transfer is entered by the user through the transaction entry window 48, the user can choose to store the specifics of that transfer as identified by a particular setup name. Selecting the setup name pick-data button 82 causes a listing of the various setup names stored on the system to appear in an enlarged setup name field 60 appearing on the transaction entry screen 48. The user can thus highlight any of the stored setup names and input that setup in the setup name field 60. Based upon the setup chosen, the proper information for the remaining fields in the transaction entry window 48 will propagate from the interface to the display. The amount field may include a default amount, which can be changed by the user. The transaction type field 64 and text field 78 may also be changed by the user if the particular setup so allows.

As shown in FIG. 3, many of the remaining fields of the transaction entry screen 48 include such pick-data windows 82. In particular, the transaction type field 64 includes a pick-data button 82, which preferably displays on the transaction entry screen 48 an enlarged window identifying all of the payment networks to which a particular user has access. The account field 62 also includes a pick-data button 82, which operates in a similar manner.

Upon completion of the pertinent data required for a particular payment transfer, the user will select the "Accept" system function button 84. When the Accept system function button 84 has been "depressed" the interface will either validate the input and display error messages if appropriate, for example, for additional transaction details required for the transaction type selected (see FIG. 4), or will accept the transaction and place a status indication in a summary field 81 for the particular transaction. In the preferred embodiment of the invention, after each transaction has been accepted it is stored on a data base (not shown) provided at the remote computer 28. Upon a regular interval, i.e. hourly, daily or weekly, the transactions stored on the various remote computers 28 are processed for approval. The transaction approval process is discussed in more detail below in connection with FIG. 10.

Based on the particular transaction type selected, further information may be allowed by the software interface. Referring to FIG. 4, for example, if the wire payment network was selected as the transaction type additional transaction details are allowed. Thus, FIG. 4 illustrates a preferred additional transaction details screen 90. As shown in FIG. 4, in addition to the fields already discussed in connection with the transaction entry screen 48, a settlement type window 92 and terms window 94 are provided. In the software interface, data entered on the transaction entry screen 48 will propagate to the additional transaction details screen 90 to complete those fields common to both screens. However, to provide further instructions for each transaction over the Fedwire or CHIPS payment networks the user can select from four terms appearing in the terms window 94. Examples of the terms that can be selected include a priority transfer, to deduct charges from the beneficiary, conditional payment or to deduct correspondent charges. Once the additional data provided in the additional transaction details screen 90 is complete, the user selects the "O.K." system function button 84.

Referring to FIGS. 5–9, if the ACH payment network is specified in the transaction type field 64 (FIG. 3) further additional information may be required. FIGS. 5–9 thus illustrate additional information screens required for the various types of ACH transfers. FIG. 5 prompts the user for additional information for a CCD+ type ACH transfer; FIG. 6 prompts the user for additional information required for a PPD+ACH type transfer; FIG. 7 prompts the user for additional information for a TXP ACH type transfer; FIG. 8 prompts the user for additional information required by a CTP ACH type transfer; and FIG. 9 prompts the user for additional information required by a CTX ACH type transfer. As mentioned above, once all the pertinent data is specified and entered for each particular payment transfer, the transaction is stored at the remote computer to await transaction approval.

Referring to FIG. 10, a preferred transaction approval screen 100 is shown. As displayed in FIG. 10, the plurality of transactions awaiting approval are listed for a system operator who has been given access to the transaction approval screen 100. The transaction approval screen 100 includes several categories with which to identify each transaction awaiting approval. These categories include a PC reference category 102, a currency category 104, an amount category 106, a setup name category 108 (where appropriate), a beneficiary/receiver category 110, and a status category 112.

Figure 11:
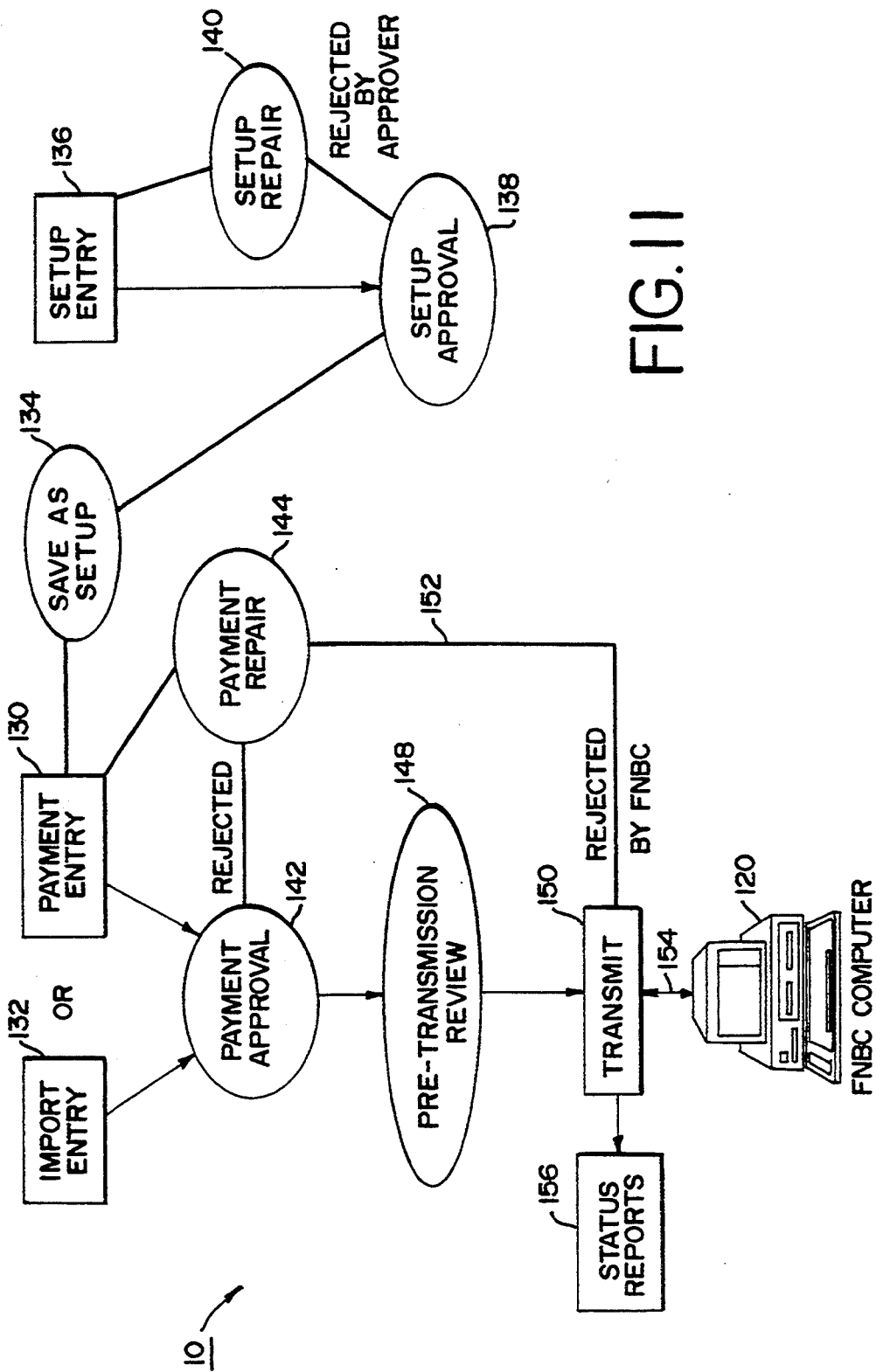
FIG. 11 is a flow diagram illustrating the transaction entry process of the invention.

FIG. 11 illustrates the transaction entry function flow as seen from the back office terminals 120 provided at the central bank. As indicated at the top of FIG. 11, a payment may be initiated in either of two fashions on the system 10. The payment may be entered by the user by hand as illustrated by the payment entry box 130, or the payment may be imported from other files as shown by the import entry box 132. As described above, payments first entered by the user may be saved as a setup 134. Setups may also be entered in advance of any transfer (box 136), and all setups are approved as shown at step 138. A setup repair step 140 is also provided in FIG. 11.

Once a payment is entered, the payment may be first approved or verified at the remote locations before it is communicated to the central bank (see FIG. 10). As shown in FIG. 11, a payment is approved at step 142, and rejected payments can be repaired by the user at step 144. After a transaction entry has been approved it may be further reviewed at step 148, but is ultimately transmitted to the central bank at step 150. Those transactions rejected by the central bank are sent back through path 152 to the remote location for payment repair (step 144). Valid, approved payment transactions transmitted to the bank are then forwarded to a back office terminal 120 in order to complete the transaction.

As shown by step 156, status reports are also available at the central bank showing transmission errors or acknowledgements and control data.

Referring now to FIG. 12, a detailed flow chart of the software interface is provided. A copy of the actual code used to implement the software interface of the invention appears in the Appendix. In the preferred embodiment of the invention, the software was written primarily in a proprietary object-oriented programming language called "Actor" developed by the Whitewater Group, Evanston, Ill. As those skilled in the art will appreciate, however, other programming languages and techniques can be employed to achieve the software interface without departing from the spirit and scope of the invention. For example, the C programming language, or any of its enhancements (C++ and turbo C++), or any combination of programming packages can be used to develop the software interface.

Figure 12A:
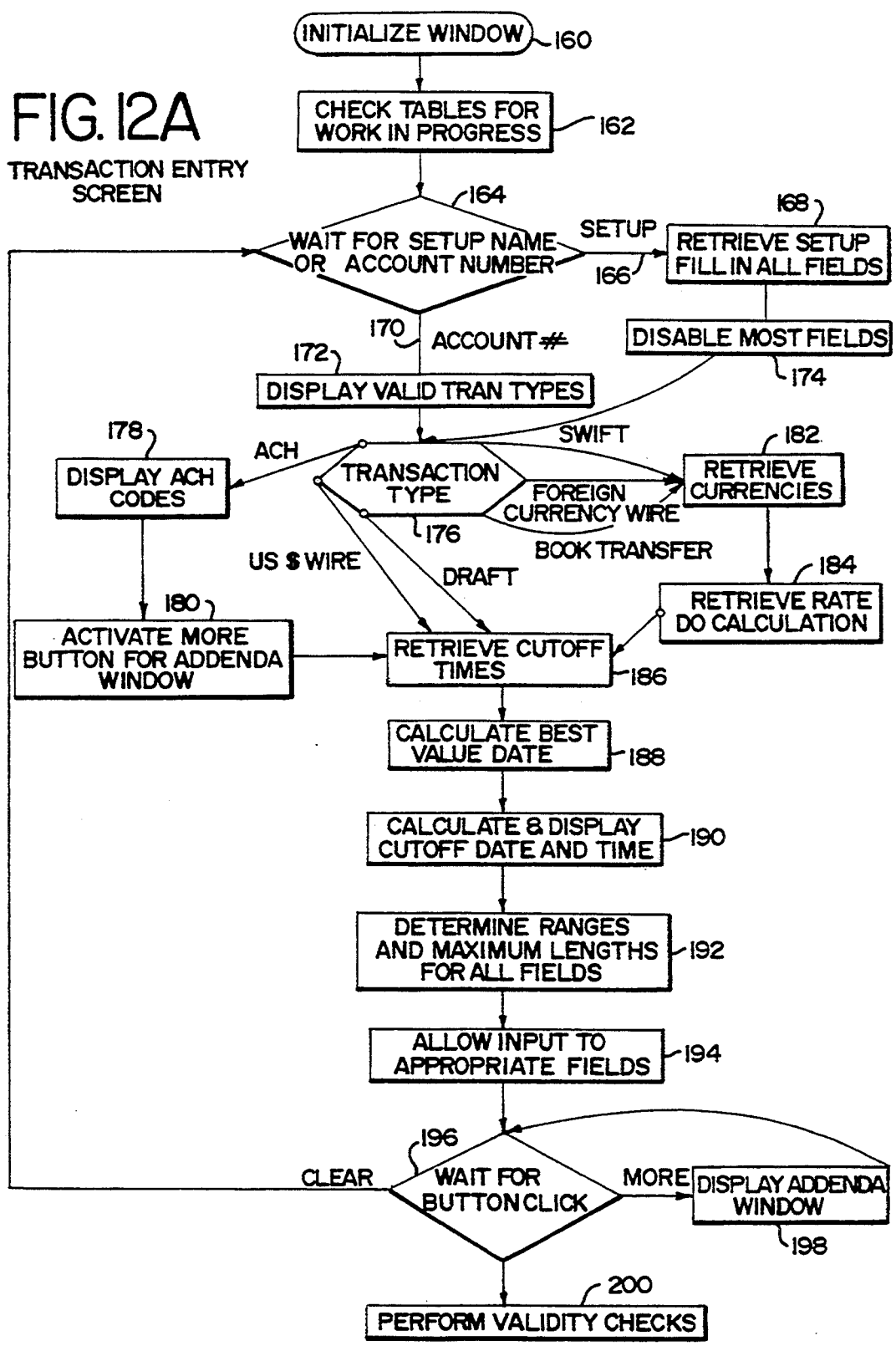

Referring to FIG. 12A, a detailed flow chart for implementation of the transaction entry screen 48 (FIG. 3) is illustrated. The transaction entry screen 48 is first initialized at step 160 and a check is made at step 162 to determine if any work is currently in progress. If not, the interface then waits for either input of a setup name or an account number at step 164. If a setup name is provided, the program branches at step 166 to retrieve the setup and fills in all appropriate fields at step 168. Those fields not necessary for the specific setup are disabled at step 174. If an account number is provided, the program branches at step 170 to display all available and valid transaction types at step 172 subscribed to by the user.

At step 176, the user selects and provides the preferred transaction type for the particular payment transfer. Based on the transaction type selected, therefore, certain additional functions are performed, as described above. For example, where an ACH transfer has been selected, the program proceeds to display the available ACH codes at step 178 and enables the "More" system function button 84 (FIG. 3) at step 180. On the other hand, where a SWIFT, foreign currency wire or book transfer is selected by the user, the available currencies are retrieved at step 182 and the conversion rate for each currency is calculated at step 184. After completing either the ACH or SWIFT/foreign currency wire/book transfer branches of the program, or if a Federal Reserve Fedwire transfer or draft transfer were selected by the user, the program proceeds to retrieve the proper cutoff times for the transaction at step 186.

In the cutoff time function, the program determines the appropriate time frame in which to complete the requested payment transfer. The best value date is calculated at step 188 and the cutoff date and time are calculated and displayed at step 190. A more detailed flow chart of the cutoff time calculation appears in FIG. 12D, and is described in more detail below.

After the cutoff date and time are calculated and displayed, the program determines the ranges and maximum lengths for all fields appearing on the transaction entry screen 48 (FIG. 3) at step 192. The interface then allows the user to input data to the appropriate fields at step 194, and then waits for one of the system function buttons 84 to be "depressed" at step 196. Upon activation of the "Clear" function button 84 (FIG. 3) the flow returns to step 164 to await entry of a new transaction. Should the "More" system function button 84 have been depressed, the program proceeds to display the additional screens of FIGS. 4–9 at step 198. Should the user select the "Accept" system function button 84, the program proceeds to perform validity checks at step 200. A detailed illustration of the validity check routine appears in FIGS. 12B and 12C.

Figure 12B:
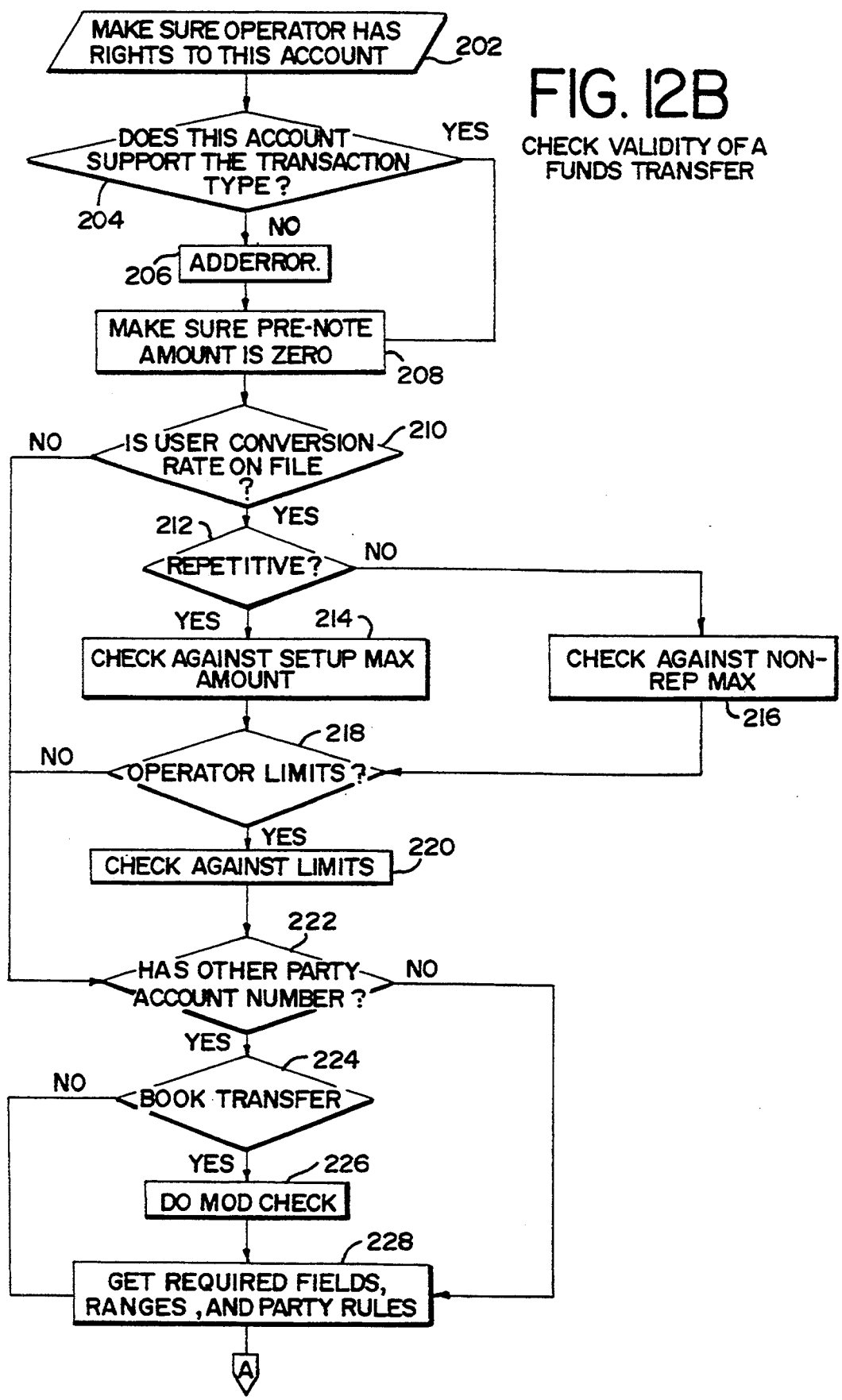

Referring to FIGS. 12B and 12C, the flow of the validity analysis sub-routine is illustrated. The validity analysis sub-routine is also part of the software interface executing at the remote computers 28. Upon initiation of the validity routine at step 202, therefore, the routine checks to ensure the operator has rights to access the particular transfer and account to be verified. If so, the routine next determines at step 204 if the particular account supports the transaction type chosen. If not, an error is identified at step 206. Whenever the pre-note transaction type is chosen the routine sets the pre-note amount to zero at step 208.

The validity routine next checks whether the user conversion rate is on file at step 210. If so, the routine determines whether the transaction is repetitive at step 212. If the transaction is repetitive, the validity routine checks at step 214 the amount entered against the maximum amount defined by the setup. For non-repetitive transfers the routine checks the amount entered against a non-repetitive maximum amount at step 216. After either maximum amount has been checked, or if the user conversion rate is not on file, the program proceeds to step 218.

At step 218, the validity routine checks for any operator limits. If operator limits exist, the routine checks the data entered against those limits at step 220. After such checks, or if no operator limits exist, the program proceeds to step 222 to check for other party account numbers. If an other party account number exists the validity routine determines whether the transfer is a book transfer at step 224, and if so, performs a "mod" check at step 226. Upon completion of the mod check, or if no other party account number exists, the program proceeds to step 228 where it retrieves required fields, ranges and party rules.

Continuing in FIG. 12C, the validity routine next determines whether data input by the user is valid or present at steps 230–238. At step 240, the routine determines whether the transaction entry was imported. If so, the routine determines the maximum length of the imported transfer at step 242 and proceeds to step 244. For non-imported transfers the program proceeds directly to step 244 where a determination of whether the ACH network is specified is made. If the transfer is not an ACH transfer then the program checks for illegal characters at step 246 and proceeds to step 248 to check ranges. Ranges are also checked at step 248 if the transfer is an ACH type payment. Finally, the validity routine determines if any errors or warnings were generated at step 250. The value returned to the main interface routine is zero if any errors or warnings occurred (step 254). If the transaction is valid, a true value is returned to the main program at step 252.

Figure 12D:
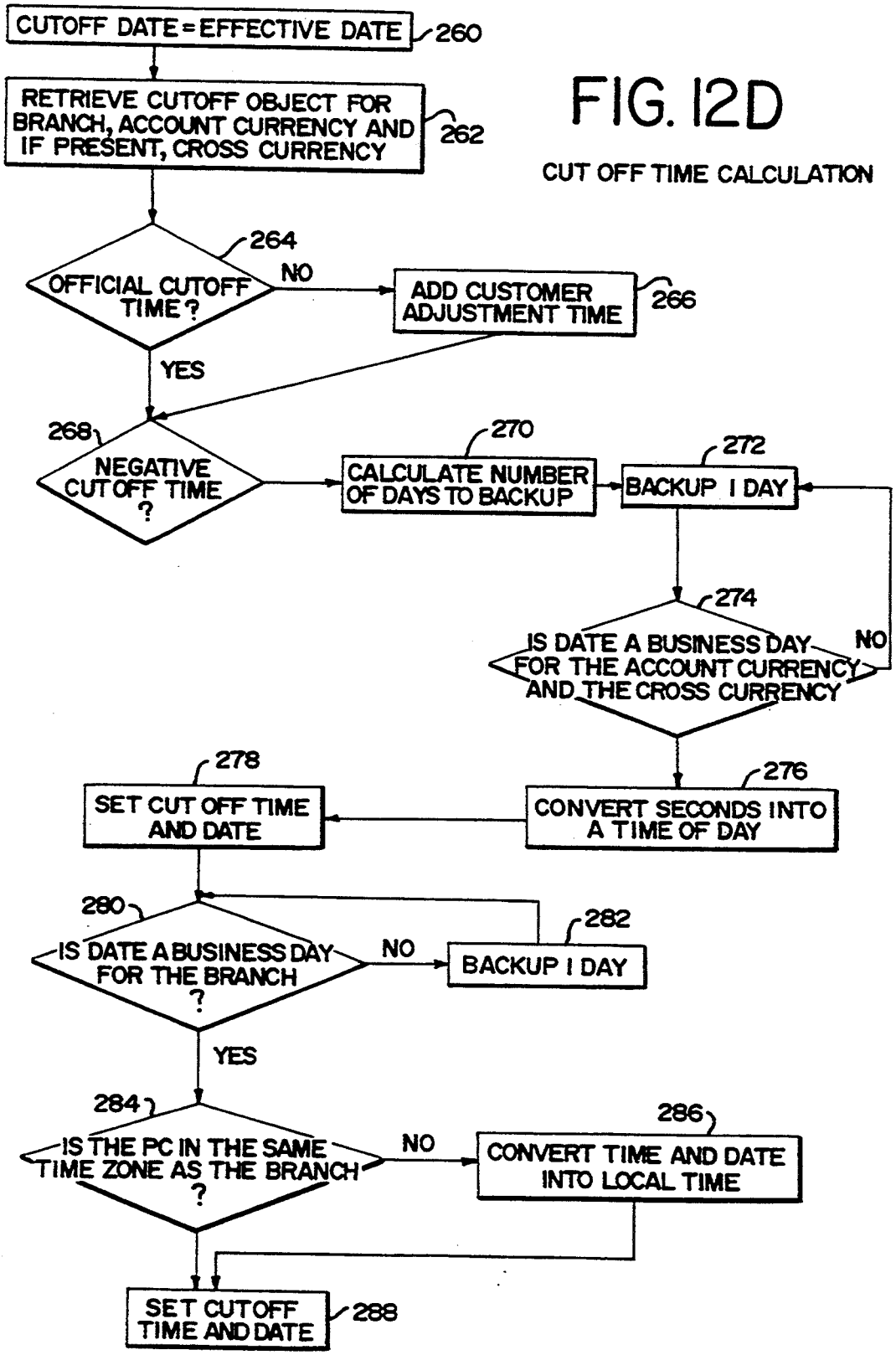

Referring now to FIG. 12D, a detailed flow chart of the cutoff time calculation is illustrated. At step 260, the cutoff time sub-routine sets the cutoff date equal to the effective date. At step 262 the cutoff sub-routine retrieves the particular cutoff default for the type of transaction selected. A determination is made at step 264 if the default cutoff time for the transaction is to be employed. If not, a customer adjustment to the default cutoff time is added at step 266 and the program returns to step 268. If the default cutoff time will be employed, the sub-routine determines at step 268 if a negative cutoff time is selected. A negative cutoff can be supplied by the user as another form of transaction protection. If so, the cutoff time sub-routine calculates the number of days to back up at steps 270 and 272. The sub-routine also determines if the backup date is a business day at step 274. If not, the sub-routine backs up another day at step 272.

The cutoff time sub-routine proceeds at step 276 to convert the cutoff time into a time of day. Thus, the cutoff time and date are set at step 278 and again a determination is made if the cutoff date falls on a business day at step 280. If not, the sub-routine backs the cutoff date one day at step 282. Next, the sub-routine checks for matching time zones for the location of transaction initiation and transaction completion at step 282. If these time zones differ, the sub-routine converts the cutoff time and date into local time at step 284. The sub-routine is exited at step 286 where a valid cutoff time and date have been set.

Figure 13:
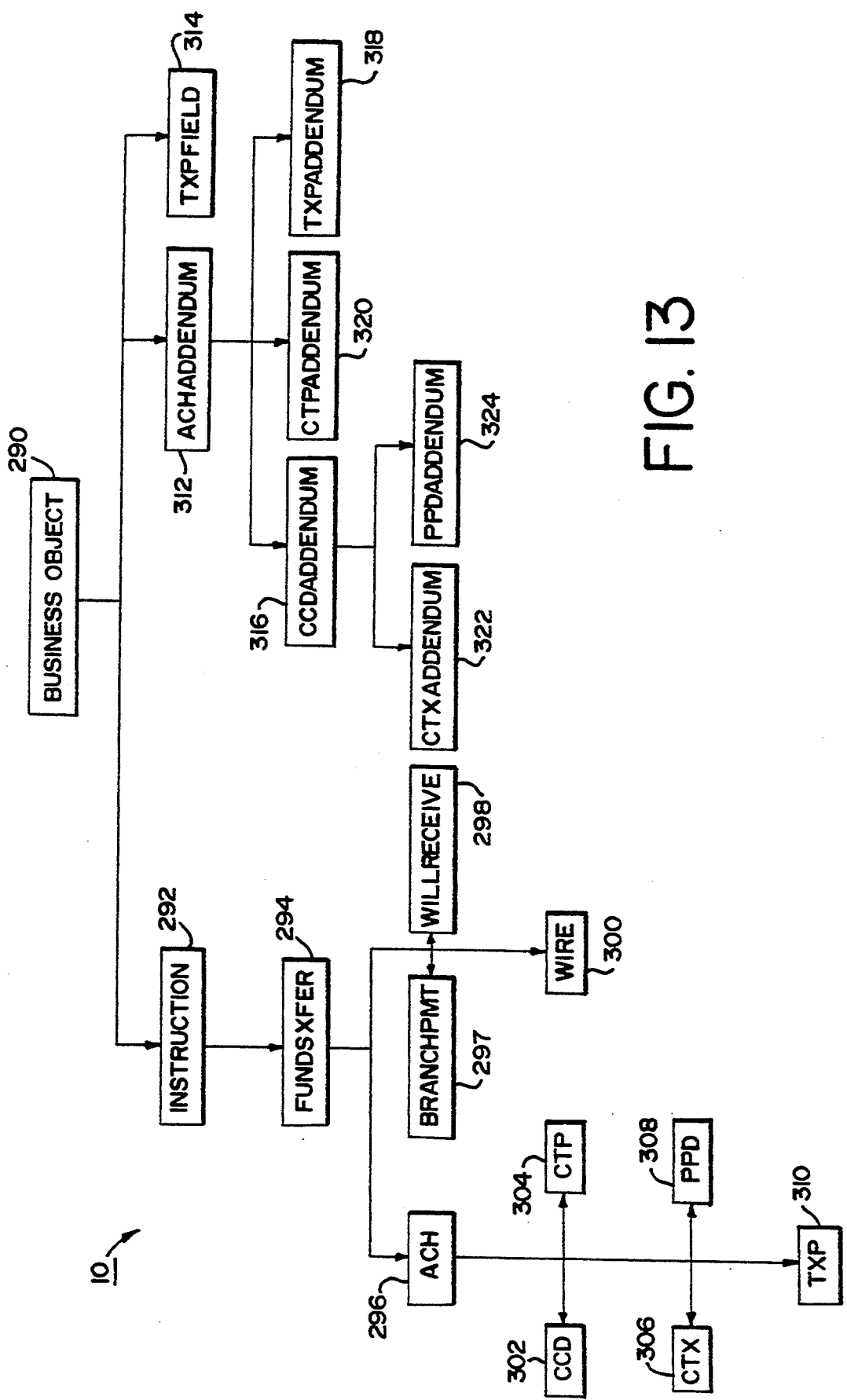
FIG. 13 is an hierarchical illustration of the data base to create and process transactions over the various payment networks employed with the invention.

A hierarchical depiction of the data base design for transaction entry and processing over the system 10 employing the preferred object-oriented programming language is shown in FIG. 13. At the top of FIG. 13 is a business object box 290. In the context of the invention, the business object box 290 represents the unified payment transfer system of the invention. In this system, a payment initiation is seen as an instruction 292 in the hierarchy of FIG. 13. Upon selection of a funds transfer at point 294, the software interface branches to the rules associated with various payment networks coupled to the system 10. As illustrated in FIG. 13, these payment networks can include an ACH payment network 296, a branch payment network 297, a "will receive" transfer 298 and a Fedwire transfer 300. At points 292 and 294, therefore, all data received by the interface is common to all of the various payment networks and options available to each user. Upon designation of either the branch payment network 297, "will receive" transfer 298 or Fedwire transfer 300, the interface receives the rules associated with the respective payment network.

For ACH transfers 296, however, further identification of the specific ACH type of transfer is required. Accordingly, for CCD transfers 302, CTP transfers 304, CTX transfers 306, PPD transfers 308, and TXP transfers 310 further processing may be necessary. As a result, in response to selection of the "More" system function button 84 (FIG. 3) the addenda rules identified at points 312–324 for the various ACH type transfers are supplied by the data base to the interface software.

As can be seen, the system described above provides bank customers the unique ability to access any of a number of payment networks through a single user interface. The customer can thus initiate a plurality of payment transactions through the single user interface without employing redundant computer hardware or differing system protocols. These advantages are further enhanced because the interface to the plurality of payment networks is provided through a single computer screen.

Accordingly, the single user interface of the invention provides a uniform gateway to the plurality of national and international payment networks. This single user interface provides advantages to both the bank and its customers. With a single user interface and system, a bank no longer needs to support and maintain differing hardware and software systems products provided to its customer base. The primary advantage to the customer is the ease of initiation of any form of payment transfer over a single system employing a single communications protocol. A further advantage to the customer is the elimination of redundant computer equipment which can result in increased costs and fees, and take up valuable office space.

It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents, that are intended to define the spirit and scope of this invention.

APPENDIX

TransBrowser

Source file:           TRANSBRO.CLS

Inherits from:         Object WindowsObject Window AppWindow Form UPCForm UPCBrowser Inherited by:          RepairBrowser SetupBrowser SetupGroupBr SetupViewOnly TransGroupMember Transaction Entry Browser Instance variables:

| | |
|---|---|
| hWnd | (From class WindowsObject) |
| defProc | (From class WindowsObject) |
| parent | (From class WindowsObject) |
| cRect | (From class WindowsObject) |

| | |
|---|---|
| contID | (From class WindowsObject) |
| wStyle | (From class WindowsObject) |
| paintStruct | (From class Window) |
| hMenu | (From class Window) |
| menu | (From class Window) |
| buttonDn | (From class Window) |
| locRect | (From class Window) |
| caption | (From class Window) |
| cursor | (From class Window) |
| picture | (From class Window) |
| port | (From class Window) |
| space | (From class Window) |
| fieldColl | (From class Form) |
| gettingFocus | (From class Form) |
| theFocus | (From class Form) |
| idDict | (From class Form) |
| handleDict | (From class Form) |
| currGroup | (From class Form) |
| errorField | (From class Form) |
| execModal | (From class Form) |
| dirty | (From class Form) |
| retVal | (From class Form) |
| dispatchTrigger | (From class Form) |
| statusText | (From class Form) |
| fieldWithFocus | (From class Form) |
| aRec | (From class UPCForm) |
| fldValDict | (From class UPCForm) |
| hBrush | (From class UPCForm) |
| errorLog | (From class UPCForm) |
| activeRec | (From class UPCBrowser) |
| selCriteria | file open saved select criteria |
| fundsXfer | working transaction |
| sessionNum | current session |
| hostSetup | for host repetitive reference |
| items | set of accepted transactions |
| setup | holds selected setup |
| setupText | holds setup addenda as string |
| operId | operator id |
| workVar | used by summary list block processing |
| selItemIdx | index into summary list of the currently selected transaction |
| pendingXferRefNum | temporary place to store num which has been fetched from BBS but not used yet |

Class variables:

$OtherPartyRetrieval
$OtherBankRetrieval
$OtherPartyFldVal
$OtherBankFldVal
$InterBankRetrieval
$InterBankFldVal
$FieldRetrieval
$StrBuf Class methods:

caption(self)

Returns the caption string.

```
{ ^loadString(15705) /* Transaction Entry */ ;
}
``` helpFields(self)

5/1/1992 14:26

```
{^%IdentityDictionary(
  #setupName->2201
  #fnbcAccount2->2202
  #transType->2203
  #currCode->2204
  #amount->2204
  #docRef->2205
  #bene->2206
  #accountNumber->2207
  #bankName->2208
  #interBankName->2209
  #achCode->2210
  #bankCodeTypes->2211
  #bankCode->2211
  #interBankCodeTypes->2211
  #interBankCode->2211
  #addenda->2212
  #beneCodeTypes->2217
  #beneCode->2217
  #valueDate->3001
  #pcRef->3002
  #sessionNumber->3003
  #cutOff->3004
  #interBankCity->0
  #interBankState->0
  #interBankCountry->2110
  #beneCity->0
  #beneState->0
  #beneCountry->2110
  #bankCity->0
  #bankState->0
  #bankCountry->2110
  );
}
``` helpIndex(self)

4/10/1992 13:53

```
{
  ^3000;
}
``` wndIcon(self)

6/10/92 KAM

```
{ ^TRANSBROW;
}
```

Object methods:

acceptAction(self, fld, code | ok tranOK)

Accepts the current fundsXfer. Adds the amount of the transaction to the operator's running total. 8/3/92 ADC: There was a bug in restoring the operator's cumulative total when an update failed.

```
{ showWaitCurs();
  clear(UPCServices[#errorMessages]);
```

```
      if not(tranOK := isValid?(fundsXfer))
      then showOldCurs();
         tranOK := showDataCheckerResults(self); /* operator may override
            warnings */
      endif;
      if tranOK
      then showWaitCurs();
         calcAndSetNumApprReq(fundsXfer);
         if isStored(fundsXfer)
         then ok := acceptUpdate(self);
         else ok := acceptInsert(self);
         endif;
         showOldCurs();
         if ok
         then enableTotal(self);
         else showDataCheckerResults(self);
         endif;
      endif;
      setPendingXferRefNum(self,nil);
      ^ok;
}
``` acceptedFreeForm(self, fld, code)
Accepts the current fundsXfer.

```
{ removeTriggersFreeForm(self);
  hostSetupRemoval(self);
  if activeRec
  then activeRec := false;
     makeFundsXfer(self);
     enableAllFreeForm(self);
     setFocus(self[#setupName]);
  else makeFundsXferAsFundsXfer(self);
     enableAllFreeForm(self);
     dirtyOff(self);
     fillBestValueDate(self);
     setCutoff(self);
     displayCutoff(self);
     isAncestor(class(fundsXfer), ACH) cand
        setFocus(self[#achCode]) cor
        setFocus(self[#amount]);
  endif;
}
``` acceptedRepetitive(self, fld, code)
Accepts the current fundsXfer.

```
{ removeTriggersRepetitive(self);
  asFreeForm(self);
  hostSetupRemoval(self);
  makeFundsXfer(self);
  enableAllFreeForm(self);
  setFocus(self[#setupName]);
  activeRec := false;
.}
``` acceptInsert(self | ok, oper, itemRec, amountAndCode)
8/4/1992 12:25 ADC: Split off from the acceptAction method to reduce its complexity.

```
{ oper := operator(UPCServices[#systemConfiguration]);
  setEntererId(fundsXfer, id(oper));
  setCurrStatus(fundsXfer, WIP);
  if (ok := insert(fundsXfer))
  then
     amountAndCode := xCcyAmtOrAmountAndCode(fundsXfer);
     itemRec := build(CStruct, itemDataType(items));
     itemRec[#xferRefNum] := xferRefNum(fundsXfer);
     itemRec[#summCcyCode] := summCcyCode(fundsXfer);
     itemRec[#summAmount] := summAmount(fundsXfer);
     itemRec[#setupUsed] := setupUsed(fundsXfer);
     itemRec[#otherPartyName] := name(otherParty(fundsXfer));
```

```
        itemRec[#initialStatus] := #(RTS PFA P1A)[numApprReq(fundsXfer)];
        itemRec[#currStatus] := currStatus(fundsXfer);
        itemRec[#xCcyAmtOrAmount] := amountAndCode[0];
        itemRec[#code] := amountAndCode[1];
        itemRec[#stamp] := stamp(fundsXfer);
        add(items, itemRec);
        dispatchOff(self);
        setCurSel(self[#summary], size(self[#summary]) - 1);
        dispatchOn(self);
        addToActivityLog(self);
        (maxDailyAmt(oper)>0) cand
            addToCumTotalAmt(oper, inBaseCurrency(Currency, amountAndCode[0],
    amountAndCode[1]));
     endif;
     ^ok;
   }
``` acceptUpdate(self | oper, ok, itemRec, amountAndCode).

8/4/1992 12:19 ADC: Separate routine for updating to reduce complexity of the acceptAction method.

```
{ if isACH(fundsXfer) /* only ACH have addenda */
      cand isDirtyFld(fundsXfer, #addenda) /* only interested in these */
      cand not(addenda(fundsXfer)) /* no addenda on the new guy */
      cand not(addenda(aRec)) /* original */
    then clearDirtyFld(fundsXfer, #addenda); /*so as not to confuse DB
logic*/
  endif;
  itemRec := items[selItemIdx];
  oper := operator(UPCServices[#systemConfiguration]);
  if (maxDailyAmt(oper)>0)
  then
     amountAndCode := xCcyAmtOrAmountAndCode(aRec);
     subtractFromCumTotalAmt(oper, /* cumulative total */
         inBaseCurrency(Currency, amountAndCode[0], amountAndCode[1]));
  endif;
  if (ok := update(fundsXfer))
  then
     amountAndCode := xCcyAmtOrAmountAndCode(fundsXfer);
     itemRec[#summCcyCode] := summCcyCode(fundsXfer);
     itemRec[#summAmount] := summAmount(fundsXfer);
     itemRec[#setupUsed] := setupUsed(fundsXfer);
     itemRec[#otherPartyName] := name(otherParty(fundsXfer));
     itemRec[#xCcyAmtOrAmount] := amountAndCode[0];
     itemRec[#code] := amountAndCode[1];
     itemRec[#stamp] := stamp(fundsXfer);
     invalidateItem(self[#summary], selItemIdx);
     logItem(self, 5020, asString(sessionNum)); /*modified*/
  endif;
  /* Successful update, add in the new amount; otherwise, add back in the
     original amount. */
  (maxDailyAmt(oper)>0) cand
      addToCumTotalAmt(oper, inBaseCurrency(Currency, amountAndCode[0],
  amountAndCode[1]));
  ^ok;
}
``` addToActivityLog(self)

4/1/1992 11:13 Adds to the activity log the two levels of warnings commonly expected in the course of processing.

```
{ do(#(LIS_DATA_WARNING LIS_WARNING),
    { using(severity) addToActivityLog(UPCServices[#errorMessages],
severity);
    });
}
``` asFreeForm(self)

12/23/1991 15:38 Undergoes metamorphosis, changes identity to free form.

```
{ setup := nil;
}
``` asSetup(self, wP, lP | aSetup)
　　　1/14/1992 14:19 Method performed as a result of a menu selection.

```
{
    runModal(SaveAsSetup:late, self, fundsXfer)
}
``` canDoFreeForm(self)
　　　1/22/1992 13:12 The operator has the privilege of free form entry.

```
{ ^isPrivOn?(operator(UPCServices[#systemConfiguration]), PRIV_FREE_ENTRY);
}
``` canDoRepetitive(self)
　　　1/22/1992 13:12 The operator has the privilege of repetitive entry.

```
{ ^isPrivOn?(operator(UPCServices[#systemConfiguration]), PRIV_REP_ENTRY);
}
``` changeAccountFreeForm(self, fld, code | tmp)
　　　Given an account, retrieve the info and populate the fields. Enable transaction type.

```
{
    if code = CBN_SELCHANGE /* Only do if the selection changed. */
    then
      showWaitCurs();
      clear(UPCServices[#errorMessages]);
      makeFundsXfer(self);
      if setCustInfoByStr(fundsXfer, trimBlanks(getField(fld)))
        setField(self[#accountLongName], name(custAcct(fundsXfer)));
        setField(self[#transType], instTypes(custAcct(fundsXfer)));
        enable(self[#transType]);
        enableForm(self);
        setFocus(self[#transType]);
        dirtyOff(fld);
      else
        messageBox(UPCServices[#errorMessages], ThePort, "Error accessing
account", caption(class(self)), MB_OK);
        enableForm(self);
        setErrorField(self, self[#fnbcAccount2]);
        clear(UPCServices[#errorMessages]);
      endif;
      showOldCurs();
    else
      setCustAcct(fundsXfer, nil);
      disable(self[#accept]);
      if isBlank(tmp := getText(fld))
        disable(self[#transType]);
      else
        if searchString(fld, tmp)
          enable(self[#transType])
        else
          errorBox(loadString(15731) /* Invalid Account Number */ ,
                   loadString(15732) /* No account begins with */ + tmp);
          setText(self[#fnbcAccount2], NULLSTR);
        endif;
      endif;
    endif;
    setSessionNum(self);
}
``` changeAccountRepetitive(self, fld, code)
　　　Given an account, retrieve the info and populate the fields.

```
{ showWaitCurs();
  removeTriggersRepetitive(self);
  /*makeFundsXfer(self); commented out 5/12/92 */
  asFreeForm(self);
  setText(self[#setupName], NULLSTR); /* Do this before enabling triggers
*/
```

```
enableTriggersFreeForm(self); /* Triggers rigged again */
changeAccountFreeForm(self, fld, code); /* Fire away */
showOldCurs();
}
``` changeACHTranCode(self, fld, code)
Change trigger for ACH tran code.

```
{ setAchTranCodeByStr(fundsXfer, getField(fld));
  achTranCode(fundsXfer) in %Set(23,28,33,38) cand not(amount(fundsXfer))
  cand setAmount(fundsXfer,0.0)
}
``` changeAddendaHostRepetitive(self, fld, code | text)
1/7/1992 9:25 This trigger gets exercised on a change to the addenda of a host repetitive payment. The gist of it is that you can append to the setup's addenda or detail text, but you can't change the part that comes off the setup.

```
{ if size(setupText) > 0
    then text := asString(asTextCollection(self[#addenda]));
      if size(text) >= size(setupText) /* new text at least as long as setup's */
        cand setupText = copyFrom(text, 0, size(setupText))
        then ;
        else hostSetupFieldChanged(self, fld, code);
      endif;
    endif;
}
``` changeAddendaRepetitive(self, fld, code | text)
1/7/1992 9:25 This trigger gets exercised on a change to the addenda of a repetitive payment. The gist of it is that you can append to the setup's addenda or detail text, but you can't change the part that comes off the setup. 7/24/92, revisited by ADC. Somehow, the equality expression setupText = copyFrom(etc..) got changed to an assignment, setupText := copyFrom. So, it didn't work. ADC, 7/24/92.

```
{ if size(setupText) > 0
    then text := asString(asTextCollection(self[#addenda]));
      if size(text) >= size(setupText) /* new text at least as long as setup's */
        cand setupText = copyFrom(text, 0, size(setupText))
        then ;
        else setupFieldChanged(self, fld, code);
      endif;
    endif;
}
``` changeAmount(self, fld, code | temp1 temp2)
3/5/1992 12:46 If the payment is already cross currency, and the operator decides to tamper with the amount, reset the amount.

```
{
  if summCcyCode(fundsXfer) <> ccyCode(custAcct(fundsXfer)) /* an xccy transfer */
    cand isModified(fld) /* see below; this prevents looping */
    then update(self[#amount]);
      temp1 := xCcyAmt(fundsXfer); /* this is a cross-currency Xfer */
      temp2 := amount(fundsXfer);
      setXCcyAmt(fundsXfer, getField(fld));
      setAmount(fundsXfer, nil);
      /* setXCcyAmt(fundsXfer, nil);*/
      if not(crossCurrency(self, fld, code))
        then dispatchOff(self);
        setXCcyAmt(fundsXfer, temp1);
      setAmount(fundsXfer, temp2);
```

```
        setField(self[#amount], summAmount(fundsXfer));
        dispatchOn(self);
      endif;
      resetModify(self[#amount]);
    endif;
}
``` changeCurrCode(self, fld, code | currCode tmpXCcyAmt tmpXCcyRate tmpXCcyCode)

Trigger for currency code field. If a currency is selected which differs from the default currency then the fundsXfer is considered a cross-currency fundsXfer. GWB 8/6 : added dispatch off and dispatch on in the if (not(crossCurrency.... section of code. Problem was that if you start with a clear screen, select a foreign currency account, select a foreign currency txn type, change the currency, and cancel out of the cross currency dialog when it appears, Actor GPF's. Not sure what's really wrong or why this fixes it.

```
{
  tmpXCcyAmt := xCcyAmt(fundsXfer);
  tmpXCcyRate := xCcyRate(fundsXfer);
  tmpXCcyCode := xCcyCode(fundsXfer);
  setXCcyCode(fundsXfer, nil);
  setXCcyAmt(fundsXfer, nil);
  setXCcyRate(fundsXfer, nil);
  currCode := getField(self[#currCode]);
  if currCode <> ccyCode(custAcct(fundsXfer)) /* this is a cross-currency
fundsXfer */
    then setXCcyCode(fundsXfer, currCode);
      dispatchOff(self);
      clearField(self[#amount]); /* 6/18/92 */
      dispatchOn(self);
      /* setAmount(fundsXfer, nil); */
      if not(crossCurrency(self, fld, code))
        then
          dispatchOff(self);
          setXCcyCode(fundsXfer, tmpXCcyCode);
          code := summCcyCode(fundsXfer);
          /* Necessary because USD is not in the selection for USD Foreign Ccy
Wires */
          (code = USD cand instType(fundsXfer)=FOREIGN_CCY_WIRE)
            cand setCurSel(self[#currCode], -1)
            cor selectString(self[#currCode], summCcyCode(fundsXfer));

setXCcyAmt(fundsXfer, tmpXCcyAmt);
          setXCcyRate(fundsXfer, tmpXCcyRate);
          setCcyCode(self[#amount], summCcyCode(fundsXfer));
          setField(self[#amount], summAmount(fundsXfer));
          /*grayMenuItem(menu, CROSS_CURRENCY);*/
          dispatchOn(self);
      endif;
    else
      clearField(self[#amount]);
      grayMenuItem(menu, CROSS_CURRENCY);
  endif;
  showWaitCurs();
  fillBestValueDate(self);
  setCutoff(self);
  displayCutoff(self);
  displayBene(self);/* routing codes may change */
  displayBank(self);
  displayInterBank(self);
  showOldCurs();
}
``` changeInterBankCodeType(self, fld, code | aBank partyId)

2/3/1992 12:09 Change made to the combo box containing the set of codes. Find the proper id.

```
{ if code = CBN_SELCHANGE /* change made to the code field */
    cand fundsXfer /* need the busines object */
    cand (aBank := intermediary(fundsXfer))
  then dispatchOff(self);
    if partyId := perform(aBank, getMethod(FundsXfer:late,
```

```
            trimBlanks(getField(fld))))
                then setText(self[#interBankCode], partyId);
                else setText(self[#interBankCode], NULLSTR);
            endif;
            dispatchOn(self);
        endif;
    }
``` changeInterBankInfo(self, fld, code | aBank)

Trigger for changing the intermediary bank fields when there is a match. Clear all the fields of this section except for the one currently being changed and reset the bank object.

```
    { if fundsXfer
        then.
          if not(hasPartyId(aBank := intermediary(fundsXfer)))
            then setIntermediary(fundsXfer, aBank) /* this sets the dirty flag */
            else
              setIntermediary(fundsXfer, newPhantom(Bank));  /* create a phantom
party */
            dispatchOff(self);
            clearFieldsCarefully(self,
            extract(#(interBankCity interBankState interBankCountry interBankCode
interBankCodeTypes)
            ,
            { using(id) id ~= identity(fld) /* it's not the field being changed
*/
                cand (id == #interBankCodeTypes cand identity(fld)
                ~= #interBankCode cor id ~= #interBankCodeTypes);
            }));
            identity(fld) ~= #interBankName cand setText(self[#interBankName],
NULLSTR);
            dispatchOn(self);
          endif;
        endif;
    }
``` changeInterBankName(self, fld, code)

Change trigger for intermediary bank name field. If the name was selected then search for it in the database and fill fields with information, otherwise, assume a free form entry.

```
    { if code = CBN_SELCHANGE
        then setIntermediaryById(fundsXfer, getField(fld));
          /* Force the interBankCode to be reset. */
          dispatchOff(self);
          clearField(self[#interBankCode]);
          dispatchOn(self);
          fillInterBankFields(self, intermediary(fundsXfer));
        else changeInterBankInfo(self, fld, code);
      endif;
    }
``` changeOtherBankCodeType(self, fld, code | aBank partyId)

2/3/1992 12:09 Change made to the combo box containing the set of codes. Find the proper id.

```
    { if code = CBN_SELCHANGE /* change made to the code field */
         cand fundsXfer /* need the busines object */
         cand (aBank := otherPartyBank(fundsXfer))
        then dispatchOff(self);
          if partyId := perform(aBank, getMethod(FundsXfer:late,
trimBlanks(getField(fld))))
            then setText(self[#bankCode], partyId);
            else setText(self[#bankCode], NULLSTR);
          endif;
          dispatchOn(self);
        endif;
    }
``` changeOtherBankInfo(self, fld, code | aBank)

Trigger for changing the other party bank fields when there is a match. Clear all the fields of this section except for the field currently being changed and reset the bank object.

```
{ if fundsXfer
  then
     if not(hasPartyId(aBank := otherPartyBank(fundsXfer)))
     then setOtherPartyBank(fundsXfer, aBank) /* this sets the dirty flag */
     else
        setOtherPartyBank(fundsXfer, newPhantom(Bank));  /* create a phantom
party */
        dispatchOff(self);
        clearFieldsCarefully(self,
        extract(#(bankCity bankState bankCountry bankCode bankCodeTypes),
        { using(id) id ~= identity(fld) /* it's not the field being changed
*/
           cand (id == #bankCodeTypes cand identity(fld) ~= #bankCode cor id
~= #bankCodeTypes);
        }));
        identity(fld) ~= #bankName cand setText(self[#bankName], NULLSTR);
        dispatchOn(self);
     endif;
  endif;
}
``` changeOtherBankName(self, fld, code)

Change trigger for other party bank name field. If the name was selected then search for it in the database and fill fields with information, otherwise, assume a free form entry.

```
{ if code = CBN_SELCHANGE
    then setOtherPartyBankById(fundsXfer, trimBlanks(getField(fld)));
    /* Force the bankCode to be reset. */
    dispatchOff(self);
    clearField(self[#bankCode]);
    dispatchOn(self);
    fillOtherBankFields(self, otherPartyBank(fundsXfer));
  else changeOtherBankInfo(self, fld, code);
  endif;
}
``` changeOtherPartyCodeType(self, fld, code | aParty partyId)

2/3/1992 12:09 Change made to the combo box containing the set of codes. Find the proper id.

```
{ if code = CBN_SELCHANGE /* change made to the code field */
     cand fundsXfer /* need the busines object */
     cand (aParty := otherParty(fundsXfer))
  then dispatchOff(self);
     if partyId := perform(aParty, getMethod(FundsXfer:late,
trimBlanks(getField(fld))))
        then setText(self[#beneCode], partyId);
        else setText(self[#beneCode], NULLSTR);
     endif;
     dispatchOn(self);
  endif;
}
``` changeOtherPartyInfo(self, fld, code | aParty)

Trigger for changing the other party fields when there is a match. Clear all the fields of this section except for the field currently being changed and reset the bank object.

```
{ if fundsXfer
  then
     select
        case not(hasPartyId(aParty := otherParty(fundsXfer)))  /* Free-Form
input */
        is setOtherParty(fundsXfer, aParty) /* sets the dirty flag */
        endCase
```

```
            default
                setOtherParty(fundsXfer, newPhantom(Party));   /* create a phantom
party */
                dispatchOff(self);
                clearFieldsCarefully(self,
                    extract(#(beneCity beneState beneCountry beneCode beneCodeTypes),
                        { using(id) id ~= identity(fld) /* it's not the field being changed
*/
                            cand (id == #beneCodeTypes cand identity(fld) ~= #beneCode cor id
~= #beneCodeTypes);
                        }));
                identity(fld) ~= #bene cand setText(self[#bene], NULLSTR);
                dispatchOn(self);

endSelect;
    endif;
}
``` changeOtherPartyName(self, fld, code)

Change trigger for other party name field. If the name was selected then search the
database and set in the fundsXfer otherwise assume free-self entry.

```
{ if code = CBN_SELCHANGE
    then setOtherPartyById(fundsXfer, trimBlanks(getField(fld)));
        /* Force the beneCode to be reset. */
        dispatchOff(self);
        clearField(self[#beneCode]);
        dispatchOn(self);
        fillOtherPartyFields(self, otherParty(fundsXfer));
    else changeOtherPartyInfo(self, fld, code);
    endif;
}
``` changeSetupNameFreeForm(self, fld, code | setupName aSetup)

Given a setup name, go after it. Note: enable the triggers after setting focus to avoid
activating an exit trigger. 7/30/92 ADC: Rearranged things so enableForm is called after
triggers are in place.

```
{
    if code = CBN_SELCHANGE cand setupName := getField(fld) /* Only do if the
selection changed. */
        then
            showWaitCurs();
            clear(UPCServices[#errorMessages]);
            if not(aSetup := query(FundsXfer:late, setupName))
                setText(fld, NULLSTR);
                messageBox(UPCServices[#errorMessages], ThePort, "Error accessing
setup", caption(class(self)), MB_OK);
            else
                if checkLowMemory()
                    setText(fld, NULLSTR);
                    ^nil;
                endif;

removeTriggersFreeForm(self);
                hostSetupRemoval(self);
                setSetup(self, aSetup);
                enableTriggersRepetitive(self);
                hostSetupEnabling(self);
                enableForm(self);
                if isEnabled?(self[#amount])
                    then dispatchOff(self);
                        setFocus(self[#amount]);
                        dispatchOn(self);
                endif;
                setSessionNum(self);
            endif;
            clear(UPCServices[#errorMessages]);
            showOldCurs();
        endif;
}
``` changeSetupNameRepetitive(self, fld, code | setupName aSetup)

Given a setup, retrieve the info and populate the fields. Is careful not to do another query if the setup on hand is the same as the one the selection indicates. Checks for the existence of the setup because changeSetupFreeForm dispatches to this method. 7/30/92 ADC: Rearranged things so enableForm is called after all triggers are in place.

```
{
  if code = CBN_SELCHANGE            /* Do only if the selection changed.
*/
    cand (setupName := getField(fld))
    cand (not(setup)                 /* Go after it if no setup now */
    cor setupName <> setupName(setup))    /* Or the selection differs
from the active setup */
  then
    showWaitCurs(); /* Retrieve the setup. */
    clear(UPCServices[#errorMessages]);
    if not(aSetup := query(FundsXfer:late, setupName))
      setText(fld, setup cand setupName(setup) cor NULLSTR);
      messageBox(UPCServices[#errorMessages], ThePort, "Error accessing
setup", caption(class(self)), MB_OK);
    else
      if checkLowMemory()
        setText(fld, NULLSTR);
        ^nil;
      endif;

removeTriggersRepetitive(self);
      hostSetupRemoval(self);
      setSetup(self, aSetup);
      enableTriggersRepetitive(self);
      hostSetupEnabling(self);
      enableForm(self);
      if isEnabled?(self[#amount])
      then dispatchOff(self);
        setFocus(self[#amount]);
        dispatchOn(self);
      endif;
      showOldCurs();
    endif;
    clear(UPCServices[#errorMessages]);
    showOldCurs();
  endif;
}
``` changeSummary(self, fld, code | idx aSetup)

Retrieves a funds transfer business object, which contains a db object that is locked, ready for updating. 8/3/92 ADC: Starting now, fundsXfer carries the new object, and aRec is a snapShot of the old one. Up to this point, aRec had not been used. It became necessary when it was decided to delete a rejected item. 8/13/92 ADC: Defends against failure to grab a setup.

```
{ hostSetupRemoval(self);
  select.
    case not(aRec := /* db failure to retrieve fundsXfer */
      query(self, keyFromSummaryIndex(self, idx := getSelIdx(fld))))
    is showDataCheckerResults(self);
      makeFundsXfer(self); /* failure path here */
      enableAllFreeForm(self);
    endCase
    case not((fundsXfer := deepCopy(aRec))  /* won't fail */
      or (selItemIdx := idx)  /* always evaluate; won't fail */
      or (activeRec := true))  /* always evaluate; won't fail */
    is ; /* one of those won't ever happens */
    endCase
    case size(setupUsed(fundsXfer)) = 0 /* no setup indicated */
    is enableAllFreeForm(self);
      hostSetupEnabling(self);
      setFocusOnOrAfter(self, #amount);
    endCase
    case aSetup := query(self, setupUsed(fundsXfer))
    is setup := aSetup;
      enableAllRepetitive(self);
      hostSetupEnabling(self);
      setFocusOnOrAfter(self, #amount);
    endCase
```

```
            default showDataCheckerResults(self);
            activeRec := false; /* db failure to retrieve setup */
            makeFundsXfer(self);
            enableAllFreeForm(self);
          endSelect;
      }
``` changeSummaryFreeForm(self, fld, code)

Change trigger for summary field. 8/13/92 ADC: Dispatches to new changeSummary method.

```
{ showWaitCurs();
  removeTriggersFreeForm(self);
  changeSummary(self, fld, code);
  showOldCurs();
}
``` changeSummaryRepetitive(self, fld, code)

Change trigger for summary field. 8/13/92 ADC: Dispatches to change summary to do most of the work.

```
{ showWaitCurs();
  removeTriggersRepetitive(self);
  asFreeForm(self);
  changeSummary(self, fld, code);
  showOldCurs();
}
``` changeType(self, fld, code | choice wasACH)

Based on the type, enable fields. If this is a host repetitive payment, and the type changes, and the change is other than from one ACH type to another, then repetitive status should be lost. Note that the asInstType method must be good, or else information gets lost. 8/12/92 ADC: Removed dispatch to setAmountRange. It is sent to by enableForm, through limitTyped.

```
{ if code = CBN_SELCHANGE cand choice := getField(fld)
    then showWaitCurs();
      wasACH:=isACH(fundsXfer);
      aRec := fundsXfer := asInstType(fundsXfer, choice); /* Create
        fundsXfer of selected type. */
      setCcyCode(self[#amount], ccyCode(custAcct(fundsXfer)));
      not(wasACH cand isACH(fundsXfer)) cand enableForm(self);
      setFocusOnOrAfter(self, #amount);
      dirtyOff(self);
      fillBestValueDate(self);
      setCutoff(self);
      displayCutoff(self);
      showOldCurs();
    endif;
}
``` changeTypeHostRepetitive(self, fld, code)

The idea here is that the changeType method has already been processed. A trigger exists because there is a host repetitive setup, and the setup is ACH. If the new funds transfer is ACH, OK. Otherwise, it's a change.

```
{ not(isACH(fundsXfer)) cand hostSetupFieldChanged(self, fld, code);
}
``` clearAction(self, fld, code)

Clears all the self fields.

```
{   showWaitCurs();
    if setup
    then removeTriggersRepetitive(self);
    else removeTriggersFreeForm(self);
    endif;
    hostSetupRemoval(self);
```

```
    asFreeForm(self);
    makeFundsXfer(self);
    setText(self[#setupName], NULLSTR);
    enableAllFreeForm(self);
    enableTotal(self);
    setFocus(self[#setupName]);
    dirtyOff(self);
    activeRec := false;
    showOldCurs();
}
``` clearFieldsCarefully(self, ids | textCBs staticCBs codeTypeCBs)

Enable and clear the self fields in the collection of ids. Be careful about how to clear them, so as not to remove codes from the combo box fields.

```
{ textCBs := %Set(setupName fnbcAccount2 bene bankName interBankName);
  staticCBs := %Set(achCode transType);
  codeTypeCBs := %Set(beneCodeTypes bankCodeTypes interBankCodeTypes);
  do(ids,
  { using(id)
      select
        case id in textCBs
        is setText(self[id], NULLSTR)
        endCase
        case id in staticCBs
        is setCurSel(self[id], -1);
        endCase
        case id in codeTypeCBs cand isEnabled?(self[id])
        is setCurSel(self[id], 0);
        endCase
        case id in codeTypeCBs
        is setCurSel(self[id], -1);
        endCase
        case id == #accountNumber
        is clearField(self[id]);
        endCase
        default clearField(self[id]);
      endSelect;
  });
}
``` createFields(self | lbl, fld)

This method is generated automatically

```
{
    shrinkWrap(self, rect(-46, -54, 582, 378));
    fld:=newField(self, ViewComboBox, 100, %BitOr(WS_CHILD, WS_VISIBLE,
WS_VSCROLL, WS_TABSTOP, CBS_OWNERDRAWFIXED, CBS_DROPDOWNLIST),
rect(6,18,624,162), nil, #summary);
    asSummary(fld);
    setLabel(fld, rect(6,0,622,16), 13350 /* PC Ref */);
    fld:=newField(self, VComboBox, 101, %BitOr(WS_CHILD, WS_VISIBLE,
WS_VSCROLL, WS_TABSTOP, CBS_AUTOHSCROLL, CBS_OWNERDRAWFIXED, CBS_DROPDOWN),
rect(120,46,336,406), nil, #setupName);
    setRightLabel(fld, rect(4,52,116,68), 13351 /* Setup Name */);
    fld:=newField(self, StaticField, 203, %BitOr(WS_CHILD, WS_VISIBLE,
SS_LEFT), rect(454,50,508,66), nil, #sessionNumber);
    setRightLabel(fld, rect(384,50,450,66), 13352 /* Session: */);
    fld:=newField(self, StaticField, 204, %BitOr(WS_CHILD, WS_VISIBLE,
SS_LEFT), rect(566,50,622,66), nil, #pcRef);
    setRightLabel(fld, rect(506,50,562,68), 13353 /* PC Ref: */);
    fld:=newField(self, VComboBox, 219, %BitOr(WS_CHILD, WS_VISIBLE,
WS_VSCROLL, WS_TABSTOP, CBS_OWNERDRAWFIXED, CBS_DROPDOWN),
rect(120,70,336,406), nil, #fnbcAccount2);
    setRightLabel(fld, rect(4,74,116,90), 13354 /* FNBC Account */);
    fld:=newField(self, StaticField, 220, %BitOr(WS_CHILD, WS_VISIBLE,
SS_LEFT), rect(414,74,624,90), nil, #accountLongName);
    fld:=newField(self, CBoxField, 197, %BitOr(WS_CHILD, WS_VISIBLE,
WS_VSCROLL, WS_TABSTOP, CBS_DROPDOWNLIST), rect(120,94,336,238), nil,
#transType);
    setRightLabel(fld, rect(4,96,116,112), 13355 /* Transaction Type */);
    fld:=newField(self, CBoxField, 202, %BitOr(WS_CHILD, WS_VISIBLE,
```

```
    WS_VSCROLL, WS_TABSTOP, CBS_SORT, CBS_DROPDOWNLIST), rect(444,94,624,214),
nil, #achCode);
    setRightLabel(fld, rect(376,98,440,116), 13356 /* ACH Code */);
    fld:=newField(self, CBoxField, 201, %BitOr(WS_CHILD, WS_VISIBLE,
WS_VSCROLL, WS_TABSTOP, CBS_SORT, CBS_DROPDOWNLIST), rect(120,118,178,218),
nil, #currCode);
    setRightLabel(fld, rect(4,122,116,138), 13357 /* Amount */);
    fld:=newField(self, FloatField, 198, %BitOr(/*FS_SEPERATOR*/ 0x2000,
WS_CHILD, WS_VISIBLE, WS_BORDER, WS_TABSTOP, ES_RIGHT, ES_LEFT),
rect(178,118,336,142), nil, #amount);
    fld:=newField(self, DateField, 120, %BitOr(WS_CHILD, WS_VISIBLE,
WS_BORDER, WS_TABSTOP, ES_LEFT), rect(444,118,538,142), nil, #valueDate);
    setRightLabel(fld, rect(368,122,440,138), 13358 /* Value Date */);
    fld:=newField(self, StaticField, 217, %BitOr(WS_CHILD, WS_VISIBLE,
WS_GROUP, SS_LEFT), rect(344,382,556,400), nil, #cutOff);
    setRightLabel(fld, rect(290,382,340,398), 13359 /* Cut-Off: */);
    fld:=newField(self, VComboBox, 205, %BitOr(WS_CHILD, WS_VISIBLE,
WS_VSCROLL, WS_TABSTOP, CBS_AUTOHSCROLL, CBS_OWNERDRAWFIXED, CBS_DROPDOWN),
rect(120,142,440,386), nil, #bene);
    setRightLabel(fld, rect(4,146,116,162), 13360 /* Beneficiary */);
    fld:=newField(self, CBoxField, 229, %BitOr(WS_CHILD, WS_VISIBLE,
WS_VSCROLL, WS_TABSTOP, CBS_DROPDOWNLIST), rect(524,142,624,238), nil,
#beneCodeTypes);
    setRightLabel(fld, rect(460,146,520,162), 13361 /* ID Code */);
    fld:=newField(self, EditField, 210, %BitOr(WS_CHILD, WS_VISIBLE,
WS_BORDER, WS_TABSTOP, ES_AUTOHSCROLL, ES_LEFT), rect(120,166,256,190),
nil, #beneCity);
    setRightLabel(fld, rect(90,168,116,184), 13362 /* City */);
    fld:=newField(self, EditField, 211, %BitOr(WS_CHILD, WS_VISIBLE,
WS_BORDER, WS_TABSTOP, ES_AUTOHSCROLL, ES_UPPERCASE, ES_LEFT),
rect(298,166,334,190), nil, #beneState);
    setRightLabel(fld, rect(260,170,296,186), 13363 /* State */);
    fld:=newField(self, EditField, 216, %BitOr(WS_CHILD, WS_VISIBLE,
WS_BORDER, WS_TABSTOP, ES_AUTOHSCROLL, ES_UPPERCASE, ES_LEFT),
rect(388,166,424,190), nil, #beneCountry);
    setRightLabel(fld, rect(334,168,386,186), 13364 /* Country */);
    fld:=newField(self, EditField, 214, %BitOr(WS_CHILD, WS_VISIBLE,
WS_BORDER, WS_TABSTOP, ES_AUTOHSCROLL, ES_LEFT, 0x200L),
rect(492,166,624,190), nil, #beneCode);
    fld:=newField(self, EditField, 140, %BitOr(WS_CHILD, WS_VISIBLE,
WS_BORDER, WS_TABSTOP, ES_AUTOHSCROLL, ES_UPPERCASE, ES_LEFT),
rect(120,190,382,214), nil, #accountNumber);
    setRightLabel(fld, rect(4,192,116,208), 13365 /* Account Number */);
    fld:=newField(self, VComboBox, 206, %BitOr(WS_CHILD, WS_VISIBLE,
WS_VSCROLL, WS_TABSTOP, CBS_AUTOHSCROLL, CBS_OWNERDRAWFIXED, CBS_DROPDOWN),
rect(120,214,422,386), nil, #bankName);
    setRightLabel(fld, rect(4,216,116,232), 13366 /* Bank Name */);
    fld:=newField(self, CBoxField, 215, %BitOr(WS_CHILD, WS_VISIBLE,
WS_VSCROLL, WS_TABSTOP, CBS_DROPDOWNLIST), rect(522,214,622,310), nil,
#bankCodeTypes);
    setRightLabel(fld, rect(432,218,520,234), 13367 /* Routing Code */);
    fld:=newField(self, EditField, 155, %BitOr(WS_CHILD, WS_VISIBLE,
WS_BORDER, WS_TABSTOP, ES_AUTOHSCROLL, ES_LEFT), rect(120,238,256,262),
nil, #bankCity);
    setRightLabel(fld, rect(90,240,116,256), 13368 /* City */);
    fld:=newField(self, EditField, 156, %BitOr(WS_CHILD, WS_VISIBLE,
WS_BORDER, WS_TABSTOP, ES_AUTOHSCROLL, ES_UPPERCASE, ES_LEFT),
rect(298,238,334,262), nil, #bankState);
    setRightLabel(fld, rect(260,242,296,258), 13369 /* State */);
    fld:=newField(self, EditField, 157, %BitOr(WS_CHILD, WS_VISIBLE,
WS_BORDER, WS_TABSTOP, ES_AUTOHSCROLL, ES_UPPERCASE, ES_LEFT),
rect(388,238,424,262), nil, #bankCountry);
    setRightLabel(fld, rect(334,242,386,260), 13370 /* Country */);
    fld:=newField(self, EditField, 222, %BitOr(WS_CHILD, WS_VISIBLE,
WS_BORDER, WS_TABSTOP, ES_AUTOHSCROLL, ES_LEFT, 0x200L),
rect(490,238,622,262), nil, #bankCode);
    fld:=newField(self, VComboBox, 207, %BitOr(WS_CHILD, WS_VISIBLE,
WS_VSCROLL, WS_TABSTOP, CBS_AUTOHSCROLL, CBS_OWNERDRAWFIXED, CBS_DROPDOWN),
rect(120,262,422,386), nil, #interBankName);
    setRightLabel(fld, rect(22,266,114,282), 13371 /* Intermediary */);
    fld:=newField(self, CBoxField, 218, %BitOr(WS_CHILD, WS_VISIBLE,
WS_VSCROLL, WS_TABSTOP, CBS_DROPDOWNLIST), rect(522,262,622,358), nil,
#interBankCodeTypes);
    setRightLabel(fld, rect(432,266,520,282), 13372 /* Routing Code */);
    fld:=newField(self, EditField, 174, %BitOr(WS_CHILD, WS_VISIBLE,
WS_BORDER, WS_TABSTOP, ES_AUTOHSCROLL, ES_LEFT), rect(120,286,256,310),
nil, #interBankCity);
    setRightLabel(fld, rect(86,288,114,304), 13373 /* City */);
    fld:=newField(self, EditField, 175, %BitOr(WS_CHILD, WS_VISIBLE,
```

```
WS_BORDER, WS_TABSTOP, ES_AUTOHSCROLL, ES_UPPERCASE, ES_LEFT),
rect(298,286,334,310), nil, #interBankState);
   setRightLabel(fld, rect(260,290,296,306), 13374 /* State */);
   fld:=newField(self, EditField, 176, %BitOr(WS_CHILD, WS_VISIBLE,
WS_BORDER, WS_TABSTOP, ES_UPPERCASE, ES_LEFT), rect(388,286,424,310), nil,
#interBankCountry);
   setRightLabel(fld, rect(334,290,386,308), 13375 /* Country */);
   fld:=newField(self, EditField, 228, %BitOr(WS_CHILD, WS_VISIBLE,
WS_BORDER, WS_TABSTOP, ES_AUTOHSCROLL, ES_LEFT, 0x200L),
rect(490,286,622,310), nil, #interBankCode);
   fld:=newField(self, EditField, 208, %BitOr(WS_CHILD, WS_VISIBLE,
WS_BORDER, WS_VSCROLL, WS_TABSTOP, ES_MULTILINE, ES_LEFT),
rect(6,318,622,374), nil, #addenda);
   setRightLabel(fld, rect(2,300,34,316), 13376 /* Text */);
   fld:=newField(self, EditField, 185, %BitOr(WS_CHILD, WS_VISIBLE,
WS_BORDER, WS_TABSTOP, ES_AUTOHSCROLL, ES_LEFT), rect(120,378,286,402),
nil, #docRef);
   setRightLabel(fld, rect(2,382,114,398), 13377 /* Document Ref. */);
   fld:=newField(self, ButtonField, 126, %BitOr(WS_CHILD, WS_VISIBLE,
WS_TABSTOP, BS_PUSHBUTTON), rect(4,406,84,430), 13378 /* &More... */,
#more);
   fld:=newField(self, ButtonField, 128, %BitOr(WS_CHILD, WS_VISIBLE,
WS_TABSTOP, BS_PUSHBUTTON), rect(84,406,164,430), 13379 /* &Accept */,
#accept);
   fld:=newField(self, ButtonField, 129, %BitOr(WS_CHILD, WS_VISIBLE,
WS_TABSTOP, BS_PUSHBUTTON), rect(164,406,244,430), 13380 /* &Clear */,
#clear);
   fld:=newField(self, ButtonField, 236, %BitOr(WS_CHILD, WS_VISIBLE,
WS_TABSTOP, BS_PUSHBUTTON), rect(244,406,324,430), 13381 /* H&istory... */,
#history);
   fld:=newField(self, ButtonField, 221, %BitOr(WS_CHILD, WS_VISIBLE,
WS_TABSTOP, BS_PUSHBUTTON), rect(556,406,622,430), 13382 /* &Total... */,
#totalBut);
}
``` crossCurrency(self, wP, lP | ccyArgs)

9/23/1991 14:12 This method responds to the selection of the cross currency menu item or change in currency code

```
{ ccyArgs := tuple(code(custBranch(fundsXfer)), /* branch code */
   xCcyCode(fundsXfer), /* credit ccy */
   ccyCode(custAcct(fundsXfer)), /* debit ccy */
   xCcyAmt(fundsXfer), /* credit amount */
   amount(fundsXfer), /* debit amount */
   xCcyRate(fundsXfer) cand asReal(xCcyRate(fundsXfer))); /* rate */
   ^crossCurrencyDialog(self, ccyArgs);
}
``` crossCurrencyDialog(self, ccyArgs | ret)

Runs the cross currency dialog. Puts the new credit amount into the amount field.
8/13/92 ADC: Method returns true when user selects OK.

```
{ setCurrObj(UPCServices[#dataChecker],fundsXfer );
   if ret := runModal(CrossCurrency:late, self, ccyArgs)
   then showWaitCurs();
      dispatchOff(self);
      setXCcyAmt(fundsXfer, ret[0]); /* credit amount */
      setAmount(fundsXfer, ret[1]); /* debit amount */
      setXCcyRate(fundsXfer, asDisplayString(ret[2]));
      setField(self[#amount], summAmount(fundsXfer));
      dispatchOn(self);
      showOldCurs();
      ^true;
   else
      ^nil; /* user canceled out */
   endif;
}
``` disableDrawDown(self)
1/22/1992 Disables lots of fields.

```
{
   disableFields(self,
     #(fnbcAccount2 transType achCode currCode bene accountNumber
beneCodeTypes beneCity
      beneState beneCountry beneCode bankName bankCodeTypes bankCity
bankState bankCountry
      bankCode interBankName interBankCodeTypes interBankCity interBankState
interBankCountry
      interBankCode addenda)
   );
}
``` disableGeneric(self)
1/22/1992 Disables everything.

```
{ disableFields(self,
     #(fnbcAccount2 transType achCode currCode amount valueDate docRef bene
accountNumber
      beneCodeTypes beneCity beneState beneCountry beneCode bankName
bankCodeTypes bankCity
      bankState bankCountry bankCode interBankName interBankCodeTypes
interBankCity
      interBankState interBankCountry interBankCode addenda more accept)
   );
}
``` displayACHCode(self | tmp code)
1/21/1992 Display the ACH code.

```
{ if isACH(fundsXfer) cand (tmp := achTranCode(fundsXfer)) /* number here
*/
      cand (code := achTranCodes(ACH)[tmp]) /* string here */
   then selectString(self[#achCode], asString(tmp) + SPACE + code);
   else setCurSel(self[#achCode], -1);
   endif;
}
``` displayAddenda(self | disabled)
1/21/1992 Fill the addenda field if addenda exists, and it is not a set of CTX or CTP.

```
{ if isAncestor(class(fundsXfer), CTX) cor isAncestor(class(fundsXfer),
CTP)
   then disabled := 0;
   endif;
   select
     case details(fundsXfer)
      is fillAddenda(self, details(fundsXfer));
     endCase
     case isAncestor(class(fundsXfer), ACH) cand not(disabled) cand
addenda(fundsXfer)
      is fillAddendaWithAddenda(self);
     endCase
     default clearField(self[#addenda]);
   endSelect;
}
``` displayBank(self | aBank types)
1/21/1992 Displays the other party bank fields.

```
{ clearField(self[#bankCode]);
   clearField(self[#bankCodeTypes]);
   types := determineCodeTypes(fundsXfer, loadString(15720) /* bank */ );
   do(types,
     { using(type) insertString(self[#bankCodeTypes], type, -1);
     });
```

```
if aBank := otherPartyBank(fundsXfer)
then fillOtherBankFields(self, aBank);
else clearFieldsCarefully(self, #(bankName bankCity bankState bankCountry
bankCode));
endif;
}
``` displayBene(self | aParty types)
1/21/1992 Displays the other party fields.

```
{ clearField(self[#beneCode]);
  clearField(self[#beneCodeTypes]);
  types := determineCodeTypes(fundsXfer, loadString(15726) /* beneficiary
*/);
  do(types,
  { using(type) insertString(self[#beneCodeTypes], type, -1);
  });
  if aParty := otherParty(fundsXfer)
  then fillOtherPartyFields(self, aParty);
  else clearFieldsCarefully(self, #(beneName beneCity beneState beneCountry
beneCode));
  endif;
}
``` displayCurrCode(self)
1/21/1992 Fill in the currency code field.

```
{ /* Get and fill the currency codes and select the default currency code
for this type. */
  clearField(self[#currCode]);
  fillCcyCodes(new(DBCutOff), self[#currCode], code(custBranch(fundsXfer)),
instType(fundsXfer)
  );
  selectString(self[#currCode], summCcyCode(fundsXfer));
}
``` displayCutoff(self | str)
2/20/1992 8:48 Displays the cutoff date.

```
{ if cutOffDate(fundsXfer)
  then str := asDisplayString(cutOffDate(fundsXfer));
    size(str) > 0 cand str := str + SPACE;
    setField(self[#cutOff], str + asDisplayString(cutOffTime(fundsXfer)));
  else clearField(self[#cutOff]);
  endif;
}
``` displayGeneric(self)
1/22/92 Clears most of the fields for free form entry.

```
{ clearField(self[#pcRef]);
  if not(custAcct(fundsXfer))
  then setText(self[#fnbcAccount2], NULLSTR);
    clearField(self[#accountLongName]);
  endif;
  setCurSel(self[#transType], -1);
  changeLabel(self[#bene], loadString(15750) /* Beneficiary */);
  changeLabel(self[#bankName], loadString(15718) /* Account-With Bk */ );
  clearFieldsCarefully(self,
  #(achCode currCode amount valueDate docRef cutOff bene accountNumber
beneCodeTypes
    beneCity beneState beneCountry beneCode bankName bankCodeTypes bankCity
bankState
    bankCountry bankCode interBankName interBankCodeTypes interBankCity
interBankState
    interBankCountry interBankCode addenda)
  );
}
``` displayInterBank(self | fields aBank types typeTuple)
1/21/1992 Display the intermediary bank fields.

```
{ clearField(self[#interBankCode]);
  clearField(self[#interBankCodeTypes]);
  types := determineCodeTypes(fundsXfer, loadString(15719) /*
intermediaryBank */ );
  do(types,
  { using(type) insertString(self[#interBankCodeTypes], type, -1);
  });
  fields := #(interBankName interBankCity interBankState interBankCountry
interBankCode);
  select
    case kindOf(fundsXfer, ACH)
    is clearFieldsCarefully(self, fields);
      disable(self[#interBankCodeTypes]);
    endCase
    case aBank := intermediary(fundsXfer)
    is fillInterBankFields(self, aBank);
    endCase
    default clearFieldsCarefully(self, fields);
    size(types) = 0 cand disable(self[#interBankCodeTypes]);
  endSelect;
}
``` displayMainAttributes(self)
1/22/92 Displays the top part of the form.

```
{ if size(setupUsed(fundsXfer)) > 0
  then setText(self[#setupName], setupUsed(fundsXfer));
  else setText(self[#setupName], NULLSTR);
  endif;

if custAcct(fundsXfer)
  then setText(self[#fnbcAccount2], longAcctNum(custAcct(fundsXfer)));
    setField(self[#accountLongName], name(custAcct(fundsXfer)));
    setField(self[#transType], instTypes(custAcct(fundsXfer)));
  else setText(self[#setupName], NULLSTR);
    clearField(self[#accountLongName]);
  endif;
  if instType(fundsXfer)
  then selectString(self[#transType], instType(fundsXfer));
  else setCurSel(self[#transType], -1);
  endif;
}
``` displayTyped(self | max amt)
1/21/1992 Display fields of the funds transfer object.

```
{ setField(self[#pcRef], asDisplayString(xferRefNum(fundsXfer)));
  displayACHCode(self);
  displayCurrCode(self);
  setCcyCode(self[#amount], summCcyCode(fundsXfer));
  if summAmount(fundsXfer) /* is there an amount? */
    cand (max := getRange(self[#amount])[1]) < (amt :=
summAmount(fundsXfer))
  then setRange(self[#amount], 0.0, amt);
  endif;
  setField(self[#amount], summAmount(fundsXfer));
  setField(self[#valueDate], effDate(fundsXfer));
  if instType(fundsXfer) = loadString(15721) /* Will Receive */
  then changeLabel(self[#bene], loadString(15722) /* Remitter */ );
    changeLabel(self[#bankName], loadString(15723) /* Remitting Bank */ );
  else changeLabel(self[#bankName], loadString(15718) /* Account-With Bk */
);
    if isACH(fundsXfer)
    then changeLabel(self[#bene], loadString(15725) /* Receiver */ );
    else changeLabel(self[#bene], loadString(15750) /* Beneficiary */ );
    endif;
  endif;
  setField(self[#accountNumber], otherPartyAcct(fundsXfer));
  displayBene(self);
  displayBank(self);
```

```
    displayInterBank(self);
    displayAddenda(self);
    setField(self[#docRef], docRefNum(fundsXfer));
    displayCutoff(self);
}
``` enableAddenda(self)

9/21/1991 22:07 Disable or enable the addenda field. 8/10/92 ADC: Uses the setViewOnly method. 8/12/92 ADC: Keeps CTX and CTP disabled.

```
{ select
    case isAncestor(class(fundsXfer), CTX) /* These remain disabled */
      cor isAncestor(class(fundsXfer), CTP)
    is disable(self[#addenda]);
    endCase
    case required(UPCServices[#dataChecker])[#details][instType(fundsXfer)]
      =='P' /* protected */
      cor (isACH(fundsXfer) cand not(canDoFreeForm(self)))
    is enable(self[#addenda]);
      setViewOnly(self[#addenda], true);
    endCase
    default enable(self[#addenda]);
      setViewOnly(self[#addenda], false);
  endSelect;
}
``` enableAllFreeForm(self | fields)

1/22/1992 Displays the main attributes, enables them if it should, displays and enables the rest of the form, and then applies the free form triggers. 8/13/92 ADC: Disables triggers when clearing fields. This became necessary when the browsers started to defend themselves from data base failure, and the repair browser set fundsXfer to nil. It cannot admit triggers.

```
{ dispatchOff(self);
  if fundsXfer
  then displayMainAttributes(self);
    enableMainAttributes(self);
    enableForm(self);
  else fields :=
    #(setupName fnbcAccount2 accountLongName transType achCode
      currCode amount valueDate docRef bene accountNumber beneCodeTypes
      beneCity beneState beneCountry beneCode bankName bankCodeTypes
      bankCity bankState bankCountry bankCode interBankName
      interBankCodeTypes interBankCity interBankState interBankCountry
      interBankCode addenda more accept)
    ;
    clearFieldsCarefully(self, fields);
    disableFields(self, fields);
  endif;
  dispatchOn(self);
  enableTriggersFreeForm(self);
}
``` enableAllRepetitive(self)

1/22/1992 Displays the main attributes, enables them if it should, displays and enables the rest of the form, and then applies the repetitive triggers.

```
{ displayMainAttributes(self);
  enableMainAttributes(self);
  enableTriggersRepetitive(self);
  enableForm(self);
}
``` enableCurrCode(self)

1/21/1992 Enable the currency code field

```
{ enable(self[#currCode]);
  if summCcyCode(fundsXfer) <> ccyCode(custAcct(fundsXfer))
  then enableMenuItem(menu, CROSS_CURRENCY);
```

```
        else grayMenuItem(menu, CROSS_CURRENCY);
    endif;
}
``` enableDrawDown(self)

1/21/1992 Enables selected fields.

```
{ enableFieldsCarefully(self,
    #(amount valueDate beneCodeTypes bankCodeTypes interBankCodeTypes docRef
more accept));
}
``` enableFieldsCarefully(self, aCol | codeTypeCBs)

3/4/1992 14:27 Looks at a field to determine how to enable it.

```
{ codeTypeCBs := %Set(beneCodeTypes bankCodeTypes interBankCodeTypes);
  do(aCol,
  { using(id)
    select
      case id in codeTypeCBs cand getCount(self[id]) > 0
      is enable(self[id]);
      endCase
      case id in codeTypeCBs
      is ;
      endCase
      default enable(self[id]);
    endSelect;
  });
}
``` enableForm(self)

Enables and disables the appropriate fields depending on the type of the working funds transfer object.

```
{ dispatchOff(self);
  select
    case isTypeEstablished(self) cand (instType(fundsXfer)=US_DOLLAR_WIRE) cand
          setup cand isDrawDown(setup) cand canDoRepetitive(self)
    is limitTyped(self);
      displayTyped(self);
      disableDrawDown(self);
      enableDrawDown(self);
    endCase
    case isTypeEstablished(self) cand setup cand canDoRepetitive(self)
         cand not(canDoFreeForm(self))
    is limitTyped(self);
      displayTyped(self);
      enableTypedRepetitivePrivilege(self);
    endCase
    case isTypeEstablished(self) cand canDoFreeForm(self)
    is limitTyped(self);
      displayTyped(self);
      enableTyped(self);
    endCase
    case isTypeEstablished(self)
    is displayTyped(self);
      disableGeneric(self);
    endCase
    case custAcct(fundsXfer) cand canDoFreeForm(self)
    is enableGeneric(self);
      displayGeneric(self);
      enable(self[#transType]);
    endCase
    case canDoFreeForm(self)
    is limitTyped(self);
      enableGeneric(self);
      displayGeneric(self);
    endCase
    default disableGeneric(self); /* everything is protected */
      displayGeneric(self);
``` enableGeneric(self)

```
{ if not(custAcct(fundsXfer))
    then enable(self[#fnbcAccount2]);
      disable(self[#transType]);
  endif;
  disableFields(self,
    #(achCode currCode amount valueDate bene accountNumber beneCodeTypes
beneCity beneState
      beneCountry beneCode bankName bankCodeTypes bankCity bankState
bankCountry bankCode
      interBankName interBankCodeTypes interBankCity interBankState
interBankCountry
      interBankCode addenda docRef more accept)
  );
}
``` enableMainAttributes(self)
1/22/92 Enables the fields at the top of the form.

```
{
  if isStored(fundsXfer)
  then disableFields(self, #(setupName fnbcAccount2 transType));
  else
    if canDoRepetitive(self)
    then enable(self[#setupName]);
    else disable(self[#setupName]);
    endif;
    if canDoFreeForm(self)
    then enable(self[#fnbcAccount2]);
    else disable(self[#fnbcAccount2]);
    endif;
  endif;
}
``` enableTotal(self | totalString)
6/19/92 KAM

```
{
  if size(items) = 0
    disable(self[#totalBut]);
  else
    enable(self[#totalBut]);
  endif;
}
``` enableTriggersFreeForm(self)
12/23/1991 16:17 Enables the free form triggers.

```
{ addChangeTrigger(self[#summary], self, #changeSummaryFreeForm);
  addChangeTrigger(self[#setupName], self, #changeSetupNameFreeForm);
  addExitTrigger(self[#setupName], self, #exitSetupNameFreeForm);
  addChangeTrigger(self[#fnbcAccount2], self, #changeAccountFreeForm);
  addChangeTrigger(self[#accept], self, #acceptedFreeForm);
}
``` enableTriggersHostRepetitive(self)
Enable the triggers. 8/12/92 ADC: Simplified trigger enabling.

```
{ addChangeTrigger(self[#fnbcAccount2], self, #hostSetupFieldChanged);
  if isTypeEstablished(self)
  then
```

```
        if isACH(hostSetup)
        then addChangeTrigger(self[#transType], self,
           #changeTypeHostRepetitive);
        else addChangeTrigger(self[#transType], self, #hostSetupFieldChanged);
        endif;
    endif;
    addChangeTrigger(self[#achCode], self, #hostSetupFieldChanged);
    addChangeTrigger(self[#currCode], self, #hostSetupFieldChanged);
    keysDo($OtherPartyRetrieval,
    { using(key) addChangeTrigger(self[key], self, #hostSetupFieldChanged);
    });
    addChangeTrigger(self[#beneCode], self, #hostSetupFieldChanged);
    addChangeTrigger(self[#accountNumber], self, #hostSetupFieldChanged);
    keysDo($OtherBankRetrieval,
    { using(key) addChangeTrigger(self[key], self, #hostSetupFieldChanged);
    });
    addChangeTrigger(self[#bankCode], self, #hostSetupFieldChanged);
    keysDo($InterBankRetrieval,
    { using(key) addChangeTrigger(self[key], self, #hostSetupFieldChanged);
    });
    addChangeTrigger(self[#interBankCode], self, #hostSetupFieldChanged);
    if isACH(hostSetup) cand addenda(hostSetup)
    then addChangeTrigger(self[#addenda], self, #hostSetupFieldChanged);
    else addChangeTrigger(self[#addenda],self,#changeAddendaHostRepetitive);
    endif;
}
``` enableTriggersRepetitive(self)

Enables repetitive triggers. 8/10/92 ADC: Tests for the case where there is only an id for a party. 8/12/92 ADC: Routing code only case demands the setting of triggers on every field associated with the party. 8/12/92 ADC: Simplified the setting of triggers on parties.

```
{ addChangeTrigger(self[#summary], self, #changeSummaryRepetitive);
    addChangeTrigger(self[#setupName], self, #changeSetupNameRepetitive);
    addExitTrigger(self[#setupName], self, #exitSetupNameRepetitive);
    addChangeTrigger(self[#fnbcAccount2], self, #changeAccountRepetitive);
    if isTypeEstablished(self)
    then addChangeTrigger(self[#transType], self, #setupFieldChanged);
    endif;
    addChangeTrigger(self[#achCode], self, #setupFieldChanged);
    addChangeTrigger(self[#currCode], self, #setupFieldChanged);
    if summAmount(setup) cand summAmount(setup) <> 0
    then addChangeTrigger(self[#amount], self, #setupFieldChanged);
    endif;
    keysDo($OtherPartyRetrieval,
    { using(key) addChangeTrigger(self[key], self, #setupFieldChanged);
    });
    addChangeTrigger(self[#beneCode], self, #setupFieldChanged);
    addChangeTrigger(self[#accountNumber], self, #setupFieldChanged);
    keysDo($OtherBankRetrieval,
    { using(key) addChangeTrigger(self[key], self, #setupFieldChanged);
    });
    addChangeTrigger(self[#bankCode], self, #setupFieldChanged);
    keysDo($InterBankRetrieval,
    { using(key) addChangeTrigger(self[key], self, #setupFieldChanged);
    });
    addChangeTrigger(self[#interBankCode], self, #setupFieldChanged);
    if isACH(setup) cand addenda(setup)
    then addChangeTrigger(self[#addenda], self, #setupFieldChanged);
    else addChangeTrigger(self[#addenda], self, #changeAddendaRepetitive);
    endif;
    addChangeTrigger(self[#accept], self, #acceptedRepetitive);
}
``` enableTyped(self | protectionCodes instType codeDict)

Enable selected fields.

```
{ setCurrObj(UPCServices[#dataChecker], fundsXfer);
    enableTypedNotInherited(self);
    enableCurrCode(self);
    instType := instType(fundsXfer);
```

```
    protectionCodes := required(UPCServices[#dataChecker]);
    assocsDo($FieldRetrieval,
    { using(pair) codeDict := protectionCodes[value(pair)];
      if codeDict[instType] = 'P'
      then disable(self[key(pair)]);
      else enable(self[key(pair)]);
      endif;
    });
    codeDict := protectionCodes[#otherParty];
    enableTypedParty(self, $OtherPartyRetrieval,
codeDict[instType],"otherParty");
    enableTypedRoutingCodes(self, codeDict[instType], #beneCodeTypes,
#beneCode);
    codeDict := protectionCodes[#otherPartyBank];
    enableTypedParty(self, $OtherBankRetrieval,
codeDict[instType],"otherPartyBank");
    enableTypedRoutingCodes(self, codeDict[instType], #bankCodeTypes,
#bankCode);
    codeDict := protectionCodes[#intermediary];
    enableTypedParty(self, $InterBankRetrieval,
codeDict[instType],"intermediary");
    enableTypedRoutingCodes(self, codeDict[instType], #interBankCodeTypes,
#interBankCode);
    enableAddenda(self);
}
``` enableTypedNotInherited(self)

The part of field enabling that the setup browser should not inherit. Won't enable the transaction type if an item exists for the transaction, which indicates it was obtained from the file.

```
{
  not(isStored(fundsXfer)) cand enable(self[#transType]);
  enableFields(self, #(valueDate more accept));
}
``` enableTypedParty(self, aDict, protectCode, partyType)

3/17/1992 15:24 Disables or enables a set of fields.

```
{
    assocsDo(aDict,
    { using(anAssoc)
      select
        case protectCode = 'P'
        is disable(self[key(anAssoc)]);
        endCase
        case partyRules(UPCServices[#dataChecker])
            [asString(value(anAssoc))][partyType]
            [instTypeNum(UPCServices[#dataChecker],instType(fundsXfer))]='P'
        is if not(key(anAssoc) in %Set(#bankName,#interbankName)) then
              disable(self[key(anAssoc)])
            else enable(self[key(anAssoc)])
            endif;
        endCase
        default
          enable(self[key(anAssoc)]);
      endSelect;
    });
}
``` enableTypedRepetitivePrivilege(self)

1/21/1992 Enable selected fields. 7/30/92 ADC: Disables fields that have the trigger indicating a change would cause a loss of repetitive status.

```
{ do(#(amount valueDate docRef),
  { using(field)
    if triggerExists(self[field], #setupFieldChanged)
    then disable(self[field]);
    else enable(self[field]);
```

```
      endif;
    });
    enableFieldsCarefully(self, #(beneCodeTypes bankCodeTypes
  interBankCodeTypes more accept));
    enableAddenda(self);
}
``` enableTypedRoutingCodes(self, protectCode, codeTypes, code)
Enable fields pertaining to the routing codes.

```
{
  select
    case protectCode = 'P'
    is disableFields(self, tuple(codeTypes, code));
    endCase
    case getCount(self[codeTypes]) > 0
    is enable(self[codeTypes]);
      if getSelIdx(self[codeTypes])
      then enable(self[code]);
      else disable(self[code]);
      endif;
    endCase
    default disableFields(self, tuple(codeTypes, code));
  endSelect;
}
``` enterAddenda(self, fld, code | aSetup details segments aStrm limits)
1/7/1992 9:25 This trigger gets exercised on a repetitive payment. Don't bother to test whether the field is disabled or not, because if it is, there won't ever be an entry trigger. Note that in fill addenda, if there is a setup with details or addenda that need to be displayed, the limit on the field is exactly the same as the amount of text it contains. Therefore, if the data checker shows no increase, no additional limit setting is done. 7/28/92: Was not setting a limit in the case where there is setup text and the data checker replies that the limit is 0. ADC, 7/28/92. 8/14/82 ADC: The data checker returns an incremental amount when there is host text. Otherwise, it returns an absolute limit.

```
{ if setup
  then aSetup := setup;
  else hostSetup cand aSetup := hostSetup;
  endif;
  select
    case not(aSetup)
    is setupText := nil;
    endCase
    case details := details(aSetup)
    is setupText := new(TextCollection, size(details));
      do(details,
      { using(line) add(setupText, line);
      });
      setupText := asString(setupText);
    endCase
    case isACH(fundsXfer) /* only ACH's may have addenda */
      cand addenda(aSetup)
    is segments := new(TextCollection, 8);
      aStrm := new(X12Stream);
      asX12(addenda(aSetup), aStrm, segments);
      setupText := asString(segments)
    endCase
    default setupText := nil;
  endSelect;
  limits := maximumLengths(UPCServices[#dataChecker], /* source */
  fundsXfer, /* business object */
  nil, /* party type */
  instType(fundsXfer), hostSetup cand size(setupText) cor 0);
  if hostSetup /* incremental limits for host setups */
  then setLimit(self[#addenda], size(setupText) + limits[#details]);
  else setLimit(self[#addenda], limits[#details]);
  endif;
}
``` enterInterBankCode(self, fld, code | codeString, limits, getMethod)
Entry trigger for the intermediary routing code field.

```
{ codeString := getSelString(self[#interBankCodeTypes]);
  getMethod := getMethod(FundsXfer:late, codeString);
  limits := maximumLengths(UPCServices[#dataChecker],
intermediary(fundsXfer), "intermediary",
  instType(fundsXfer), 0);
  setLimit(self[#interBankCode], limits[getMethod]);
}
``` enterOtherBankCode(self, fld, code | codeString, limits, getMethod)
Entry trigger for the other bank routing code field.

```
{ codeString := getSelString(self[#bankCodeTypes]);
  getMethod := getMethod(FundsXfer:late, codeString);
  limits := maximumLengths(UPCServices[#dataChecker],
otherPartyBank(fundsXfer),
  "otherPartyBank", instType(fundsXfer), 0);
  setLimit(self[#bankCode], limits[getMethod]);
}
``` enterOtherPartyCode(self, fld, code | codeString, limits, getMethod)
Entry trigger for ach id field.

```
{ codeString := getSelString(self[#beneCodeTypes]);
  getMethod := getMethod(FundsXfer:late, codeString);
  limits := maximumLengths(UPCServices[#dataChecker],
otherPartyBank(fundsXfer), "otherParty",
  instType(fundsXfer), 0);
  setLimit(self[#beneCode], limits[getMethod]);
}
``` exitAccount(self, fld, code | tmp)
Exit field validation for the account. Takes a partial string and turns it into a valid account.

```
{
  if isDirty?(fld)
    cand not(custAcct(fundsXfer))         /* no account here */
    cand not(isBlank(tmp:=getText(fld)))  /* something here */
  then
    if selectString(self[#fnbcAccount2], tmp)
    then
      showWaitCurs();
      clear(UPCServices[#errorMessages]);
      makeFundsXfer(self);
      if setCustInfoByStr(fundsXfer, trimBlanks(getField(fld)))
        setField(self[#accountLongName], name(custAcct(fundsXfer)));
        setField(self[#transType], instTypes(custAcct(fundsXfer)));
        enable(self[#transType]);
        enableForm(self);
        setFocus(self[#transType]);
        dirtyOff(fld);
      else
        messageBox(UPCServices[#errorMessages], ThePort, "Error accessing
account.", caption(class(self)), MB_OK);
        enableForm(self);
        setErrorField(self, self[#fnbcAccount2]);
        clear(UPCServices[#errorMessages]);
      endif;
      showOldCurs();
    else
      setText(self[#fnbcAccount2], tmp);
      setFocus(self[#fnbcAccount2]);
    endif;
  endif;
}
``` exitAddenda(self, fld, code | aTC)
   Exit trigger for the addenda field.

```
{
  if isDirty?(fld)
    then isAncestor(class(fundsXfer), ACH) cand initAddenda(fundsXfer);
      if byteSize(aTC := asTextCollectionDelimByCR_LF(fld)) >0
         setDetails(fundsXfer, aTC);
      else
         setDetails(fundsXfer, nil);
      endif;
      dirtyOff(fld);
  endif;
  setupText := nil;
}
``` exitAmount(self, fld, code)
   Exit trigger for amount field. Sets the transaction amount to the value specified by the user.

```
{ if isDirty?(fld)
    then
      if size(xCcyCode(fundsXfer)) > 0
      then setXCcyAmt(fundsXfer, getField(fld));
      else setAmount(fundsXfer, getField(fld));
        setXCcyAmt(fundsXfer, nil);
      endif;
      dirtyOff(fld);
  endif;
}
``` exitDocRef(self, fld, code)
   9/12/1991 11:25

```
{ setDocRefNum(fundsXfer, getField(fld));
}
``` exitInterBank(self, fld, code | aName aBank method interBankCode1 interBankCode2)
   Exit trigger for intermediary name. Searches for the specified field in the database, if found fills fields with information, otherwise, assume a free-form entry.

```
{
  if not(hasPartyId(intermediary(fundsXfer)))  /* limbo? */
    cand (aName := trimBlanks(getText(fld)))   /* there's an id or name */
    cand (aBank := setIntermediaryById(fundsXfer, aName))  /* it exists */
    then fillInterBankFields(self, aBank);
  else
    method := getMethod(FundsXfer:late,
getField(self[#interBankCodeTypes]));
    interBankCode1 := getField(self[#interBankCode]);
    interBankCode2 := asDisplayString(getVar(intermediary(fundsXfer),
method));
    if asUpperCase(interBankCode1) <> asUpperCase(interBankCode2)
      dispatchOff(self);
      clearField(self[#interBankCode]);
      dispatchOn(self);
    endif;
  endif;
}
``` exitInterBankCode(self, fld, code | codeString, codeType, anId, aBank, otherParty, setSyms,setMethod)
   Exit trigger for intermediary aba and swift fields. Searches for the specified field in the database, if found fills fields with information, otherwise, assume a free-form entry.

```
{ if isDirty?(fld)
    then
```

```
    if (anId := trimBlanks(getText(fld)))   /* something there */
      cand not((otherParty := intermediary(fundsXfer))  /* it exists */
      cand hasPartyId(otherParty))
    then setSyms :=
       %IdentityDictionary(#ABA->setIntermediaryByAba, #SWIFT-
>setIntermediaryBySwift,
                          #ClearingCode->setIntermediaryByLocalClearCode,
                          #CHIPSUID->setIntermediaryByChipsUid);
      if (codeString := getSelString(self[#interBankCodeTypes]))  /*
selection made */
         cand (codeType := asSymbol(extract(codeString,
         { using(char) char <> ' ';
         }))) /* get the blanks out */
         cand (setMethod := setSyms[codeType])
      then perform(fundsXfer, anId, setMethod);
      else setIntermediary(fundsXfer, aBank := newPhantom(Bank));
      endif;
    endif;
    if hasPartyId(aBank := intermediary(fundsXfer))
    then fillInterBankFields(self, aBank);
    else perform(aBank, anId, setMethod(FundsXfer:late, codeString));
    endif;
    dirtyOff(fld);
  endif;
}
``` exitInterBankInfo(self, fld, code | aName aBank)

Exit trigger for intermediary bank fields.

```
{ if not(hasPartyId(aBank := intermediary(fundsXfer)))
  then aName := trimBlanks(getText(fld));
     perform(aBank, aName, $InterBankFldVal[identity(fld)]);
  endif;
}
``` exitOtherBank(self, fld, code | aName aBank method bankCode1 bankCode2)

Exit trigger for other bank name. Searches for the specified field in the database, if found fills fields with information, otherwise, assume a free-form entry.

```
{
  if not(hasPartyId(otherPartyBank(fundsXfer)))  /* limbo? */
     cand (aName := trimBlanks(getText(fld)))  /* is there a name */
     cand (aBank := setOtherPartyBankById(fundsXfer, aName))  /* try to
locate it */
  then
     fillOtherBankFields(self, aBank);
  else
     method := getMethod(FundsXfer:late, getField(self[#bankCodeTypes]));
     bankCode1 := getField(self[#bankCode]);
     bankCode2 := asDisplayString(getVar(otherPartyBank(fundsXfer),
method));
     if asUpperCase(bankCode1) <> asUpperCase(bankCode2)
        dispatchOff(self);
        clearField(self[#bankCode]);
        dispatchOn(self);
     endif;
  endif;
}
``` exitOtherBankCode(self, fld, code | codeString, codeType, anId, aBank, otherParty, setSyms,setMethod)

Exit trigger for other bank aba and swift fields. Searches for the specified field in the database, if found fills fields with information, otherwise, assume a free-form entry.

```
{ if isDirty?(fld)
  then
     if (anId := trimBlanks(getText(fld)))  /* Something here */
        cand not((otherParty := otherPartyBank(fundsXfer))  /* it exists */
        cand hasPartyId(otherParty))
     then setSyms :=
```

```
    %IdentityDictionary(#ABA->setOtherPartyBankByAba, #SWIFT-
>setOtherPartyBankBySwift,
                        #ClearingCode->setOtherPartyBankByLocalClearCode,
                        #CHIPSUID->setOtherPartyBankByChipsUid);
    if (codeString := getSelString(self[#bankCodeTypes])) /* selection
made */
        cand (codeType := asSymbol(extract(codeString,
            { using(char) char <> ' ';
            }))) /* get rid of blanks */
        cand (setMethod := setSyms[codeType])
        then perform(fundsXfer, anId, setMethod);
        else setOtherPartyBank(fundsXfer, aBank := newPhantom(Bank));
        endif;

if hasPartyId(aBank := otherPartyBank(fundsXfer))
        then fillOtherBankFields(self, aBank);
        else perform(aBank, anId, setMethod(FundsXfer:late, codeString));
        endif;
      endif;
      dirtyOff(fld);
    endif;
}
``` exitOtherBankInfo(self, fld, code | aName aBank)

Exit trigger for other bank fields.

```
{ if not(hasPartyId(aBank := otherPartyBank(fundsXfer)))
  then aName := trimBlanks(getText(fld));
     perform(aBank, aName, $OtherBankFldVal[identity(fld)]);
  endif;
}
``` exitOtherParty(self, fld, code | aParty aName method beneCode1 beneCode2)

Exit trigger for other party name field.

```
{
  if not(hasPartyId(otherParty(fundsXfer)) )/* limbo? */
    cand (aName := trimBlanks(getText(fld))) /* there's a name or id */
    cand (aParty := setOtherPartyById(fundsXfer, aName))
  then
     fillOtherPartyFields(self, aParty);
  else
     method := getMethod(FundsXfer:late, getField(self[#beneCodeTypes]));
     beneCode1 := getField(self[#beneCode]);
     beneCode2 := asDisplayString(getVar(otherParty(fundsXfer), method));
     if asUpperCase(beneCode1) <> asUpperCase(beneCode2)
        dispatchOff(self);
        clearField(self[#beneCode]);
        dispatchOn(self);
     endif;
  endif;
}
``` exitOtherPartyAcct(self, fld, code)

Exit trigger for other party account field.

```
{
  isModified(fld) cand
     setOtherPartyAcct(fundsXfer, getField(fld));
}
``` exitOtherPartyCode(self, fld, code | codeString, codeType, anId, aParty, otherParty,setSyms, setMethod)

Exit trigger for other party aba and swift fields. Searches for the specified field in the database, if found fills fields with information, otherwise, assume a free-form entry.

```
{
  if isDirty?(fld)
    then
```

```
    if (anId := trimBlanks(getText(fld))) /* Something here */
        cand not((otherParty := otherParty(fundsXfer)) /* it exists */
        cand hasPartyId(otherParty))
    then setSyms := $IdentityDictionary(#ABA->setOtherPartyByAba, #SWIFT-
>setOtherPartyBySwift,
                                        #ClearingCode-
>setOtherPartyByLocalClearCode,
                                        #CHIPSUID->setOtherPartyByChipsUid,
                                        #IndivID->setOtherPartyByIndivId);
        if (codeString := getSelString(self[#beneCodeTypes])) /* selection
made */
            cand (codeType := asSymbol(extract(codeString,
                { using(char) char <> ' ';
                }))) /* get rid of blanks */
            cand (setMethod := setSyms[codeType])
            then perform(fundsXfer, anId, setMethod);
            endif;
        endif;
        if hasPartyId(aParty := otherParty(fundsXfer))
        then
            fillOtherPartyFields(self, aParty);
        else isFinancialInst?(aParty) cand perform(aParty, anId,
setMethod(FundsXfer:late, codeString));
        endif;
        dirtyOff(fld);
    endif;
}
``` exitOtherPartyInfo(self, fld, code | aName aParty)
Exit trigger for other party fields.

```
{ if not(hasPartyId(aParty := otherParty(fundsXfer)))
    then aName := trimBlanks(getText(fld));
        perform(aParty, aName, $OtherPartyFldVal[identity(fld)]);
    endif;
}
``` exitSetupNameFreeForm(self, fld, code | setupName aSetup)
Trigger for setup name. If there is one see if it exists. 7/30/92 ADC: Rearranged to enable form after all triggers are in place. Changed the setting of the focus to avoid putting it on a disabled field.

```
{
    setupName := trimBlanks(getText(fld));
    select
      case isBlank(setupName) /* blank string */
      is /* do nothing */;
      endCase
      case not(selectString(fld, setupName)) /* select on partial match */
      is
        setText(fld, setupName);
        setErrorField(self, fld);
      endCase
      default /* get the setup with the specified setupName */
        showWaitCurs(); /* This is going to take a while */
        clear(UPCServices[#errorMessages]);
        if not(aSetup := query(FundsXfer:late, setupName := getText(fld)))
          setErrorField(self, fld);
          messageBox(UPCServices[#errorMessages], ThePort, "Error accessing
setup", caption(class(self)), MB_OK);
        else
          if checkLowMemory()
            setErrorField(self, fld);
            ^nil;
          endif;

errorField := nil;
          removeTriggersFreeForm(self);
          hostSetupRemoval(self);
          setSetup(self, aSetup);
          enableTriggersRepetitive(self);
          hostSetupEnabling(self);
```

```
            enableForm(self);
            setFocusOnOrAfter(self, #amount);
         endif;
         clear(UPCServices[#errorMessages]);
         showOldCurs();
      endSelect;
}
``` exitSetupNameRepetitive(self, fld, code | setupName aSetup)
   Dispatches to changeSetupNameRepetitive if and only if the name differs from the name
   of the setup currently retained. 7/30/92 ADC: Rearranged things so the call to
   enableForm happens after all triggers are in place.

```
{
   setupName := trimBlanks(getText(fld));
   select
      case isBlank(setupName)
      is ^setupFieldChanged(self, fld, code);
      endCase
      case not(selectString(fld, setupName))   /* select on partial match */
      is setText(fld, setupName);
         setErrorField(self, fld);
      endCase
      case setupName(setup) = (setupName := getText(fld)) /* setupName same
as current one */
      is /* do nothing */ ;
      endCase
      default /* get the setup */
         showWaitCurs();  /* Be patient */
         clear(UPCServices[#errorMessages]);
         if not(aSetup := query(FundsXfer:late, setupName := getText(fld)))
            setErrorField(self, fld);
            messageBox(UPCServices[#errorMessages], ThePort, "Error accessing
setup", caption(class(self)), MB_OK);
         else
            if checkLowMemory()
               setErrorField(self, fld);
               ^nil;
            endif;

removeTriggersRepetitive(self);
            hostSetupRemoval(self);
            setSetup(self, aSetup);
            enableTriggersRepetitive(self);
            hostSetupEnabling(self);
            enableForm(self);
            setFocusOnOrAfter(self, #amount);
         endif;
      clear(UPCServices[#errorMessages]);
      showOldCurs();
   endSelect;
}
``` exitValueDate(self, fld, code | aDate)
   Get a new value date.

```
{
   if isDirty?(fld) cand (aDate := getField(fld)) cand aDate <>
effDate(fundsXfer)
      then setValueDate(fundsXfer, aDate);
         setCutoff(self);
         displayCutoff(self);
   endif;
   isBlank(aDate) cand setField(self[#valueDate],effDate(fundsXfer));
}
``` fileDelete(self, fld, code | oper itemRec amountAndCode)
   Delete the current transaction.

```
{
   showWaitCurs();
   clear(UPCServices[#errorMessages]);
```

```
     oper := operator(UPCServices[#systemConfiguration]);
    if new(ErrorBox, self, loadString(15743) /* Do you wish to delete
  transaction ' */  +
                                asDisplayString(xferRefNum(fundsXfer)) +
  loadString(15744) /* ' ? */ ,
           loadString(15745) /* Confirm Delete */ , MB_OKCANCEL bitOr
  MB_ICONQUESTION)  = IDCANCEL
     ^IDCANCEL;
   endif;
   if delete(fundsXfer)
   then itemRec := items[selItemIdx];
     if maxDailyAmt(oper) > 0
     then
        amountAndCode := xCcyAmtOrAmountAndCode(fundsXfer);
        subtractFromCumTotalAmt(oper, inBaseCurrency(Currency:late,
                                  amountAndCode[0], amountAndCode[1]));
     endif;
     remove(items, selItemIdx);
     dispatchOff(self);
     setCurSel(self[#summary], size(items) > 0 cand 0 cor -1);
     enableTotal(self);
     dispatchOn(self);
     logItem(self, 5021, loadString(15746) /* Session # */  +
  asString(sessionNum));
      showOldCurs();
      if setup
      then ^acceptedRepetitive(self, fld, code);
      else ^acceptedFreeForm(self, fld, code);
      endif;
    else showOldCurs();
      showDataCheckerResults(self);
    endif;
}
``` fileNew(self, wP, lP)
Reinitializes receiver.

```
{ if fileSaveWIPs(self)
   fileRefresh(self);
  endif;
}
``` fileRefresh(self)
Reinitializes receiver.

```
{ sessionNum := nil;
  setSessionNum(self);
  enableTotal(self);
  makeFundsXfer(self);
  clearField(self[#summary]);
  displayMainAttributes(self);
  enableMainAttributes(self);
  enableForm(self);
  setFocus(self[#setupName]);
}
``` fileSave(self, fld, code)
Saves transactions and prepares next session.

```
{ saveTransactions(self);
  fileRefresh(self);
}
``` fileSaveWIPs(self | ret oper dbFundsXfer )
Tests for work in progress transactions. Saves them if the operator wants them saved.

```
{
  if size(items) > 0
  then ret := new(ErrorBox, ThePort, /* Prepare an error box that threatens
  */
```

```
        loadString(15714) /* Save */ + asString(size(items)) +
   loadString(15715) /* work in progress transactions? */ , /* Tell them
what's at stake */
        loadString(15705) /* Transaction Browser */ , MB_YESNOCANCEL bitOr
MB_ICONQUESTION);

select
            case ret = IDYES
              is saveTransactions(self);
            endCase
            case ret = IDNO
            is showWaitCurs(); /* Have at it */
               oper := operator(UPCServices[#systemConfiguration]);
               dbFundsXfer := new(DBFundsXfer);
               clear(UPCServices[#errorMessages]);
               do(items,
               {using(itemRec)
                  if deleteByKey(dbFundsXfer, itemRec[#xferRefNum],
itemRec[#stamp])
                  then
                     (maxDailyAmt(oper)>0) cand subtractFromCumTotalAmt(oper,
inBaseCurrency(Currency, itemRec[#xCcyAmtOrAmount], removeNulls(itemRec[#code])));
                  else showOldCurs();
                     messageBox(UPCServices[#errorMessages], self,
                        loadString(15717) /* Error Deleting WIPs */ ,
                        caption(class(self)),
                        MB_OK);
                     clear(UPCServices[#errorMessages]);
                     showWaitCurs();
                  endif;
               });
               clearField(self[#summary]);
               showOldCurs();
            endCase
            default ^nil; /* then cancel case */
         endSelect;
      endif;
   }
``` fillAddenda(self, text | appendCRLF)

Fills the addenda field with the lines. 7/28/92: The display of a setup's text was being truncated when it followed a transaction that put a limit on the field. So, the limit is removed prior to the display here. ADC, 7/28/92.

```
{ clearField(self[#addenda]);
  setLimit(self[#addenda], 0); /* This sets limit to 65535 bytes */
  details(aRec) cand appendCRLF := true;
  do(text,
  { using(line)
    if not(isBlank(line))
    then add(self[#addenda], line);
      (line <> last(text)) cand appendCRLF cand add(self[#addenda], CR_LF);
    endif;
  });
  resetModify(self[#addenda]);
}
``` fillAddendaWithAddenda(self | segments aStrm)

1/2/1992 16:00 Uses fundXfer's addenda to fill the addenda field.

```
{ segments := new(TextCollection, 8);
  aStrm := new(X12Stream);
  asX12(addenda(fundsXfer), aStrm, segments);
  fillAddenda(self, segments);
}
``` fillBankName(self)

6/18/1992 8:57

```
    fill(self[#bankName],
      DBSession[#UPC][#party],
      {using(aRecord)
        stringBufAt(aRecord, "partyId", $StrBuf, size($StrBuf));
      },
      {using(aRecord)
        aRecord["financialInst?"] cand not(aRecord["limbo?"]);
      });
}
``` fillBene(self)
6/18/1992 8:56

```
{
  fill(self[#bene],
    DBSession[#UPC][#party],
    {using(aRecord)
      stringBufAt(aRecord, "partyId", $StrBuf, size($StrBuf));
    },
    {using(aRecord)
      not(aRecord["limbo?"]);
    });
}
``` fillBestValueDate(self | aDate)
Obtain best value date if and only if the date if unmodified.

```
{ if not(isDirty?(self[#valueDate]))
    then aDate := bestValueDate(fundsXfer);
      setField(self[#valueDate], aDate);
      setValueDate(fundsXfer, aDate);
    endif;
}
``` fillComboBoxes(self)
The combo boxes are loaded after the window is visible.

```
{
  enableTotal(self);

fillSetupName(self);
  fillFnbcAccount2(self);
  fillACHTranCodes(ACH, self[#achCode]);
  fillBene(self);
  fillBankName(self);
  fillInterBankName(self);
}
``` fillFnbcAccount2(self)
6/18/1992 8:54

```
{
  fill(self[#fnbcAccount2],
    new(DBAccount),
    {using(aRecord)
      asciiz(workVar);
    },
    {using(aRecord)
      workVar := longAcctNum(Account,
        aRecord["acctNum"], aRecord["branchCode"]);

not(aRecord["limbo?"] cor
          accountRestricted?(Account, workVar, %Set('B', 'T')));
    });
}
``` fillInterBankFields(self, aParty | types typeTuple)
    Fill the intermediary bank fields

```
{ types := determineCodeTypes(fundsXfer, loadString(15719) /*
intermediaryBank */ );
  dispatchOff(self);
  assocsDo($InterBankRetrieval,
    { using(pair) setText(self[key(pair)], perform(aParty, value(pair)) cor
NULLSTR);
    });
  if size(types) = 0
  then disable(self[#interBankCodeTypes]);
    disable(self[#interBankCode]);
    clearField(self[#interBankCode]);
  else
    if typeTuple := determinePreferredCode(aParty, types)
    then
      if (size(getField(self[#interBankCode]))=0 cor
(size(setupUsed(fundsXfer))>0) cor isSetup(fundsXfer) cor
        typeTuple[1]<>getField(self[#interBankCode]))
        selectString(self[#interBankCodeTypes], typeTuple[0]);
        setField(self[#interBankCode], typeTuple[1]);
      endif;
    else setCurSel(self[#interBankCodeTypes], 0);
      clearField(self[#interBankCode]);
    endif;
    isEnabled?(self[#interBankName]) cand enable(self[#interBankCode]);
    enable(self[#interBankCodeTypes]);
  endif;
  dispatchOn(self);
}
``` fillInterBankName(self)
    6/18/1992 8:58

```
{
  fill(self[#interBankName],
    DBSession[#UPC][#party],
    {using(aRecord)
      stringBufAt(aRecord, "partyId", $StrBuf, size($StrBuf));
    },
    {using(aRecord)
      aRecord["financialInst?"] cand not(aRecord["limbo?"]);
    });
}
``` fillOtherBankFields(self, aParty | types typeTuple )
    Fill the other party bank fields

```
{ types := determineCodeTypes(fundsXfer, loadString(15720) /* bank */ );
  dispatchOff(self);
  assocsDo($OtherBankRetrieval,
    { using(pair) setText(self[key(pair)], perform(aParty, value(pair)) cor
NULLSTR);
    });

if size(types) = 0
  then disable(self[#bankCodeTypes]);
    disable(self[#bankCode]);
    clearField(self[#bankCode]);
  else
    if typeTuple := determinePreferredCode(aParty, types)
    then
      (size(getField(self[#bankCode]))=0 cor
(size(setupUsed(fundsXfer))>0) cor isSetup(fundsXfer))
        cand selectString(self[#bankCodeTypes], typeTuple[0]);
      if typeTuple[0]=ABA cand isACH(fundsXfer) then
        if size(achRoutingNum(aParty))>0
          typeTuple[1]:=achRoutingNum(aParty);
```

```
                endif;
            endif;

(size(getField(self[#bankCode]))=0 cor
 (size(setupUsed(fundsXfer))>0) cor isSetup(fundsXfer) cor
            typeTuple[1]<>getField(self[#bankCode]))
              cand setField(self[#bankCode], typeTuple[1]);
        else
            setCurSel(self[#bankCodeTypes], 0);
            clearField(self[#bankCode]);
        endif;
      isEnabled?(self[#bankName]) cand enable(self[#bankCode]);
      enable(self[#bankCodeTypes]);
    endif;
    dispatchOn(self);
}
``` fillOtherPartyFields(self, aParty | types typeTuple)

Fill the other party fields. If, due to a change of currency or some other attribute, it there is now a code to display, enable the code if the bene field itself is enabled.

```
{ types := determineCodeTypes(fundsXfer, loadString(15726) /* beneficiary
*/ );
  dispatchOff(self);
  assocsDo($OtherPartyRetrieval,
    { using(pair) setText(self[key(pair)], perform(aParty, value(pair)) cor
NULLSTR);
  });
  if size(types) = 0
  then disable(self[#beneCodeTypes]);
    disable(self[#beneCode]);
    clearField(self[#beneCode]);
  else
    if typeTuple := determinePreferredCode(aParty, types)
    then
        if (size(getField(self[#beneCode]))=0 cor
size(setupUsed(fundsXfer))>0  cor
            typeTuple[1]<>getField(self[#beneCode]))
          selectString(self[#beneCodeTypes], typeTuple[0]);
          setField(self[#beneCode], typeTuple[1]);
        endif;
    else
        setCurSel(self[#beneCodeTypes], 0);
        clearField(self[#beneCode]);
    endif;
    isEnabled?(self[#bene]) cand enable(self[#beneCode]);
    enable(self[#beneCodeTypes]);
  endif;
  dispatchOn(self);
}
``` fillSetupName(self)

6/18/1992 8:52

```
{
  canDoRepetitive(self) cand
    fill(self[#setupName],
      DBSession[#UPC][#setup],
      {using(aRecord)
        stringBufAt(aRecord, "setupName", $StrBuf, size($StrBuf));
      },
      {using(aRecord)
        aRecord["currStatus"] = ACT cand
          not(accountRestricted?(Account:late,
            longAcctNum(Account:late,
              aRecord["CustAcct"],
              aRecord["CustBranch"]),
            %Set('B', 'T'))}
    });
}
``` fillSummary(self | view)
Fill the summary field using selection criteria.

```
{
  dispatchOff(self);
  operId := id(operator(UPCServices[#systemConfiguration]));
  view := new(DBSelXfer);
  setFilter(view, selCriteria,
  {using(aRecord)
    /* only want owned WIPS and do not want trasactions created from
       transaction group members */
    operId = aRecord["entererId"] cand  isBlank(aRecord["trGroupName"]);
  });

fill(self[#summary], view);

size(items) > 0 cand setCurSel(self[#summary], 0);
  dispatchOn(self);
}
``` historyAction(self, fld, code)
2/21/1992 13:22 Starts the history dialog. Placed here for SetupBrowser and RepairBrowser to inherit and avoid duplicating the method. TransBrowser does not have a history button. 5/5/92 KAM

```
{ runModal(TranHistory:late, self, aRec);
}
``` hostSetup(self)
1/6/1992 14:32 Returns the host setup instance variable.

```
{ ^hostSetup;
}
``` hostSetupEnabling(self)
3/4/1992 10:21 Retrieve the host setup. Hopefully, its id is most often the same as that of the setup's.

```
{ if isHostRepetitive(fundsXfer)
   then
      if setup cand hostSetupName(fundsXfer) = setupName(setup)
        then hostSetup := setup;
        else hostSetup := queryOnHostSetupName(FundsXfer:late,
   hostSetupName(fundsXfer));
      endif;
      hostSetup cand enableTriggersHostRepetitive(self);
   else hostSetup := nil;
   endif;
   ^hostSetup;
}
``` hostSetupFieldChanged(self, fld, code | limits)
Trigger for fields whose values are predefined by the host setup.

```
{ hostSetupRemoval(self);
  if fundsXfer
  setHostSetupName(fundsXfer, nil);
  /* if the host setup is an ach we need to clear the prohibited fields for
bank 8/11/92 AWH */
   if fld cand not(identity(fld)=#bankName) cand isACH(fundsXfer) then
     dispatchOff(self);
     assocsDo($OtherBankFldVal,
     { using(pair) setText(self[key(pair)], NULLSTR);
                perform(otherPartyBank(fundsXfer), nil, value(pair));
     });
     setName(otherPartyBank(fundsXfer),nil);
     setCurSel(self[#bankName], -1);
     dispatchOn(self);
   endif;
```

```
        limits := maximumLengths(UPCServices[#dataChecker], fundsXfer, nil, /*
party type */
                                instType(fundsXfer), 0);
        setLimit(self[#addenda], limits[#details]);
        endif;
}
``` hostSetupRemoval(self)

Removes host setup triggers.

```
{ if hostSetup
    then removeTriggersHostRepetitive(self);
      hostSetup := nil;
    endif;
}
``` initForm(self)

6/27/1991 13:12 Sets the limits on various fields.

```
{
    initFormNotInherited(self); /* initialization peculiar to class */
    setAmountField(self[#currCode], self[#amount]);
    initFieldHelp(self,helpFields(self));
}
``` initFormNotInherited(self)

2/19/1992 10:24

```
{
    initForm(self:ancestor); /* ancestor's initForm will init triggers */ items := self[#summary];
    asUpperCase(self[#setupName]);
    destroy(self[#history]);
    remove(fieldColl, find(fieldColl, self[#history])); /* destroy the
evidence */
    makeFundsXfer(self);
    enableAllFreeForm(self);
}
``` initMenu(self | pMenu)

Define the methods to be executed when a menu choice is made.

```
{ pMenu := newPopup(MenuItem, loadString(7940) /* &File */ );
    addItem(pMenu, new(MenuItem, loadString(7901) /* &New */ , FILE_NEW,
#fileNew));
    addItem(pMenu, new(MenuItem, loadString(7905) /* &Save... */ , FILE_SAVE,
#fileSave));
    addItem(pMenu, nil);
    initDetailSummaryPrintMenu(self, pMenu);
    addItem(menu, pMenu);
    pMenu := newPopup(MenuItem, loadString(15747) /* Tra&nsaction */ );
    addItem(pMenu, new(MenuItem, loadString(7907) /* &Delete */ ,
FILE_DELETE, #fileDelete));
    addItem(pMenu, new(MenuItem, loadString(15748) /* &As Setup... */ ,
AS_SETUP, #asSetup));
    addItem(pMenu, new(MenuItem, loadString(15749) /* &Cross Currency... */ ,
CROSS_CURRENCY, #crossCurrency));
    addItem(menu, pMenu); /* temporary */
    initHelpMenu(self);
}
``` initTriggers(self)

Initializes trigger handling.

```
{ initTriggersNotInherited(self);
```

```
    addExitTrigger(self[#fnbcAccount2], self, #exitAccount);
    addChangeTrigger(self[#transType], self, #changeType);
    addChangeTrigger(self[#currCode], self, #changeCurrCode);
    addChangeTrigger(self[#achCode], self, #changeACHTranCode);
    addChangeTrigger(self[#amount], self, #changeAmount);
    addExitTrigger(self[#amount], self, #exitAmount);
    addExitTrigger(self[#docRef], self, #exitDocRef);
    addChangeTrigger(self[#bene], self, #changeOtherPartyName); /* other
party (beneficiary) */
    addExitTrigger(self[#bene], self, #exitOtherParty);
    addChangeTrigger(self[#beneCodeTypes], self, #changeOtherPartyCodeType);
    do(#(beneCity beneState beneCountry beneCode),
    { using(id) addChangeTrigger(self[id], self, #changeOtherPartyInfo);
    });
    addExitTrigger(self[#accountNumber], self, #exitOtherPartyAcct);
    do(#(beneCity beneState beneCountry),
    { using(id) addExitTrigger(self[id], self, #exitOtherPartyInfo);
    });
    addEntryTrigger(self[#beneCode], self, #enterOtherPartyCode);
    addExitTrigger(self[#beneCode], self, #exitOtherPartyCode);
    addChangeTrigger(self[#bankName], self, #changeOtherBankName); /* other
party bank */
    addExitTrigger(self[#bankName], self, #exitOtherBank);
    addChangeTrigger(self[#bankCodeTypes], self, #changeOtherBankCodeType);
    do(#(bankCity bankState bankCountry bankCode),
    { using(id) addChangeTrigger(self[id], self, #changeOtherBankInfo);
    });
    do(#(bankCity bankState bankCountry),
    { using(id) addExitTrigger(self[id], self, #exitOtherBankInfo);
    });
    addEntryTrigger(self[#bankCode], self, #enterOtherBankCode);
    addExitTrigger(self[#bankCode], self, #exitOtherBankCode);
    addChangeTrigger(self[#interBankName], self, #changeInterBankName); /*
intermediary */
    addExitTrigger(self[#interBankName], self, #exitInterBank);
    addChangeTrigger(self[#interBankCodeTypes], self,
#changeInterBankCodeType);
    do(#(interBankCity interBankState interBankCountry interBankCode),
    { using(id) addChangeTrigger(self[id], self, #changeInterBankInfo);
    });
    do(#(interBankCity interBankState interBankCountry),
    { using(id) addExitTrigger(self[id], self, #exitInterBankInfo);
    });
    addEntryTrigger(self[#interBankCode], self, #enterInterBankCode);
    addExitTrigger(self[#interBankCode], self, #exitInterBankCode);
    addEntryTrigger(self[#addenda], self, #enterAddenda);
    addExitTrigger(self[#addenda], self, #exitAddenda); /* addenda */
    addChangeTrigger(self[#more], self, #moreAction);
    addChangeTrigger(self[#accept], self, #acceptAction);
    addChangeTrigger(self[#clear], self, #clearAction);
}
``` initTriggersNotInherited(self)

Initializes trigger handling for triggers which the setup browser should not inherit.

```
{
    addExitTrigger(self[#valueDate], self, #exitValueDate);
    addChangeTrigger(self[#totalBut], self, #totalAction);
}
``` isTypeEstablished(self | type)

2/28/1992 8:48 The funds transfer must have a type and the type must exist in the set of possible types.

```
{
  ^fundsXfer cand custAcct(fundsXfer) /* there's an account */
  cand (type := instType(fundsXfer)) cand searchString(self[#transType],
type);
}
``` keyFromSummaryIndex(self, idx)

Returns the key of the transaction specified by the given summary index.

```
{
  ^items[idx][#xferRefNum];
}
``` limitTyped(self | limits)

Sets limits on selected fields. 8/12/92 ADC: Added dispatch to setAmountRange.

```
{ setAmountRange(self);
  setCurrObj(UPCServices[#dataChecker], fundsXfer);
  limits := maximumLengths(UPCServices[#dataChecker], fundsXfer, nil,
  instType(fundsXfer), 0);
  limitTypedSet(self, $FieldRetrieval, limits);
  limits := maximumLengths(UPCServices[#dataChecker], /* beneficiary */
  otherParty(fundsXfer), "otherParty", instType(fundsXfer), 0);
  limitTypedSet(self, $OtherPartyRetrieval, limits);
  limits := maximumLengths(UPCServices[#dataChecker], /* beneficiary's
    bank */
  otherPartyBank(fundsXfer), "otherPartyBank", instType(fundsXfer), 0);
  limitTypedSet(self, $OtherBankRetrieval, limits);
  limits := maximumLengths(UPCServices[#dataChecker], /* intermediary */
  intermediary(fundsXfer), "intermediary", instType(fundsXfer), 0);
  limitTypedSet(self, $InterBankRetrieval, limits);
}
``` limitTypedSet(self, map, limits)

3/17/1992 11:15 Map contains a cross reference of screen field names to data base names. Limits is a dictionary keyed by screen field names.

```
{ assocsDo(map,
    { using(pair | limit field) field := self[key(pair)];
      if limit := limits[value(pair)]
      then setLimit(field, limit); /* print(key(pair));print(limit); */
      endif;
    });
}
``` logItem(self, msg, userData | aLogItem)

Log the transaction.

```
{ addToActivityLog(self);
  aLogItem := build(LogItem:late, 1, /* normal severity */
  LIA_FUNDSTRANSFER, /* application */
  LIC_TRANSENTRY, /* category */
  msg, /* a supplied argument */
  xferRefNum(fundsXfer), /* optional reference number */
  id(operator(UPCServices[#systemConfiguration])), /* the operator */
  userData); /* user data */
  add(UPCServices[#ActivityLog], aLogItem);
}
``` makeFundsXfer(self)

12/31/1991 9:45 Makes a new instance of FundsXfer from scratch. Sets its session number to the current batch's session number.

```
{
  aRec := fundsXfer := new(FundsXfer);
  setSessionNum(self);
  setXferRefNum(self, fundsXfer);
}
``` makeFundsXferAsFundsXfer(self)

12/31/1991 9:45 Makes a new instance of FundsXfer retaining some attributes of the prior one. Sets its session number to the current batch's session number.

```
{ aRec := fundsXfer := asFundsXfer(fundsXfer);
  setSessionNum(self);
  setXferRefNum(self, fundsXfer);
  fillBestValueDate(self);
``` makeFundsXferFromSetup(self | tmp xferRefNum)
Given a setup, retrieve the info and populate the fields.

```
{ if fundsXfer
     tmp := sessionNum(fundsXfer);
     xferRefNum := xferRefNum(fundsXfer);
  endif;
  aRec := fundsXfer := asPayment(setup);
  xferRefNum cand
     setXferRefNum(fundsXfer,xferRefNum) cor
     setXferRefNum(self, fundsXfer);
  tmp cand setSessionNum(fundsXfer, tmp) cor
     setSessionNum(self);
  setText(self[#fnbcAccount2], longAcctNum(custAcct(fundsXfer)));
  setField(self[#acccuntLongName], name(custAcct(fundsXfer)));
  setField(self[#transType], instTypes(custAcct(fundsXfer)));
  selectString(self[#transType], instType(fundsXfer));
}
``` menuActivated(self, popInfo)
Something's happened to cause a popup menu to appear. So, before it does, prepare it appropriately.

```
{ if popInfo = 0 /* File menu */
  then
     if numberSelected(self[#summary]) > 0
     then
        enableMenuItem(menu, FILE_PRINTSEL);
        enableMenuItem(menu, FILE_PRINTSEL_SUMMARY);
     else
        grayMenuItem(menu, FILE_PRINTSEL);
        grayMenuItem(menu, FILE_PRINTSEL_SUMMARY);
     endif;
     if size(self[#summary]) > 0
     then
        enableMenuItem(menu, FILE_PRINT_ALL);
        enableMenuItem(menu, FILE_PRINT_ALL_SUMMARY);
     else
        grayMenuItem(menu, FILE_PRINT_ALL);
        grayMenuItem(menu, FILE_PRINT_ALL_SUMMARY);
     endif;
  endif;

menuActivatedNotInherited(self, popInfo);
}
``` menuActivatedNotInherited(self, popInfo | aSetup)
9/25/1991 19:23 Something's happened to cause a popup menu to appear. So, before it does, prepare it appropriately.

```
{ select
     case popInfo = 0  /* File menu */
     is
        (size(items) > 0) cand enableMenuItem(menu, FILE_SAVE)
                          cor grayMenuItem(menu, FILE_SAVE);
     endCase
     case popInfo = 1 cand fundsXfer /* Transaction menu */
     is
        if activeRec /* Something out there to delete? */
        then enableMenuItem(menu, FILE_DELETE); /* if yes, .. */
        else grayMenuItem(menu, FILE_DELETE); /* forget it */
        endif;
        if isPrivOn?(operator(UPCServices[#systemConfiguration]),
PRIV_SETUP_MAIN) /*first this*/
           cand isTypeEstablished(self) /* is the basic stuff there? */
        then
           enableMenuItem(menu, AS_SETUP) /* If yes, enable */
        else
           grayMenuItem(menu, AS_SETUP);
        endif;
        if custAcct(fundsXfer) /* Is there an account? */
           cand ccyCode(custAcct(fundsXfer)) <> summCcyCode(fundsXfer) /* Is
it xccy? */
```

```
      then enableMenuItem(menu , CROSS_CURRENCY) /* Enable if xccy */
      else grayMenuItem(menu, CROSS_CURRENCY); /* Otherwise, do this */
      endif;
    endCase
    case popInfo = 1 /* Transaction menu, no fundsXfer */
    is do(tuple(FILE_DELETE, AS_SETUP, CROSS_CURRENCY),
        { using(id) grayMenuItem(menu, id);
        });
    endCase
  endSelect;
}
``` moreAction(self, fld, code)

Runs the appropriate more dialog. This dialog allows the user to enter addenda information for the fundsXfer.

```
{ showWaitCurs();
  if runMorePage(fundsXfer, self) /* user hasn't canceled out */
     cand not(details(fundsXfer)) /* Never alter explicitly entered details */
     cand isACH(fundsXfer)
  then dispatchOff(self);
    if addenda(fundsXfer) /* An addendum must exist */
       cand not(isAncestor(class(fundsXfer), CTX)) /* CTX doesn't fit */
       cand not(isAncestor(class(fundsXfer), CTP)) /* CTP doesn't fit */
    then fillAddendaWithAddenda(self);
    else clearField(self[#addenda]);
    endif;
    addDirtyFld(fundsXfer, #addenda);
    dispatchOn(self);
  endif;
  if (closeStatus(mainWindow(TheUPC))<>-1) cand not(isACH(fundsXfer))
  then fillOtherPartyFields(self, otherParty(fundsXfer));
    fillOtherBankFields(self, otherPartyBank(fundsXfer));
    fillInterBankFields(self, intermediary(fundsXfer));
  endif;
}
``` pendingXferRefNum(self)

7/25/1992 10:07

```
{
  ^pendingXferRefNum;
}
``` postStart(self)

2/13/1992 8:58 The TranBrowser has its own postStart method to display itself more promptly. Note that it proceeds to fill in its combo boxes.

```
{
  selCriteria := new(IdentityDictionary, 4);
  selCriteria[#workInProgress] := new(IdentityDictionary, 4);
  selCriteria[#workInProgress][#value] := true;

initSummary(self);
  showWaitCurs();
  fillComboBoxes(self);
  setFocus(self[#setupName]);
  showOldCurs();
}
``` qClass(self)

3/25/1992 11:28 Returns the class to use in a query.

```
{ ^FundsXferClass
}
``` refillSetupNames(self)

2/13/1992 9:08 The combo boxes are loaded after the window is visible.

```
{ clearField(self[#setupName]);
  setText(self[#setupName], NULLSTR);
  fillSetupNames(new(DBFundsXfer), self[#setupName]);
  setup cand selectString(self[#setupName], setupName(setup));
}
``` removeTriggersFreeForm(self)
12/23/1991 16:17 Removes the free form triggers.

```
{ removeChangeTrigger(self[#summary], self, #changeSummaryFreeForm);
  removeChangeTrigger(self[#setupName], self, #changeSetupNameFreeForm);
  removeTrigger(self[#setupName], self, #exitSetupNameFreeForm, TN_EXIT);
  removeChangeTrigger(self[#fnbcAccount2], self, #changeAccountFreeForm);
  removeChangeTrigger(self[#accept], self, #acceptedFreeForm);
}
``` removeTriggersHostRepetitive(self | party)
Remove the triggers.

```
{ if isTypeEstablished(self) cand isACH(hostSetup)
    then removeChangeTrigger(self[#transType], self,
#changeTypeHostRepetitive);
  endif;
  removeTriggersByName(self, #hostSetupFieldChanged);
  if not(isACH(hostSetup))
    then removeChangeTrigger(self[#addenda], self,
#changeAddendaHostRepetitive);
  endif;
}
``` removeTriggersRepetitive(self)
Have to remove every trigger that got added by enableTriggersRepetitive.

```
{ removeChangeTrigger(self[#summary], self, #changeSummaryRepetitive);
  removeChangeTrigger(self[#setupName], self, #changeSetupNameRepetitive);
  removeTrigger(self[#setupName], self, #exitSetupNameRepetitive, TN_EXIT);
  removeChangeTrigger(self[#fnbcAccount2], self, #changeAccountRepetitive);
  removeTriggersByName(self, #setupFieldChanged);
  if setup cand not(isACH(setup))
    then removeChangeTrigger(self[#addenda], self, #changeAddendaRepetitive);
  endif;
  removeChangeTrigger(self[#accept], self, #acceptedRepetitive);
}
``` reverseTransaction(self)
4/1/1992 10:47 Tests the funds transfer for group membership. If it belongs to a group, back it out. If reversal fails, show the reason. If it succeeds, proceed.

```
{ if trGroupName(fundsXfer) /* it belongs to a group */
    cand not(reverseTransaction(TrGroup:late, fundsXfer)) /* this fails */
    cand not(okToProceed(TrGroup:late))
  then ^nil; /* tell sender not to go any further */
  else ^0; /* tell sender to keep going */
  endif;
}
``` saveTransactions(self | dbFundsXfer aLogItem)
Saves transactions.

```
{
  showWaitCurs();
  dbFundsXfer := new(DBFundsXfer);
  do(items,
    {using(itemRec)
      updateStatus(dbFundsXfer,
        itemRec[#xferRefNum],
        itemRec[#initialStatus],
        itemRec[#stamp]);
```

```
}};
aLogItem := build(LogItem:late, 1, /* normal severity */
LIA_FUNDSTRANSFER, /* application */
LIC_TRANSENTRY, /* category */
5019, /* means "Transaction session created */
nil, /* optional reference number */
id(operator(UPCServices[#systemConfiguration])), /* the operator */
NUMBER_SIGN+asString(sessionNum) + loadString(15706) /*  and */ +
totalBatchString(self)); /* user data */
add(UPCServices[#ActivityLog], aLogItem);
showOldCurs();
}
``` setAmountRange(self | range )

```
{
    setCurrObj(UPCServices[#dataChecker],fundsXfer);
    range:=ranges(UPCServices[#dataChecker])[#amount];
    setRange(self[#amount], range[0], range[1]);
}
``` setCutoff(self | tmp)
2/20/1992 8:48 Displays the cutoff date based on the effective date.

```
{
  if effDate(fundsXfer)
  then tmp := cutOff(fundsXfer, nil);
    setCutOffDate(fundsXfer, tmp[0]);
    setCutOffTime(fundsXfer, tmp[1]);
  else clearField(self[#cutOff]);
  endif;
}
``` setItems(self, anItems)
9/30/1991 14:12

```
{
    ^items := anItems;
}
``` setPendingXferRefNum(self, aValue)
7/25/1992 10:07

```
{
    ^pendingXferRefNum:=aValue;
}
``` setSelCriteria(self, aCriteria)
10/2/1991 14:10

```
{
    ^selCriteria := aCriteria;
}
``` setSessionNum(self)
5/18/1992 13:05

```
{
  if not(sessionNum)
  then
```

```
    sessionNum := next(UPCServices[#BBS], #sessionNumber);
  endif;
  setSessionNum(fundsXfer, sessionNum);

setField(self[#sessionNumber], dsDisplayString(sessionNum(fundsXfer)));
}
``` setSetup(self, aSetup | xferRefNum temp1 temp2)

Given a setup, retrieve the info and populate the fields. 7/30/92 ADC: Removed the send to enable form that was in here. It happened too soon. Must give the browser a chance to apply its repetitive triggers before summoning enableForm.

```
{
  setup := aSetup;
  fundsXfer cand xferRefNum:=xferRefNum(fundsXfer);
  setXferRefNum(setup,xferRefNum);
  makeFundsXferFromSetup(self);
  dirtyOff(self);
  if isTypeEstablished(self) /* A defective setup fails to establish a
transaction type */
    then fillBestValueDate(self);
      setCutoff(self);
  endif;
  displayCutoff(self);
  if instType(fundsXfer) = loadString(15727) /* Foreign CCY Wire */
    cand size(xCcyCode(fundsXfer)) = 0
  then errorBox(loadString(15728) /* Warning */
    , loadString(15729)); /* Selected setup must have a Cross Currency
Code. Please select
      one before proceeding. */
    ^self;
  endif;
  if (instType(fundsXfer) = loadString(15727) /* Foreign CCY Wire */
    cand (amount(fundsXfer) cor xCcyAmt(fundsXfer))) cor
(size(xCcyCode(fundsXfer)) > 0)
    then temp1 := xCcyAmt(fundsXfer); /* this is a cross-currency Xfer */
      temp2 := amount(fundsXfer);
      if not(crossCurrency(self, nil, nil))
        then dispatchOff(self);
          setXCcyAmt(fundsXfer, temp1);
          setAmount(fundsXfer, temp2);
          setField(self[#amount], summAmount(fundsXfer));
          dispatchOn(self);
      endif;
  endif;
}
``` setup(self)

1/6/1992 14:32 Returns the setup instance variable.

```
{ ^setup;
}
``` setupFieldChanged(self, fld, code | limits)

Trigger for fields whose values are predefined by the setup. If any predefined field from a setup is changed by the user then the fundsXfer is now considered free-form and reverts to that mode. The test for these existence of setup is here to protect against a situation where two of these messages arrive in rapid succession. What happens then is that multiple copies of free form triggers are added to fields, which is very messy.

```
{ if setup
    then removeTriggersRepetitive(self);
      if fundsXfer
        then setSetupUsed(fundsXfer, nil);
          isACH(fundsXfer) cand setAddendaSetupName(fundsXfer);
      endif;
      setText(self[#setupName], NULLSTR);
```

```
        limits := maximumLengths(UPCServices[#dataChecker], fundsXfer, nil, /*
    party type */
                                        instType(fundsXfer), 0);
        setLimit(self[#addenda], limits[#details]);
        asFreeForm(self);
        not(canDoFreeForm(self)) cand disableGeneric(self);
        enableTriggersFreeForm(self);
      endif;
    }
``` setXferRefNum(self, xfer | temp)
5/12/1992 7:55

```
    {
        if not(xferRefNum(xfer)) then
          if pendingXferRefNum
            then setXferRefNum(xfer,pendingXferRefNum);
            else setXferRefNum(xfer, pendingXferRefNum:=next(UPCServices[#BBS],
    "fundsXferRefNumber"));
          endif;
        endif;

}
``` shouldClose(self | ret)
2/20/1992 9:20 Dispatches to the method that saves work in progress transactions.
8/14/92 ADC: Receipt of this message and reply of true does not necessarily mean that a close is definitely on its way, because the operator can close at the desktop level and then change his mind. Therefore, refresh self.

```
    {
      ret := fileSaveWIPs(self);
      setCurrObj(UPCServices[#dataChecker], nil);
      ^ret
    }
``` showDataCheckerResults(self | ret)

```
    { select
        case numMsgs(UPCServices[#errorMessages], LIS_DATA_ERROR) > 0 /* hard
    errors */
          is messageBox(UPCServices[#errorMessages], self, instType(fundsXfer) +
    loadString(15711) /* not accepted */ ,
            caption(class(self)), MB_OK);
          endCase
        case numMsgs(UPCServices[#errorMessages], LIS_DATA_WARNING) > 0 /*
    warnings */
          is ret := messageBox(UPCServices[#errorMessages], /* operator can
    override warnings */
            self, instType(fundsXfer) + loadString(15712) /* warning */ ,
    caption(class(self)), MB_OKCANCEL);
            ret == IDOK cand addToActivityLog(UPCServices[#errorMessages],
    LIS_DATA_WARNING);
          endCase
        default /* Only other possibility is database errors. */
          messageBox(UPCServices[#errorMessages], self,
                  fundsXfer cand (instType(fundsXfer) + loadString(15711))
    /* not accepted */
                                    cor loadString(15811), /* Error retrieving
    selection */
            caption(class(self)), MB_OK);
        endSelect;
        clear(UPCServices[#errorMessages]);
      ^ret == IDOK;
    }
``` titles(self)
> 9/10/1991 10:48 Default Titles method for all approval Browsers but Setup Approval Browser. The Setup Approval Browser will have its own specific titles method and will not inherit this general titles method.

```
{ ^#( 0->15737 /* PC Ref */ ,
      7->15738 /* Cur */ ,
     23->15739 /* Amount */ ,
     30->15740 /* Setup Name */ ,
     46->15741 /* Bene/Receiver */ ,
     65->15742 /* Status */ );
}
``` totalAction(self, fld, code)
> Starts the dialog that shows totals

```
{ runModal(TotCurr:late, self, totals(self));
}
``` totalBatchString(self | str ccyCode)
> Returns the current batch totals as a string.

```
{
  str := NULLSTR;
  do(totals(self),
   {using(totalRec) size(str) > 0 cand str := str + COMMA;
     str := str + SPACE + asString(totalRec[#count]);
     str := str + loadString(15707) /* items and */ ;
     str := str + asCurrencyString(totalRec[#amount], ccyCode :=
removeNulls(totalRec[#ccyCode])); '
     str := str + SPACE + ccyCode;
   });

^str;
}
``` totals(self | ccyTotals)
> Returns the batch totals as a dictionary.

```
{
  ccyTotals := new(Dictionary, 10);
  do(items,
   {using(itemRec | ccyCode total)
     ccyCode := itemRec[#summCcyCode];
     if total := ccyTotals[ccyCode]
     then total[#count] := total[#count] + 1;
       total[#amount] := total[#amount] + itemRec[#summAmount];
     else
       ccyTotals[ccyCode] := total := build(CStruct, #ccyCodeTotal);
       total[#ccyCode] := asciiz(ccyCode);
       total[#count] := 1;
       total[#amount] := itemRec[#summAmount];
     endif;
   });

^ccyTotals
}
```

MoreCCD

Source file:　　　　　　　　　MORECCD.CLS

Inherits from:　　　　　　　　Object WindowsObject Window AppWindow
　　　　　　　　　　　　　　　Form UPCForm MorePPD Inherited by:　　　　　　　　 ViewCCD Window for entering CCD+ addenda.

Instance variables:

| | |
|---|---|
| hWnd | (From class WindowsObject) |
| defProc | (From class WindowsObject) |
| parent | (From class WindowsObject) |
| cRect | (From class WindowsObject) |
| contID | (From class WindowsObject) |
| wStyle | (From class WindowsObject) |
| paintStruct | (From class Window) |
| hMenu | (From class Window) |
| menu | (From class Window) |
| buttonDn | (From class Window) |
| locRect | (From class Window) |
| caption | (From class Window) |
| cursor | (From class Window) |
| picture | (From class Window) |
| port | (From class Window) |
| space | (From class Window) |
| fieldColl | (From class Form) |
| gettingFocus | (From class Form) |
| theFocus | (From class Form) |
| idDict | (From class Form) |
| handleDict | (From class Form) |
| currGroup | (From class Form) |
| errorField | (From class Form) |
| execModal | (From class Form) |
| dirty | (From class Form) |
| retVal | (From class Form) |
| dispatchTrigger | (From class Form) |
| statusText | (From class Form) |
| fieldWithFocus | (From class Form) |
| aRec | (From class UPCForm) |
| fldValDict | (From class UPCForm) |
| hBrush | (From class UPCForm) |
| errorLog | (From class UPCForm) |
| clearFlag | (From class MorePPD) |
| firstTime | (From class MorePPD) |
| theFundsXfer | (From class MorePPD) |
| currentSection | (From class MorePPD) |
| helpFields | (From class MorePPD) |

Class variables:

| | |
|---|---|
| $StdFldVal | (From class MorePPD) |
| $NoteFlds | (From class MorePPD) |

$DateTimeFlds
$DeadRemittanceFlds
$StdFldVal
$RemittanceFlds
$ReferenceFlds (From class MorePPD)

Class methods:

caption(self)
    8/9/1991 20:13 Return the default caption for the window.

```
{ ^loadString(14985) /* ACH CCD+ Additional Information */ ;
}
``` helpFields(self)
    5/1/1992 11:35

```
{
    ^%IdentityDictionary(
    #memo->2219
    #discData->2220
    #refNum1->2224
    #refNum2->2224
    #adjustment->2231
    #adjCode->2234
    #refCode->2237
    #information->2238
    #dateQual1->2239
    #date1->2240
    #time1->2241
    #description1->2242
    #refQual1->2243
    #dateQual2->2239
    #date2->2240
    #time2->2241
    #description2->2242
    #refQual2->2243
    #amtPaid->2244
    #invoiceAmt->2245
    #discAmtDue->2246
    #help->2236
    );
}
``` helpIndex(self)
    4/10/1992 13:53

```
{
    ^2236;
}
```

Object methods:

adjCodeTrigger(self, fld, code | str adjCode)
    8/14/1991 11:02 trigger for setting the adjCode for the remittance section of an addenda object.

```
{ if size(str := getField(fld)) >= 2
    then adjCode := subString(str, 0, 2);
    endif;
    setAdjCode(aRec, adjCode);
}
``` clearAction(self, fld, code | newRec)

8/1/1991 16:48 trigger for clear button. clear all the fields for the currently enabled section. 8/3/92 ADC: Preserve the old new on the new addendum object. Failure to do so results in update failures. 8/5/92 ADC: The clear action itself sets a flag. The ok action stuffs nil into the xfer's addenda ivar.

```
{ clearMemoDiscDataFlds(self);
  if aRec /* We are working with an addenda, not free-form details. */
  then clearNoteFlds(self);
    clearDateTimeFlds(self);
    clearRemittanceFlds(self);
    clearReferenceFlds(self);
  endif;
  clearFlag := true;
  if aRec
  then newRec := new(CCDAddendum);
    setOldKey(newRec, oldKey(aRec));
    aRec := newRec;
  endif;
  dirtyOff(self);
}
``` clearReferenceFlds(self)

8/14/1991 11:02 Clear & disable all the reference fields and their ivars.

```
{
  /* Clear reference fields and reset their ivars. */
  clearField(at(self, #refNum2));
  setRefNum(aRec, nil);
  clearField(at(self, #description2));
  setDescription(aRec, nil);

/* Set the refQual2 comboBox to have no current selection */
  setCurSel(at(self, #refQual2), -1);
  refQualTrigger(self, at(self, #refQual2), nil);
}
``` clearRemittanceFlds(self)

8/14/1991 11:02 Clear the remittance fields and reset their ivars.

```
{ clearField(self[#refNum1]);
  setRmtRefNum(aRec, nil);
  clearField(self[#subjToDisc]);
  setSubjToDiscAmt(aRec, nil);
  clearField(self[#amtPaid]);
  setAmtPaid(aRec, nil);
  clearField(self[#description1]);
  setRmtDescription(aRec, nil);
  clearField(self[#invoiceAmt]);
  setInvoiceAmt(aRec, nil);
  clearField(self[#adjustment]);
  setAdjAmt(aRec, nil);
  clearField(self[#termsDiscAmt]);
  setTermsDiscAmt(aRec, nil);
  clearField(self[#discAmtDue]);
  setDiscAmtDue(aRec, nil);  /* Set the refQual1 and adjCode comboBoxes to have no current
     selection */
  setCurSel(self[#refQual1], -1);
  refQualTrigger(self, self[#refQual1], nil);
  setCurSel(self[#adjCode], -1);
  adjCodeTrigger(self, self[#adjCode], nil);
}
``` createFields(self | lbl, fld)

This method is generated automatically

```
{
  shrinkWrap(self, rect(2, 10, 624, 436));
  fld:=newField(self, EditField, 2300, %BitOr(WS_CHILD, WS_VISIBLE,
```

```
WS_BORDER, WS_TABSTOP, ES_AUTOHSCROLL, ES_LEFT, 0x200L), rect(46,2,506,26),
nil, #memo);
    setRightLabel(fld, rect(0,6,44,24), 11300 /* Memo */);
    fld:=newField(self, EditField, 2301, %BitOr(WS_CHILD, WS_VISIBLE,
WS_BORDER, WS_TABSTOP, ES_AUTOHSCROLL, ES_LEFT, 0x200L),
rect(580,2,616,26), nil, #discData);
    setRightLabel(fld, rect(512,6,578,22), 11301 /* Disc Data */);
    fld:=newField(self, VComboBox, 2305, %BitOr(WS_CHILD, WS_VISIBLE,
WS_VSCROLL, WS_TABSTOP, CBS_OWNERDRAWFIXED, CBS_DROPDOWNLIST),
rect(100,38,368,182), nil, #refCode);
    setRightLabel(fld, rect(32,40,96,58), 11302 /* Ref. Code */);
    fld:=newField(self, EditField, 2306, %BitOr(WS_CHILD, WS_VISIBLE,
WS_BORDER, WS_TABSTOP, ES_AUTOHSCROLL, ES_LEFT, 0x200L),
rect(100,62,592,86), nil, #information);
    setRightLabel(fld, rect(20,66,96,82), 11303 /* Information */);
    fld:=newField(self, VComboBox, 2307, %BitOr(WS_CHILD, WS_VISIBLE,
WS_VSCROLL, WS_TABSTOP, CBS_OWNERDRAWFIXED, CBS_DROPDOWNLIST),
rect(100,100,368,228), nil, #dateQual1);
    setRightLabel(fld, rect(6,104,96,122), 11304 /* Date Qualifier */);
    fld:=newField(self, DateField, 2309, %BitOr(ES_LEFT, WS_CHILD,
WS_VISIBLE, WS_BORDER, WS_TABSTOP), rect(414,100,500,124), nil, #date1);
    setLabel(fld, rect(382,104,414,122), 11305 /* Date */);
    fld:=newField(self, TimeField, 2311, %BitOr(ES_LEFT, WS_CHILD,
WS_VISIBLE, WS_BORDER, WS_TABSTOP), rect(544,100,612,124), nil, #time1);
    setLabel(fld, rect(510,104,542,122), 11306 /* Time */);
    fld:=newField(self, VComboBox, 2308, %BitOr(WS_CHILD, WS_VISIBLE,
WS_VSCROLL, WS_TABSTOP, CBS_OWNERDRAWFIXED, CBS_DROPDOWNLIST),
rect(100,124,368,254), nil, #dateQual2);
    setRightLabel(fld, rect(6,126,96,144), 11307 /* Date Qualifier */);
    fld:=newField(self, DateField, 2310, %BitOr(ES_LEFT, WS_CHILD,
WS_VISIBLE, WS_BORDER, WS_TABSTOP), rect(414,124,500,148), nil, #date2);
    setLabel(fld, rect(382,126,414,144), 11308 /* Date */);
    fld:=newField(self, TimeField, 2312, %BitOr(ES_LEFT, WS_CHILD,
WS_VISIBLE, WS_BORDER, WS_TABSTOP), rect(544,124,612,148), nil, #time2);
    setLabel(fld, rect(510,126,542,144), 11309 /* Time */);
    fld:=newField(self, VComboBox, 2321, %BitOr(WS_CHILD, WS_VISIBLE,
WS_VSCROLL, WS_TABSTOP, CBS_OWNERDRAWFIXED, CBS_DROPDOWNLIST),
rect(100,158,356,254), nil, #refQual1);
    setRightLabel(fld, rect(8,162,96,180), 11310 /* Ref. Qualifier */);
    fld:=newField(self, EditField, 2322, %BitOr(WS_CHILD, WS_VISIBLE,
WS_BORDER, WS_TABSTOP, ES_AUTOHSCROLL, ES_LEFT, 0x200L),
rect(100,182,356,206), nil, #refNum1);
    setRightLabel(fld, rect(12,184,96,202), 11311 /* Ref. Number */);
    fld:=newField(self, FloatField, 2327, %BitOr(/*FS_SEPERATOR*/ 0x2000,
ES_LEFT, WS_CHILD, WS_VISIBLE, WS_BORDER, WS_TABSTOP),
rect(480,182,612,206), nil, #invoiceAmt);
    setRightLabel(fld, rect(398,184,476,202), 11312 /* Invoice Amt */);
    fld:=newField(self, FloatField, 2323, %BitOr(/*FS_SEPERATOR*/ 0x2000,
ES_LEFT, WS_CHILD, WS_VISIBLE, WS_BORDER, WS_TABSTOP),
rect(100,206,232,230), nil, #subjToDisc);
    setRightLabel(fld, rect(12,208,96,226), 11313 /* Subj. to Disc */);
    fld:=newField(self, FloatField, 2328, %BitOr(/*FS_SEPERATOR*/ 0x2000,
ES_LEFT, WS_CHILD, WS_VISIBLE, WS_BORDER, WS_TABSTOP),
rect(480,206,612,230), nil, #adjustment);
    setRightLabel(fld, rect(400,208,476,226), 11314 /* Adjustment */);
    fld:=newField(self, FloatField, 2324, %BitOr(/*FS_SEPERATOR*/ 0x2000,
ES_LEFT, WS_CHILD, WS_VISIBLE, WS_BORDER, WS_TABSTOP),
rect(100,230,232,254), nil, #amtPaid);
    setRightLabel(fld, rect(38,232,96,250), 11315 /* Amt Paid */);
    fld:=newField(self, FloatField, 2329, %BitOr(/*FS_SEPERATOR*/ 0x2000,
ES_LEFT, WS_CHILD, WS_VISIBLE, WS_BORDER, WS_TABSTOP),
rect(480,230,612,254), nil, #termsDiscAmt);
    setRightLabel(fld, rect(372,232,476,250), 11316 /* Terms Disc Amt */);
    fld:=newField(self, VComboBox, 2325, %BitOr(WS_CHILD, WS_VISIBLE,
WS_VSCROLL, WS_TABSTOP, CBS_OWNERDRAWFIXED, CBS_DROPDOWNLIST),
rect(100,254,356,364), nil, #adjCode);
    setRightLabel(fld, rect(32,256,96,274), 11317 /* Adj. Code */);
    fld:=newField(self, FloatField, 2330, %BitOr(/*FS_SEPERATOR*/ 0x2000,
ES_LEFT, WS_CHILD, WS_VISIBLE, WS_BORDER, WS_TABSTOP),
rect(480,254,612,278), nil, #discAmtDue);
    setRightLabel(fld, rect(374,256,476,274), 11318 /* Disc Amt Taken */);
    fld:=newField(self, EditField, 2326, %BitOr(WS_CHILD, WS_VISIBLE,
WS_BORDER, WS_TABSTOP, ES_AUTOHSCROLL, ES_LEFT, 0x200L),
rect(100,278,612,302), nil, #description1);
    setRightLabel(fld, rect(22,280,96,300), 11319 /* Description */);
    fld:=newField(self, VComboBox, 2331, %BitOr(WS_CHILD, WS_VISIBLE,
WS_VSCROLL, WS_TABSTOP, CBS_OWNERDRAWFIXED, CBS_DROPDOWNLIST),
rect(100,312,356,408), nil, #refQual2);
```

```
   setRightLabel(fld, rect(8,314,96,332), 11320 /* Ref. Qualifier */);
   fld:=newField(self, EditField, 2332, %BitOr(WS_CHILD, WS_VISIBLE,
WS_BORDER, WS_TABSTOP, ES_AUTOHSCROLL, ES_LEFT, 0x200L),
   rect(100,336,356,360), nil, #refNum2);
   setRightLabel(fld, rect(8,338,96,356), 11321 /* Ref. Number */);
   fld:=newField(self, EditField, 2333, %BitOr(WS_CHILD, WS_VISIBLE,
WS_BORDER, WS_TABSTOP, ES_AUTOHSCROLL, ES_LEFT, 0x200L),
   rect(100,360,612,384), nil, #description2);
   setRightLabel(fld, rect(18,362,96,382), 11322 /* Description */);
   fld:=newField(self, ButtonField, 2313, %BitOr(WS_CHILD, WS_VISIBLE,
WS_TABSTOP, BS_DEFPUSHBUTTON), rect(186,392,266,416), 11323 /* &OK */,
#ok);
   fld:=newField(self, ButtonField, 2314, %BitOr(BS_PUSHBUTTON, WS_CHILD,
WS_VISIBLE, WS_TABSTOP), rect(270,392,350,416), 11324 /* &Clear */,
#clear);
   fld:=newField(self, StaticField, 2315, %BitOr(WS_CHILD, WS_VISIBLE,
SS_BLACKFRAME), rect(2,32,616,90), nil, #staticFld1);
   fld:=newField(self, StaticField, 2316, %BitOr(WS_CHILD, WS_VISIBLE,
SS_BLACKFRAME), rect(2,90,616,152), nil, #staticFld2);
   fld:=newField(self, StaticField, 2319, %BitOr(WS_CHILD, WS_VISIBLE,
SS_BLACKFRAME), rect(2,152,616,310), nil, #staticFld3);
   fld:=newField(self, StaticField, 2320, %BitOr(WS_CHILD, WS_VISIBLE,
SS_BLACKFRAME), rect(2,308,616,390), nil, #staticFld4);
   fld:=newField(self, ButtonField, 799, %BitOr(BS_PUSHBUTTON, WS_CHILD,
WS_VISIBLE, WS_TABSTOP), rect(356,392,436,416), 11325 /* &Help */, #help);
}
``` disableForDetails(self)

3/12/1992 12:49 Details are present.

```
{ disableForDetails(self:ancestor);
  disableFields(self, $RemittanceFlds);
  disableFields(self, $ReferenceFlds);
}
``` displayReferenceSection(self)

3/12/1992 13:10 Displays the fields of the reference section.

```
{ refQual(aRec) cand   /* Highlight last selected refQual if is one. */
    findString(at(self, #refQual2), refQual(aRec));

setField(self[#refNum2], refNum(aRec));
  setField(self[#description2], description(aRec));
}
``` displayRemittanceSection(self)

12/3/1991 14:23 The remittance section is the default for CCD's. This method loads its fields from the business object.

```
{ rmtRefQual(aRec) cand  /* Highlight last selected rmtRefQual and adjCode
if there are any. */
    findString(at(self, #refQual1), rmtRefQual(aRec));

setField(self[#refNum1], rmtRefNum(aRec));
  setField(self[#subjToDisc], subjToDiscAmt(aRec));
  setField(self[#amtPaid], amtPaid(aRec));
  setField(self[#description1], rmtDescription(aRec));
  setField(self[#invoiceAmt], invoiceAmt(aRec));
  adjCode(aRec) cand findString(self[#adjCode], adjCode(aRec));

setField(self[#adjustment], adjAmt(aRec));
  setField(self[#termsDiscAmt], termsDiscAmt(aRec));
  setField(self[#discAmtDue], discAmtDue(aRec));
}
``` enableTriggersRepetitive(self | setup)

1/6/1992 13:46 This method is invoked when initializing triggers and it is discovered that the payment is repetitive.

```
{ enableTriggersRepetitive(self:ancestor);
  setup := addenda(setup(parent));
```

```
        if size(rmtRefNum(setup)) > 0
        then addChangeTrigger(self[#refNum1], self, #setupFieldChanged);
        endif;
        if size(rmtRefQual(setup)) > 0
        then addChangeTrigger(self[#refQual1], self, #setupFieldChanged);
        endif;
        if invoiceAmt(setup) cand invoiceAmt(setup) <> 0
        then addChangeTrigger(self[#invoiceAmt], self, #setupFieldChanged);
        endif;
        if subjToDiscAmt(setup) cand subjToDiscAmt(setup) <> 0
        then addChangeTrigger(self[#subjToDisc], self, #setupFieldChanged);
        endif;
        if adjAmt(setup) cand adjAmt(setup) <> 0
        then addChangeTrigger(self[#adjustment], self, #setupFieldChanged);
        endif;
        if amtPaid(setup) cand amtPaid(setup) <> 0
        then addChangeTrigger(self[#amtPaid], self, #setupFieldChanged);
        endif;
        if termsDiscAmt(setup) cand termsDiscAmt(setup) <> 0
        then addChangeTrigger(self[#termsDiscAmt], self, #setupFieldChanged);
        endif;
        if discAmtDue(setup) cand discAmtDue(setup) <> 0
        then addChangeTrigger(self[#discAmtDue], self, #setupFieldChanged);
        endif;
        if size(adjCode(setup)) > 0
        then addChangeTrigger(self[#adjCode], self, #setupFieldChanged);
        endif;
        if size(rmtDescription(setup)) > 0
        then addChangeTrigger(self[#description1], self, #setupFieldChanged);
        endif;
        if size(refQual(setup)) > 0
        then addChangeTrigger(self[#refQual2], self, #setupFieldChanged);
        endif;
        if size(refNum(setup)) > 0
        then addChangeTrigger(self[#refNum2], self, #setupFieldChanged);
        endif;
        if size(description(setup)) > 0
        then addChangeTrigger(self[#description2], self, #setupFieldChanged);
        endif;
    }
``` fillAdjCodes(self)

Loads the adjustment code combo box.

```
    {
      fill(self[#adjCode],
        DBSession[#UPC][#rmtadjcd],
        {using(aRecord | str)
          fillCodeStr(call(DBInterface), record(aRecord), str :=
    stringBuffer(String));
          str;
        },
        {using(aRecord)
          true;
        });
    }
``` fillRefQuals(self | aView)

Loads the reference qualifier combo boxes.

```
    {
      aView := DBSession[#UPC][#refqual];

do(tuple(#refQual1, #refQual2),
      {using(fieldId)
        fill(self[fieldId], aView,
        {using(aRecord | str)
          fillCodeStr(call(DBInterface), record(aRecord), str :=
    stringBuffer(String));
          str;
        },
        {using(aRecord)
          true;
        });
      });
    }
``` initForm(self)

12/4/1991 8:50 Sets the limits on fields. Fills in combo boxes. Ancestor's initForm takes care of either retrieving or creating a CCDAddendum for aRec.

```
{
  setFixedFont(self);
  fillAdjCodes(self);
  fillRefQuals(self);
  initForm(self:ancestor);
  disableFields(self, $DeadRemittanceFlds);
}
``` initTriggers(self)

8/14/1991 10:52 initialize all fields and setup all triggers prior to displaying it. Setup all triggers for the remittance and reference sections.

```
{ initTriggers(self:ancestor);
  initFldValidation(self, $StdFldVal);
  addExitTrigger(at(self, #refQual1), self, #refQualTrigger);
  addExitTrigger(at(self, #refQual2), self, #refQualTrigger);
  addExitTrigger(at(self, #adjCode), self, #adjCodeTrigger);
}
``` limitTyped(self | limits, ranges, range)

3/24/1992 12:57 Sets the limits on fields. 8/4/92 ADC: Sets ranges on amount fields.

```
{ limitTyped(self:ancestor);
  if aRec  /* A free-form X12 details does NOT exist. */
  then setCurrObj(UPCServices[#dataChecker], aRec);
    limits := maximumLengths(UPCServices[#dataChecker], aRec, nil,
      instType(theFundsXfer), 0);
    setLimit(self[#refNum1], limits[#rmtRefNum]);
    setLimit(self[#refNum2], limits[#refNum]);
    setLimit(self[#description1], limits[#rmtDescription]);
    setLimit(self[#description2], limits[#description]);
    ranges := ranges(UPCServices[#dataChecker]);
    range := ranges[#invoiceAmt];
    setRange(self[#invoiceAmt], range[0], range[1]);
    range := ranges[#subjToDiscAmt];
    setRange(self[#subjToDisc], range[0], range[1]);
    range := ranges[#adjAmt];
    setRange(self[#adjustment], range[0], range[1]);
    range := ranges[#amtPaid];
    setRange(self[#amtPaid], range[0], range[1]);
    range := ranges[#termsDiscAmt];
    setRange(self[#termsDiscAmt], range[0], range[1]);
    range := ranges[#discAmtDue];
    setRange(self[#discAmtDue], range[0], range[1]);
  endif;
}
``` prepareAddendum(self)

3/12/1992 12:21 Either retrieves or creates a new addendum.

```
{ select
    case details(theFundsXfer) /* Free form entry exists */
    is ;
    endCase
    case addenda(theFundsXfer)  /* Addendum already exists */
    is aRec := deepCopy(addenda(theFundsXfer));
    endCase
    default  /* Make a new addendum */
    aRec := new(CCDAddendum);
  endSelect;
}
``` refQualTrigger(self, fld, code | str refQual)
8/14/1991 11:02 trigger for setting the refQual for the reference and remittance sections of an addendum object.

```
{ size(str := getField(fld)) >= 2 cand refQual := subString(str, 0, 2);
  if identity(fld) = #refQual1
  then setRmtRefQual(aRec, refQual);   /* Remittance ivar */
  else setRefQual(aRec, refQual);      /* Reference ivar */
  endif;
}
``` setFixedFont(self)
Set fields to use a fixed font.

```
{
  setFixedFont(self:ancestor);
  do(tuple(#adjCode, #refQual1, #refQual2),
    {using(fieldId) asFixedFont(self[fieldId]);
    });
}
``` setSection(self)
Initialize and enable the appropriate section.

```
{
  if details(theFundsXfer)
    disableForDetails(self);
  else
    hasNTE?(aRec) cand displayNoteSection(self);
    hasDTM?(aRec) cand displayDateTimeSection(self);
    hasRMR?(aRec) cand displayRemittanceSection(self);
    hasREF?(aRec) cand displayReferenceSection(self);
  endif;
}
```

MoreCTP

Source file:        MORECTP.CLS

Inherits from:      Object WindowsObject Window AppWindow
                    Form UPCForm UPCBrowser Inherited by:       ViewCTP Window for capturing Corporate Trade Payment Addenda Information - CTP.

Instance variables:

| | |
|---|---|
| hWnd | (From class WindowsObject) |
| defProc | (From class WindowsObject) |
| parent | (From class WindowsObject) |
| cRect | (From class WindowsObject) |
| contID | (From class WindowsObject) |
| wStyle | (From class WindowsObject) |
| paintStruct | (From class Window) |
| hMenu | (From class Window) |
| menu | (From class Window) |
| buttonDn | (From class Window) |
| locRect | (From class Window) |
| caption | (From class Window) |

| | |
|---|---|
| cursor | (From class Window) |
| picture | (From class Window) |
| port | (From class Window) |
| space | (From class Window) |
| fieldColl | (From class Form) |
| gettingFocus | (From class Form) |
| theFocus | (From class Form) |
| idDict | (From class Form) |
| handleDict | (From class Form) |
| currGroup | (From class Form) |
| errorField | (From class Form) |
| execModal | (From class Form) |
| dirty | (From class Form) |
| retVal | (From class Form) |
| dispatchTrigger | (From class Form) |
| statusText | (From class Form) |
| fieldWithFocus | (From class Form) |
| aRec | (From class UPCForm) |
| fldValDict | (From class UPCForm) |
| hBrush | (From class UPCForm) |
| errorLog | (From class UPCForm) |
| activeRec | (From class UPCBrowser) |
| setupChange | Set or nil |
| theFundsXfer | The Payment Object |
| noteSize | The number of characters that can be entered in the notes field. |
| helpFields | Help indices dictionary |

Class variables:

SStdFldVal

Class methods:

caption(self)
    8/9/1991 20:13 Return the default caption for the window.

```
{ ^loadString(14990) /* ACH CTP Additional Information */ ;
}
``` comboFields(self)
    6/11/1992 16:49

```
{
  ^#(paymentType refDoc adjCode);
}
``` helpFields(self)
    5/1/1992 13:55

```
{^%IdentityDictionary(
    #memo->2219
    #discData->2220
    #refNum1->2224
    #summary->2225
    #paymentType->2226
    #refDoc->2227
    #refDate->2228
```

```
#docAmt->2229
#discount->2230
#adjustment->2231
#adjAmt->2232
#netAmt->2233
#adjCode->2234
#note->2235
#help->2221
);
``` helpIndex(self)
    4/10/1992 13:53

```
{
^2221;
}
```

Object methods:

acceptAction(self, fld, code | tranOK idx)
    Trigger for the accept button. Note to future modifiers: it might be nicer to review the setupChange object, which is a set that holds the identities of fields on the form, and actually compare values of the setup to values of the addendum to see if they actually are different. After all, an operator may make a change inadvertently, and then change the field back to the setup value. Currently, this is regarded as a change, which seems a bit inflexible and severe. 7/22/92: Removed the call to prepareNewAddendum, which is now always done in resetBrowser. ADC, 7/22/92.

```
{
  if checkLowMemory()
    ^self;
  endif;

showWaitCurs();
  clear(UPCServices[#errorMessages]);
  setOk(UPCServices[#dataChecker], true);  /* Needed so data checker knows
whether to
    report errors or warnings the first time an addenda is made. */
  if isSetup(theFundsXfer) cand isBlank(setupName(aRec))
  then setSetupName(aRec, setupName(theFundsXfer))
  else not(xferRefNum(aRec)) cand setXferRefNum(aRec,
xferRefNum(theFundsXfer));
  endif;
  if not(tranOK := isValid?(aRec))
  then showOldCurs();
    tranOK := showDataCheckerResults(self);  /* operator may override
warnings */
  endif;
  if tranOK
  then showWaitCurs();
    addAddendum(theFundsXfer, aRec);
    removeSetupCheck(self);
    clearFields(self);
    if activeRec invalidateItem(self[#summary], activeRec);
       size(setupChange) > 0 cand setupFieldChanged(parent, nil, nil);
    else idx := add(view(self[#summary]), primSeqNum(aRec));
      refresh(self[#summary]);
      setCurSel(self[#summary], idx);
    endif;
    resetBrowser(self);  /* Prepares a new addendum */
  endif;
  showOldCurs();
}
``` addAdjPairAction(self, fld, code | str adjCode amount idx)
    8/1/1991 16:48 Trigger for addAdjPair button.

```
{ if size(str := getField(self[#adjCode])) >= 2
    then adjCode := subString(str, 0, 2);
    else errorBox(loadString(15000) /* Error */ , loadString(15001) /* An
Adjustment Code must be selected */ );
      setFocus(self[#adjCode]);
      ^self;
  endif;
  if ((amount := getField(self[#adjAmt])) = 0)
    then errorBox(loadString(15002) /* Error */ , loadString(15003) /* An
Amount must be entered */ );
      setFocus(self[#adjAmt]);
      ^self;
  endif;
  if not(okToAddAdjPair?(self))
    then errorBox(loadString(15002) /* Error */ , loadString(15004) /* The
maximum number of adjustments has been entered. */ );
      setFocus(self[#adjCode]);
    else
      if insertAdjustPair(aRec, adjCode, asReal(amount), nil)
        then idx := addString(self[#adjPairs], prepareAdjPairStr(self, adjCode,
amount));
          setCurSel(self[#adjCode], -1);
          clearField(self[#adjAmt]);
          enable(self[#adjPairs]);
        else setCurSel(self[#adjPairs], -1);
      endif;
  endif;
}
``` adjPairsTrigger(self, fld, code | adjPair idx)

8/1/1991 16:48 trigger for populating the code and amount fields based on
the current selection in the listBox.

```
{ if getField(self[#adjPairs]) cand (idx := getSelIdx(self[#adjPairs]))
    cand (adjPair := adjustments(aRec)[idx])
  then findString(self[#adjCode], adjPair[0]);
    setField(self[#adjAmt], adjPair[1]);
    enable(self[#deleteAdjPair]);
    enable(self[#modify]);
  endif;
}
``` asSummaryStr(self, primSeqNum, pmtType, refNum, refDoc, refDate, docAmt, discount | strBuf sz n tmp)

Return the sequence number plus other attributes of a CTP addendum
formatted nicely.

```
{
  strBuf := new(String, 72);
  strBuf[0] := NULLCHAR;
  strPad(call(TbProInterface), strBuf, sz := 72);
  memCopy(strBuf, 0, sz, tmp := asPaddedString(primSeqNum, 3), 0,
size(tmp));
  memCopy(strBuf, 4, sz, pmtType, 0, size(pmtType));
  memCopy(strBuf, 9, sz, refNum, 0, size(refNum));   /* 30 characters long
*/
  memCopy(strBuf, 41, sz, refDoc, 0, size(refDoc)); /* 2 char */
  memCopy(strBuf, 45, sz, tmp := asDisplayString(refDate), 0, size(tmp));
  tmp := asCurrencyString(docAmt, ccyCode(theFundsXfer) cor USD);
  memCopy(strBuf, 71 - size(tmp), sz, tmp, 0, size(tmp));

^strBuf;
}
``` calcAvailNoteText(self | tmpNum)

8/14/1991 10:52 Calculate the available amount of note text based on the
number of adjCode/adjAmt pairs + 7 characters of slack not usable per
secondary addenda except for the last one.

```
{ tmpNum := numAdjPairs(aRec);
  noteSize := 711 - ((tmpNum/6)*7) - (tmpNum*12);
  if (tmpNum mod 6) == 0 cand (tmpNum ~= 0)
    then
```

```
        noteSize := noteSize + 7;
   endif;
}
``` clearFields(self)
Clears the fields.

```
{ setCurSel(self[#paymentType], -1);
  clearField(self[#refNum1]);
  clearField(self[#refDate]);
  clearField(self[#docAmt]);
  clearField(self[#discount]);
  clearField(self[#adjustment]);
  clearField(self[#netAmt]);
  setCurSel(self[#refDoc], -1);
  clearField(self[#adjPairs]);
  disable(self[#adjPairs]);
  setCurSel(self[#adjCode], -1);
  clearField(self[#adjAmt]);
  disable(self[#deleteAdjPair]);
  disable(self[#modify]);
  disable(self[#deleteRec]);;
  clearField(self[#note]);
  calcAvailNoteText(self);
  dirtyOff(self);
}
``` createFields(self | lbl, fld)
This method is generated automatically

```
{
  shrinkWrap(self, rect(2, 10, 622, 442));
  fld:=newField(self, EditField, 2300, %BitOr(WS_CHILD, WS_VISIBLE,
WS_BORDER, WS_TABSTOP, ES_AUTOHSCROLL, ES_LEFT, 0x200L), rect(48,4,508,28),
nil, #memo);
  setRightLabel(fld, rect(2,8,46,26), 12700 /* Memo */);
  fld:=newField(self, EditField, 2301, %BitOr(WS_CHILD, WS_VISIBLE,
WS_BORDER, WS_TABSTOP, ES_AUTOHSCROLL, ES_LEFT, 0x200L),
rect(582,4,618,28), nil, #discData);
  setRightLabel(fld, rect(514,8,580,24), 12701 /* Disc Data */);
  fld:=newField(self, VComboBox, 2347, %BitOr(WS_CHILD, WS_VISIBLE,
WS_VSCROLL, WS_TABSTOP, CBS_OWNERDRAWFIXED, CBS_DROPDOWNLIST),
rect(2,56,616,176), nil, #summary);
  asSummary(fld);
  setLabel(fld, rect(6,36,616,56), 12702 /* Column Headings */);
  fld:=newField(self, VComboBox, 2355, %BitOr(WS_CHILD, WS_VISIBLE,
WS_VSCROLL, WS_TABSTOP, CBS_OWNERDRAWFIXED, CBS_DROPDOWNLIST),
rect(98,88,334,200), nil, #paymentType);
  setRightLabel(fld, rect(0,90,94,106), 12703 /* Payment Type */);
  fld:=newField(self, EditField, 2322, %BitOr(WS_CHILD, WS_VISIBLE,
WS_BORDER, WS_TABSTOP, ES_AUTOHSCROLL, ES_LEFT, 0x200L),
rect(436,88,616,112), nil, #refNum1);
  setRightLabel(fld, rect(348,90,432,106), 12704 /* Ref. Number */);
  fld:=newField(self, VComboBox, 2356, %BitOr(WS_CHILD, WS_VISIBLE,
WS_VSCROLL, WS_TABSTOP, CBS_OWNERDRAWFIXED, CBS_DROPDOWNLIST),
rect(98,112,334,200), nil, #refDoc);
  setRightLabel(fld, rect(28,116,94,134), 12705 /* Ref. Doc. */);
  fld:=newField(self, DateField, 2358, %BitOr(ES_LEFT, WS_CHILD,
WS_VISIBLE, WS_BORDER, WS_TABSTOP), rect(436,112,522,136), nil, #refDate);
  setRightLabel(fld, rect(366,116,432,132), 12706 /* Ref. Date */);
  fld:=newField(self, FloatField, 2357, %BitOr(/*FS_SEPERATOR*/ 0x2000,
ES_LEFT, WS_CHILD, WS_VISIBLE, WS_BORDER, WS_TABSTOP),
rect(98,136,220,160), nil, #docAmt);
  setRightLabel(fld, rect(16,140,94,160), 12707 /* Doc Amount */);
  fld:=newField(self, FloatField, 2359, %BitOr(/*FS_SEPERATOR*/ 0x2000,
ES_LEFT, WS_CHILD, WS_VISIBLE, WS_BORDER, WS_TABSTOP),
rect(436,136,558,160), nil, #discount);
  setRightLabel(fld, rect(366,140,432,158), 12708 /* Discount */);
  fld:=newField(self, FloatField, 2328, %BitOr(/*FS_SEPERATOR*/ 0x2000,
ES_LEFT, WS_CHILD, WS_VISIBLE, WS_BORDER, WS_TABSTOP),
rect(98,160,220,184), nil, #adjustment);
  setRightLabel(fld, rect(16,164,94,182), 12709 /* Adjustment */);
```

```
    fld:=newField(self, StaticField, 2360, %BitOr(WS_CHILD, WS_VISIBLE,
SS_RIGHT), rect(436,164,554,186), nil, #netAmt);
    setRightLabel(fld, rect(354,164,432,184), 12710 /* Net Amount */);
    fld:=newField(self, LBoxField, 2362, %BitOr(WS_CHILD, WS_VISIBLE,
WS_BORDER, WS_VSCROLL, WS_TABSTOP, LBS_NOTIFY), rect(16,216,218,314), nil,
#adjPairs);
    setLabel(fld, rect(16,198,216,214), 12711 /* Adjustment Code / Amount
*/);
    fld:=newField(self, VComboBox, 2325, %BitOr(WS_CHILD, WS_VISIBLE,
WS_VSCROLL, WS_TABSTOP, CBS_OWNERDRAWFIXED, CBS_DROPDOWNLIST),
rect(284,212,520,312), nil, #adjCode);
    setRightLabel(fld, rect(242,216,278,234), 12712 /* Code */);
    fld:=newField(self, FloatField, 2361, %BitOr(/*FS_SEPERATOR*/ 0x2000,
ES_LEFT, WS_CHILD, WS_VISIBLE, WS_BORDER, WS_TABSTOP),
rect(284,236,382,260), nil, #adjAmt);
    setRightLabel(fld, rect(228,238,278,258), 12713 /* Amount */);
    fld:=newField(self, ButtonField, 2353, %BitOr(BS_PUSHBUTTON, WS_CHILD,
WS_VISIBLE, WS_TABSTOP), rect(236,274,316,298), 12714 /* &Add */,
#addAdjPair);
    fld:=newField(self, ButtonField, 2363, %BitOr(BS_PUSHBUTTON, WS_CHILD,
WS_VISIBLE, WS_TABSTOP), rect(326,274,406,298), 12715 /* &Modify */,
#modify);
    fld:=newField(self, ButtonField, 2352, %BitOr(BS_PUSHBUTTON, WS_CHILD,
WS_VISIBLE, WS_TABSTOP), rect(416,274,496,298), 12716 /* &Delete */,
#deleteAdjPair);
    fld:=newField(self, EditField, 2303, %BitOr(WS_CHILD, WS_VISIBLE,
WS_BORDER, WS_TABSTOP, ES_AUTOVSCROLL, ES_MULTILINE, ES_LEFT, 0x200L),
rect(2,344,590,404), nil, #note);
    setLabel(fld, rect(2,326,48,340), 12717 /* Note */);
    fld:=newField(self, StaticField, 2315, %BitOr(WS_CHILD, WS_VISIBLE,
SS_BLACKFRAME), rect(4,192,594,320), nil, #staticFld1);
    fld:=newField(self, ButtonField, 2348, %BitOr(BS_PUSHBUTTON, WS_CHILD,
WS_VISIBLE, WS_TABSTOP), rect(40,406,128,428), 12718 /* Acce&pt */,
#accept);
    fld:=newField(self, ButtonField, 2314, %BitOr(BS_PUSHBUTTON, WS_CHILD,
WS_VISIBLE, WS_TABSTOP), rect(130,406,206,428), 12719 /* &Clear */,
#clear);
    fld:=newField(self, ButtonField, 2351, %BitOr(BS_PUSHBUTTON, WS_CHILD,
WS_VISIBLE), rect(210,406,286,428), 12720 /* D&elete */, #deleteRec);
    fld:=newField(self, ButtonField, 2313, %BitOr(WS_CHILD, WS_VISIBLE,
WS_TABSTOP, BS_DEFPUSHBUTTON), rect(380,406,460,430), 12721 /* &OK */,
#ok);
    fld:=newField(self, ButtonField, 799, %BitOr(BS_PUSHBUTTON, WS_CHILD,
WS_VISIBLE, WS_TABSTOP), rect(540,406,620,430), 12722 /* &Help */, #help);
}
``` deleteAdjPairAction(self, fld, code | idx adjPair)

8/1/1991 16:48 Trigger for deleteAdjPair button.

```
{ if getField(self[#adjPairs]) cand (idx := getSelIdx(self[#adjPairs]))
  then adjPair := adjustments(aRec)[idx];
    deleteAdjustPair(aRec, adjPair[0], adjPair[1]);
    deleteString(self[#adjPairs], idx);
    clearField(self[#adjAmt]);
    setCurSel(self[#adjCode], -1);
    setCurSel(self[#adjPairs], -1);
  endif;
  disable(self[#deleteAdjPair]);
  disable(self[#modify]);
  getCount(self[#adjPairs]) = 0 cand disable(self[#adjPairs]);
}
``` deleteRecAction(self, fld, code)

8/1/1991 16:48 Trigger for deleteRec button. It is intentional that clearFields precedes removeSetupCheck: the changes to fields occur before the removal of triggers. In this way, it falls out that if the addendum being deleted is based on a setup, the status of the payment changes to non-repetitive.

```
{ showWaitCurs();
  removeAddendum(theFundsXfer, aRec);
  clearFields(self);
  remove(view(self[#summary]), primSeqNum(aRec));
  size(setupChange) > 0 cand setupFieldChanged(parent, nil, nil);
  resetSummary(self); /* Positions on the first addendum */
  resetBrowser(self); /* Creates a new addendum */
  showOldCurs();
}
``` discDataTrigger(self, fld, code)

8/14/1991 11:02 Trigger for setting the discretionary data ivar of theFundsXfer object.

```
{ setDiscretionaryData(theFundsXfer, getField(fld));
}
``` enableTriggersRepetitive(self | setup)

1/8/1992 15:54 It is for sure that a setup exists when this method is summoned. The job is to get the right setup in place, then determine which of its fields are non-blank, and put triggers in place. The purpose of all the triggers is to change the payment's status to non-repetitive if there is a change to any of the sensitive fields.

```
{ if (setup := setup(parent)) /* Does parent have a setup? */
    cand setup := (addenda(setup)[primSeqNum(aRec)]) /* Select correct setup addendum */
  then
    if size(refNum(setup)) > 0
    then addChangeTrigger(self[#refNum1], self, #setupFieldChanged);
    endif;
    if size(pmtType(setup)) > 0
    then addChangeTrigger(self[#paymentType], self, #setupFieldChanged);
    endif;
    if size(refNum(setup)) > 0
    then addChangeTrigger(self[#refNum1], self, #setupFieldChanged);
    endif;
    if size(refDoc(setup)) > 0
    then addChangeTrigger(self[#refDoc], self, #setupFieldChanged);
    endif;
    refDate(setup) cand addChangeTrigger(self[#refDate], self, #setupFieldChanged);
    if docAmt(setup) cand docAmt(setup) <> 0
    then addChangeTrigger(self[#docAmt], self, #setupFieldChanged);
    endif;
    if discAmt(setup) cand discAmt(setup) <> 0
    then addChangeTrigger(self[#discount], self, #setupFieldChanged);
    endif;
    if adjAmt(setup) cand adjAmt(setup) <> 0
    then addChangeTrigger(self[#adjustment], self, #setupFieldChanged);
    endif;
    if size(adjustments(setup)) > 0
    then addChangeTrigger(self[#adjPairs], self, #setupFieldChanged);
    endif;
    note(aRec) cand addChangeTrigger(self[#note], self, #setupFieldChanged);
  endif;
}
``` fillAdjCodes(self)

Loads the adjustment code combo box.

```
{
  fill(self[#adjCode],
    DBSession[#UPC][#rmtadjcd],
    {using(aRecord | str)
      fillCodeStr(call(DBInterface), record(aRecord), str := stringBuffer(String));
      str;
```

```
        },
        {using(aRecord)
          true;
        });
}
``` fillAdjPairs(self)

12/13/1991 15:52 Fills the adjusment pairs list box.

```
{ if size(adjustments(aRec)) > 0
  then enable(self[#adjPairs]);
  else disable(self[#adjPairs]);
  endif;
  clearField(self[#adjPairs]);
  redrawOff(self[#adjPairs]);
  do(adjustments(aRec),
    { using(adjPair)
      if (getCount(self[#adjPairs]) = size(adjustments(aRec)) - 1) /* The
last one */
        cor getCount(self[#adjPairs]) = 5 /* The depth of the list box minus
one */
      then redrawOn(self[#adjPairs]);
      endif;
      addString(self[#adjPairs], prepareAdjPairStr(self, adjPair[0],
adjPair[1]));
    });
  redrawOn(self[#adjPairs]); /* Needed when there are no adjustments */
}
``` fillNote(self, text)

Fills the note field with the lines.

```
{ clearField(self[#note]);
  do(text,
  { using(line) add(self[#note], line + CR_LF);
  });
  resetModify(self[#note]);
}
``` fillPmtTypes(self)

Loads the payment type combo box.

```
{
  fill(self[#paymentType],
    DBSession[#UPC][#ctppmtyp],
    {using(aRecord | str)
      fillCodeStr(call(DBInterface), record(aRecord), str :=
stringBuffer(String));
      str;
    },
    {using(aRecord)
      true;
    });
}
``` fillRefDocs(self)

Loads the ref doc combo box.

```
{
  fill(self[#refDoc],
    DBSession[#UPC][#ctprefcd],
    {using(aRecord | str)
      fillCodeStr(call(DBInterface), record(aRecord), str :=
stringBuffer(String));
      str;
    },
    {using(aRecord)
      true;
    });
}
``` fillSummary(self | view)
Setups filling the summary combo box with nicely formatted strings, each representing an addendum.

```
{
  view := new(DBViewACHAddenda);
  setSortOrder(view, addenda(theFundsXfer));
  setView(self[#summary], view);
  setSummaryBlock(self[#summary],
  {using(aRecord | addendum)
    addendum := addenda(theFundsXfer)[primSeqNum(aRecord)];
    asSummaryStr(self,
      primSeqNum(addendum),
      pmtType(addendum),
      refNum(addendum),
      refDoc(addendum),
      refDate(addendum),
      dotAmt(addendum),
      discAmt(addendum));
  });

fillIt(self[#summary]);
}
``` fixupCombos(self, combos)
Shrinks the combo boxes.

```
{
  do(combos,
  {using(id)
    asFixedFont(self[id]);
  });
}
``` hasMenu(self)
4/3/1992 12:28 This browser doesn't have a menu.

```
{ ^false;
}
``` initFields(self)
8/14/1991 10:52 initialize all fields.

```
{ disable(self[#discData]); /* We will not support in Phase 1. */
  setField(self[#memo], memo(theFundsXfer));
  setField(self[#discData], discretionaryData(theFundsXfer)); /* Initialize the comboBoxes */
  fillNote(self, note(aRec));
  calcAvailNoteText(self);
  initFieldHelp(self,helpFields(self));
}
``` initForm(self)
8/14/1991 10:52 initialize all fields and setup up all triggers prior to displaying it.

```
{
  fixupCombos(self, comboFields(class(self)));
  fillAdjCodes(self);
  fillPmtTypes(self);
  fillRefDocs(self);
  disable(self[#deleteRec]);
  disable(self[#adjPairs]);
  disable(self[#modify]);
  disable(self[#deleteAdjPair]);
  prepareNewAddendum(self);
  limitTyped(self);
  initForm(self:ancestor);
}
``` initSummary(self)

12/9/1991 13:45 Fills the summary combo box with summary lines for the addenda.

```
{ fillSummary(self);
  resetSummary(self); /* Sets selected item to the first in the list */
}
``` initTriggers(self)

Initialize all triggers.

```
{ initTriggers(self:ancestor);
  initTriggersNotInherited(self);
  addChangeTrigger(at(self, #adjPairs), self, #adjPairsTrigger);
}
``` initTriggersNotInherited(self)

8/14/1991 10:52 initialize all triggers.

```
{ initFldValidation(self, $StdFldVal);
  addEntryTrigger(self[#note], self, #noteEntryTrigger);
  addExitTrigger(self[#memo], self, #memoTrigger);
  addExitTrigger(self[#discData], self, #discDataTrigger);
  addExitTrigger(self[#paymentType], self, #paymentTypeTrigger);
  addExitTrigger(self[#refDoc], self, #refDocTrigger);
  addExitTrigger(self[#note], self, #noteExitTrigger);
  addChangeTrigger(at(self, #deleteRec), self, #deleteRecAction);
  addChangeTrigger(at(self, #addAdjPair), self, #addAdjPairAction);
  addChangeTrigger(at(self, #deleteAdjPair), self, #deleteAdjPairAction);
  addChangeTrigger(at(self, #modify), self, #modifyAdjPairAction);
  addChangeTrigger(at(self, #accept), self, #acceptAction);
}
``` keyFromSummaryIndex(self, idx)

Returns the key of the addendum specified by the given summary index.

```
{
  ^view(self[#summary])[idx];
}
``` limitTyped(self | limits, ranges, range)

3/24/1992 12:32 Sets limits on fields. 8/4/92 ADC: Sets ranges on amount fields.

```
{ setCurrObj(UPCServices[#dataChecker], theFundsXfer);
  limits := maximumLengths(UPCServices[#dataChecker],theFundsXfer,nil,
  instType(theFundsXfer),0);
  setLimit(self[#memo], limits[#memo]);
  setLimit(self[#discData], limits[#discretionaryData]);
  setCurrObj(UPCServices[#dataChecker], aRec);
  limits := maximumLengths(UPCServices[#dataChecker], aRec, nil,
  instType(theFundsXfer), 0);
  setLimit(self[#refNum1], limits[#refNum]);
  setLimit(self[#note], 711);
  setCurrObj(UPCServices[#dataChecker], aRec);
  ranges := ranges(UPCServices[#dataChecker]);
  range := ranges[#docAmt];
  setRange(self[#docAmt], range[0], range[1]);
  range := ranges[#discAmt];
  setRange(self[#discount], range[0], range[1]);
  range := ranges[#adjAmt];
  setRange(self[#adjustment], range[0], range[1]);
  setRange(self[#adjAmt], range[0], range[1]);
}
``` memoTrigger(self, fld, code)
8/14/1991 11:02 trigger for setting the memo ivar of theFundsXfer object.

```
{ setMemo(theFundsXfer, getField(fld));
}
``` modifyAdjPairAction(self, fld, code | idx str adjCode adjAmt)
8/1/1991 16:48 trigger for modifyAdjPair button.

```
{ if getField(self[#adjPairs]) cand (idx := getSelIdx(self[#adjPairs]))
   then
      deleteString(self[#adjPairs], idx);
      str := getField(self[#adjCode]);
      adjCode := subString(str, 0, 2);
      adjAmt := getField(self[#adjAmt]);
      idx := insertString(self[#adjPairs], /* Modify the selected string */
      prepareAdjPairStr(self, adjCode, adjAmt), idx);
      insertAdjustPair(aRec, adjCode, adjAmt, idx); /* Replaces the
adjustment pair */
      setCurSel(self[#adjPairs], idx);
   endif;
}
``` noteEntryTrigger(self, fld, code)
8/1/1991 16:48 trigger for limiting the number of characters that can be entered in the note field based on the number of adjCode/adjAmt pairs that have been entered.

```
{ calcAvailNoteText(self);
  setLimit(fld, noteSize);
}
``` noteExitTrigger(self, fld, code)
1/7/1992 14:59 Saves the text of the note field as an ordered collection. As of 4/2/92, put text away as a text collection instead of an ordered collection.

```
{ if isModified(self[#note])
   then
      if isEmpty(self[#note])
      then setNote(aRec, nil);
      else setNote(aRec, asTextCollection(self[#note]));
      endif;
      resetModify(self[#note]);
   endif;
}
``` okAction(self, fld, code)
8/1/1991 16:48 trigger for ok button.

```
{
  ^endModal(self, aRec);
}
``` okToAddAdjPair?(self | tmp tmpNum)
8/14/1991 10:52 Determine whether or not there is enough space to add another adjCode/adjAmt pair. If not successful, return nil.

```
{ tmpNum := numAdjPairs(aRec) + 1;
  tmp := 711 - ((tmpNum/6)*7) - (tmpNum*12) - size(getField(at(self,
#note)));
  if tmp < 0
  then ^nil;
  else ^true;
  endif;
}
``` paymentTypeTrigger(self, fld, code | str paymentType)
12/13/1991 16:38 Sets the payment type.

```
{ if size(str := getField(fld)) >= 2
  then paymentType := subString(str, 0, 2);
  endif;
  setPmtType(aRec, paymentType);
}
``` prepareAdjPairStr(self, adjCode, amount | aStrm, tmp)
12/12/1991 14:38 Makes an attractive string showing the adjustment code and amount.

```
{ aStrm := streamOver(stringOf(' ', 25));
  nextPutAll(aStrm, adjCode);
  tmp := asCurrencyString(amount, ccyCode(theFundsXfer) cor USD );
  setPosition(aStrm, 22 - size(tmp));
  nextPutAll(aStrm, tmp);
  ^collection(aStrm);
}
``` prepareNewAddendum(self | nextSeqNum)
12/13/1991 14:52 Prepares a new CTP addendum.

```
{ aRec := new(CTPAddendum);
  if nextSeqNum := nextSeqNum(theFundsXfer)
  then setPrimSeqNum(aRec, nextSeqNum);
  else setFocus(self[#memo]);
    disable(self[#accept]);
  endif;
  setNote(aRec, NULLSTR);
  ^nextSeqNum;
}
``` qClass(self)
12/9/1991 10:23 Returns the query class.

```
{ ^DBCTPAddendum
}
``` refDocTrigger(self, fld, code | str refDoc)
12/13/1991 16:38 Sets the ref doc.

```
{ if size(str := getField(fld)) >= 2
  then refDoc := subString(str, 0, 2);
  endif;
  setRefDoc(aRec, refDoc);
}
``` removeSetupCheck(self | setup)
1/8/1992 16:14 If there is a setup with the same number as the active record, remove the triggers that got installed when the active record was selected.

```
{ if activeRec /* Had another addendum been active? */
    cand (setup := setup(parent)) /* Does the parent have a setup? */
    cand addenda(setup)[primSeqNum(aRec)] /* Is there a setup for this
record? */
  then removeTriggersRepetitive(self);
- endif;
}
``` removeTriggersRepetitive(self)

1/8/1992 15:54 Here we must remove every trigger that
enableTriggersRepetitive added.

```
{ removeTriggersByName(self, #setupFieldChanged);
}
``` resetBrowser(self)

7/23/1991 15:49 reset the browser to the initial start state. 7/22/92.
Unconditionally creates a new addendum. ADC, 7/22/92. 7/28/92 ADC:
Added send to removeTriggersRepetitive.

```
{ not(hasFocus(self[#memo])) cand setFocus(self[#memo]);
  prepareNewAddendum(self);
  if activeRec
  then activeRec := false;
    disable(self[#deleteRec]);
    if setupChange
    then removeTriggersRepetitive(self);
      setupChange := nil;
    endif;
  endif;
}
``` resetSummary(self)

12/10/1991 11:19 Positions on the first addendum, if there is one.

```
{ removeSetupCheck(self);
  if getCount(self[#summary]) > 0
  then setCurSel(self[#summary], 0);
  else setCurSel(self[#summary], -1);
  endif;
}
``` setAllFields(self | tmp)

Set the fields with values upon selection from summary area.

```
{ setAllFieldsNotInherited(self);
  if pmtType(aRec)
  then findString(self[#paymentType], pmtType(aRec));
  else setCurSel(self[#paymentType], -1);
  endif;
  setField(self[#refNum1], refNum(aRec));
  setField(self[#refDate], refDate(aRec));
  setField(self[#docAmt], docAmt(aRec));
  setField(self[#discount], discAmt(aRec));
  setField(self[#adjustment], adjAmt(aRec));
  tmp := asCurrencyString(netAmt(aRec), ccyCode(theFundsXfer) cor USD);
  setField(self[#netAmt], tmp);
  if refDoc(aRec)
  then findString(self[#refDoc], refDoc(aRec))
  else setCurSel(self[#refDoc], -1);
  endif;
  fillAdjPairs(self);
  setCurSel(self[#adjCode], -1);
  clearField(self[#adjAmt]);
  fillNote(self, note(aRec));
  calcAvailNoteText(self);
}
``` setAllFieldsNotInherited(self)
Set the fields with values upon selection from summary area.

```
{ disable(self[#deleteAdjPair]);
  disable(self[#modify]);
}
``` setupFieldChanged(self, fld, code)
1/6/1992 14:03 The payment is repetitive, and there was a change to a setup field. Add the identity of the field changed to the setupChange set.

```
{ setupChange cand add(setupChange, identity(fld));
}
``` showDataCheckerResults(self | ret)
3/16/1992 15:09 Show what the data checker has to show.

```
{ select
    case numMsgs(UPCServices[#errorMessages], LIS_DATA_ERROR) > 0 /* hard
errors */
    is messageBox(UPCServices[#errorMessages], self, instType(theFundsXfer)
+ loadString(14991) /* not accepted */ ,
        caption(class(self)), MB_OK);
    endCase
    case numMsgs(UPCServices[#errorMessages], LIS_DATA_WARNING) > 0 /*
warnings */
    is ret := messageBox(UPCServices[#errorMessages], /* operator can
override warnings */
        self, instType(theFundsXfer) + loadString(14992) /* warning */ ,
caption(class(self)), MB_OKCANCEL);
        ret == IDOK cand addToActivityLog(UPCServices[#errorMessages],
LIS_DATA_WARNING);
    endCase
    default /* Only other possibility is database errors. */
    messageBox(UPCServices[#errorMessages], self, instType(theFundsXfer)
+ loadString(14991) /* not accepted */ ,
        caption(class(self)), MB_OK);
  endSelect;
  clear(UPCServices[#errorMessages]);
  ^ret == IDOK;
}
``` start(self, aFundsXfer)
8/19/1991 15:24

```
{ theFundsXfer := aFundsXfer;
  start(self:ancestor, theFundsXfer);
  showOldCurs();
}
``` summarySelect(self)
12/9/1991 15:54 Enables the delete and accept buttons.

```
{ enable(self[#deleteRec]);
  enable(self[#accept]);
}
``` summaryTrigger(self, fld, code | setup)
This is the trigger method for the change event. Retrieve the record from the collection held by the funds transfer object. Makes a copy of the addendum to which changes will be applied. Changes are not committed until the accept action. 7/28/92 ADC: Added send to removeTriggersRepetitive.

```
{ if numberSelected(fld) = 1 showWaitCurs();
   removeSetupCheck(self);
   activeRec := getSelIdx(fld);
   aRec := addenda(theFundsXfer)[keyFromSummaryIndex(self, activeRec)];
   setAllFields(self);
   if (setup := setup(parent)) /* Does parent have a setup? */
     cand addenda(setup)[primSeqNum(aRec)] /* Does it have addenda? */
     enableTriggersRepetitive(self);
     setupChange := new(Set, size(fieldColl));
   else
     if setupChange
     then removeTriggersRepetitive(self);
        setupChange := nil;
     endif;
   endif;
   summarySelect(self); /* Enables the delete button */
   showOldCurs();
 else removeSetupCheck(self);
   clearFields(self);
   resetBrowser(self);
 endif;
}
``` titles(self)
   Column headings for the browser box.

```
{
  ^#(0->14994 /* Seq */, 4->14995 /* Type */, 9->14996 /* Reference Number */,
    41->14997 /* Doc */, 45->14998 /* Date */, 55->14999 /* Doc Amount */);
```

MoreCTX

Source file: MORECTX.CLS

Inherits from: Object WindowsObject Window AppWindow Form UPCForm UPCBrowser

Inherited by: ViewCTX

Window for entering CTX addenda types.

Instance variables:

| | |
|---|---|
| hWnd | (From class WindowsObject) |
| defProc | (From class WindowsObject) |
| parent | (From class WindowsObject) |
| cRect | (From class WindowsObject) |
| contID | (From class WindowsObject) |
| wStyle | (From class WindowsObject) |
| paintStruct | (From class Window) |
| hMenu | (From class Window) |
| menu | (From class Window) |
| buttonDn | (From class Window) |
| locRect | (From class Window) |
| caption | (From class Window) |
| cursor | (From class Window) |
| picture | (From class Window) |
| port | (From class Window) |
| space | (From class Window) |

| | |
|---|---|
| fieldColl | (From class Form) |
| gettingFocus | (From class Form) |
| theFocus | (From class Form) |
| idDict | (From class Form) |
| handleDict | (From class Form) |
| currGroup | (From class Form) |
| errorField | (From class Form) |
| execModal | (From class Form) |
| dirty | (From class Form) |
| retVal | (From class Form) |
| dispatchTrigger | (From class Form) |
| statusText | (From class Form) |
| fieldWithFocus | (From class Form) |
| aRec | (From class UPCForm) |
| fldValDict | (From class UPCForm) |
| hBrush | (From class UPCForm) |
| errorLog | (From class UPCForm) |
| activeRec | (From class UPCBrowser) |
| setupChange | flag |
| theFundsXfer | Help indices dictionary |
| helpFields | Help indices dictionary |

Class variables:

$StdFldVal

Class methods:

caption(self)
8/9/1991 20:13 Return the default caption for the window.

```
{ ^loadString(15005) /* ACH CTX Additional Information */ ;
}
``` comboFields(self)
6/11/1992 16:43

```
{
  ^#(adjCode dateQual1 dateQual2 refCode refQual1 refQual2);
}
``` helpFields(self)
5/1/1992 14:04

```
{^%IdentityDictionary(
   #memo->2219
   #discData->2220
   #refNum1->2224
   #refNum2->2224
   #adjustment->2231
   #adjCode->2234
   #refCode->2237
   #information->2238
   #dateQual1->2239
   #date1->2240
   #time1->2241
   #dateQual2->2239
   #date2->2240
   #time2->2241
   #description1->2242
```

```
#refQual1->2243
#description2->2242
#refQual2->2243
#amtPaid->2244
#invoiceAmt->2245
#discAmtDue->2246
#help->2247
);
}
``` helpIndex(self)
4/10/1992 13:53

```
{
  ^2247;
}
```

Object methods:

acceptAction(self, fld, code | tranOK idx)
12/9/1991 13:00 Adds the current addendum to the funds transfer object's collection. 7/22: Removed call to prepareNewAddendum, as resetBrowser does it. ADC, 7/22/92.

```
{
  if checkLowMemory()
    ^self;
  endif;

showWaitCurs();
  clear(UPCServices[#errorMessages]);
  setOk(UPCServices[#dataChecker], true);  /* Needed so data checker knows whether to
     report errors or warnings the first time an addenda is made. */
  if isSetup(theFundsXfer) cand isBlank(setupName(aRec))
  then setSetupName(aRec, setupName(theFundsXfer))
    else not(xferRefNum(aRec)) cand setXferRefNum(aRec,
  xferRefNum(theFundsXfer));
  endif;
  if not(tranOK := isValid?(aRec)) showOldCurs();
     tranOK := showDataCheckerResults(self); /* operator may override
  warnings */
  endif;
  if tranOK showWaitCurs();
    addAddendum(theFundsXfer, aRec);
    removeSetupCheck(self);
    clearFields(self);
    if activeRec invalidateItem(self[#summary], activeRec);
      size(setupChange) > 0 cand setupFieldChanged(parent, nil, nil);
    else idx := add(view(self[#summary]), primSeqNum(aRec));
      refresh(self[#summary]);
      setCurSel(self[#summary], idx);
    endif;
    resetBrowser(self); /* If activeRec, prepares a new addendum */
  endif;
  showOldCurs();
}
``` addSummary(self, addendum)
12/10/1991 9:45 Extracts the necessary attributes of the addendum to build a summary line.

```
{ addString(self[#summary], asSummaryStr(self, primSeqNum(addendum),
   rmtRefQual(addendum),
   rmtRefNum(addendum), invoiceAmt(addendum), amtPaid(addendum)));
}
``` adjCodeTrigger(self, fld, code | str adjCode)
    8/14/1991 11:02 trigger for setting the adjCode for the remittance section
of an addenda object.

```
{
  if size(str := getField(fld)) >= 2
    adjCode := subString(str, 0, 2);
  endif;
  setAdjCode(aRec, adjCode);
}
``` asSummaryStr(self, primSeqNum, rmtRefQual, rmtRefNum, invoiceAmt, amtPaid
| strBuf sz n tmp)
    Return the sequence number plus other attributes of a CTX addendum
formatted nicely.

```
{
  strBuf := new(String, 74);
  strBuf[0] := NULLCHAR;
  strPad(call(TbProInterface), strBuf, sz := 74);
  memCopy(strBuf, 0, sz, tmp := asPaddedString(primSeqNum, 2), 0,
size(tmp));
  memCopy(strBuf, 5, sz, rmtRefQual, 0, size(rmtRefQual));
  memCopy(strBuf, 9, sz, rmtRefNum, 0, size(rmtRefNum));
  tmp := asCurrencyString(invoiceAmt cor 0.0, ccyCode(theFundsXfer) cor
USD);
  memCopy(strBuf, 56 - size(tmp), sz, tmp, 0, size(tmp));
  tmp := asCurrencyString(amtPaid cor 0.0, ccyCode(theFundsXfer) cor USD);
  memCopy(strBuf, 73 - size(tmp), sz, tmp, 0, size(tmp));

^strBuf;
}
``` clearFields(self)
    12/9/1991 10:38 Called in response to the clear button action. As of
7/22/92, prepares a new addendum. ADC, 7/22/92.

```
{ setCurSel(at(self, #refCode), -1);/* Note section */
  clearField(self[#information]);
  setCurSel(self[#dateQual1], -1); /* Date section */
  clearField(self[#date1]);
  clearField(self[#time1]);
  setCurSel(self[#dateQual2], -1);
  clearField(self[#date2]);
  clearField(self[#time2]);
  setCurSel(self[#refQual1], -1);/* Remittance section */
  clearField(self[#refNum1]);
  clearField(self[#subjToDisc]);
  clearField(self[#amtPaid]);
  clearField(self[#description1]);
  clearField(self[#invoiceAmt]);
  clearField(self[#adjustment]);
  clearField(self[#termsDiscAmt]);
  clearField(self[#discAmtDue]);
  setCurSel(self[#adjCode], -1);
  setCurSel(at(self, #refQual2), -1);
  clearField(self[#refNum2]); /* Reference section */
  clearField(self[#description2]);
  dirtyOff(self);
}
``` createFields(self | lbl, fld)
    This method is generated automatically

```
{
  shrinkWrap(self, rect(10, -24, 630, 424));
  fld:=newField(self, EditField, 2300, %BitOr(WS_CHILD, WS_VISIBLE,
WS_BORDER, WS_TABSTOP, ES_AUTOHSCROLL, ES_LEFT, 0x200L), rect(46,2,506,26),
```

```
nil, #memo);
    setRightLabel(fld, rect(0,6,44,24), 12800 /* Memo */);
    fld:=newField(self, EditField, 2301, %BitOr(WS_CHILD, WS_VISIBLE,
WS_BORDER, WS_TABSTOP, ES_AUTOHSCROLL, ES_LEFT, 0x200L),
rect(580,2,616,26), nil, #discData);
    setRightLabel(fld, rect(512,6,578,22), 12801 /* Disc Data */);
    fld:=newField(self, VComboBox, 2347, %BitOr(WS_CHILD, WS_VISIBLE,
WS_VSCROLL, WS_TABSTOP, CBS_OWNERDRAWFIXED, CBS_DROPDOWNLIST),
rect(4,46,618,186), nil, #summary);
    asSummary(fld);
    setLabel(fld, rect(4,26,618,44), 12802 /* Column Headings */);
    fld:=newField(self, VComboBox, 2305, %BitOr(WS_CHILD, WS_VISIBLE,
WS_VSCROLL, WS_TABSTOP, CBS_OWNERDRAWFIXED, CBS_DROPDOWNLIST),
rect(102,74,370,218), nil, #refCode);
    setRightLabel(fld, rect(34,76,98,94), 12803 /* Ref. Code */);
    fld:=newField(self, EditField, 2306, %BitOr(WS_CHILD, WS_VISIBLE,
WS_BORDER, WS_TABSTOP, ES_AUTOHSCROLL, ES_LEFT, 0x200L),
rect(102,98,594,122), nil, #information);
    setRightLabel(fld, rect(22,102,98,118), 12804 /* Information */);
    fld:=newField(self, VComboBox, 2307, %BitOr(WS_CHILD, WS_VISIBLE,
WS_VSCROLL, WS_TABSTOP, CBS_OWNERDRAWFIXED, CBS_DROPDOWNLIST),
rect(102,136,370,264), nil, #dateQual1);
    setRightLabel(fld, rect(8,140,98,158), 12805 /* Date Qualifier */);
    fld:=newField(self, DateField, 2309, %BitOr(WS_CHILD, WS_VISIBLE,
WS_BORDER, WS_TABSTOP, ES_LEFT), rect(416,136,502,160), nil, #date1);
    setLabel(fld, rect(384,140,416,158), 12806 /* Date */);
    fld:=newField(self, TimeField, 2311, %BitOr(WS_CHILD, WS_VISIBLE,
WS_BORDER, WS_TABSTOP, ES_LEFT), rect(546,136,614,160), nil, #time1);
    setLabel(fld, rect(512,140,544,158), 12807 /* Time */);
    fld:=newField(self, VComboBox, 2308, %BitOr(WS_CHILD, WS_VISIBLE,
WS_VSCROLL, WS_TABSTOP, CBS_OWNERDRAWFIXED, CBS_DROPDOWNLIST),
rect(102,160,370,290), nil, #dateQual2);
    setRightLabel(fld, rect(8,162,98,180), 12808 /* Date Qualifier */);
    fld:=newField(self, DateField, 2310, %BitOr(WS_CHILD, WS_VISIBLE,
WS_BORDER, WS_TABSTOP, ES_LEFT), rect(416,160,502,184), nil, #date2);
    setLabel(fld, rect(384,162,416,180), 12809 /* Date */);
    fld:=newField(self, TimeField, 2312, %BitOr(WS_CHILD, WS_VISIBLE,
WS_BORDER, WS_TABSTOP, ES_LEFT), rect(546,160,614,184), nil, #time2);
    setLabel(fld, rect(512,162,544,180), 12810 /* Time */);
    fld:=newField(self, VComboBox, 2321, %BitOr(WS_CHILD, WS_VISIBLE,
WS_VSCROLL, WS_TABSTOP, CBS_OWNERDRAWFIXED, CBS_DROPDOWNLIST),
rect(102,194,358,290), nil, #refQual1);
    setRightLabel(fld, rect(10,198,98,216), 12811 /* Ref. Qualifier */);
    fld:=newField(self, EditField, 2322, %BitOr(WS_CHILD, WS_VISIBLE,
WS_BORDER, WS_TABSTOP, ES_AUTOHSCROLL, ES_LEFT, 0x200L),
rect(102,218,358,242), nil, #refNum1);
    setRightLabel(fld, rect(14,220,98,238), 12812 /* Ref. Number */);
    fld:=newField(self, FloatField, 2327, %BitOr(/*FS_SEPERATOR*/ 0x2000,
WS_CHILD, WS_VISIBLE, WS_BORDER, WS_TABSTOP, ES_RIGHT, ES_LEFT),
rect(482,218,614,242), nil, #invoiceAmt);
    setRightLabel(fld, rect(400,220,478,238), 12813 /* Invoice Amt */);
    fld:=newField(self, FloatField, 2323, %BitOr(/*FS_SEPERATOR*/ 0x2000,
WS_CHILD, WS_VISIBLE, WS_BORDER, WS_TABSTOP, ES_RIGHT, ES_LEFT),
rect(102,242,234,266), nil, #subjToDisc);
    setRightLabel(fld, rect(14,244,98,262), 12814 /* Subj. to Disc */);
    fld:=newField(self, FloatField, 2328, %BitOr(/*FS_SEPERATOR*/ 0x2000,
WS_CHILD, WS_VISIBLE, WS_BORDER, WS_TABSTOP, ES_RIGHT, ES_LEFT),
rect(482,242,614,266), nil, #adjustment);
    setRightLabel(fld, rect(402,244,478,262), 12815 /* Adjustment */);
    fld:=newField(self, FloatField, 2324, %BitOr(/*FS_SEPERATOR*/ 0x2000,
WS_CHILD, WS_VISIBLE, WS_BORDER, WS_TABSTOP, ES_RIGHT, ES_LEFT),
rect(102,266,234,290), nil, #amtPaid);
    setRightLabel(fld, rect(40,268,98,286), 12816 /* Amt Paid */);
    fld:=newField(self, FloatField, 2329, %BitOr(/*FS_SEPERATOR*/ 0x2000,
WS_CHILD, WS_VISIBLE, WS_BORDER, WS_TABSTOP, ES_LEFT),
rect(482,266,614,290), nil, #termsDiscAmt);
    setRightLabel(fld, rect(374,268,478,286), 12817 /* Terms Disc Amt */);
    fld:=newField(self, VComboBox, 2325, %BitOr(WS_CHILD, WS_VISIBLE,
WS_VSCROLL, WS_TABSTOP, CBS_OWNERDRAWFIXED, CBS_DROPDOWNLIST),
rect(102,290,358,400), nil, #adjCode);
    setRightLabel(fld, rect(34,292,98,310), 12818 /* Adj. Code */);
    fld:=newField(self, FloatField, 2330, %BitOr(/*FS_SEPERATOR*/ 0x2000,
WS_CHILD, WS_VISIBLE, WS_BORDER, WS_TABSTOP, ES_LEFT),
rect(482,290,614,314), nil, #discAmtDue);
    setRightLabel(fld, rect(372,292,478,310), 12819 /* Disc Amt Taken */);
    fld:=newField(self, EditField, 2326, %BitOr(WS_CHILD, WS_VISIBLE,
WS_BORDER, WS_TABSTOP, ES_AUTOHSCROLL, ES_LEFT, 0x200L),
rect(102,314,614,338), nil, #description1);
```

```
  setRightLabel(fld, rect(24,316,98,336), 12820 /* Description */);
  fld:=newField(self, VComboBox, 2331, %BitOr(WS_CHILD, WS_VISIBLE,
WS_VSCROLL, WS_TABSTOP, CBS_OWNERDRAWFIXED, CBS_DROPDOWNLIST),
rect(102,352,358,448), nil, #refQual2);
  setRightLabel(fld, rect(10,354,98,372), 12821 /* Ref. Qualifier */);
  fld:=newField(self, EditField, 2332, %BitOr(WS_CHILD, WS_VISIBLE,
WS_BORDER, WS_TABSTOP, ES_AUTOHSCROLL, ES_LEFT, 0x200L),
rect(102,376,358,400), nil, #refNum2);
  setRightLabel(fld, rect(10,378,98,396), 12822 /* Ref. Number */);
  fld:=newField(self, EditField, 2333, %BitOr(WS_CHILD, WS_VISIBLE,
WS_BORDER, WS_TABSTOP, ES_AUTOHSCROLL, ES_LEFT, 0x200L),
rect(102,400,614,424), nil, #description2);
  setRightLabel(fld, rect(20,402,98,422), 12823 /* Description */);
  fld:=newField(self, StaticField, 2315, %BitOr(WS_CHILD, WS_VISIBLE,
SS_BLACKFRAME, SS_LEFT), rect(4,68,618,126), nil, #staticFld1);
  fld:=newField(self, StaticField, 2316, %BitOr(WS_CHILD, WS_VISIBLE,
SS_BLACKFRAME, SS_LEFT), rect(4,126,618,188), nil, #staticFld2);
  fld:=newField(self, StaticField, 2319, %BitOr(WS_CHILD, WS_VISIBLE,
SS_BLACKFRAME, SS_LEFT), rect(4,188,618,346), nil, #staticFld3);
  fld:=newField(self, StaticField, 2320, %BitOr(WS_CHILD, WS_VISIBLE,
SS_BLACKFRAME, SS_LEFT), rect(4,344,618,426), nil, #staticFld4);
  fld:=newField(self, ButtonField, 2348, %BitOr(WS_CHILD, WS_VISIBLE,
WS_TABSTOP, BS_PUSHBUTTON), rect(90,426,164,448), 12824 /* &Accept */,
#accept);
  fld:=newField(self, ButtonField, 2314, %BitOr(WS_CHILD, WS_VISIBLE,
WS_TABSTOP, BS_PUSHBUTTON), rect(178,426,252,448), 12825 /* &Clear */,
#clear);
  fld:=newField(self, ButtonField, 2350, %BitOr(WS_CHILD, WS_VISIBLE,
BS_PUSHBUTTON), rect(262,426,336,448), 12826 /* &Delete */, #delete);
  fld:=newField(self, ButtonField, 2313, %BitOr(WS_CHILD, WS_VISIBLE,
WS_TABSTOP, BS_DEFPUSHBUTTON, BS_PUSHBUTTON), rect(430,426,504,448), 12827
/* &OK */, #ok);
  fld:=newField(self, ButtonField, 799, %BitOr(WS_CHILD, WS_VISIBLE,
WS_TABSTOP, BS_PUSHBUTTON), rect(540,426,620,450), 12828 /* &Help */,
#help);
}
``` dateQualTrigger(self, fld, code | str dateQual)

8/14/1991 11:02 trigger for setting the dateQuals for the dateTime section of the addenda.

```
{
  if size(str := getField(fld)) >= 3
    dateQual := subString(str, 0, 3);
  endif;
  if identity(fld) = #dateQual1
    setDateQual(aRec, dateQual, 1);
  else
    setDateQual(aRec, dateQual, 2);
  endif;
}
``` deleteAction(self, fld, code)

12/9/1991 16:08 Removes an addendum from the funds transfer object's dictionary.

```
{ showWaitCurs();
  removeAddendum(theFundsXfer, aRec);
  clearFields(self);
  remove(view(self[#summary]), primSeqNum(aRec));
  size(setupChange) > 0 cand setupFieldChanged(parent, nil, nil);
  resetSummary(self); /* Positions on the first addendum */
  resetBrowser(self); /* Creates a new addendum */
  showOldCurs();
}
``` discDataTrigger(self, fld, code)
    8/14/1991 11:02 Trigger for setting the discretionary data ivar of
    theFundsXfer object.
```
{ setDiscretionaryData(theFundsXfer, getField(fld));
}
```

- enableTriggersRepetitive(self | setup)
    1/8/1992 15:54 Here we refer to the setup to enable triggers.

```
{ if (setup := setup(parent))  /* Does parent have a setup? */
     cand setup := (addenda(setup)[primSeqNum(aRec)]) /* Select correct
setup addendum */
   then
      if size(refCode(setup)) > 0
      then addChangeTrigger(self[#refCode], self, #setupFieldChanged);
      endif;
      if size(information(setup)) > 0
      then addChangeTrigger(self[#information], self, #setupFieldChanged);
      endif;
      if size(dateQual1(setup)) > 0
      then addChangeTrigger(self[#dateQual1], self, #setupFieldChanged);
      endif;
      date1(setup) cand addChangeTrigger(self[#date1], self,
#setupFieldChanged);
      firstTime(setup) cand addChangeTrigger(self[#time1], self,
#setupFieldChanged);
      if size(dateQual2(setup)) > 0
      then addChangeTrigger(self[#dateQual2], self, #setupFieldChanged);
      endif;
      date2(setup) cand addChangeTrigger(self[#date2], self,
#setupFieldChanged);
      secondTime(setup) cand addChangeTrigger(self[#time2], self,
#setupFieldChanged);
      if size(rmtRefQual(setup)) > 0
      then addChangeTrigger(self[#refQual1], self, #setupFieldChanged);
      endif;
      if size(rmtRefNum(setup)) > 0
      then addChangeTrigger(self[#refNum1], self, #setupFieldChanged);
      endif;
      if invoiceAmt(setup) cand invoiceAmt(setup) <> 0
      then addChangeTrigger(self[#invoiceAmt], self, #setupFieldChanged);
      endif;
      if subjToDiscAmt(setup) cand subjToDiscAmt(setup) <> 0
      then addChangeTrigger(self[#subjToDisc], self, #setupFieldChanged);
      endif;
      if adjAmt(setup) cand adjAmt(setup) <> 0
      then addChangeTrigger(self[#adjustment], self, #setupFieldChanged);
      endif;
      if amtPaid(setup) cand amtPaid(setup) <> 0
      then addChangeTrigger(self[#amtPaid], self, #setupFieldChanged);
      endif;
      if termsDiscAmt(setup) cand termsDiscAmt(setup) <> 0
      then addChangeTrigger(self[#termsDiscAmt], self, #setupFieldChanged) ;
      endif;
      if discAmtDue(setup) cand discAmtDue(setup) <> 0
      then addChangeTrigger(self[#discAmtDue], self, #setupFieldChanged);
      endif;
      if size(adjCode(setup)) > 0
      then addChangeTrigger(self[#adjCode], self, #setupFieldChanged);
      endif;
      if size(rmtDescription(setup)) > 0
      then addChangeTrigger(self[#description1], self, #setupFieldChanged);
      endif;
      if size(refQual(setup)) > 0
      then addChangeTrigger(self[#refQual2], self, #setupFieldChanged);
      endif;
      if size(refNum(setup)) > 0
      then addChangeTrigger(self[#refNum2], self, #setupFieldChanged);
      endif;
      if size(description(setup)) > 0
      then addChangeTrigger(self[#description2], self, #setupFieldChanged);
      endif;
   endif;
}
``` fillAdjCodes(self)
    Loads the adjustment code combo box.

```
    {
      fill(self[#adjCode],
        DBSession[#UPC][#rmtadjcd],
        {using(aRecord | str)
          fillCodeStr(call(DBInterface), record(aRecord), str :=
    stringBuffer(String));

str;
        },
        {using(aRecord)
          true;
        });
    }
``` fillDateQuals(self | aView)
    Fill the date qualifier fields.

```
    {
      aView := DBSession[#UPC][#dtmdtqua];

do(tuple(#dateQual1, #dateQual2),
        {using(fieldId)
          fill(self[fieldId], aView,
            {using(aRecord | str)
              fillCodeStr(call(DBInterface), record(aRecord), str :=
    stringBuffer(String));
              str;
            },
            {using(aRecord)
              true;
            });
        });
    }
``` fillRefCode(self)
    Fills the reference code combo box.

```
    {
      fill(self[#refCode],
        DBSession[#UPC][#nterefcd],
        {using(aRecord | str)
          fillCodeStr(call(DBInterface), record(aRecord), str :=
    stringBuffer(String));
          str;
        },
        {using(aRecord)
          true;
        });
    }
``` fillRefQuals(self | aView)
    Loads the reference qualifier combo boxes.

```
    {
      aView := DBSession[#UPC][#refqual];

do(tuple(#refQual1, #refQual2),
        {using(fieldId)
          fill(self[fieldId], aView,
            {using(aRecord | str)
              fillCodeStr(call(DBInterface), record(aRecord), str :=
    stringBuffer(String));
              str;
            },
            {using(aRecord)
              true;
            });
        });
    }
``` fillSummary(self | view)
> Fills the summary combo box with nicely formatted strings, each representing an addendum.

```
{
  view := new(DBViewACHAddenda);
  setSortOrder(view, addenda(theFundsXfer));
  setView(self[#summary], view);
  setSummaryBlock(self[#summary],
    {using(aRecord | addendum)
      addendum := addenda(theFundsXfer)[primSeqNum(aRecord)];
      asSummaryStr(self,
        primSeqNum(addendum),
        rmtRefQual(addendum),
        rmtRefNum(addendum),
        invoiceAmt(addendum),
        amtPaid(addendum));
    });

fillIt(self[#summary]);
}
``` fixupCombos(self, combos)
> Shrinks the combo boxes.

```
{
  do(combos,
    {using(id)
      asFixedFont(self[id]);
    });
}
``` hasMenu(self)
> 4/3/1992 12:28 This browser doesn't have a menu.

```
{ ^false;
}
``` helpFields(self)
> 5/1/1992 14:04

```
{^helpFields := %IdentityDictionary(
  #memo->2219
  #discData->2220
  #refNum1->2224
  #refNum2->2224
  #adjustment->2231
  #adjCode->2234
  #refCode->2237
  #information->2238
  #dateQual1->2239
  #date1->2240
  #time1->2241
  #dateQual2->2239
  #date2->2240
  #time2->2241
  #description1->2242
  #refQual1->2243
  #description2->2242
  #refQual2->2243
  #amtPaid->2244
  #invoiceAmt->2245
  #discAmtDue->2246
  #help->2247
  );
}
``` initFields(self)

8/14/1991 10:52 Initialize all fields and setup all triggers prior to displaying it.

```
{ disable(self[#discData]); /* We will not support in Phase 1. */
  setField(self[#memo], memo(theFundsXfer));
  setField(self[#discData], discretionaryData(theFundsXfer));
  disable(self[#termsDiscAmt]);
  disable(self[#subjToDisc]);
  initFieldHelp(self,helpFields(self));
}
``` initForm(self)

Disable the delete button, set limits on certain fields, fill the various combo boxes, and prepare a new addendum record with a proper key.

```
{
  fixupCombos(self, comboFields(class(self)));
  fillRefCode(self);
  fillDateQuals(self);
  fillAdjCodes(self);
  fillRefQuals(self);
  disable(self[#delete]);
  prepareNewAddendum(self);
  limitTyped(self);
  initForm(self:ancestor);
}
``` initSummary(self)

12/9/1991 13:45 Fills the summary combo box with summary lines for the addenda.

```
{ fillSummary(self);
  resetSummary(self); /* Sets selected item to the first in the list */
}
``` initTriggers(self)

Initialize all triggers.

```
{ initTriggers(self:ancestor);
  initTriggersNotInherited(self);
}
``` initTriggersNotInherited(self)

Initialize all triggers.

```
{ initFldValidation(self, $StdFldVal);
  addExitTrigger(self[#memo], self, #memoTrigger);
  addExitTrigger(self[#discData], self, #discDataTrigger);
  addExitTrigger(self[#refCode], self, #refCodeTrigger);
  addExitTrigger(self[#dateQual1], self, #dateQualTrigger);
  addExitTrigger(self[#dateQual2], self, #dateQualTrigger);
  addExitTrigger(self[#refQual1], self, #refQualTrigger);
  addExitTrigger(self[#refQual2], self, #refQualTrigger);
  addExitTrigger(self[#adjCode], self, #adjCodeTrigger);
  addChangeTrigger(self[#accept], self, #acceptAction);
  addChangeTrigger(self[#delete], self, #deleteAction);
}
``` keyFromSummaryIndex(self, idx)

Returns the key of the addendum specified by the given summary index.

```
{
  ^view(self[#summary])[idx];
}
``` limitTyped(self | limits, ranges, range)

3/26/1992 14:49 Refer to the data checker to get the limits of the fields.
8/4/92 ADC: Sets ranges on amount fields.

```
{ setCurrObj(UPCServices[#dataChecker], theFundsXfer);
  limits := maximumLengths(UPCServices[#dataChecker],theFundsXfer,nil,
  instType(theFundsXfer), 0);
  setLimit(self[#memo], limits[#memo]);
  setLimit(self[#discData], limits[#discretionaryData]);
  setCurrObj(UPCServices[#dataChecker], aRec);
  limits := maximumLengths(UPCServices[#dataChecker], aRec, nil,
  instType(theFundsXfer), 0);
  setLimit(self[#refNum1], limits[#rmtRefNum]);
  setLimit(self[#description1], limits[#rmtDescription]);
  setLimit(self[#information], limits[#information]);
  setLimit(self[#refNum2], limits[#refNum]);
  setLimit(self[#description2], limits[#description]);
  setCurrObj(UPCServices[#dataChecker], aRec);
  ranges := ranges(UPCServices[#dataChecker]);
  range := ranges[#invoiceAmt];
  setRange(self[#invoiceAmt], range[0], range[1]);
  range := ranges[#subjToDiscAmt];
  setRange(self[#subjToDisc], range[0], range[1]);
  range := ranges[#adjAmt];
  setRange(self[#adjustment], range[0], range[1]);
  range := ranges[#amtPaid];
  setRange(self[#amtPaid], range[0], range[1]);
  range := ranges[#termsDiscAmt];
  setRange(self[#termsDiscAmt], range[0], range[1]);
  range := ranges[#discAmtDue];
  setRange(self[#discAmtDue], range[0], range[1]);
}
``` memoTrigger(self, fld, code)

8/14/1991 11:02 trigger for setting the memo ivar of theFundsXfer object.

```
{
    setMemo(theFundsXfer, getField(fld));
}
``` okAction(self, fld, code)

12/9/1991 14:56 The OK action is a done action, it simply closes self.

```
{
    ^endModal(self, aRec);
}
``` prepareNewAddendum(self | nextSeqNum)

12/9/1991 13:53 Creates a new addendum record with a proper primary key.

```
{ aRec := new(CTXAddendum);
  if nextSeqNum := nextSeqNum(theFundsXfer)
  then setPrimSeqNum(aRec, nextSeqNum(theFundsXfer));
  else setFocus(self[#memo]);
    disable(self[#accept]);
  endif;
}
``` qClass(self)

12/9/1991 10:23 Returns the query class.

```
{ ^DBCTXAddendum
}
``` refCodeTrigger(self, fld, code | str refCode)

8/14/1991 11:02 trigger for setting the refCode for the note section of the addenda.

```
{
   if size(str := getField(fld)) >= 3
     refCode := subString(str, 0, 3);
   endif;
   setRefCode(aRec, refCode);
}
``` refQualTrigger(self, fld, code | str refQual)

8/14/1991 11:02 trigger for setting the refQual for the reference and remittance sections of an addendum object.

```
{ size(str := getField(fld)) >= 2 cand refQual := subString(str, 0, 2);
  if identity(fld) = #refQual1
  then setRmtRefQual(aRec, refQual);  /* Remittance ivar */
  else setRefQual(aRec, refQual);     /* Reference ivar */
  endif;
}
``` removeSetupCheck(self | setup)

1/8/1992 16:14 If there is a setup with the same number as the active record, remove the triggers that got installed when the active record was selected.

```
{ if activeRec /* Had another addendum been active? */
      cand (setup := setup(parent)) /* Does the parent have a setup? */
      cand addenda(setup)[primSeqNum(aRec)] /* Is there a setup for this record? */
    then removeTriggersRepetitive(self);
    endif;
}
``` removeTriggersRepetitive(self)

1/8/1992 15:54 Here we must remove every trigger that enableTriggersRepetitive added.

```
{ removeTriggersByName(self, #setupFieldChanged);
}
``` resetBrowser(self)

12/9/1991 13:51 Creates a new CTX Addendum. Sets the focus to the first field in the form. 7/22: Added unconditional call to prepareNewAddendum, because the clear action needs it. ADC, 7/22/92.

```
{ not(hasFocus(self[#memo])) cand setFocus(self[#memo]);
  prepareNewAddendum(self);
  if activeRec
  then activeRec := false;
    disable(self[#delete]);
  endif;
}
``` resetSummary(self)

12/10/1991 11:19 Positions on the first addendum, if there is one.

```
{ removeSetupCheck(self);
  if getCount(self[#summary]) > 0
  then setCurSel(self[#summary], 0);
  else setCurSel(self[#summary], -1);
  endif;
}
``` setAllFields(self)

12/9/1991 10:38 Called in response to a change of the selected item in the summary combo box. Sets the fields with the values of the business object.

```
{ if refCode(aRec) /* Highlight last selected refCode */
  then findString(self[#refCode], refCode(aRec));
  else setCurSel(self[#refCode], -1);
  endif;
  setField(self[#information], information(aRec)); /* Note section */
  if dateQuall(aRec) /* Date time section. Highlight last selected dateQual
  if there is one */
  then findString(self[#dateQuall], dateQuall(aRec));
  else setCurSel(self[#dateQuall], -1);
  endif;
  setField(self[#date1], date1(aRec));
  setField(self[#time1], firstTime(aRec));
  if dateQual2(aRec)
  then findString(self[#dateQual2], dateQual2(aRec));
  else setCurSel(self[#dateQual2], -1);
  endif;
  setField(self[#date2], date2(aRec));
  setField(self[#time2], secondTime(aRec));
  if rmtRefQual(aRec) /* Highlight last selected rmtRefQual and adjCode if
  there are any. */
  then findString(self[#refQual1], rmtRefQual(aRec));
  else setCurSel(self[#refQual1], -1);
  endif;
  setField(self[#refNum1], rmtRefNum(aRec)); /* Remittance section */
  setField(self[#invoiceAmt], invoiceAmt(aRec));
  setField(self[#subjToDisc], subjToDiscAmt(aRec));
  setField(self[#adjustment], adjAmt(aRec));
  setField(self[#amtPaid], amtPaid(aRec));
  setField(self[#termsDiscAmt], termsDiscAmt(aRec));
  setField(self[#discAmtDue], discAmtDue(aRec));
  if adjCode(aRec)
  then findString(self[#adjCode], adjCode(aRec));
  else setCurSel(self[#adjCode], -1);
  endif;
  setField(self[#description1], rmtDescription(aRec));
  if refQual(aRec) /* Highlight last selected refQual if is one. */
  then findString(self[#refQual2], refQual(aRec));
  else setCurSel(self[#refQual2], -1);
  endif;
  setField(self[#refNum2], refNum(aRec)); /* Reference section */
  setField(self[#description2], description(aRec));
  dirtyOff(self);
}
``` setupFieldChanged(self, fld, code)

1/6/1992 14:03 The payment is repetitive, and there was a change to a setup field. Add the identity of the field to the set of changes.

```
{ add(setupChange, identity(fld));
}
``` showDataCheckerResults(self | ret)

3/16/1992 15:09 Show what the data checker has to show.

```
{ select
    case numMsgs(UPCServices[#errorMessages], LIS_DATA_ERROR) > 0 /* hard
errors */
    is messageBox(UPCServices[#errorMessages], self, instType(theFundsXfer)
+ loadString(15006) /* not accepted */ ,
        caption(class(self)), MB_OK);
    endCase
    case numMsgs(UPCServices[#errorMessages], LIS_DATA_WARNING) > 0 /*
warnings */
    is ret := messageBox(UPCServices[#errorMessages], /* operator can
override warnings */
        self, instType(theFundsXfer) + loadString(15007) /* warning */ ,
```

```
          caption(class(self)), MB_OKCANCEL);
      ret == IDOK cand addToActivityLog(UPCServices[#errorMessages],
LIS_DATA_WARNING);
       endCase
       default /* Only other possibility is database errors. */
         messageBox(UPCServices[#errorMessages], self, instType(theFundsXfer)
  + loadString(15006) /* not accepted */ ,
         caption(class(self)), MB_OK);
    endSelect;
    clear(UPCServices[#errorMessages]); .
    ^ret == IDOK;
}
``` start(self, aFundsXfer)
8/19/1991 15:24

```
{ theFundsXfer := aFundsXfer;
  start(self:ancestor, theFundsXfer);
  showOldCurs();
}
``` summarySelect(self)
12/9/1991 15:54 Enables the delete button.

```
{ enable(self[#delete]);
  enable(self[#accept]);
}
``` summaryTrigger(self, fld, code | setup)
This is the trigger method for the change event. Retrieve the record from
the collection held by the funds transfer object.

```
{
  if numberSelected(fld) = 1
    showWaitCurs();
    removeSetupCheck(self);
    activeRec := getSelIdx(fld);
    aRec := addenda(theFundsXfer)[keyFromSummaryIndex(self, activeRec)];
    setAllFields(self);
    if (setup := setup(parent)) /* Does parent have a setup? */
      cand addenda(setup)[primSeqNum(aRec)] /* Does it have addenda? */
      enableTriggersRepetitive(self);
      setupChange := new(Set, size(fieldColl));
    else setupChange := nil;
    endif;
    summarySelect(self); /* Enables the delete button */
    showOldCurs();
  else removeSetupCheck(self);
    activeRec:=false;
    clearFields(self);
    resetBrowser(self);
  endif;
}
``` titles(self)
Returns the column titles that appear above the summary combo box.

```
{
  ^#(0->15009 /* Seq */, 5->15010 /* Ref Qualifier and Number */,
    42->15011 /* Invoice Amount */, 62->15012 /* Amount Paid */);
}
```

MorePage

Source file: MOREPAGE.CLS

Inherits from: Object WindowsObject Window AppWindow Form UPCForm

Inherited by: ViewMorePage

This is the more details window of the Transaction Browser.

Instance variables:

| | |
|---|---|
| hWnd | (From class WindowsObject) |
| defProc | (From class WindowsObject) |
| parent | (From class WindowsObject) |
| cRect | (From class WindowsObject) |
| contID | (From class WindowsObject) |
| wStyle | (From class WindowsObject) |
| paintStruct | (From class Window) |
| hMenu | (From class Window) |
| menu | (From class Window) |
| buttonDn | (From class Window) |
| locRect | (From class Window) |
| caption | (From class Window) |
| cursor | (From class Window) |
| picture | (From class Window) |
| port | (From class Window) |
| space | (From class Window) |
| fieldColl | (From class Form) |
| gettingFocus | (From class Form) |
| theFocus | (From class Form) |
| idDict | (From class Form) |
| handleDict | (From class Form) |
| currGroup | (From class Form) |
| errorField | (From class Form) |
| execModal | (From class Form) |
| dirty | (From class Form) |
| retVal | (From class Form) |
| dispatchTrigger | (From class Form) |
| statusText | (From class Form) |
| fieldWithFocus | (From class Form) |
| aRec | (From class UPCForm) |
| fldValDict | (From class UPCForm) |
| hBrush | (From class UPCForm) |
| errorLog | (From class UPCForm) |
| helpFields | Help indices dictionary |

Class variables:

$OtherPartyRetrieval
$OtherBankRetrieval
$OtherPartyFldVal
$StdFldVal
$OtherBankFldVal $InterBankRetrieval
$InterBankFldVal
$FieldRetrieval Class methods:

caption(self)
> Return the default caption for the window.
>
> ```
> { ^loadString(15035) /* Additional Transaction Details */ ;
> }
> ``` helpFields(self)
> 5/1/1992 15:49
>
> ```
> {^%IdentityDictionary(
>   #bene->2206
>   #bankName->2208
>   #interBankName->2209
>   #bankCodeTypes->2211
>   #bankCode->2211
>   #interBankCodeTypes->2211
>   #interBankCode->2211
>   #beneCodeTypes->2217
>   #beneCode->2217
>   #memo->2219
>   #instrToFNBC->2258
>   #fedTransfer->2259
>   #chips->2260
>   #priorityTransfer->2261
>   #deductBene->2262
>   #condPayment->2263
>   #deductCorrespond->2264
>   #specialInstruc->2265
>   #help->2257
>   ); }
> ``` helpIndex(self)
> 4/10/1992 13:53
>
> ```
> {
>  ^2257;
> }
> ```

Object methods:

changeChips(self, fld, code)
> 2/20/1992 15:49 When switching to 'Y', toggles off fedTransfer.
>
> ```
> { if getField(fld) cand fld = self[#chips] cand
> getField(self[#fedTransfer])
>   then clearField(self[#fedTransfer]);
>     changeFedTransfer(self, fld, code);
>   endif;
>   setMustBeChips?(aRec, getField(self[#chips]));
> }
> ``` changeFedTransfer(self, fld, code)
> 2/20/1992 15:49 When going on, toggles off chips.
>
> ```
> { if getField(fld) cand fld = self[#fedTransfer] cand
> getField(self[#chips])
>   then clearField(self[#chips]);
>     changeChips(self, fld, code);
> ```

```
        endif;
        setMustBeFedwire?(aRec, getField(self[#fedTransfer]));
}
``` changeInterBankCodeType(self, fld, code | aBank partyId)

2/3/1992 12:09 Change made to the combo box containing the set of codes.
Find the proper id.

```
{ if code = CBN_SELCHANGE /* change made to the code field */
    cand aRec /* need the busines object */
    cand (aBank := intermediary(aRec))
  then dispatchOff(self);
    if partyId := perform(aBank, getMethod(FundsXfer:late,
trimBlanks(getField(fld))))
      then setText(self[#interBankCode], partyId);
      else setText(self[#interBankCode], NULLSTR);
      endif;
      dispatchOn(self);
  endif;
  isEnabled?(self[#interBankName]) cand enable(self[#interBankCode]);
}
``` changeInterBankInfo(self, fld, code | aBank)

7/24/1991 12:01 trigger for changing the intermediary bank fields when
there is a match. clear all the fields of this section and reset the the bank
object.

```
{ if not(hasPartyId(aBank := intermediary(aRec)))
    then setIntermediary(aRec, aBank) /* this sets the dirty flag */
    else setIntermediary(aRec, newPhantom(Bank)); /* create a phantom party
*/
      dispatchOff(self);
      clearFieldsCarefully(self,
      extract(#(interBankCity interBankState interBankCountry interBankCode
interBankCodeTypes),
        { using(id) id -= identity(fld) /* it's not the field being changed */
          cand (id == #interBankCodeTypes cand identity(fld)
          -= #interBankCode cor id -= #interBankCodeTypes);
        }));
      identity(fld) -= #interBankName cand setText(self[#interBankName],
NULLSTR);
      dispatchOn(self);
  endif;
}
``` changeOtherBankCodeType(self, fld, code | aBank partyId)

2/3/1992 12:09 Change made to the combo box containing the set of codes.
Find the proper id.

```
{ if code = CBN_SELCHANGE /* change made to the code field */
    cand aRec /* need the busines object */
    cand (aBank := otherPartyBank(aRec))
  then dispatchOff(self);
    if partyId := perform(aBank, getMethod(FundsXfer:late,
trimBlanks(getField(fld))))
      then setText(self[#bankCode], partyId);
      else setText(self[#bankCode], NULLSTR);
      endif;
      dispatchOn(self);
  endif;
  isEnabled?(self[#bankName]) cand enable(self[#bankCode]);
}
``` changeOtherBankInfo(self, fld, code | aBank)

Trigger for changing the other party bank fields when there is a match.
Clear all the fields of this section except for the field currently being
changed and reset the bank object.

```
{ if not(hasPartyId(aBank := otherPartyBank(aRec)))
    then setOtherPartyBank(aRec, aBank) /* this sets the dirty flag */
    else setOtherPartyBank(aRec, newPhantom(Bank));  /* create a phantom
party */
        dispatchOff(self);
        clearFieldsCarefully(self,
        extract(#(bankCity bankState bankCountry bankCode bankCodeTypes),
         { using(id) id -= identity(fld) /* it's not the field being changed */
            cand (id == #bankCodeTypes cand identity(fld) -= #bankCode cor id -=
#bankCodeTypes);
         }));
        identity(fld) -= #bankName cand setText(self[#bankName], NULLSTR);
        dispatchOn(self);
    endif;
}
``` changeOtherPartyCodeType(self, fld, code | aParty partyId)

2/3/1992 12:09 Change made to the combo box containing the set of codes.
Find the proper id.

```
{ if code = CBN_SELCHANGE /* change made to the code field */
    cand aRec /* need the busines object */
    cand (aParty := otherParty(aRec))
    then dispatchOff(self);
    if partyId := perform(aParty, getMethod(FundsXfer:late,
trimBlanks(getField(fld))))
        then setText(self[#beneCode], partyId);
        else setText(self[#beneCode], NULLSTR);
    endif;
    dispatchOn(self);
    endif;
    isEnabled?(self[#bene]) cand enable(self[#beneCode]);
}
``` changeOtherPartyInfo(self, fld, code | aParty)

Trigger for changing the other party fields when there is a match. Clear all
the fields of this section except for the field currently being changed and
reset the bank object.

```
{ if not(hasPartyId(aParty := otherParty(aRec)))
    then setOtherParty(aRec, aParty) /* sets the dirty flag */
    else setOtherParty(aRec, newPhantom(Party));  /* create a phantom party
*/
        dispatchOff(self);
        clearFieldsCarefully(self,
        extract(#(beneCity beneState beneCountry beneCode beneCodeTypes),
         { using(id) id -= identity(fld) /* it's not the field being changed */
            cand (id == #beneCodeTypes cand identity(fld) -= #beneCode cor id -=
#beneCodeTypes);
         }));
        identity(fld) -= #bene cand setText(self[#bene], NULLSTR);
        dispatchOn(self);
    endif;
}
``` clearAction(self, fld, code | enabledFields)

2/26/1992 15:06 Clears fields that are not disabled.

```
{ enabledFields := extract(
  #(memo instrToFNBC fedTransfer chips condPayment priorityTransfer
deductBene
    deductCorrespond bene beneCodeTypes beneAddress beneCity beneState
beneCountry beneCode
    finanInst bankName bankCodeTypes bankAddress bankCity bankState
bankCountry specialInstruc
    bankCode interBankName interBankCodeTypes interBankCity interBankState
interBankCountry
    interBankCode)
```

```
  { using(id) isEnabled?(self[id]) cand not(viewOnly(self[id]))
  });
  clearFieldsCarefully(self, enabledFields);
  enabledFields := asSet(enabledFields);

if #bene cand not(viewOnly(self[#bene]))
  then setOtherParty(aRec, newPhantom(Party:late));
  endif;
  if #bankName cand not(viewOnly(self[#bankName]))
  then setOtherPartyBank(aRec, newPhantom(Bank:late));
  endif;
  if #interBankName cand not(viewOnly(self[#interBankName]))
  then setIntermediary(aRec, newPhantom(Bank:late));
  endif;

assocsDo($StdFldVal,
  { using(pair)
    if key(pair) in enabledFields
    then perform(aRec, getField(self[key(pair)]), value(pair));
    endif;
  });
}
``` clearFieldsCarefully(self, ids | staticCBs)

Enable and clear the self fields in the collection of ids. Be careful about how to clear them, so as not to remove codes from the combo box fields.

```
{ staticCBs := %Set(beneCodeTypes bankCodeTypes interBankCodeTypes);
  do(ids,
  { using(id)
    select
      case id in staticCBs cand isEnabled?(self[id])
      is setCurSel(self[id], 0);
      endCase
      case id in staticCBs
      is setCurSel(self[id], -1);
      endCase
      default clearField(self[id]);
    endSelect;
  });
}
``` createFields(self | lbl, fld)

This method is generated automatically

```
{
  shrinkWrap(self, rect(2, 20, 642, 478));
  fld:=newField(self, EditField, 265, %BitOr(WS_CHILD, WS_VISIBLE,
WS_BORDER, WS_TABSTOP, ES_AUTOHSCROLL, ES_LEFT, 0x200L), rect(62,2,630,26),
nil, #memo);
  setRightLabel(fld, rect(14,6,58,24), 11400 /* Memo */);
  fld:=newField(self, EditField, 120, %BitOr(WS_CHILD, WS_VISIBLE,
WS_BORDER, WS_TABSTOP, ES_AUTOHSCROLL), rect(158,28,452,52), nil,
#instrToFNBC);
  setRightLabel(fld, rect(18,30,154,48), 11401 /* Instructions to FNBC */);
  fld:=newField(self, GroupField, 100, %BitOr(WS_CHILD, WS_VISIBLE,
BS_GROUPBOX), rect(28,52,272,160), 11402 /* Settlement Type */,
#settlementType);
  fld:=newField(self, CheckBoxField, 221, %BitOr(WS_CHILD, WS_VISIBLE,
WS_TABSTOP, BS_AUTOCHECKBOX), rect(44,80,128,104), 11403 /* FEDWIRE */,
#fedTransfer);
  fld:=newField(self, CheckBoxField, 266, %BitOr(WS_CHILD, WS_VISIBLE,
WS_TABSTOP, BS_AUTOCHECKBOX), rect(44,110,104,134), 11404 /* CHIPS */,
#chips);
  fld:=newField(self, GroupField, 101, %BitOr(WS_CHILD, WS_VISIBLE,
BS_GROUPBOX), rect(322,52,586,160), 11405 /* Terms */, #terms);
  fld:=newField(self, CheckBoxField, 219, %BitOr(WS_CHILD, WS_VISIBLE,
WS_TABSTOP, BS_AUTOCHECKBOX), rect(338,70,470,94), 11406 /* Priority
Transfer */, #priorityTransfer);
  fld:=newField(self, CheckBoxField, 220, %BitOr(WS_CHILD, WS_VISIBLE,
WS_TABSTOP, BS_AUTOCHECKBOX), rect(338,90,574,114), 11407 /* Deduct Charges
from Beneficiary */, #deductBene);
  fld:=newField(self, CheckBoxField, 223, %BitOr(WS_CHILD, WS_VISIBLE,
```

```
WS_TABSTOP, BS_AUTOCHECKBOX), rect(338,110,496,134), 11408 /* Conditional
Payment */, #condPayment);
    fld:=newField(self, CheckBoxField, 222, %BitOr(WS_CHILD, WS_VISIBLE,
WS_TABSTOP, BS_AUTOCHECKBOX), rect(338,130,562,154), 11409 /* Deduct
Correspondent Charges */, #deductCorrespond);
    fld:=newField(self, EditField, 262, %BitOr(WS_CHILD, WS_VISIBLE,
WS_BORDER, WS_TABSTOP, ES_AUTOHSCROLL), rect(96,166,424,190), nil, #bene);
      setRightLabel(fld, rect(12,170,92,188), 11410 /* Beneficiary */);
    fld:=newField(self, CBoxField, 275, %BitOr(WS_CHILD, WS_VISIBLE,
WS_VSCROLL, WS_TABSTOP, CBS_DROPDOWNLIST), rect(534,166,634,262), nil,
#beneCodeTypes);
      setRightLabel(fld, rect(466,170,526,188), 11411 /* ID Code */);
    fld:=newField(self, EditField, 225, %BitOr(WS_CHILD, WS_VISIBLE,
WS_BORDER, WS_TABSTOP, ES_MULTILINE, ES_LEFT, 0x200L),
rect(96,190,402,238), nil, #beneAddress);
      setRightLabel(fld, rect(34,198,92,216), 11412 /* Address */);
    fld:=newField(self, EditField, 276, %BitOr(WS_CHILD, WS_VISIBLE,
WS_BORDER, WS_TABSTOP, ES_AUTOHSCROLL, ES_LEFT, 0x200L),
rect(502,190,634,214), nil, #beneCode);
    fld:=newField(self, CheckBoxField, 224, %BitOr(WS_CHILD, WS_VISIBLE,
WS_TABSTOP, BS_AUTOCHECKBOX), rect(482,214,632,238), 11413 /* Financial
Institution */, #finanInst);
    fld:=newField(self, EditField, 155, %BitOr(WS_CHILD, WS_VISIBLE,
WS_BORDER, WS_TABSTOP, ES_AUTOHSCROLL), rect(96,238,250,262), nil,
#beneCity);
      setRightLabel(fld, rect(64,240,90,258), 11414 /* City */);
    fld:=newField(self, EditField, 156, %BitOr(WS_CHILD, WS_VISIBLE,
WS_BORDER, WS_TABSTOP, ES_AUTOHSCROLL, ES_UPPERCASE),
rect(288,238,324,262), nil, #beneState);
      setRightLabel(fld, rect(250,240,286,256), 11415 /* State */);
    fld:=newField(self, EditField, 157, %BitOr(WS_CHILD, WS_VISIBLE,
WS_BORDER, WS_TABSTOP, ES_AUTOHSCROLL, ES_UPPERCASE),
rect(378,238,414,262), nil, #beneCountry);
      setRightLabel(fld, rect(324,240,376,258), 11416 /* Country */);
    fld:=newField(self, EditField, 263, %BitOr(WS_CHILD, WS_VISIBLE,
WS_BORDER, WS_TABSTOP, ES_AUTOHSCROLL), rect(96,268,424,292), nil,
#bankName);
      setLabel(fld, rect(10,266,94,298), 11417 /* Account-With Bk */);
    fld:=newField(self, CBoxField, 272, %BitOr(WS_CHILD, WS_VISIBLE,
WS_VSCROLL, WS_TABSTOP, CBS_DROPDOWNLIST), rect(534,268,634,364), nil,
#bankCodeTypes);
      setRightLabel(fld, rect(438,270,526,288), 11418 /* Routing Code */);
    fld:=newField(self, EditField, 242, %BitOr(WS_CHILD, WS_VISIBLE,
WS_BORDER, WS_TABSTOP, ES_MULTILINE, ES_LEFT, 0x200L),
rect(96,292,402,340), nil, #bankAddress);
      setRightLabel(fld, rect(36,300,94,318), 11419 /* Address */);
    fld:=newField(self, EditField, 273, %BitOr(WS_CHILD, WS_VISIBLE,
WS_BORDER, WS_TABSTOP, ES_AUTOHSCROLL, ES_LEFT, 0x200L),
rect(502,292,634,316), nil, #bankCode);
    fld:=newField(self, EditField, 231, %BitOr(WS_CHILD, WS_VISIBLE,
WS_BORDER, WS_TABSTOP, ES_AUTOHSCROLL), rect(96,340,250,364), nil,
#bankCity);
      setRightLabel(fld, rect(68,342,94,360), 11420 /* City */);
    fld:=newField(self, EditField, 233, %BitOr(WS_CHILD, WS_VISIBLE,
WS_BORDER, WS_TABSTOP, ES_AUTOHSCROLL, ES_UPPERCASE),
rect(288,340,324,364), nil, #bankState);
      setRightLabel(fld, rect(250,342,286,358), 11421 /* State */);
    fld:=newField(self, EditField, 235, %BitOr(WS_CHILD, WS_VISIBLE,
WS_BORDER, WS_TABSTOP, ES_AUTOHSCROLL, ES_UPPERCASE),
rect(378,340,414,364), nil, #bankCountry);
      setRightLabel(fld, rect(324,342,376,360), 11422 /* Country */);
    fld:=newField(self, EditField, 237, %BitOr(WS_CHILD, WS_VISIBLE,
WS_BORDER, WS_TABSTOP, ES_AUTOHSCROLL), rect(420,340,634,364), nil,
#specialInstruc);
      setRightLabel(fld, rect(414,320,542,338), 11423 /* Special Instructions
*/);
    fld:=newField(self, EditField, 264, %BitOr(WS_CHILD, WS_VISIBLE,
WS_BORDER, WS_TABSTOP, ES_AUTOHSCROLL), rect(96,374,424,398), nil,
#interBankName);
      setRightLabel(fld, rect(10,376,94,394), 11424 /* Intermediary */);
    fld:=newField(self, CBoxField, 278, %BitOr(WS_CHILD, WS_VISIBLE,
WS_VSCROLL, WS_TABSTOP, CBS_DROPDOWNLIST), rect(534,374,634,446), nil,
#interBankCodeTypes);
      setRightLabel(fld, rect(438,376,526,394), 11425 /* Routing Code */);
    fld:=newField(self, EditField, 248, %BitOr(WS_CHILD, WS_VISIBLE,
WS_BORDER, WS_TABSTOP, ES_AUTOHSCROLL), rect(96,398,250,422), nil,
#interBankCity);
```

```
    setRightLabel(fld, rect(68,400,94,418), 11426 /* City */);
    fld:=newField(self, EditField, 250, %BitOr(WS_CHILD, WS_VISIBLE,
WS_BORDER, WS_TABSTOP, ES_AUTOHSCROLL, ES_UPPERCASE),
rect(288,398,324,422), nil, #interBankState);
    setRightLabel(fld, rect(250,400,286,416), 11427 /* State */);
    fld:=newField(self, EditField, 252, %BitOr(WS_CHILD, WS_VISIBLE,
WS_BORDER, WS_TABSTOP, ES_AUTOHSCROLL, ES_UPPERCASE),
rect(378,398,414,422), nil, #interBankCountry);
    setRightLabel(fld, rect(324,400,376,418), 11428 /* Country */);
    fld:=newField(self, EditField, 279, %BitOr(WS_CHILD, WS_VISIBLE,
WS_BORDER, WS_TABSTOP, ES_AUTOHSCROLL, ES_LEFT, 0x200L),
rect(502,398,634,422), nil, #interBankCode);
    fld:=newField(self, ButtonField, 1, %BitOr(WS_CHILD, WS_VISIBLE,
WS_TABSTOP, BS_DEFPUSHBUTTON), rect(208,428,288,452), 11429 /* &OK */,
#ok);
    fld:=newField(self, ButtonField, 268, %BitOr(BS_PUSHBUTTON, WS_CHILD,
WS_VISIBLE, WS_TABSTOP), rect(342,428,422,452), 11430 /* &Clear */,
#clear);
    fld:=newField(self, ButtonField, 799, %BitOr(BS_PUSHBUTTON, WS_CHILD,
WS_VISIBLE, WS_TABSTOP), rect(544,428,624,452), 11431 /* &Help */, #help);
}
``` enableTriggersHostRepetitive(self | hostSetup)
2/27/1992 13:35 A host setup exists. 8/12/92 ADC: Simplified setting
triggers on parties

```
{ hostSetup := hostSetup(parent);
  if isAncestor(class(hostSetup), BranchPmt)
  then
     addChangeTrigger(self[#instrToFNBC],self,#hostSetupFieldChanged);
     addChangeTrigger(self[#condPayment],self,#hostSetupFieldChanged);
     addChangeTrigger(self[#deductBene],self, #hostSetupFieldChanged);
     addChangeTrigger(self[#deductCorrespond], self,#hostSetupFieldChanged);
     addChangeTrigger(self[#specialInstruc], self,#hostSetupFieldChanged);
  endif;
  addChangeTrigger(self[#fedTransfer], self, #hostSetupFieldChanged);
  addChangeTrigger(self[#chips], self, #hostSetupFieldChanged);

keysDo($OtherPartyRetrieval,
  { using(key) addChangeTrigger(self[key], self, #hostSetupFieldChanged);
  });
  addChangeTrigger(self[#finanInst], self, #hostSetupFieldChanged);
  addChangeTrigger(self[#beneCode], self, #hostSetupFieldChanged);
  keysDo($OtherBankRetrieval,
  { using(key)addChangeTrigger(self[key], self, #hostSetupFieldChanged);
  });
  addChangeTrigger(self[#bankCode], self, #hostSetupFieldChanged);
  keysDo($InterBankRetrieval,
  { using(key) addChangeTrigger(self[key], self, #hostSetupFieldChanged);
  });
  addChangeTrigger(self[#interBankCode], self, #hostSetupFieldChanged);
}
``` enableTriggersRepetitive(self | setup)
Enables triggers for a repetitive. 8/10/92 ADC: Tests case where there is
only a code to represent a party. 8/12/92 ADC: Routing code only case
demands the setting of triggers on every field associated with the party.
8/12/92 ADC: Simplified the setting of triggers on parties.

```
{ setup := setup(parent);
  if isAncestor(class(setup), BranchPmt)
  then
     addChangeTrigger(self[#instrToFNBC], self, #setupFieldChanged);
     addChangeTrigger(self[#condPayment], self, #setupFieldChanged);
     addChangeTrigger(self[#deductBene], self, #setupFieldChanged);
     addChangeTrigger(self[#deductCorrespond], self, #setupFieldChanged);
     addChangeTrigger(self[#specialInstruc], self, #setupFieldChanged);
  endif;
  addChangeTrigger(self[#fedTransfer], self, #setupFieldChanged);
  addChangeTrigger(self[#chips], self, #setupFieldChanged);
```

```
        keysDo($OtherPartyRetrieval,
        { using(key) addChangeTrigger(self[key], self, #setupFieldChanged);
        });
        addChangeTrigger(self[#finanInst], self, #setupFieldChanged);
        addChangeTrigger(self[#beneCode], self, #setupFieldChanged);
        keysDo($OtherBankRetrieval,
        { using(key) addChangeTrigger(self[key], self, #setupFieldChanged);
        });
        addChangeTrigger(self[#bankCode], self, #setupFieldChanged);
        keysDo($InterBankRetrieval,
        { using(key) addChangeTrigger(self[key], self, #setupFieldChanged);
        });
        addChangeTrigger(self[#interBankCode], self, #setupFieldChanged);
    }
``` enableTyped(self | protectionCodes instType codeDict protectFlag)
Enable selected fields.

```
    { setCurrObj(UPCServices[#dataChecker], aRec);
      instType := instType(aRec);
      protectionCodes := required(UPCServices[#dataChecker]);

assocsDo($FieldRetrieval,
      { using(pair) codeDict := protectionCodes[value(pair)];
        if codeDict[instType] = 'P'
        then disable(self[key(pair)]);
        else enable(self[key(pair)]);
        endif;
      });
      if code(custBranch(aRec))=NY then
        enable(self[#condPayment])
      else disable(self[#condPayment])
      endif;
      codeDict := protectionCodes[#otherParty];
      protectFlag := hasPartyId(otherParty(aRec));
      enableTypedParty(self, $OtherPartyRetrieval, protectFlag cor
    codeDict[instType] = 'P',true,"otherParty");
      if protectFlag cor codeDict[instType] = 'P'
      then disable(self[#finanInst]);
      else enable(self[#finanInst]);
      endif;
      enableTypedRoutingCodes(self, protectFlag, codeDict[instType],
    #beneCodeTypes, #beneCode);
      codeDict := protectionCodes[#otherPartyBank];
      protectFlag := hasPartyId(otherPartyBank(aRec));
      enableTypedParty(self, $OtherBankRetrieval, protectFlag cor
    codeDict[instType] = 'P',true, "otherPartyBank");
      enableTypedRoutingCodes(self, protectFlag, codeDict[instType],
    #bankCodeTypes, #bankCode);
      codeDict := protectionCodes[#intermediary];
      protectFlag := hasPartyId(intermediary(aRec));
      enableTypedParty(self, $InterBankRetrieval,
        protectFlag cor codeDict[instType] = 'P',codeDict[instType] <>
    'P',"intermediary");
      enableTypedRoutingCodes(self, protectFlag, codeDict[instType],
    #interBankCodeTypes,
        #interBankCode);
    }
``` enableTypedParty(self, aDict, protect, viewOnly, partyType)
3/17/1992 15:24 Disables or enables a set of fields.

```
    { assocsDo(aDict,
      { using(anAssoc)
        select
          case protect cand viewOnly
          is setViewOnly(self[key(anAssoc)], true);;
          endCase
          case protect cand not(viewOnly) cor
            partyRules(UPCServices[#dataChecker])
              [asString(value(anAssoc))][partyType]
              [instTypeNum(UPCServices[#dataChecker],instType(aRec))]='P'
          is disable(self[key(anAssoc)]);;
```

```
            endCase
            default enable(self[key(anAssoc)]);
         endSelect;
      });
}
``` enableTypedRoutingCodes(self, protectFlag, protectCode, codeTypes, code)
    Enable fields pertaining to the routing codes. This is a little different here than on the first form, because when the party has an id, there should be no changes to it on the more page form.

```
{ select
     case protectCode = 'P'
     is disableFields(self, tuple(codeTypes, code));
     endCase
     case protectFlag cand getCount(self[codeTypes]) > 0
     is enable(self[codeTypes]);
        setViewOnly(self[code],true);
     endCase
     case getCount(self[codeTypes]) > 0
     is enable(self[codeTypes]);
        if getSelIdx(self[codeTypes])
        then enable(self[code]);
        else setViewOnly(self[code],true);
        endif;
     endCase
     default enable(self[codeTypes]);
              setViewOnly(self[code],true);
  endSelect;
}
``` enterInterBankCode(self, fld, code | codeString, limits, getMethod)
    Entry trigger for the intermediary routing code field.

```
{ codeString := getSelString(self[#interBankCodeTypes]);
  getMethod := getMethod(FundsXfer:late, codeString);
  limits := maximumLengths(UPCServices[#dataChecker], intermediary(aRec),
loadString(15042) /* intermediary */ ,
  instType(aRec), 0);
  setLimit(self[#interBankCode], limits[getMethod]);
}
``` enterOtherBankCode(self, fld, code | codeString, limits, getMethod)
    Entry trigger for the other bank routing code field.

```
{ codeString := getSelString(self[#bankCodeTypes]);
  getMethod := getMethod(FundsXfer:late, codeString);
  limits := maximumLengths(UPCServices[#dataChecker], otherPartyBank(aRec),
loadString(15043) /* otherPartyBank */ ,
  instType(aRec), 0);
  setLimit(self[#bankCode], limits[getMethod]);
}
``` enterOtherPartyCode(self, fld, code | codeString, limits, getMethod)
    Entry trigger for a routing code field.

```
{ codeString := getSelString(self[#beneCodeTypes]);
  getMethod := getMethod(FundsXfer:late, codeString);
  limits := maximumLengths(UPCServices[#dataChecker], otherPartyBank(aRec),
loadString(15044) /* otherParty */ ,
  instType(aRec), 0);
  setLimit(self[#beneCode], limits[getMethod]);
}
``` exitInterBankCode(self, fld, code | codeString, codeType, anId, aBank, otherParty, setSyms,setMethod)

Exit trigger for intermediary aba and swift fields. Searches for the specified field in the database, if found fills fields with information, otherwise, assume a free-form entry.

```
{ if size(anId := trimBlanks(getText(fld))) = 0 /* Null string */
    cor ((otherParty := intermediary(aRec)) /* it exists */
    cand hasPartyId(otherParty))
  then ^self;
  else setSyms := %IdentityDictionary(#ABA->setIntermediaryByAba, #SWIFT-
>setIntermediaryBySwift,
                        #ClearingCode->setIntermediaryByLocalClearCode,
                        #CHIPSUID->setIntermediaryByChipsUid);
    if (codeString := getSelString(self[#interBankCodeTypes])) /* selection
made */
        cand (codeType := asSymbol(extract(codeString,
          { using(char) char <> ' ';
          }))) cand (setMethod := setSyms[codeType])
        then perform(aRec, anId, setMethod);
        endif;
    endif;
    if hasPartyId(aBank := intermediary(aRec))
    then fillInterBankFields(self, aBank);
    else setSyms :=
        %IdentityDictionary(#ABA->setAbaNum, #CHIPSUID->setChipsUid,
          #ClearingCode->setLocalClrCode, #SWIFT->setSwiftId)
        ;
        if setMethod := setSyms[codeType]
        then perform(aBank, anId, setSyms[codeType]);
        endif;
    endif;
}
``` exitInterBankInfo(self, fld, code | aName aBank)

Exit trigger for intermediary bank fields.

```
{ if not(hasPartyId(aBank := intermediary(aRec)))
  then aName := trimBlanks(getText(fld));
    perform(aBank, aName, $InterBankFldVal[identity(fld)]);
  endif;
}
``` exitOtherBankCode(self, fld, code | codeString, codeType, anId, aBank, otherParty, setSyms,setMethod)

Exit trigger for other bank aba and swift fields. Searches for the specified field in the database, if found fills fields with information, otherwise, assume a free-form entry.

```
{ if size(anId := trimBlanks(getText(fld))) = 0 /* Null string */
    cor ((otherParty := otherPartyBank(aRec)) /* it exists */
        cand hasPartyId(otherParty))
  then
  ^self;
  else setSyms :=
      %IdentityDictionary(#ABA->setOtherPartyBankByAba, #SWIFT-
>setOtherPartyBankBySwift,
                        #ClearingCode->setOtherPartyBankByLocalClearCode,
                        #CHIPSUID->setOtherPartyBankByChipsUid);
    if (codeString := getSelString(self[#bankCodeTypes])) /* selection made
*/
        cand (codeType := asSymbol(extract(codeString,
          { using(char) char <> ' ';
          }))) cand (setMethod := setSyms[codeType])
        then perform(aRec, anId, setMethod);
        endif;
    endif;
    if hasPartyId(aBank := otherPartyBank(aRec))
    then
    fillOtherBankFields(self, aBank);
```

```
    else setSyms :=
      %IdentityDictionary(#ABA->setAbaNum, #CHIPSUID->setChipsUid,
        #ClearingCode->setLocalClrCode, #SWIFT->setSwiftId)
      ;
      if setMethod := setSyms[codeType]
      then perform(aBank, anId, setSyms[codeType]);
      endif;
    endif;
}
``` exitOtherBankInfo(self, fld, code | aName aBank)
Exit trigger for other bank fields.

```
{ if not(hasPartyId(aBank := otherPartyBank(aRec)))
  then aName := trimBlanks(getText(fld));
    perform(aBank, aName, $OtherBankFldVal[identity(fld)]);
  endif;
}
``` exitOtherPartyCode(self, fld, code | codeString, codeType, anId, aParty, otherParty,setSyms, setMethod)
Exit trigger for other party aba and swift fields. Searches for the specified field in the database, if found fills fields with information, otherwise, assume a free-form entry.

```
{ if size(anId := trimBlanks(getText(fld))) = 0 /* Null string */
    cor ((otherParty := otherParty(aRec)) /* it exists */
    cand hasPartyId(otherParty))
  then ^self;
  else setSyms := %IdentityDictionary(#ABA->#setOtherPartyByAba, #SWIFT-
>#setOtherPartyBySwift,
                                     #ClearingCode-
>setOtherPartyByLocalClearCode,
                                     #CHIPSUID-
>setOtherPartyByChipsUid);
      if (codeString := getSelString(self[#beneCodeTypes])) /* selection made
*/
        cand (codeType := asSymbol(extract(codeString,
          { using(char) char <> ' ';
          }))) cand (setMethod := setSyms[codeType])
        then perform(aRec, anId, setMethod);
      endif;
  endif;
  if hasPartyId(aParty := otherParty(aRec))
  then fillOtherPartyFields(self, aParty);
  else setSyms :=
    %IdentityDictionary(#ABA->setAbaNum, #CHIPSUID->setChipsUid,
      #ClearingCode->setLocalClrCode, #SWIFT->setSwiftId)
    ;
    if setMethod := setSyms[codeType]
    then perform(aParty, anId, setSyms[codeType]);
    endif;
  endif;
}
``` exitOtherPartyInfo(self, fld, code | aName aParty)
Exit trigger for other party fields.

```
{ if not(hasPartyId(aParty := otherParty(aRec)))
  then aName := trimBlanks(getText(fld));
    perform(aParty, aName, $OtherPartyFldVal[identity(fld)]);
  endif;
}
``` fillInterBankFields(self, aParty | types typeTuple)
7/30/1991 11:42 fill the intermediary bank fields

```
{ dispatchOff(self);
```

```
    types := determineCodeTypes(aRec, loadString(15050) /* intermediaryBank
*/ );
  do(types,
  { using(type) insertString(self[#interBankCodeTypes], type, -1);
  });
  assocsDo($InterBankRetrieval,
  { using(pair) setText(self[key(pair)], perform(aParty, value(pair)) cor
NULLSTR);
  });
  if size(types) = 0
  then disable(self[#interBankCodeTypes]);
       disable(self[#interBankCode]);
  else
     typeTuple := determinePreferredCode(aParty, types);
     select
        case typeTuple cand size(getField(self[#interBankCode])) <> 0
        is selectString(self[#interBankCodeTypes],
getField(self[#interBankCodeTypes]));
           setField(self[#interBankCode], getField(self[#interBankCode]));
        endCase
        case typeTuple cand size(getField(parent[#interBankCode])) <> 0
        is selectString(self[#interBankCodeTypes],
getField(parent[#interBankCodeTypes]));
           setField(self[#interBankCode], getField(parent[#interBankCode]));
        endCase
        case typeTuple cand size(getField(self[#interBankCode])) = 0  /* no
codes set, set highest priority */
        is selectString(self[#interBankCodeTypes], typeTuple[0]);
           setField(self[#interBankCode], typeTuple[1]);
        endCase
        case not(typeTuple)
        is setCurSel(self[#interBankCodeTypes], 0);  /* none available, clear
fields */
           clearField(self[#interBankCode]);
        endCase
     endSelect;
     isEnabled?(self[#interBankCode]) cand enable(self[#interBankCode]);
  endif;
  dispatchOn(self);
}
``` fillOtherBankFields(self, aParty | types typeTuple)
7/30/1991 11:42 fill the bank fields

```
{ dispatchOff(self);
  types := determineCodeTypes(aRec, loadString(15049) /* bank */ );
  do(types,
  { using(type) insertString(self[#bankCodeTypes], type, -1);
  });
  assocsDo($OtherBankRetrieval,
  { using(pair) setText(self[key(pair)], perform(aParty, value(pair)) cor
NULLSTR);
  });
  if size(types) = 0
  then disable(self[#bankCodeTypes]);
       disable(self[#bankCode]);
  else
     typeTuple := determinePreferredCode(aParty, types);
       select
         /* added following case 8/10/92 AWH */
         case typeTuple cand size(getField(self[#bankCode])) <> 0
         is selectString(self[#bankCodeTypes],
getField(self[#bankCodeTypes]));
            setField(self[#bankCode], getField(self[#bankCode]));

endCase
         case typeTuple cand size(getField(parent[#bankCode])) <> 0
         is selectString(self[#bankCodeTypes],
getField(parent[#bankCodeTypes]));
            setField(self[#bankCode], getField(parent[#bankCode]));
         endCase
         case typeTuple cand size(getField(self[#bankCode])) = 0  /* no
codes set, set highest priority */
         is
            selectString(self[#bankCodeTypes], typeTuple[0]);
```

```
            if typeTuple[0]=ABA cand isACH(aRec) then
              if size(achRoutingNum(aParty))>0
                typeTuple[1]:=achRoutingNum(aParty);
              endif;
            endif;
            setField(self[#bankCode], typeTuple[1]);
          endCase
          case not(typeTuple)
            is setCurSel(self[#bankCodeTypes], 0);  /* none available, clear
fields */
              clearField(self[#bankCode]);
          endCase
        endSelect;

isEnabled?(self[#bankName]) cand enable(self[#bankCode]);
    endif;
    dispatchOn(self);
}
``` fillOtherPartyFields(self, aParty | types typeTuple)
7/30/1991 11:42 fill the beneficiary fields

```
{ dispatchOff(self);
  types := determineCodeTypes(aRec, loadString(15041) /* beneficiary */ );
  do(types,
    { using(type) insertString(self[#beneCodeTypes], type, -1);
  });
  assocsDo($OtherPartyRetrieval,
    { using(pair) setText(self[key(pair)], perform(aParty, value(pair)) cor
NULLSTR);
  });
  setField(self[#finanInst], isFinancialInst?(aParty));
  if size(types) = 0
  then disable(self[#beneCodeTypes]);
       disable(self[#beneCode]);
  else
     typeTuple := determinePreferredCode(aParty, types);
     select
        case typeTuple cand size(getField(self[#beneCode])) <> 0
          is selectString(self[#beneCodeTypes],
getField(self[#beneCodeTypes]));
            setField(self[#beneCode], getField(self[#beneCode]));
          endCase
        case typeTuple cand size(getField(parent[#beneCode])) <> 0
          is selectString(self[#beneCodeTypes],
getField(parent[#beneCodeTypes]));
            setField(self[#beneCode], getField(parent[#beneCode]));
          endCase
        case typeTuple cand size(getField(self[#beneCode])) = 0  /* no codes
set, set highest priority */
          is selectString(self[#beneCodeTypes], typeTuple[0]);
            setField(self[#beneCode], typeTuple[1]);
          endCase
        case not(typeTuple)
          is setCurSel(self[#beneCodeTypes], 0);  /* none available, clear
fields */
            clearField(self[#beneCode]);
          endCase
        endSelect;
     isEnabled?(self[#bene]) cand enable(self[#beneCode]);
  endif;
  dispatchOn(self);
}
``` hostSetupFieldChanged(self, fld, code)
1/6/1992 14:03 The payment is host repetitive, and there was a change to a
host setup field. Notify the parent window.

```
{ removeTriggersHostRepetitive(self);
  hostSetupFieldChanged(parent, nil, nil);
}
``` initFields(self)

Initialize the contents and states of fields when the form first comes up.

```
{ dispatchOff(self);
  setField(at(self, #memo), memo(aRec));
  if isAncestor(class(aRec), BranchPmt)
  then setField(self[#instrToFNBC], instToFnbc(aRec));
    setField(self[#condPayment], conditionalPmt?(aRec));
    setField(self[#fedTransfer], mustBeFedwire?(aRec));
    setField(self[#chips], mustBeChips?(aRec));
    setField(self[#deductBene], deductFromBene?(aRec));
    setField(self[#deductCorrespond], deductCorrCharges?(aRec));
    setField(self[#specialInstruc], specialInstructions(aRec));
  else
    if instType(aRec) = loadString(15051) /* US_Dollar Wire */
    then setField(self[#priorityTransfer], priorityProc?(aRec));
      setField(self[#fedTransfer], mustBeFedwire?(aRec));
      setField(self[#chips], mustBeChips?(aRec));
    endif;
  endif;
  dispatchOn(self);
  /* initFieldHelp(self,helpFields(self));*/
}
``` initForm(self)

3/11/1992 14:32 Enables and sets the limits on the fields of the form.

```
{ initForm(self:ancestor);
  dispatchOff(self);
  initPartyFields(self);
  dispatchOn(self);
  enableTyped(self);
  limitTyped(self);
}
``` initPartyFields(self | aParty)

Initializes the party and bank fields

```
{ setBeneBankLabels(self);
  (aParty := otherParty(aRec)) cand fillOtherPartyFields(self, aParty);
  (aParty := otherPartyBank(aRec)) cand fillOtherBankFields(self, aParty);
  (aParty := intermediary(aRec)) cand fillInterBankFields(self, aParty);
}
``` initTriggers(self)

Setup all triggers

```
{ initTriggers(self:ancestor);
  initFldValidation(self, $StdFldVal);
  addChangeTrigger(self[#chips], self, #changeChips);
  addChangeTrigger(self[#fedTransfer], self, #changeFedTransfer);
  addChangeTrigger(at(self, #bene), self, #changeOtherPartyInfo);
  addExitTrigger(at(self, #bene), self, #setOtherPartyName);
  addChangeTrigger(self[#beneCodeTypes], self, #changeOtherPartyCodeType);
  keysDo($OtherPartyFldVal,
    { using(elem) addChangeTrigger(at(self, elem), self,
#changeOtherPartyInfo);
      addExitTrigger(self[elem], self, #exitOtherPartyInfo);
    });
  addChangeTrigger(self[#finanInst], self, #toggleFinInst);
  addEntryTrigger(self[#beneCode], self, #enterOtherPartyCode);
  addChangeTrigger(self[#beneCode], self, #changeOtherPartyInfo);
  addExitTrigger(self[#beneCode], self, #exitOtherPartyCode);
  addChangeTrigger(at(self, #bankName), self, #changeOtherBankInfo);
  addExitTrigger(at(self, #bankName), self, #setOtherBankName);
  addChangeTrigger(self[#bankCodeTypes], self, #changeOtherBankCodeType);
  keysDo($OtherBankFldVal,
    { using(elem) addChangeTrigger(at(self, elem), self,
#changeOtherBankInfo);
      addExitTrigger(self[elem], self, #exitOtherBankInfo);
    });
```

```
    addEntryTrigger(self[#bankCode], self, #enterOtherBankCode);
    addChangeTrigger(self[#bankCode], self, #changeOtherBankInfo);
    addExitTrigger(self[#bankCode], self, #exitOtherBankCode);
    addChangeTrigger(at(self, #interBankName), self, #changeInterBankInfo);
    addExitTrigger(at(self, #interBankName), self, #setInterBankName);
    addChangeTrigger(self[#interBankCodeTypes], self,
#changeInterBankCodeType);
    keysDo($InterBankFldVal,
    { using(elem) addChangeTrigger(at(self, elem), self,
#changeInterBankInfo);
      addExitTrigger(self[elem], self, #exitInterBankInfo);
    });
    addEntryTrigger(self[#interBankCode], self, #enterInterBankCode);
    addChangeTrigger(self[#interBankCode], self, #changeInterBankInfo);
    addExitTrigger(self[#interBankCode], self, #exitInterBankCode);
    setup(parent) cand enableTriggersRepetitive(self);
    hostSetup(parent) cand enableTriggersHostRepetitive(self);
}
``` limitTyped(self | limits)
Sets limits on selected fields.

```
{ setCurrObj(UPCServices[#dataChecker], aRec);
  limits := maximumLengths(UPCServices[#dataChecker], aRec, nil,
instType(aRec), 0);
  limitTypedSet(self, $FieldRetrieval, limits);
  limits := maximumLengths(UPCServices[#dataChecker], /* beneficiary */
  otherParty(aRec), loadString(15044) /* otherParty */ , instType(aRec),
0);
  limitTypedSet(self, $OtherPartyRetrieval, limits);
  limits := maximumLengths(UPCServices[#dataChecker], /* beneficiary's bank
*/
  otherPartyBank(aRec), loadString(15043) /* otherPartyBank */ ,
instType(aRec), 0);
  limitTypedSet(self, $OtherBankRetrieval, limits);
  limits := maximumLengths(UPCServices[#dataChecker], /* intermediary */
  intermediary(aRec), loadString(15042) /* intermediary */ ,
instType(aRec), 0);
  limitTypedSet(self, $InterBankRetrieval, limits);
}
``` limitTypedSet(self, map, limits)
3/17/1992 11:15 Map contains a cross reference of screen field names to data base names. Limits is a dictionary keyed by screen field names.

```
{ assocsDo(map,
  { using(pair | limit field) field := self[key(pair)];
    if limit := limits[value(pair)]
    then setLimit(field, limit);
    endif;
  });
}
``` okAction(self, fld, code)
8/1/1991 16:48 trigger for ok button. return aRec to first screen

```
{
  if isModal?(self)
    ^endModal(self, aRec);
  else
  ^close(self:ancestor);
  endif;
}
``` removeTriggersHostRepetitive(self | hostSetup party)
2/27/1992 13:35 A host setup exists.

```
{ hostSetup := hostSetup(parent);
  if isAncestor(class(hostSetup), BranchPmt)
  then
```

```
    removeChangeTrigger(self[#instrToFNBC], self, #hostSetupFieldChanged);
    removeChangeTrigger(self[#condPayment], self, #hostSetupFieldChanged);
    removeChangeTrigger(self[#chips], self, #hostSetupFieldChanged);
    removeChangeTrigger(self[#deductBene], self, #hostSetupFieldChanged);
    removeChangeTrigger(self[#deductCorrespond], self,
#hostSetupFieldChanged);
    removeChangeTrigger(self[#specialInstruc], self,
#hostSetupFieldChanged);
  endif;
  removeChangeTrigger(self[#fedTransfer], self, #hostSetupFieldChanged);
  removeChangeTrigger(self[#chips], self, #hostSetupFieldChanged);
  if party := otherParty(hostSetup)
  then assocsDo($OtherPartyRetrieval,
    { using(pair) removeChangeTrigger(self[key(pair)], self,
#hostSetupFieldChanged);
    });
    removeChangeTrigger(self[#finanInst], self,#hostSetupFieldChanged);
    removeChangeTrigger(self[#beneCode], self, #hostSetupFieldChanged);
  endif;
  if party := otherPartyBank(hostSetup)
  then assocsDo($OtherBankRetrieval,
    { using(pair) removeChangeTrigger(self[key(pair)], self,
#hostSetupFieldChanged);
    });
    removeChangeTrigger(self[#bankCode], self, #hostSetupFieldChanged);
  endif;
  if party := intermediary(hostSetup)
  then assocsDo($InterBankRetrieval,
    { using(pair) removeChangeTrigger(self[key(pair)], self,
#hostSetupFieldChanged);
    });
    removeChangeTrigger(self[#interBankCode], self,
#hostSetupFieldChanged);
  endif;
}
``` removeTriggersRepetitive(self)

2/27/1992 13:35 A setup field has changed.

```
{ removeTriggersByName(self, #setupFieldChanged);
}
``` setBeneBankLabels(self)

Set the beneficiary and bank labels appropriately.

```
{
  if instType(aRec) = loadString(15036) /* Will Receive */
    changeLabel(self[#bene], loadString(15037) /* Remitter */ );
    changeLabel(self[#bankName], loadString(15038) /* Remitting Bank */ );
  else
    changeLabel(self[#bankName], loadString(15039) /* Account-With Bk */ );
    isACH(aRec) cand changeLabel(self[#bene], loadString(15040) /* Receiver
*/ )
                cor changeLabel(self[#bene], loadString(15052) /*
Beneficiary */ );
  endif;
}
``` setInterBankName(self, fld, code | aParty)

7/24/1991 11:47 trigger for name field. search for name in database. if
found, fill fields with information, otherwise, assume a free form entry
and set the name field with the entry.

```
{ if setIntermediaryById(aRec, getField(fld))
  then aParty := intermediary(aRec);
    fillInterBankFields(self, aParty);
  endif;
}
``` setOtherBankName(self,fld,code | aParty)
> 7/24/1991 11:47 trigger for name field. search for name in database. if found, fill fields with information, otherwise, assume a free form entry and set the name field with the entry.

```
{ if setOtherPartyBankById(aRec, getField(fld))
    then aParty := otherPartyBank(aRec);
      fillOtherBankFields(self, aParty);
    endif;
}
``` setOtherPartyName(self, fld, code | aParty)
> 7/24/1991 11:47 trigger for name field. search for name in database. if found, fill fields with information, otherwise, assume a free form entry and set the name field with the entry.

```
{ if setOtherPartyById(aRec, getField(fld))
    then aParty := otherParty(aRec);
      fillOtherPartyFields(self, aParty);
    endif;
}
``` setupFieldChanged(self, fld, code)
> 1/6/1992 14:03 The payment is repetitive, and there was a change to a setup field. Notify the parent window.

```
{ removeTriggersRepetitive(self);
  setupFieldChanged(parent, nil, nil);
}
``` start(self, aFundsXfer)
> 8/19/1991 15:24

```
{ aRec := aFundsXfer;
  start(self:ancestor, aFundsXfer);
}
``` toggleFinInst(self, fld, code | state)
> change trigger for the financial institution button

```
{ if state := getField(fld)
    then setOtherParty(aRec, asBank(otherParty(aRec)));
    else setOtherParty(aRec, asParty(otherParty(aRec)));
    endif;
}
```

MorePPD

Source file:     MOREPPD.CLS

Inherits from:     Object WindowsObject Window AppWindow Form UPCForm

Inherited by:     MoreCCD ViewCCD ViewPPD

Form for processing ACH PPD Addendas. This window is invoked when the user pushes the "More" button on the transaction browser.

Instance variables:

| | |
|---|---|
| hWnd | (From class WindowsObject) |
| defProc | (From class WindowsObject) |
| parent | (From class WindowsObject) |
| cRect | (From class WindowsObject) |
| contID | (From class WindowsObject) |
| wStyle | (From class WindowsObject) |
| paintStruct | (From class Window) |
| hMenu | (From class Window) |
| menu | (From class Window) |
| buttonDn | (From class Window) |
| locRect | (From class Window) |
| caption | (From class Window) |
| cursor | (From class Window) |
| picture | (From class Window) |
| port | (From class Window) |
| space | (From class Window) |
| fieldColl | (From class Form) |
| gettingFocus | (From class Form) |
| theFocus | (From class Form) |
| idDict | (From class Form) |
| handleDict | (From class Form) |
| currGroup | (From class Form) |
| errorField | (From class Form) |
| execModal | (From class Form) |
| dirty | (From class Form) |
| retVal | (From class Form) |
| dispatchTrigger | (From class Form) |
| statusText | (From class Form) |
| fieldWithFocus | (From class Form) |
| aRec | (From class UPCForm) |
| fldValDict | (From class UPCForm) |
| hBrush | (From class UPCForm) |
| errorLog | (From class UPCForm) |
| clearFlag | clear button selected |
| firstTime | flag indicating that this is the first time that this window has been initialized. Used when setting appropriate sections |
| theFundsXfer | a FundsXfer Object that is passed by the TransBrowser |
| currentSection | Indicates the currently enabled section for PPD only. Possible values are: NTE or DTM. |
| helpFields | Help indices dictionary |

Class variables:

$StdFldVal
$NoteFlds
$DateTimeFlds

Class methods:

caption(self)
    8/9/1991 20:13 Return the default caption for the window.

```
{ ^loadString(15015) /* ACH PPD Additional Information */ ;
}
``` helpFields(self)
    5/1/1992 11:36

```
{
 ^%IdentityDictionary(
   #memo->2219
   #discData->2220
   #refCode->2237
   #information->2238
   #dateQual1->2239
   #date1->2240
   #time1->2241
   #dateQual2->2239
   #date2->2240
   #time2->2241
   #help->2256
   );
}
``` helpIndex(self)
    4/10/1992 13:53

```
{
 ^2256;
}
```

Object methods:

centerButton(self, button | clientRect buttonCRect leftSpace rightSpace)
    3/11/1992 16:18 Centers the ok button.

```
{ clientRect := clientRect(self);
  buttonCRect := copy(cRect(button));
  leftSpace := left(buttonCRect) - left(clientRect);
  rightSpace := right(clientRect) - right(buttonCRect);
  if rightSpace > leftSpace
  then offset(buttonCRect, (rightSpace - leftSpace)/2, 0);
  else offset(buttonCRect, 0 - (leftSpace - rightSpace)/2, 0);
  endif;
  setCRect(button, buttonCRect);
  moveWindow(button);
}
``` clearAction(self, fld, code | newRec)
    8/1/1991 16:48 Trigger for clear button. Clears all fields for the currently enabled section. 8/3/92 ADC: Preserves the old key in the new aRec. Failure to do this resulted in update failures.

```
{ clearMemoDiscDataFlds(self);
  select
    case currentSection = NTE
    is clearNoteFlds(self);
       setField(at(self, #note), true);
    endCase
    case currentSection = DTM
    is clearDateTimeFlds(self);
       setField(at(self, #dateTime), true);
    endCase
  endSelect;
  clearFlag := true;
  if aRec
  then newRec := new(PPDAddendum);
       setOldKey(newRec, oldKey(aRec));
```

```
    aRec := newRec;
  endif;
  dirtyOff(self);
}
``` clearDateTimeFlds(self)
8/14/1991 11:02 Clear & disable all the dateTime fields and their ivars.

```
{ /* Set the dateQual comboBox to have no current selection */
  setCurSel(self[#dateQual1], -1);
  dateQualTrigger(self, self[#dateQual1], nil);
  clearField(self[#date1]); /* Clear appropriate dateTime fields */
  setDate1(aRec, nil); /* Clear the business object */
  clearField(self[#time1]);
  setFirstTime(aRec, nil); /* Clear the business object */
  setCurSel(self[#dateQual2], -1); /* Set the dateQual comboBox to have no
current selection */
  dateQualTrigger(self, self[#dateQual2], nil);
  clearField(self[#date2]); /* Clear appropriate dateTime fields */
  setDate2(aRec, nil); /* Clear the business object */
  clearField(self[#time2]);
  setSecondTime(aRec, nil); /* Clear the business object */
}
``` clearMemoDiscDataFlds(self)
Clear the memo and discretionary data fields that are part of
theFundsXfer NOT the addenda and reset their ivars.

```
{
  clearField(self[#memo]);
  setMemo(theFundsXfer, nil);
  clearField(self[#discData]);
  setDiscretionaryData(theFundsXfer, nil);
}
``` clearNoteFlds(self)
8/14/1991 11:02 Clear all the note fields and reset their ivars.

```
{ setCurSel(at(self, #refCode), -1);
  refCodeTrigger(self, at(self, #refCode), nil);
  clearField(at(self, #information));
  setInformation(aRec, nil);
}
``` createFields(self | lbl, fld)
This method is generated automatically

```
{
  shrinkWrap(self, rect(2, 20, 630, 266));
  fld:=newField(self, EditField, 2300, %BitOr(WS_CHILD, WS_VISIBLE,
WS_BORDER, WS_TABSTOP, ES_AUTOHSCROLL), rect(52,8,512,32), nil, #memo);
  setRightLabel(fld, rect(6,12,50,30), 11200 /* Memo */);
  fld:=newField(self, EditField, 2301, %BitOr(WS_CHILD, WS_VISIBLE,
WS_BORDER, WS_TABSTOP, ES_AUTOHSCROLL), rect(586,8,622,32), nil,
#discData);
  setRightLabel(fld, rect(518,12,584,28), 11201 /* Disc Data */);
  fld:=newField(self, GroupField, 2302, %BitOr(WS_CHILD, WS_VISIBLE,
BS_GROUPBOX), rect(8,34,208,80), 11202 /* Select Addenda Type */,
#addendaTypeGrp);
  fld:=newField(self, CheckBoxField, 2303, %BitOr(WS_CHILD, WS_VISIBLE,
BS_AUTORADIOBUTTON), rect(20,56,78,76), 11203 /* Note */, #note);
  fld:=newField(self, CheckBoxField, 2304, %BitOr(WS_CHILD, WS_VISIBLE,
BS_AUTORADIOBUTTON), rect(98,56,192,76), 11204 /* Date/Time */, #dateTime);
  fld:=newField(self, VComboBox, 2305, %BitOr(WS_CHILD, WS_VISIBLE,
WS_VSCROLL, WS_TABSTOP, CBS_OWNERDRAWFIXED, CBS_DROPDOWNLIST),
rect(106,86,376,224), nil, #refCode);
  setRightLabel(fld, rect(38,90,102,108), 11205 /* Ref. Code */);
  fld:=newField(self, EditField, 2306, %BitOr(WS_CHILD, WS_VISIBLE,
```

```
    WS_BORDER, WS_TABSTOP, ES_AUTOHSCROLL), rect(106,110,598,134), nil,
#information);
    setRightLabel(fld, rect(30,114,102,130), 11206 /* Information */);
    fld:=newField(self, VComboBox, 2307, %BitOr(WS_CHILD, WS_VISIBLE,
WS_VSCROLL, WS_TABSTOP, CBS_OWNERDRAWFIXED, CBS_DROPDOWNLIST),
rect(106,142,376,222), nil, #dateQual1);
    setRightLabel(fld, rect(12,146,102,164), 11207 /* Date Qualifier */);
    fld:=newField(self, DateField, 2309, %BitOr(ES_LEFT, WS_CHILD,
WS_VISIBLE, WS_BORDER, WS_TABSTOP), rect(420,142,506,166), nil, #date1);
    setRightLabel(fld, rect(382,146,418,164), 11208 /* Date */);
    fld:=newField(self, TimeField, 2311, %BitOr(ES_LEFT, WS_CHILD,
WS_VISIBLE, WS_BORDER, WS_TABSTOP), rect(550,142,618,166), nil, #time1);
    setRightLabel(fld, rect(512,146,548,164), 11209 /* Time */);
    fld:=newField(self, VComboBox, 2308, %BitOr(WS_CHILD, WS_VISIBLE,
WS_VSCROLL, WS_TABSTOP, CBS_OWNERDRAWFIXED, CBS_DROPDOWNLIST),
rect(106,166,376,246), nil, #dateQual2);
    setRightLabel(fld, rect(12,170,102,188), 11210 /* Date Qualifier */);
    fld:=newField(self, DateField, 2310, %BitOr(ES_LEFT, WS_CHILD,
WS_VISIBLE, WS_BORDER, WS_TABSTOP), rect(420,166,506,190), nil, #date2);
    setRightLabel(fld, rect(382,170,418,188), 11211 /* Date */);
    fld:=newField(self, TimeField, 2312, %BitOr(ES_LEFT, WS_CHILD,
WS_VISIBLE, WS_BORDER, WS_TABSTOP), rect(550,166,618,190), nil, #time2);
    setRightLabel(fld, rect(512,170,548,188), 11212 /* Time */);
    fld:=newField(self, StaticField, 2316, %BitOr(WS_CHILD, WS_VISIBLE,
SS_BLACKFRAME), rect(8,138,622,196), nil, #staticFld2);
    fld:=newField(self, StaticField, 2315, %BitOr(WS_CHILD, WS_VISIBLE,
SS_BLACKFRAME), rect(8,80,622,138), nil, #staticFld1);
    fld:=newField(self, ButtonField, 2313, %BitOr(WS_CHILD, WS_VISIBLE,
WS_TABSTOP, BS_DEFPUSHBUTTON), rect(208,210,292,236), 11213 /* &OK */,
#ok);
    fld:=newField(self, ButtonField, 2314, %BitOr(BS_PUSHBUTTON, WS_CHILD,
WS_VISIBLE, WS_TABSTOP), rect(318,210,402,236), 11214 /* &Clear */,
#clear);
    fld:=newField(self, ButtonField, 799, %BitOr(BS_PUSHBUTTON, WS_CHILD,
WS_VISIBLE, WS_TABSTOP), rect(544,208,624,232), 11215 /* &Help */, #help);
}
``` dateQualTrigger(self, fld, code | str dateQual)

8/14/1991 11:02 Trigger for setting the dateQuals for the dateTime section of the addenda.

```
{ if size(str := getField(fld)) >= 3
  then dateQual := subString(str, 0, 3);
  endif;
  if identity(fld) = #dateQual1
  then setDateQual(aRec, dateQual, 1);
  else setDateQual(aRec, dateQual, 2);
  endif;
}
``` disableAddendaTypes(self)

Clear & disable all Addenda Type fields & the group box

```
{
  setField(at(self, #note), nil);
  setField(at(self, #dateTime), nil);
  disable(at(self, #note));
  disable(at(self, #dateTime));
  disable(at(self, #addendaTypeGrp));
}
``` disableAllBut(self, setOfFields | setToDisable)

12/4/1991 11:52 Disables a tuple of sets of fields, excluding the set named in the argument.

```
{ select
    case setOfFields == $NoteFlds
```

```
              is setToDisable := tuple($DateTimeFlds);
           endCase
           case setOfFields == $DateTimeFlds
           is setToDisable := tuple($NoteFlds);
           endCase
        endSelect;
        do(setToDisable,
        { using(elem) disableFields(self, elem);
        });
}
``` disableDateTimeFlds(self)

8/14/1991 11:02 Clear & disable all the dateTime fields.

```
{ clearDateTimeFlds(self);
  disableFields(self, $DateTimeFlds);
}
``` disableForDetails(self)

3/12/1992 12:48 Details are present. Disable everything else.

```
{ disableFields(self, $NoteFlds);
  disableFields(self, $DateTimeFlds);
}
``` disableNoteFlds(self)

8/14/1991 11:02 Clear & disable all the note fields.

```
{
  clearNoteFlds(self);
  disableFields(self, $NoteFlds);
}
``` discDataTrigger(self, fld, code)

8/14/1991 11:02 Trigger for setting the discretionary data ivar of
theFundsXfer object.

```
{ setDiscretionaryData(theFundsXfer, getField(fld));
}
``` displayDateTimeSection(self)

1/10/1992 14:34 Displays the fields of the date time section.

```
{ if dateQual1(aRec) /* Highlight last selected dateQual if there is one */
  then findString(at(self, #dateQual1), dateQual1(aRec));
  endif;
  setField(self[#date1], date1(aRec));
  setField(self[#time1], firstTime(aRec));
  if dateQual2(aRec)
  then findString(at(self, #dateQual2), dateQual2(aRec));
  endif;
  setField(self[#date2], date2(aRec));
  setField(self[#time2], secondTime(aRec));
}
``` displayNoteSection(self)

3/12/1992 12:00 Displays the note section of the form.

```
{ setField(self[#information], information(aRec));
  refCode(aRec) cand findString(self[#refCode], refCode(aRec));
}
``` enableDateTimeFlds(self, fld, code)
    8/14/1991 11:02 trigger for clearing & disabling all the fields of the previously activeSection, and enabling the dateTime fields.

```
{ select
     case firstTime = true  /* If nil, first time window has been invoked.
*/
       disableAllBut(self, $DateTimeFlds); /* Disable all sections except
dateTime fields. */
       firstTime := nil;
     endCase
     case currentSection = NTE /* Clear & disable note fields */
       disableNoteFlds(self);
       enableFields(self, $DateTimeFlds); /* Enable dateTime fields. */
     endCase
   endSelect;  /* Enable dateTime fields. */
   currentSection := DTM;
}
``` enableNoteFlds(self, fld, code)
    8/14/1991 11:02 trigger for clearing & disabling all the fields of the previously activeSection, and enabling the Note fields.

```
{ select
     case firstTime = true  /* If nil, first time window has been invoked.*/
       disableAllBut(self, $NoteFlds); /*  Disable all sections except note
fields. */
       firstTime := nil;
     endCase
     case currentSection = DTM /* Clear & disable dateTime fields */
       disableDateTimeFlds(self);
       enableFields(self, $NoteFlds); /* Enable note fields */
     endCase
   endSelect;  /* Enable note fields */
   currentSection := NTE;
}
``` enableTriggersRepetitive(self | setup)
    1/6/1992 13:46 This method is invoked when initializing triggers and it is discovered that the payment is repetitive.

```
{ setup := addenda(setup(parent));
  if class(self) = MorePPD
    hasNTE?(setup) cand addChangeTrigger(self[#note], self,
#setupFieldChanged);
    hasDTM?(setup) cand addChangeTrigger(self[#dateTime], self,
#setupFieldChanged);
  endif;
  size(refCode(setup)) > 0 cand addChangeTrigger(self[#refCode], self,
#setupFieldChanged);
  if size(information(setup)) > 0
  then addChangeTrigger(self[#information], self, #setupFieldChanged);
  endif;
  dateQual1(setup) cand addChangeTrigger(self[#dateQual1], self,
#setupFieldChanged);
  date1(setup) cand addChangeTrigger(self[#date1], self,
#setupFieldChanged);
  firstTime(setup) cand addChangeTrigger(self[#time1], self,
#setupFieldChanged);
  dateQual2(setup) cand addChangeTrigger(self[#dateQual2], self,
#setupFieldChanged);
  date2(setup) cand addChangeTrigger(self[#date2], self,
#setupFieldChanged);
  secondTime(setup) cand addChangeTrigger(self[#time2], self,
#setupFieldChanged);
}
``` fillDateQuals(self | aView)
Fill the date qualifier fields.

```
{
  aView := DBSession[#UPC][#dtmdtqua];

do(tuple(#dateQual1, #dateQual2),

{using(fieldId)
    fill(self[fieldId], aView,
      {using(aRecord | str)
        fillCodeStr(call(DBInterface), record(aRecord), str :=
stringBuffer(String)};
        str;
      },
      {using(aRecord)
        true;
      });
  });
}
``` fillRefCode(self)
Fills the reference code combo box.

```
{
  fill(self[#refCode],
    DBSession[#UPC][#nterefcd],
    {using(aRecord | str)
      fillCodeStr(call(DBInterface), record(aRecord), str :=
stringBuffer(String));
      str;
    },
    {using(aRecord)
      true;
    });
}
``` initFields(self | setup)
8/14/1991 10:52 Initializes all fields. Obtains the values of memo and dicretionary data from the calling funds transfer business object. If we are working on an addendum of a repetitive payment, invoke the method that sets triggers about changes to the setup fields.

```
{ firstTime := true;
  dispatchOff(self);
  disable(self[#discData]); /* We will not support in Phase 1. */
  setField(self[#memo], memo(theFundsXfer));
  setField(self[#discData], discretionaryData(theFundsXfer));
  setSection(self);
  dispatchOn(self);
  if (setup := setup(parent)) cand addenda(setup)
  then enableTriggersRepetitive(self);
  endif;
  initFieldHelp(self,helpFields(self));
}
``` initForm(self)
Initialize some fields. Create a new PPDAddendum if one doesn't already exist, and if no free form entry exists. Otherwise, if there already is a PPDAddendum, point to it (set aRec to point to it).

```
{
  startErrorLogging(self);
  setFixedFont(self);
  fillRefCode(self);
  fillDateQuals(self);
  prepareAddendum(self);
  limitTyped(self);
```

```
    initForm(self:ancestor);
}
``` initTriggers(self)
8/14/1991 10:52 Initialize the regular triggers.

```
{ initTriggers(self:ancestor); /* Setup all triggers */
  initFldValidation(self, $StdFldVal);
  if class(self) = MorePPD then
    addChangeTrigger(self[#note], self, #enableNoteFlds);
    addChangeTrigger(self[#dateTime], self, #enableDateTimeFlds);
  endif;
  addExitTrigger(self[#memo], self, #memoTrigger);
  addExitTrigger(self[#discData], self, #discDataTrigger);
  addExitTrigger(self[#refCode], self, #refCodeTrigger);
  addExitTrigger(self[#dateQual1], self, #dateQualTrigger);
  addExitTrigger(self[#dateQual2], self, #dateQualTrigger);
}
``` limitTyped(self | limits)
3/24/1992 12:32 Sets limits on fields.

```
{ setCurrObj(UPCServices[#dataChecker], theFundsXfer);
  limits :=
maximumLengths(UPCServices[#dataChecker],theFundsXfer,nil,instType(theFunds
Xfer),0);
  setLimit(self[#memo], limits[#memo]);
  setLimit(self[#discData], limits[#discretionaryData]);
  if aRec /* A free-form X12 details does NOT exist. */
    setCurrObj(UPCServices[#dataChecker], aRec);
    limits := maximumLengths(UPCServices[#dataChecker], aRec, nil,
                            instType(theFundsXfer), 0);
    setLimit(self[#information], limits[#information]);
  endif;
}
``` memoTrigger(self, fld, code)
8/14/1991 11:02 trigger for setting the memo ivar of theFundsXfer object.

```
{ setMemo(theFundsXfer, getField(fld));
}
``` okAction(self, fld, code | tranOK)
Trigger for ok button. Return theFundsXfer to first screen

```
{ showWaitCurs();
  clear(UPCServices[#errorMessages]);
  setOk(UPCServices[#dataChecker], true); /* Free-form X12 details
    present or no changes have been made to the current copy of the
    addenda. */
  if not(aRec) cor not(isDirty(aRec))
  then clearFlag cand setAddenda(theFundsXfer, nil);
    ^endModal(self, true);
  endif;
  if isSetup(theFundsXfer) cand isBlank(setupName(aRec))
  then setSetupName(aRec, setupName(theFundsXfer))
  else not(xferRefNum(aRec)) cand setXferRefNum(aRec,
    xferRefNum(theFundsXfer));
  endif;
  if not(tranOK := isValid?(aRec))
  then showOldCurs();
    tranOK := showDataCheckerResults(self); /* operator may override
      warnings */
  endif;
  showOldCurs();
  if tranOK
  then setAddenda(theFundsXfer, aRec); /* Attach the addenda to the
    transaction. */
```

```
        ^endModal(self, true);
    endif;
}
``` prepareAddendum(self)

3/12/1992 12:21 Either retrieves or creates a new addendum.

```
{ select
    case details(theFundsXfer) /* Free form entry exists */
    is ;
    endCase
    case addenda(theFundsXfer) /* Addendum already exists */
    is aRec := deepCopy(addenda(theFundsXfer));
        currentSection := NTE;
        hasDTM?(aRec) cand currentSection := DTM;
    endCase
    default  /* Make a new addendum */
        aRec := new(PPDAddendum);
        currentSection := NTE; /* Blank ones start this way */
    endSelect;
}
``` refCodeTrigger(self, fld, code | str refCode)

8/14/1991 11:02 trigger for setting the refCode for the note section of the addenda.

```
{ if size(str := getField(fld)) >= 3
  then refCode := subString(str, 0, 3);
  endif;
  setRefCode(aRec, refCode);
}
``` removeTriggersRepetitive(self)

1/6/1992 13:46 This method is invoked to get rid of all the triggers indicating a change was made to a setup field.

```
{ removeTriggersByName(self, #setupFieldChanged);
}
``` setFixedFont(self)

Sets the fields to use fixed font (i.e. non-proportional).

```
{
  do(tuple(#refCode, #dateQual1, #dateQual2),
  {using(fieldId) asFixedFont(self[fieldId]);
  });
}
``` setSection(self)

Initialize and enable appropriate section. If the details ivar is already filled, that means that a user entered a free-form X12 type instruction, all other sections should be disabled except for memo and discretionary data.

```
{
  select
    case details(theFundsXfer)
    is disableForDetails(self);
      disableAddendaTypes(self);
    endCase
    case currentSection = NTE
    is setField(self[#note], true);
      displayNoteSection(self);
      enableNoteFlds(self, nil, nil);
    endCase
```

```
            case currentSection = DTM
            is setField(self[#dateTime], true);
              displayDateTimeSection(self);
              enableDateTimeFlds(self, nil, nil);
            endCase
            default ^nil;
          endSelect;
        }
``` setupFieldChanged(self, fld, code)
1/6/1992 14:03 The payment is repetitive, and there was a change to a setup field. Notify the parent window.

```
{ removeTriggersRepetitive(self);
  setupFieldChanged(parent, nil, nil);
}
``` showDataCheckerResults(self | ret)
3/16/1992 15:09 Show what the data checker has to show.

```
{ select
    case numMsgs(UPCServices[#errorMessages], LIS_DATA_ERROR) > 0 /* hard errors */
      is messageBox(UPCServices[#errorMessages], self, instType(theFundsXfer)
        + loadString(15016) /* not accepted */ ,
        caption(class(self)), MB_OK);
      endCase
    case numMsgs(UPCServices[#errorMessages], LIS_DATA_WARNING) > 0 /* warnings */
      is ret := messageBox(UPCServices[#errorMessages], /* operator can override warnings */
        self, instType(theFundsXfer) + loadString(15017) /* warning */ ,
        caption(class(self)), MB_OKCANCEL);
        ret == IDOK cand addToActivityLog(UPCServices[#errorMessages],
LIS_DATA_WARNING);
      endCase
    default /* Only other possibility is database errors. */
      messageBox(UPCServices[#errorMessages], self, instType(theFundsXfer)
        + loadString(15016) /* not accepted */ ,
        caption(class(self)), MB_OK);
  endSelect;
  clear(UPCServices[#errorMessages]);
  ^ret == IDOK;
}
``` shrinkCombos(self, aColl)
3/20/1992 9:18 Shrinks the combo boxes.

```
{ do(aColl,
    { using(symbol | comboCRect) comboCRect := copy(cRect(self[symbol]));
      setBottom(comboCRect, top(comboCRect) + 45);
      setCRect(self[symbol], comboCRect);
      moveWindow(self[symbol]);
    });
}
``` start(self, aFundsXfer)
8/19/1991 15:24

```
{ theFundsXfer := aFundsXfer;
  start(self:ancestor, theFundsXfer);
}
```

MoreTXP

Source file:                    MORETXP.CLS

Inherits from:                  Object WindowsObject Window AppWindow
                                Form UPCForm Inherited by:                   ViewTXP Window for adding TXP addenda information.

Instance variables:

| | |
|---|---|
| hWnd | (From class WindowsObject) |
| defProc | (From class WindowsObject) |
| parent | (From class WindowsObject) |
| cRect | (From class WindowsObject) |
| contID | (From class WindowsObject) |
| wStyle | (From class WindowsObject) |
| paintStruct | (From class Window) |
| hMenu | (From class Window) |
| menu | (From class Window) |
| buttonDn | (From class Window) |
| locRect | (From class Window) |
| caption | (From class Window) |
| cursor | (From class Window) |
| picture | (From class Window) |
| port | (From class Window) |
| space | (From class Window) |
| fieldColl | (From class Form) |
| gettingFocus | (From class Form) |
| theFocus | (From class Form) |
| idDict | (From class Form) |
| handleDict | (From class Form) |
| currGroup | (From class Form) |
| errorField | (From class Form) |
| execModal | (From class Form) |
| dirty | (From class Form) |
| retVal | (From class Form) |
| dispatchTrigger | (From class Form) |
| statusText | (From class Form) |
| fieldWithFocus | (From class Form) |
| aRec | (From class UPCForm) |
| fldValDict | (From class UPCForm) |
| hBrush | (From class UPCForm) |
| errorLog | (From class UPCForm) |
| theFundsXfer | Help indices dictionary |
| currentRules | Help indices dictionary |
| helpFields | Help indices dictionary |
| clearFlag | boolean; has button been used? |

Class variables:

| | |
|---|---|
| $CurrentFormat | Current TXP Format |
| $AllTxpFlds | TXP field formatting rules |
| $AmountFlds | TXP field formatting rules |

$TxpFlds               TXP field formatting rules
$AmtTypeFlds           TXP field formatting rules
$StdFldVal             TXP field formatting rules
$TXPFormatFields       TXP field formatting rules Class methods:

caption(self)
    8/9/1991 20:13 Return the default caption for the window.

```
{ ^loadString(15060) /* ACH TXP Additional Information */ ;
}
``` formatTxpFields(self, aFormat)
    Return the TXP field formatting rules.

```
{
   if not($CurrentFormat = aFormat)
      ($TXPFormatFields := formatTxpFields(new(DBTXPField:late), aFormat))
   cand
      $CurrentFormat := aFormat;
   endif;
   ^$TXPFormatFields;
}
``` helpFields(self)
    5/1/1992 13:50

```
{^%IdentityDictionary(
   #memo->2219
   #discData->2220
   #stateTaxFmt->2249
   #taxpayerId->2250
   #taxType->2251
   #periodEndDate->2252
   #amtType1->2253
   #amt1->2254
   #amtType2->2253
   #amt2->2254
   #amtType3->2253
   #amt3->2254
   #amtType4->2253
   #amt4->2254
   #taxpayerVerif->2255
   #help->2248
   ); }
``` helpIndex(self)
    4/10/1992 13:53

```
{
  ^2248;
}
``` initFields(self)
    4/1/1992 13:28

```
{
 $TXPFormatFields:=nil;
 $CurrentFormat:=nil;
}
```

Object methods:

adjustAmts(self | aRule, minAmt, maxAmt)
2/12/1992 11:02 Adjust amount lengths based on stateTaxFmt. 8/4/92 ADC: Ripped out call to getRules.

```
{ do($AmountFlds,
    { using(elem)
      if aRule := currentRules[elem]
      then minAmt := (10 ** (minSize(aRule) - 1)) * .01;
        maxAmt := ((10 ** maxSize(aRule)) - 1) * .01;
        setRange(self[elem], minAmt, maxAmt);
      endif;
    });
}
``` adjustPeriodEndDate(self | aRule, aLength, aStrm)
2/12/1992 11:02 Adjust periodEndDate length based on stateTaxFmt.
8/4/92 ADC: Ripped out call to getRules.

```
{ if (aRule := currentRules[#periodEndDate])
    then aLength := maxSize(aRule);
      aStrm := streamOver(NULLSTR);
      do(dateFormats(aRule),
        { using(aDateFormat) nextPutAll(aStrm, aDateFormat);
          nextPutAll(aStrm, SPACE);
        });
      clearField(self[#dateTemplate]);
      setField(self[#dateTemplate], subString(collection(aStrm), 0,
        position(aStrm)));
      setFormat(self[#periodEndDate], fillWith(loadString(15073) /* 9 */
        , aLength));
    endif;
}
``` adjustTaxPayerId(self | aRule, aLength)
2/12/1992 11:02 Adjust taxpayerId length based on stateTaxFmt. 8/4/92 ADC: Ripped out call to getRules.

```
{ if aRule := currentRules[#taxpayerId]
    then aLength := maxSize(aRule);
      setLimit(self[#taxpayerId], aLength);
    endif;
}
``` adjustTaxPayerVer(self | aRule, aLength)
2/12/1992 11:02 Adjust taxpayerVerif length based on stateTaxFmt. 8/4/92 ADC: Ripped out call to getRules.

```
{ if aRule := currentRules[#taxpayerVerif]
    then aLength := maxSize(aRule);
      setLimit(self[#taxpayerVerif], aLength);
    endif;
}
``` amtTrigger(self, fld, code | fldName, aStr)
8/14/1991 11:02 Exit trigger for amount fields. 7/31/92 ADC: Process zero strings. Passes field id to business object instead of an index.

```
{ if aStr := getField(fld)
    then fldName := identity(fld);
      setAmt(aRec, aStr, fldName);
    endif;
}
``` amtTypeTrigger(self, fld, code | fldName, aStr)
        8/14/1991 11:02 Exit trigger for amtType fields. NOTE: The amtType is presumed to be in the first position of fld. 7/31/92 ADC: Passes field name to the business object instead of a number.

```
{ if aStr := getField(fld) /* Did you exit a blank field? */
   then fldName := identity(fld);
     setAmtType(aRec, aStr[0], fldName);
   endif;
}
``` applyRule(self, aFld, aRule | aRule, aColl, theDate, rc)
        3/19/1992 10:45 Apply all edit rules to aFld.

```
{
   if isDirty?(aFld) cand getRules(self)
    if aRule := currentRules[#periodEndDate]
       aColl := dateFormats(aRule);
       theDate := getField(aFld);
       if rc := editDate(self, theDate, aColl)
          if (size(theDate) == 6)
            setPeriodEndDate(aRec, date(new(Date),
                                        asInt(subString(theDate, 2, 4), 10),
                                        asInt(subString(theDate, 4, 6), 10),
                                        asInt(subString(theDate, 0, 2), 10))
            );
          endif;
          if (size(theDate ~= 6))
             setOtherEndDate(aRec, theDate);
          endif;
       else
          setFocus(self[#periodEndDate]);
       endif;
     else
       /* We should NEVER get here. */
       errorBox(loadString(15069) /* Invalid period end date */ ,
loadString(15070) /* Date cannot be edited */ );
      endif;
      /* Otherwise, the periodEndDate didn't change, so do nothing. */
    endif;
}
``` clearAction(self, fld, code | newRec)
        8/14/1991 11:02 Clear all MoreTXP fields. Disable all MoreTXP fields except memo, discData, and stTaxFmt. Reset all ivars of the TXPAddendum to nil 8/3/92 ADC: Preserve the old key on the new TXP addendum, because you get update failures if you don't. 8/4/92 ADC: Needs a dirtyOff send to clear all the dirty fields. 8/5/92 ADC: Sets the clear flag to true instead of setting the funds transfer object's addenda ivar to nil. Clears memo and disc data.

```
{ /* Clear all MoreTXP fields */
   dispatchOff(self);
   clearMemoDiscDataFlds(self);
   fillStateTaxFmtBox(self, -1);
   clearField(self[#taxType]);
   clearField(self[#taxpayerId]);
   clearField(self[#periodEndDate]);
   clearAmtTypes(self);
   clearAmts(self);
   clearField(self[#taxpayerVerif]);
   dispatchOn(self);
   dirtyOff(self);
   disableFields(self, $AllTxpFlds);
   aRec cand enable(self[#stateTaxFmt]);
   clearFlag := true;
   if aRec
```

```
        then newRec := new(TXPAddendum);
          setOldKey(newRec, oldKey(aRec));
          aRec := newRec;
        endif;
    }
``` clearAmts(self)

8/14/1991 11:00 Clear all amount fields.

```
{
  dispatchOff(self);
  do($AmountFlds,
      {using(elem)
       if self[elem] /* cor (self[elem] = 0.) */
         clearField(self[elem]);
       endif;
      }
  );
  dispatchOn(self);
}
``` clearAmtTypes(self)

8/14/1991 11:02 Empty all amtType ComboBoxes.

```
{
  dispatchOff(self);
  do($AmtTypeFlds,
      {using(elem)
       if self[elem]
         clearField(self[elem]);
       endif;
      }
  );
  dispatchOn(self);
}
``` clearMemoDiscDataFlds(self)

8/5/92 ADC: Lifted from MorePPD. Clear the memo and discretionary data fields that are part of theFundsXfer NOT the addenda and reset their ivars.

```
{ clearField(self[#memo]);
  setMemo(theFundsXfer, nil);
  clearField(self[#discData]);
  setDiscretionaryData(theFundsXfer, nil);
}
``` clearStateTaxFmt(self)

8/14/1991 11:02 Empty the stateTaxFmt ComboBox.

```
{
  dispatchOff(self);
  clearField(self[#stateTaxFmt]);
  dispatchOn(self);
}
``` createFields(self | lbl, fld)

This method is generated automatically

```
{
  shrinkWrap(self, rect(2, 20, 564, 380));
  fld:=newField(self, EditField, 2300, %BitOr(WS_CHILD, WS_VISIBLE,
WS_BORDER, WS_TABSTOP, ES_AUTOHSCROLL), rect(102,10,540,34), nil, #memo);
  setRightLabel(fld, rect(40,14,94,32), 11500 /* Memo */);
  fld:=newField(self, EditField, 2301, %BitOr(WS_CHILD, WS_VISIBLE,
WS_BORDER, WS_TABSTOP, ES_LEFT, 0x200L), rect(102,46,138,70), nil,
#discData);
```

```
        setRightLabel(fld, rect(22,46,94,64), 11501 /* Disc Data */);
        fld:=newField(self, CBoxField, 2342, %BitOr(WS_CHILD, WS_VISIBLE,
WS_VSCROLL, WS_TABSTOP, CBS_SORT, CBS_DROPDOWNLIST), rect(102,80,328,240),
nil, #stateTaxFmt);
        setRightLabel(fld, rect(18,74,94,108), 11502 /* State Tax Format */);
        fld:=newField(self, EditField, 2343, %BitOr(WS_CHILD, WS_VISIBLE,
WS_BORDER, WS_TABSTOP, ES_AUTOHSCROLL, ES_LEFT, 0x200L),
rect(102,118,240,142), nil, #taxpayerId);
        setRightLabel(fld, rect(12,122,96,138), 11503 /* Taxpayer ID */);
        fld:=newField(self, CBoxField, 2344, %BitOr(WS_CHILD, WS_VISIBLE,
WS_VSCROLL, WS_TABSTOP, CBS_SORT, CBS_DROPDOWNLIST), rect(322,118,550,262),
nil, #taxType);
        setRightLabel(fld, rect(252,122,318,140), 11504 /* Tax Code */);
        fld:=newField(self, PicField, 2345, %BitOr(ES_LEFT, WS_CHILD, WS_VISIBLE,
WS_BORDER, WS_TABSTOP), rect(102,150,206,174), nil, #periodEndDate);
        setRightLabel(fld, rect(10,144,94,178), 11505 /* Tax Period End Date */);
        fld:=newField(self, CBoxField, 2334, %BitOr(WS_CHILD, WS_VISIBLE,
WS_VSCROLL, WS_TABSTOP, CBS_SORT, CBS_DROPDOWNLIST), rect(102,184,330,328),
nil, #amtType1);
        setRightLabel(fld, rect(6,188,94,206), 11506 /* Amount Type */);
        fld:=newField(self, FloatField, 2338, %BitOr(/*FS_SEPERATOR*/ 0x2000,
ES_LEFT, WS_CHILD, WS_VISIBLE, WS_BORDER, WS_TABSTOP),
rect(416,184,536,208), nil, #amt1);
        setRightLabel(fld, rect(354,188,408,206), 11507 /* Amount */);
        fld:=newField(self, CBoxField, 2335, %BitOr(WS_CHILD, WS_VISIBLE,
WS_VSCROLL, WS_TABSTOP, CBS_SORT, CBS_DROPDOWNLIST), rect(102,208,330,352),
nil, #amtType2);
        setRightLabel(fld, rect(6,212,94,230), 11508 /* Amount Type */);
        fld:=newField(self, FloatField, 2339, %BitOr(/*FS_SEPERATOR*/ 0x2000,
ES_LEFT, WS_CHILD, WS_VISIBLE, WS_BORDER, WS_TABSTOP),
rect(416,208,536,232), nil, #amt2);
        setRightLabel(fld, rect(354,214,408,232), 11509 /* Amount */);
        fld:=newField(self, CBoxField, 2336, %BitOr(WS_CHILD, WS_VISIBLE,
WS_VSCROLL, WS_TABSTOP, CBS_SORT, CBS_DROPDOWNLIST), rect(102,232,330,352),
nil, #amtType3);
        setRightLabel(fld, rect(6,236,94,254), 11510 /* Amount Type */);
        fld:=newField(self, FloatField, 2340, %BitOr(/*FS_SEPERATOR*/ 0x2000,
ES_LEFT, WS_CHILD, WS_VISIBLE, WS_BORDER, WS_TABSTOP),
rect(416,232,536,256), nil, #amt3);
        setRightLabel(fld, rect(354,238,408,256), 11511 /* Amount */);
        fld:=newField(self, CBoxField, 2337, %BitOr(WS_CHILD, WS_VISIBLE,
WS_VSCROLL, WS_TABSTOP, CBS_SORT, CBS_DROPDOWNLIST), rect(102,256,330,352),
nil, #amtType4);
        setRightLabel(fld, rect(6,260,94,278), 11512 /* Amount Type */);
        fld:=newField(self, FloatField, 2341, %BitOr(/*FS_SEPERATOR*/ 0x2000,
ES_LEFT, WS_CHILD, WS_VISIBLE, WS_BORDER, WS_TABSTOP),
rect(416,256,536,280), nil, #amt4);
        setRightLabel(fld, rect(354,262,408,280), 11513 /* Amount */);
        fld:=newField(self, EditField, 2346, %BitOr(WS_CHILD, WS_VISIBLE,
WS_BORDER, WS_TABSTOP, ES_AUTOHSCROLL, ES_LEFT, 0x200L),
rect(102,294,170,318), nil, #taxpayerVerif);
        setRightLabel(fld, rect(14,288,94,320), 11514 /* Taxpayer Verification
*/);
        fld:=newField(self, ButtonField, 2313, %BitOr(WS_CHILD, WS_VISIBLE,
WS_TABSTOP, BS_DEFPUSHBUTTON), rect(186,326,266,350), 11515 /* &OK */,
#ok);
        fld:=newField(self, ButtonField, 2314, %BitOr(BS_PUSHBUTTON, WS_CHILD,
WS_VISIBLE, WS_TABSTOP), rect(270,326,350,350), 11516 /* &Clear */,
#clear);
        fld:=newField(self, ButtonField, 799, %BitOr(BS_PUSHBUTTON, WS_CHILD,
WS_VISIBLE, WS_TABSTOP), rect(472,326,552,350), 11517 /* &Help */, #help);
        fld:=newField(self, StaticField, 2364, %BitOr(SS_LEFT, WS_CHILD,
WS_VISIBLE), rect(212,154,538,172), nil, #dateTemplate);
}
``` disableAllAmts(self | numOfAmts)
  8/14/1991 11:02 Disable all amount fields.

```
{
    disableFields(self, $AmountFlds)
}
``` disableAllAmtTypes(self)
8/14/1991 11:02 Disable all amtType fields.

```
{
    disableFields(self, $AmtTypeFlds)
}
``` disableStateTaxFmt(self)
8/14/1991 11:02 Disable the stateTaxFmt field.

```
{
    disableField(self, #stateTaxFmt);
}
``` disableTaxType(self)
8/14/1991 11:02 Disable the taxType field.

```
{
    disableField(self, #taxType);
}
``` discDataTrigger(self, fld, code)
8/14/1991 11:02 Exit trigger for the discretionary data ivar.

```
{
  if isDirty?(fld)
    setDiscretionaryData(theFundsXfer, getField(fld));
  endif;
}
``` editDate(self, aDate, aColl | str1, str2, num1, num2)
2/12/1992 11:02 Edit periodEndDate based on stateTaxFmt. If aDate meets the edit criteria for any of the data formats in aColl, aDate is considered valid.

```
{
    if isNumeric(aDate)
      select
        case (size(aDate) == 2) cand (MM in aColl)
          num1 := asInt(aDate, 10);
          if between(num1, 1, 12)
            ^0;
          endif;
        endCase
        /*---------------------------------------------------------------*/
        /* This case must be prior to the YYQ case, since it is a superset */
        /* of YYQ.  It must be executed before the YYQ case.             */
        /*---------------------------------------------------------------*/
        case (size(aDate) == 3) cand (YYN in aColl)
          str1 := subString(aDate, 2, 3);
          num1 := asInt(str1, 10);
          if between(num1, 0, 9)
            ^0;
          endif;
        endCase
        case (size(aDate) == 3) cand (YYQ in aColl)
          str1 := subString(aDate, 2, 3);
          num1 := asInt(str1, 10);
          if between(num1, 1, 4)
            ^0;
          endif;
        endCase
        case (size(aDate) == 4) cand ((YYMM in aColl) cor (CCYY in aColl))
          /* Is it YYMM format? */
          str1 := subString(aDate, 2, 4);
          num1 := asInt(str1, 10);
```

```
          if between(num1, 1, 12)
            ^0;
          endif;
          /* Is it CCYY format? */
          str1 := subString(aDate, 0, 2);
          num1 := asInt(str1, 10);
          if between(num1, 19, 21)
            ^0;
          endif;
        endCase
        case (size(aDate) == 6) /* YYMMDD */
          str1 := subString(aDate, 2, 4);
          num1 := asInt(str1, 10);
          str2 := subString(aDate, 4, 6);
          num2 := asInt(str2, 10);
          if (between(num1, 1, 12)) cand (between(num2, 1, 31))
            ^0;
          endif;
        endCase;
      endSelect;
    endif;

^nil;
}
``` editField(self, aFld, aRule | minSize, maxSize, justify, aFiller)

3/19/1992 10:45 Apply edit rules to aFld. NOTE: This method won't be called by all triggers. For example, periodEndDate has special rules that apply only to dates. Other fields, like TaxTypes and AmountCodes are, in effect, pre-edited because they can only be selected from a ComboBox.

```
{
    if (minSize := minSize(aRule)) cand (size(aFld) < minSize)
       errorBox(loadString(15065) /* MoreTXP Edit Error */,
                asString(aFld) + loadString(15066) /* is less than the
minimum required length. */ );
       ^nil;
    endif;

if (maxSize := maxSize(aRule)) cand (size(aFld) > maxSize)
       errorBox(loadString(15067) /* MoreTXP Edit Error */ ,
                asString(aFld) + loadString(15068) /* is greater than the
maximum allowable length. */ );
       ^nil;
    endif;

if justify := justify(aRule)
       aFiller := fillWith(asString(justify[1]), maxSize - size(aFld));
       if justify[0] = 'L'
          aFld := aFld + aFiller;
       else
          aFld := aFiller + aFld;
       endif;
    endif;
}
``` enableAmts(self | numOfAmts)

8/14/1991 11:02 Enable the appropriate number of amount fields.

```
{
  numOfAmts := numOfAmts(self);

if numOfAmts >= 1
    enableField(self, #amt1);
  endif;

if numOfAmts >= 2
    enableField(self, #amt2);
  endif;
```

```
    if numOfAmts >= 3
        enableField(self, #amt3);
    endif;

if numOfAmts >= 4
        enableField(self, #amt4);
    endif;
}
``` enableAmtTypes(self | numOfAmts)
    8/14/1991 11:02 Enable the appropriate number of amtType fields.

```
{
    numOfAmts := numOfAmts(self);

if numOfAmts >= 1
        enableField(self, #amtType1);
    endif;

if numOfAmts >= 2
        enableField(self, #amtType2);
    endif;

if numOfAmts >= 3
        enableField(self, #amtType3);
    endif;

if numOfAmts >= 4
        enableField(self, #amtType4);
    endif;
}
``` enableTaxType(self)
    8/14/1991 11:02 Enable the taxType field.

```
{
    enableField(self, #taxType);
}
``` enableTriggersRepetitive(self | setup amtTypes amounts)
    1/6/1992 13:46 This method is invoked when initializing triggers, and it is
    discovered that the payment is repetitive.

```
{ setup := addenda(setup(parent));
    if size(stateCode(setup)) > 0
    then addChangeTrigger(self[#stateTaxFmt], self, #setupFieldChanged);
    endif;
    size(taxType(setup)) > 0 cand addChangeTrigger(self[#taxType], self,
#setupFieldChanged);
    if size(taxpayerId(setup)) > 0
    then addChangeTrigger(self[#taxpayerId], self, #setupFieldChanged);
    endif;
    if periodEndDate(setup)
    then addChangeTrigger(self[#periodEndDate], self, #setupFieldChanged);
    endif;
    if amtTypes := amtTypes(setup)
    then /* set triggers if any of the types are non-blank */
        size(amtTypes[0]) > 0 cand addChangeTrigger(self[#amtType1], self,
#setupFieldChanged);
        size(amtTypes[1]) > 0 cand addChangeTrigger(self[#amtType2], self,
#setupFieldChanged);
        size(amtTypes[2]) > 0 cand addChangeTrigger(self[#amtType3], self,
#setupFieldChanged);
        size(amtTypes[3]) > 0 cand addChangeTrigger(self[#amtType4], self,
#setupFieldChanged);
    endif;
    if amounts := amounts(setup)
    then /* set triggers for non-zero amounts */
        if amounts[0] cand amounts[0] <> 0
        then addChangeTrigger(self[#amt1], self, #setupFieldChanged);
        endif;
```

```
        if amounts[1] cand amounts[1] <> 0
        then addChangeTrigger(self[#amt2], self, #setupFieldChanged);
        endif;
        if amounts[2] cand amounts[2] <> 0
        then addChangeTrigger(self[#amt3], self, #setupFieldChanged);
        endif;
        if amounts[3] cand amounts[3] <> 0
        then addChangeTrigger(self[#amt4], self, #setupFieldChanged);
        endif;
      endif;
      if size(taxpayerVerif(setup)) > 0
      then addChangeTrigger(self[#taxpayerVerif], self, #setupFieldChanged);
      endif;
    }
``` fillAmtBoxes(self, defaultFlag | numOfAmts, amtTypes, aType, anAmt)

12/18/1991 12:39 Fills amtType/amount ComboBoxes depending on the numOfAmts allowed for this taxType. NOTE: If defaultFlag is nil, the default value should be the amtType from the TXPAddendum. If defaultFlag is non-nil, the ComboBox should be emptied, the underlying ivar should be nil'ed, and the default value should be the first item in the list.

```
    {
      numOfAmts := numOfAmts(self);
      amtTypes := amtTypes(aRec);

if defaultFlag
        clearAmtTypes(self); /* Empty ComboBoxes. */
        nilAmtTypes(self); /* Nil the ivars. */
      endif;

if numOfAmts >= 1 /* At least one amtType/amount pair is allowed. */
        fillAmtTypes(aRec, self[#amtType1]);
        if defaultFlag
          setCurSel(self[#amtType1], -1);
        else
          (aType := asString(amtTypes[0])) cand not(isBlank(aType)) cand
          (findString(self[#amtType1], aType));
        endif;
        if anAmt := amounts(aRec)[0]
          setField(self[#amt1], anAmt);
        endif;
      else
        ^nil;
      endif;

if numOfAmts >= 2
        fillAmtTypes(aRec, self[#amtType2]);
        if defaultFlag
          setCurSel(self[#amtType2], -1);
        else
          (aType := asString(amtTypes[1])) cand not(isBlank(aType)) cand
          (findString(self[#amtType2], aType));
        endif;
        if anAmt := amounts(aRec)[1]
          setField(self[#amt2], anAmt);
        endif;
      else
        ^nil;
      endif;

if numOfAmts >= 3
        fillAmtTypes(aRec, self[#amtType3]);
        if defaultFlag
          setCurSel(self[#amtType3], -1);
        else
          (aType := asString(amtTypes[2])) cand not(isBlank(aType)) cand
          (findString(self[#amtType3], aType));
        endif;
        if anAmt := amounts(aRec)[2]
          setField(self[#amt3], anAmt);
        endif;
```

```
    else
      ^nil;
    endif;

if numOfAmts >= 4
      fillAmtTypes(aRec, self[#amtType4]);
      if defaultFlag
        setCurSel(self[#amtType4], -1);
      else
        (aType := asString(amtTypes[3])) cand not(isBlank(aType)) cand
        (findString(self[#amtType4], aType));
      endif;
      if anAmt := amounts(aRec)[3]
        setField(self[#amt4], anAmt);
      endif;
    else
      ^nil;
    endif;
}
``` fillStateTaxFmtBox(self, defaultFlag)

11/25/1991 14:34 Fill the stateTaxFmt ComboBox with all possible
stateCode/stateTaxFmt combinations. NOTE: If defaultFlag is 0 or -1, the
default value should be blank (-1) or the first value in the list (0). If
defaultFlag is nil, the default value should be the stateTaxFmt from the
TXPAddendum. NOTE: All stateTaxFmts are displayed with a 2-character
state code in the first two positions.

```
{ if not(aRec)
    ^self;
  endif;
  getCount(self[#stateTaxFmt]) ~= 0 cand
    (clearStateTaxFmt(self)) cand /* Empty ComboBox. */
    (setStateTaxFmt(aRec, nil)); /* Nil the ivar. */
  fillAllStateTaxFmts(aRec, self[#stateTaxFmt]);

if defaultFlag
    setCurSel(self[#stateTaxFmt], defaultFlag);
  else
    findString(self[#stateTaxFmt],
      (stateCode(aRec) cor NULLSTR) + SPACE + (stateTaxFmt(aRec) cor
NULLSTR));
  endif;
}
``` fillTaxTypeBox(self, defaultFlag | taxType)

12/18/1991 12:39 Fills the taxType ComboBox depending on the
stateTaxFmt. NOTE: If defaultFlag is 0 or -1, and the default value
should be blank (-1) or the first value in the list (0). If defaultFlag is nil,
the default value should be the taxType from the TXPAddendum.

```
{ if stateTaxFmt(aRec)
    then /* if the addendum has a stateTaxFmt... */
      if (defaultFlag == 0) cor (defaultFlag == -1)
      then dispatchOff(self);
        clearField(self[#taxType]);
        setTaxType(aRec, nil); /* Nil the ivar. */
        fillTaxTypes(aRec, self[#taxType]);
        setCurSel(self[#taxType], defaultFlag);
        dispatchOn(self);
      else fillTaxTypes(aRec, self[#taxType]);
        taxType(aRec) cand findString(self[#taxType], taxType(aRec));
      endif;
    endif;
}
``` getRules(self)
> 4/3/1992 12:02

```
{
    ^currentRules := formatTxpFields(TXPAddendum:late, stateTaxFmt(aRec));
}
``` initFields(self | val, setup, taxType, amtTypes)
> 8/14/1991 10:52 Initialize all fields. After all the fields are loaded, refer to
> the parent to obtain the setup, and if there is one, enable setup change
> triggers.

```
{ disable(self[#discData]); /* We will not support in Phase 1. */
  setField(self[#memo], memo(theFundsXfer));
  setField(self[#discData], discretionaryData(theFundsXfer));
  prepareAddendum(self);
  parent cand (setup := setup(parent)) cand addenda(setup) cand
enableTriggersRepetitive(self);
  initFieldHelp(self,helpFields(self));
}
``` initForm(self)
> 8/14/1991 10:52 Initialize all fields and setup up all triggers prior to
> displaying self. 8/6/92 ADC: Removed setting of limit on date field. It's a
> pic field, not a plain edit.

```
{ startErrorLogging(self);
  setLimit(self[#memo], 70);
  setLimit(self[#discData], 2);
  setLimit(self[#taxpayerId], 15);
  setLimit(self[#taxpayerVerif], 6);
  initForm(self:ancestor);
}
``` initFromDetails(self)
> 2/14/1992 2:12 DH PRIVATE: Initialize fields from details.

```
{
    disableFields(self, $AllTxpFlds);
}
``` initFromExisting(self | aDate)
> 2/14/1992 2:12 DH PRIVATE: Initialize all fields from an existing
> TXPAddendum. 8/4/92 ADC: Put adjustment of fields to the end, because
> when at beginning things don't work; the amount fields don't get filled.
> 8/6/92 ADC: Put filling of date at end. Can't set a pic field and then set
> its format.

```
{ /* Fill fields. */
  fillStateTaxFmtBox(self, nil); /* nil = default is from addendum */
  setField(self[#taxpayerId], taxpayerId(aRec));
  fillTaxTypeBox(self, nil); /* nil = default is from addendum */
  setField(self[#taxpayerVerif], taxpayerVerif(aRec));
  enableFields(self, $AllTxpFlds);
  disableAllAmtTypes(self); /* disable all amtType/amount fields */
  disableAllAmts(self);
  enableAmtTypes(self); /* re-enable based on taxType */
  enableAmts(self);
  fillAmtBoxes(self, nil);
  limitTyped(self); /* Set field lengths */
  setField(self[#periodEndDate], ((aDate := periodEndDate(aRec))
  cand asX12(aDate)) cor otherEndDate(aRec) cor NULLSTR);
}
``` initFromNew(self)

2/14/1992 2:12 DH PRIVATE: Initialize all fields for a new TXPAddendum.

```
{ dispatchOff(self);
  fillStateTaxFmtBox(self, -1);
  dispatchOn(self);
  disableFields(self, $AllTxpFlds);
  enable(self[#stateTaxFmt]);
}
``` initTriggers(self)

8/14/1991 10:52 Set up all triggers

```
{
  initTriggers(self:ancestor);
  initFldValidation(self, $StdFldVal);
  addExitTrigger(self[#memo], self, #memoTrigger);
  addExitTrigger(self[#discData], self, #discDataTrigger);
  addExitTrigger(self[#taxpayerId], self, #taxpayerIdTrigger);
  addExitTrigger(self[#periodEndDate], self, #periodEndDateTrigger);
  addExitTrigger(self[#taxpayerVerif], self, #taxpayerVerifTrigger);
  addChangeTrigger(self[#stateTaxFmt], self, #stateTaxFmtTrigger);
  addChangeTrigger(self[#taxType], self, #taxTypeTrigger);
  do($AmtTypeFlds,
  { using(elem) addExitTrigger(at(self, elem), self, #amtTypeTrigger);
  });
  do($AmountFlds,
  { using(elem) addExitTrigger(at(self, elem), self, #amtTrigger);
  });
}
``` isComplete(self | rules, aRule)

4/1/1992 13:02

```
{ if stateTaxFmt(aRec)
  then
    if getRules(self)
    then assocsDo(currentRules,
      { using(elem) (mandOrOpt(value(elem)) = 'M') cand
(size(self[key(elem)]) < 1);
/*        cand printLine(tuple(label(self[key(elem)]), loadString(15064)*/
/* Empty */ /* ) );*/
      });  /* dbError */
      ^nil;
    endif;
  else /* dbError */
    beep();
    ^nil;
  endif;
}
``` limitTyped(self)

8/4/1992 15:46 ADC: Sets limits and ranges on fields.

```
{ if getRules(self)
  then adjustTaxPayerId(self);
    adjustPeriodEndDate(self);
    adjustTaxPayerVer(self);
    adjustAmts(self);
  endif;
}
``` memoTrigger(self, fld, code)

8/14/1991 11:02 Exit trigger for the memo ivar.

```
{
  if isDirty?(fld)
```

```
        setMemo(theFundsXfer, getField(fld));
      endif;
}
``` nilAmts(self)

8/14/1991 11:02 Set all amount ivars of the addendum to nil. 7/31/92 ADC: Passes fieldIDs to the TXPAddendum.

```
{ do($AmountFlds,
    { using(fieldID) setAmt(aRec, nil, fieldID);
    });
}
``` nilAmtTypes(self)

8/14/1991 11:02 Empty all amtType ComboBoxes. 7/31/92 ADC: Passes field id's to the TXPAddendum.

```
{ do($AmtTypeFlds,
    { using(fieldID) setAmtType(aRec, nil, fieldID);
    });
}
``` numOfAmts(self | aSet, aCtr)

2/5/1992 10:44 DH Return the number of amount/amtType fields that should be enabled for this stateTaxFmt.

```
{ aSet := %Set(#amtType1, #amtType2 , #amtType3, #amtType4);
  aCtr := 0;
  if getRules(self)
  then keysDo(currentRules,
    {using(aKey) (aKey in aSet) cand (aCtr := aCtr + 1);
    });
  endif;
  ^aCtr;
}
``` okAction(self, fld, code | tranOK)

8/1/1991 16:48 Trigger for OK button. Set the segment type and return theFundsXfer to first screen. 8/5/92 ADC: Sets addenda to nil here if the clear action has been selected and the object is clean.

```
{ showWaitCurs();
  clear(UPCServices[#errorMessages]);
  setOk(UPCServices[#dataChecker], true);
  if not(aRec) cor not(isDirty(aRec))
  then clearFlag cand setAddenda(theFundsXfer, nil);
    ^endModal(self, true); /* Free-form X12 details present or
      current addendum has not been modified. */
  endif;
  if isSetup(theFundsXfer) cand isBlank(setupName(aRec))
  then setSetupName(aRec, setupName(theFundsXfer))
  else not(xferRefNum(aRec)) cand setXferRefNum(aRec,
    xferRefNum(theFundsXfer));
  endif;
  if not(tranOK := isValid?(aRec))
  then showOldCurs();
    tranOK := showDataCheckerResults(self); /* operator may override
      warnings */
  endif;
  showOldCurs();
  if tranOK
  then setAddenda(theFundsXfer, aRec);  /* Attach the addenda to the
    fundsXfer. */
    ^endModal(self, true);
  endif;
}
``` periodEndDateTrigger(self, fld, code | rules, aRule, aColl, theDate)

2/1/1991 11:02 Exit trigger for the periodEndDate field. 7/24/92 Reorganized and permits you to get out of the field if the length of the string is 0. ADC, 7/24/92. 8/3/92 ADC: Handles case of zero length date.

```
{ select
    case not(isDirty?(fld))
    is ;
    endCase
    case size(theDate := getField(fld)) == 0
    is setPeriodEndDate(aRec, nil);
       setOtherEndDate(aRec, nil);
    endCase
    case not(getRules(self))
    is ; /* Should not happen */
    endCase
    case not((aRule := currentRules[#periodEndDate]) cand aColl :=
dateFormats(aRule))
       is errorBox(loadString(15071) /* Invalid period end date */
       , loadString(15072)); /* Date cannot be edited */
    endCase
    case not(editDate(self, theDate, aColl))
    is
       new(ErrorBox,
          self,
          loadString(15075), /* Period end date does not comply with any
known date format. */
          loadString(15074) /* Invalid date format */,
          MB_ICONEXCLAMATION bitOr MB_OK);
       setFocus(self[#periodEndDate]);
    endCase
    case size(theDate) == 6
    is setPeriodEndDate(aRec, date(new(Date), asInt(subString(theDate, 2,
4), 10),
       asInt(subString(theDate, 4, 6), 10), asInt(subString(theDate, 0, 2),
10)) );
       setOtherEndDate(aRec, nil);
    endCase
    default setOtherEndDate(aRec, theDate);
       setPeriodEndDate(aRec, nil);
  endSelect;
}
``` prepareAddendum(self)

3/12/1992 12:21 Either retrieves or creates a new addendum.

```
{
  select
     case details(theFundsXfer) /* If the details ivar is already filled,
that means that
        a user entered a free-form X12 type instruction. All other fields
should be disabled
        except for memo and discretionary data. */
        initFromDetails(self);
     endCase
     case addenda(theFundsXfer)
        /* If there's already a TXPAddendum,
           display its ivars. */
        aRec := deepCopy(addenda(theFundsXfer));
        initFromExisting(self);
     endCase
     default /* No details and no addenda - prepare for entry of new
TXPAddendum. */
        aRec := new(TXPAddendum); /* Make a new addendum */
        initFromNew(self);
  endSelect;
}
``` removeTriggersRepetitive(self)

1/6/1992 13:46 This method is invoked to get rid of all the triggers indicating a change was made to a setup field.

```
{ removeTriggersByName(self, #setupFieldChanged);
}
``` setupFieldChanged(self, fld, code)

1/6/1992 14:03 The payment is repetitive, and there was a change to a setup field. Notify the parent window.

```
{
  removeTriggersRepetitive(self);
  ^setupFieldChanged(parent, nil, nil);
}
``` showDataCheckerResults(self | ret)

3/16/1992 15:09 Show what the data checker has to show.

```
{ select
      case numMsgs(UPCServices[#errorMessages], LIS_DATA_ERROR) > 0 /* hard
errors */
      is messageBox(UPCServices[#errorMessages], self, instType(theFundsXfer)
+ loadString(15061) /* not accepted */ ,
          caption(class(self)), MB_OK);
      endCase
      case numMsgs(UPCServices[#errorMessages], LIS_DATA_WARNING) > 0 /*
warnings */
      is ret := messageBox(UPCServices[#errorMessages], /* operator can
override warnings */
          self, instType(theFundsXfer) + loadString(15062) /* warning */ ,
caption(class(self)), MB_OKCANCEL);
          ret == IDOK cand addToActivityLog(UPCServices[#errorMessages],
LIS_DATA_WARNING);
      endCase
      default /* Only other possibility is database errors. */
          messageBox(UPCServices[#errorMessages], self, instType(theFundsXfer)
+ loadString(15061) /* not accepted */ ,
          caption(class(self)), MB_OK);
    endSelect;
    clear(UPCServices[#errorMessages]);
    ^ret == IDOK;
}
``` start(self, aFundsXfer)

8/19/1991 15:24

```
{
  theFundsXfer := aFundsXfer;
  start(self:ancestor, theFundsXfer);
}
``` stateTaxFmtTrigger(self, fld, code)

8/14/1991 11:02 Exit trigger for stateTaxFmt field. NOTE: Once the stateTaxFmt name is known, the tax type ComboBox may be enabled. Fill the taxType ComboBox without a default.

```
{ if isDirty?(fld)
    then showWaitCurs();
      setStateTaxFmtByStr(aRec, trimTrailing(getField(fld), SPACE));
      dispatchOff(self);
      fillTaxTypeBox(self, -1); /* Refill the tax type box */
      clearField(self[#taxpayerId]); /* Clear taxType, fields. */
      clearField(self[#periodEndDate]);
      clearAmtTypes(self);
      clearAmts(self);
      clearField(self[#taxpayerVerif]);
```

```
        setTaxType(aRec, nil); /* Nil fields of the data base record */
        setTaxpayerId(aRec, nil);
        setOtherEndDate(aRec, nil);
        setPeriodEndDate(aRec, nil);
        nilAmtTypes(self);
        nilAmts(self);
        setTaxpayerVerif(aRec, nil);
        disableAllAmtTypes(self);/* Enable other fields and adjust their
            lengths. */
        disableAllAmts(self);
        enableTaxType(self);
        enableFields(self, $TxpFlds);
        limitTyped(self);
        dispatchOn(self);
        showOldCurs(); /* Otherwise, the stateTaxFmt didn't change, so do
            nothing. */
    endif;
}
``` taxpayerIdTrigger(self, fld, code)
3/18/92 16:14 Exit trigger for the taxpayerId ivar.

```
{
    if isDirty?(fld)
        setTaxpayerId(theFundsXfer, getField(fld));
    endif;
}
``` taxpayerVerifTrigger(self, fld, code | rules, aRule, aFld)
3/18/92 16:14 Exit trigger for the taxpayerVerif ivar.

```
{
    if isDirty?(fld)
        aFld := getField(fld);
        if getRules(self)
            if aRule := currentRules[#taxpayerVer]
                editField(self, aFld, aRule);
            endif;
        endif;
        setTaxpayerVerif(theFundsXfer, aFld);
    endif;
}
``` taxTypeTrigger(self, fld, code | aStrm, taxType)
8/14/1991 11:02 Exit trigger for the taxType field. NOTE: Once the taxType is known, the amtType ComboBoxes and the amount fields may be enabled. Fill the taxType ComboBox without a default. NOTE: fld is presumed to be a String which contains the taxType up to the first blank.

```
{
    aStrm := streamOver(getField(fld));
    taxType := word(aStrm, ' ');

if isDirty?(fld)
        setTaxType(aRec, taxType);
        /* Clear the amtType/amount fields. */
        clearAmtTypes(self);
        nilAmtTypes(self);
        clearAmts(self);
        nilAmts(self);
        /* Enable and fill the appropriate number of amtType/amount fields. */
        disableAllAmtTypes(self);
        disableAllAmts(self);
        enableAmtTypes(self);
        enableAmts(self);
        fillAmtBoxes(self, 0);
    /* Otherwise, the taxType didn't change, so do nothing. */
    endif;
}
```

Instruction

Source file:                    INSTRUCT.CLS

Inherits from:                  Object BusinessObject

Inherited by:                   FundsXfer ACH CCD CTP CTX PPD TXP
                                BranchPmt WillReceive Wire Formal class which defines common characteristics and behaviors of instructions to the bank. Sub-types include payments, commercial paper, commercial loan drawdowns, etc.

Instance variables:

| | |
|---|---|
| dirtyFlds | (From class BusinessObject) |
| dateLastChgd | (From class BusinessObject) |
| dateLastUsed | (From class BusinessObject) |
| lastChangedTime | (From class BusinessObject) |
| oldKey | (From class BusinessObject) |
| stamp | (From class BusinessObject) |
| dbQueryLock | (From class BusinessObject) |
| dbQuery | (From class BusinessObject) |
| record | (From class BusinessObject) |
| custAcct | customer's FNBC account |
| custBranch | customer's FNBC branch |

Class variables:

| | |
|---|---|
| $DisplayRules | (From class BusinessObject) |
| $NonDisplayIvars | (From class BusinessObject) |
| $ReviewLvls | Review levels |

Class methods:                  (none)

Object methods:

amount(self)
> Return the amount ivar.
>
> ```
> {
>   ^record[#amount];
> }
> ``` ccyCode(self)

> ```
> {
>   ^ccyCode(custAcct(self));
> }
> ``` custAcct(self)
> Return the custAcct ivar.
>
> ```
> {
>   ^custAcct;
> }
> ``` custBranch(self)
> Return the custBranch ivar.

```
{
  ^custBranch;
}
``` dbOrCr(self)
> Return the dbOrCr ivar.

```
{
  ^record[#dbOrCr];
}
``` effDate(self)
> Return the effDate ivar.

```
{
  ^record[#effDate];
}
``` isCredit(self)
> Returns non-nil if credit.

```
{
  if dbOrCr(self) = CREDIT
    ^0;
  else
    ^nil;
  endif;
}
``` isDebit(self)
> Returns non-nil if debit.

```
{
  if dbOrCr(self) = loadString(4421) /* DB */
    ^0;
  else
    ^nil;
  endif;
}
``` memo(self)
> 7/17/1991 16:10

```
{
  ^record[#memo];
}
``` reviewed?(self)
> Return the reviewed? ivar.

```
{
  ^record[#reviewed?];
}
``` setAmount(self, aValue)
11-5-1991 AWH

```
{ addDirtyFld(self, #amount);
  ^record[#amount] := aValue;
}
``` setCustAcct(self, aValue)
11-5-1991 AWH

```
{ addDirtyFld(self, #custAcct);
  ^custAcct := aValue;
}
``` setCustBranch(self, aValue)
11-5-1991 AWH

```
{ addDirtyFld(self, #custBranch);
  ^custBranch := aValue;
}
``` setDbOrCr(self, aValue)
11-5-1991 AWH

```
{ addDirtyFld(self, #dbOrCr);
  ^record[#dbOrCr] := aValue;
}
``` setEffDate(self, aValue)
11-5-1991 AWH

```
{ addDirtyFld(self, #effDate);
  ^record[#effDate] := aValue;
}
``` setMemo(self, aValue)
11-5-1991 AWH

```
{ addDirtyFld(self, #memo);
  ^record[#memo] := aValue;
}
``` setReviewed?(self, aValue)
11-5-1991 AWH

```
{ addDirtyFld(self, #reviewed?);
  ^record[#reviewed?] := aValue;
}
```

FundsXfer

Source file:　　　　　　　　　　　FUNDSXFE.CLS

Inherits from:　　　　　　　　　　Object BusinessObject Instruction

Inherited by:　　　　　　　　　　 ACH CCD CTP CTX PPD TXP BranchPmt
　　　　　　　　　　　　　　　　　WillReceive Wire Formal class which defines the characteristics and behaviors common to all funds transfer formats. FundsXfer includes payments, will receives, and setups.

Instance variables:

| | |
|---|---|
| dirtyFlds | (From class BusinessObject) |
| dateLastChgd | (From class BusinessObject) |
| dateLastUsed | (From class BusinessObject) |
| lastChangedTime | (From class BusinessObject) |
| oldKey | (From class BusinessObject) |
| stamp | (From class BusinessObject) |
| dbQueryLock | (From class BusinessObject) |
| dbQuery | (From class BusinessObject) |
| record | (From class BusinessObject) |
| custAcct | (From class Instruction) |
| custBranch | (From class Instruction) |
| otherParty | beneficiary/participant - Party |
| otherPartyBank | beneficiary's bank - Bank |
| intermediary | Bank |
| details | additional details about the transaction |

Class variables:

| | |
|---|---|
| $DisplayRules | (From class BusinessObject) |
| $NonDisplayIvars | (From class BusinessObject) |
| $ReviewLvls | (From class Instruction) |
| $FieldsNotApplicable | ivars which do not apply to instances of this class |
| $PartySelectTbl | UPC Party Selection - Hierarchical Table |
| $InstTypes | dictionary loaded from database |
| $RouteCodes | dictionary of routing rules where key is | branch, instType, currency code and value is a dictionary of party types > oc of code types

| | |
|---|---|
| $CutOffTimeTbl | CutOff Time Table |
| $StatusGrpTbl | Status Grouping Table |
| $SetupSources | Setup Sources |

Class methods:

dbQuery(self)
    Returns an instance of receiver's associated DBQuery class.

```
{
    ^new(DBFundsXfer:late);
}
``` doesSetupExist(self, setupName)
    Returns true if the specified setup exists in the database.

```
{
    ^doesSetupExist(new(DBFundsXfer), setupName);
}
``` fieldsNotApplicable(self)
    11/14/1991 11:25

```
{ ^$FieldsNotApplicable
}
``` getMethod(self, code)
    Returns the appropriate get method given the route code label

```
{
    ^%Dictionary("SWIFT"->#swiftId, "ABA"->#abaNum, "CHIPS UID"->#chipsUid,
            "Indiv ID"->#achId, "Clearing Code"->&localClrCode)[code]
}
``` init(self)
11/13/1991 15:46

```
{
    $InstTypes := nil;
    $FieldsNotApplicable:=nil;
    $RouteCodes:=nil;
}
``` initPartySelectTbl(self)
7/23/1991 11:01

```
{
}
``` initSetupSources(self)
7/23/1991 11:01

```
{
    $SetupSources := new(Set, 2);
    add($SetupSources, #local);
    add($SetupSources, #host);
}
``` initStatusGrpTbl(self)
Modified 2/19/92 by AWH per Dick Clark

```
{
    $StatusGrpTbl := new(IdentityDictionary, 20);

add($StatusGrpTbl, #pendingApproval, %Set(PFA, PlA));
    add($StatusGrpTbl, #heldFromTransmission, %Set(HLD));
    add($StatusGrpTbl, #rejectedByApprover, %Set(RJA, RJO));
    add($StatusGrpTbl, #sentToFNBC, %Set(SNA));
    add($StatusGrpTbl, #pendingOffsiteApproval, %Set(POA));
    add($StatusGrpTbl, #acceptedByFNBC, %Set(ACK, CAK, ACR));
    add($StatusGrpTbl, #readyToSend, %Set(RTS));
    add($StatusGrpTbl, #rejectedByFNBC, %Set(RJC));
    add($StatusGrpTbl, #formattedButNotSent, %Set(FMT));
    add($StatusGrpTbl, #receivedButNotAccepted, %Set(RNA));
    add($StatusGrpTbl, #importPendingRepair, %Set(IPR));
    add($StatusGrpTbl, #workInProgress, %Set(WIP));
}
``` inSetupCurrency(self, xCcyAmt, amount, xCcyCode, custAcct | amountAndCode)
PAL 8/10/1992 9:22 Returns the amount value in the setup's currency, makeing the necessary conversions

```
{
    /*-----------------------------------------------------------------*/
    /* amountAndCode will contain either the (xCcyAmt and xCcyCode) or */
    /* the amount and code from the custAcct.                          */
    /*-----------------------------------------------------------------*/
    amountAndCode := xCcyAmtOrAmountAndCode(self, xCcyAmt, amount, xCcyCode,
                                    custAcct);

if amountAndCode[1] = xCcyCode
```

```
            ^amountAndCode[0];
        else
            ^convertTo(Currency, amountAndCode[1], amountAndCode[0], xCcyCode);
        endif;
    }
``` instTypes(self | name type)
11/13/1991 15:24

```
{
    if not($InstTypes) then
        $InstTypes := new(Dictionary, 20);
        doInstTypes(new(DBInstType),
        {using(record)
            name := trimBlanks(record["name"]);
            if type := typeFromName(self,
asUpperCase(trimBlanks(record["className"])))
                $InstTypes[name] := type;
            endif;
        });
    endif;

^$InstTypes;
}
``` new(self)
Create an instance of FundsXfer.

```
{
    ^init(new(self:Behavior));
}
``` newFromImport(self | aPmt)
Create an instance of a descendant of FundsXfer from imported records.

```
{
    aPmt := new(self:Behavior);
    importedOn(self);
    ^init(aPmt);
}
``` nonPendingStatuses(self)
Returns set of statuses which do not signify pending transactions.

```
{
    ^%Set(ACK, ACR, ACR);
}
``` numSetupApprovals(self)
10/25/1991 7:02

```
{
    ^numSetupApprovals(UPCServices[#fundsXferConfiguration]);
}
``` partyFromPartyType(self, partyType)
2/21/1992 11:03

```
{ ^%Dictionary("bank"->#otherPartyBank,
    "beneficiary"->#otherParty, "intermediaryBank"-
>#intermediary)[partyType];
}
``` query(self, key)

Reads a funds transfer or setup from the database, and returns a FundsXfer object.

```
{
    ^query(new(DBFundsXfer), key);
}
``` queryOnHostSetupName(self, key)

Reads a setup from the database using host setup name

```
{
    ^queryOnHostSetupName(new(DBFundsXfer), key);
}
``` routeCodes(self)

2/21/1992 8:36

```
{ ^$RouteCodes cor $RouteCodes:=routeRules(new(DBRouteRules));
}
``` setMethod(self, code)

Returns the appropriate set method given the route code label

```
{
    ^%Dictionary("SWIFT"->#setSwiftId, "ABA"->#setAbaNum, "CHIPS UID"-
>#setChipsUid,
                "Indiv ID"->#setAchId, "Clearing Code"-
>#setLocalClrCode)[code]
}
``` setup(self)

Returns a new setup.

```
{
    ^initSetup(new(self:Behavior));
}
``` statusGroup(self, aSym)

Return a Set of status code symbols given a symbolic grouping.

```
{
    ^$StatusGrpTbl[aSym]
}
``` summAmount(self, xCcyCode, xCcyAmt, amount | summAmount)

Returns the amount or, if there is a crosscurrency amount returns that for display in summary areas

```
{
    if size(xCcyCode) > 0
        summAmount := xCcyAmt;
    else
        summAmount := amount;
    endif;

^not(summAmount) cand 0.0
          cor summAmount;
}
``` summCcyCode(self, xCcyCode, custAcctNum)
    Returns xCcyCode. If xCcyCode is nil or empty, returns custAcctNum. If custAcctNum is nil, returns nil.

```
{
  if size(xCcyCode) > 0 /* maybe nil or empty string */
    ^xCcyCode;
  else
    if custAcctNum
      ^indexOf(custAcctNum, '-', 0) cand
         subString(custAcctNum, 8, 11) cor
         USD ;
    endif;
  endif;

^nil;
}
``` typeFromName(self, className)
    Returns the equivalent class.

```
{
  ^Classes[%Dictionary("CCD"->#CCD, "CTP"->#CTP, "CTX"->#CTX, "PPD"->#PPD,
    "TXP"->#TXP, "BRANCHPMT"->#BranchPmt, "WILLRECEIVE"->#WillReceive,
    "WIRE"->#Wire)[className]];
}
``` xCcyAmtOrAmountAndCode(self, xCcyAmt, amount, xCcyCode, custAcctNum | value, code)
    KM 8/6/92 Return the cross-currency amount and code if both are present. Otherwise, return amount and the ccyCode from the account used or USD. Needed for calculating non-repetitive approvals and operator daily and per transaction limits.

```
{
  if size(xCcyCode) > 0 cand xCcyAmt cand xCcyAmt<>0.0
    value := xCcyAmt;
    code := xCcyCode;
  else
    amount<>0.0 cand (value:=amount);

if custAcctNum cand indexOf(custAcctNum, '-', 0)
       code := subString(custAcctNum, 8, 11)
    else
       code := USD;
    endif;
  endif;

^tuple(value cor 0.0, code);
}
```

Object methods:

addDtlsIdx(self)
    Return the addDtlsIdx ivar.

```
{
  ^record[#addDtlsIdx];
}
``` asFundsXfer(self | aFundsXfer)
    Convert the receiver to a funds transfer of the same class, preserving some of the attributes of the original.

```
{ aFundsXfer := new(class(self));
  setCustAcct(aFundsXfer, custAcct(self));
  setCustBranch(aFundsXfer, custBranch(self));
  setInstType(aFundsXfer, instType(self));
  ^aFundsXfer;
``` asInstType(self, anInstType | type fundsXfer)

11/13/1991 15:17 Returns a new instance of an appropriate type of transaction e.g. WIRE, CCD Descendant classes override this to copy appropriate variables. 7/30/92 ADC: When mutating into an ACH, sets intermediary to a new phantom.

```
{ if type := instTypes(class(self))[anInstType]
    then fundsXfer := new(type);
      copyFlds(self, fundsXfer);
      if isACH(fundsXfer) cand not(isACH(self))
      then setAchInfo(fundsXfer);
        setIntermediary(fundsXfer, newPhantom(Bank)); /* ACH's don't have
intermediaries */
      endif;
      setInstType(fundsXfer, anInstType); /* Change in type causes a host
repetitive to
      become non-repetitive */
      setHostSetupName(fundsXfer, nil);
    endif;
    ^fundsXfer;
}
``` asPayment(self | aPmt hostName hostLength)

Modified 2/19/92 Convert self to a payment. Should obtain a reference number at this point, as the insert routine obtains when when the operator decides to commit the payment to the data base.

```
{
    aPmt := asPaymentCopy(self);
    setVar(aPmt, #setupUsed, setupName(self));
    setVar(aPmt, #setupName, nil);
    setVar(aPmt, #oldKey, nil);
    setHostSetupName(aPmt,hostName:=hostSetupName(self));
    /* if hostName above was nil then the setHostSetupName has already zeroed
       the lengthHostText, if hostName is non nil then set length to the
value from
       the setup */
    hostName cand setLengthHostText(aPmt,hostLength:=lengthHostText(self));

^aPmt;
}
``` asPaymentCopy(self | aPmt)

Modified 7/22/92. Makes a copy of self.

```
{ aPmt := deepCopy(self);
  resetAllOperators(aPmt); /* Sets all the approval operators to nil */
  setXferRefNum(aPmt,nil);
  if isACH(aPmt)
    then setAchInfo(aPmt);
  endif;
  ^aPmt;
}
``` asRemoteApproval(self | aTC, aStr, aStrm)

Convert self into an offsite approval status record.

```
aTC := new(TextCollection, 1);

/* Get the first original PC refNum */
aStrm := streamOver(origPcRefNum(self));
setPosition(aStrm, size(collection(aStrm)));

/* Add a tilde */
nextPutAll(aStrm, TILDE );

/* Add 'approved' or 'rejected' */
aStr := currStatus(self);
select
```

```
       case aStr = RTS
         nextPutAll(aStrm, loadString(4323) /* A */ );
       endCase
       case aStr = RJA
         setRejectReason(self, loadString(4345) /* REJECTED BY APPROVER */ );
         if update(self)
           nextPutAll(aStrm, loadString(4324) /* R */ );
           nextPutAll(aStrm, TILDE);
           nextPutAll(aStrm, rejectReason(self));
         else
           ^nil
         endif;
       endCase
       default
         ^nil;
    endSelect;

/* Add CR */
    nextPut(aStrm, CR);

add(aTC, collection(aStrm));

^aTC;
}
``` asSetup(self | aSetup)

Convert self to a Setup. Modified 2/19/92 by AWH per Dick Clark

```
{ if not(setupName(self))
  then aSetup := asPaymentCopy(self);
    setHostSetupName(aSetup, nil);
    setSetupUsed(aSetup, nil);
    setInitialSetupStatus(aSetup);
  else errorBox(loadString(4337) /* FundsXfer:asPayment */ ,
    loadString(4338) /* Temporary error message: */ + CR_LF +
loadString(4339) /* FundsXfer object must be a payment. */ );
    aSetup := nil;
  endif;
  ^aSetup;
}
``` assignNewPCRefNum(self)

5/12/1992 10:44

```
{ if not(xferRefNum(self)) then setXferRefNum(self, next(UPCServices[#BBS], loadString(4321) /*
fundsXferRefNumber */ ));
    endif;
}
``` assimBPR(self, flds, xferOwner | anAcct, aDbOrCr, aDBAccount, acctNum, branchCode, aBranch, aDBBranch)

5/20/1992 11:03

```
{
  /* BPR02 */
  setAmount(self, asReal(flds[1]));

/* BPR03 - This is a bit tricky: If the payment is a debit to the
     customer's account, it's a credit to the receiver's account. */ if (aDbOrCr := %Dictionary("C"->CREDIT, "D"->DB)[flds[2]])
    setDbOrCr(self, aDbOrCr);
  else
    logFldErr(xferOwner, 3, flds[2]);
    ^nil;
  endif;

/* BPR09 */
```

```
       if size(flds[8]) < 3
          logFldErr(xferOwner, 9, flds[8]);
          ^nil;
       endif;

aDBAccount := new(DBAccount:late);
       acctNum := subString(flds[8], 3, size(flds[8]));
       aDBBranch := dbQuery(Branch);

if (subString(acctNum, size(acctNum) - 2, size(acctNum)) =
   loadString(4317) /* .. */ )
          acctNum := subString(acctNum, 0, size(acctNum) - 3);
       endif;

branchCode := subString(flds[8], 0, 2);
       anAcct := query(aDBAccount, acctNum, branchCode);

if class(anAcct) = Account
          setCustAcct(self, anAcct);
       else
          logDBErr(xferOwner, aDBAccount, loadString(4318) /* Account: */ +
   branchCode + loadString(4319) /* - */ + acctNum);
          ^nil;
       endif;

/* Need to set branch ivar */
       if aBranch := query(aDBBranch, branchCode)
          setCustBranch(self, aBranch);
       else
          logDBErr(xferOwner, aDBBranch, loadString(4320) /* Branch: */ +
   branchCode + loadString(4319) /* - */ + acctNum);
          ^nil;
       endif;
       /* BPR16 */
       if size(flds[15]) < 3
          logFldErr(xferOwner, 16, flds[15]);
          ^nil;
       endif;

setEffDate(self, date(new(Date),
          asInt(subString(flds[15], 2, 4), 10),
          asInt(subString(flds[15], 4, 6), 10),
          asInt(subString(flds[15], 0, 2), 10))
       );
   }
``` assimDTM(self, flds)

```
   {

/* DTM02 */
   setCutOffDate(self, asCustomDate(flds[1], loadString(4325) /* YYMMDD */
   ));

/* DTM03 */
   setCutOffTime(self, time(new(Time),
       asInt(subString(flds[2], 0, 2), 10),
       asInt(subString(flds[2], 2, 4), 10),
       0)
      );

/* DTM04 */
   /* This was handled when the account was set and the asInstType was
   performed on the xfer */

}
``` asTransaction(self)
Converts the receiver from a setup to a transaction.

```
   {
      SetSetupUsed(self, setupName(self));
      setSetupName(self,nil);
``` bestValueDate(self | tempDate aCutOff afterCutOff? acctCurrency xCcy )

```
{
   aCutOff:=cutOff(CutOff,code(custBranch(self)),instType(self),
        size(xCcyCode(self))<>0 cand xCcyCode(self) cor
ccyCode(custAcct(self))));
   /* If there is no entry in the cutoff table for this insttype and
currency, just use today's
        date as the default (Should never happen.) */
   if not(aCutOff) then
     aCutOff:=new(CutOff);
     setCurrency(aCutOff,summCcyCode(self));
     setInstType(aCutOff,instType(self));
     setBranchCode(aCutOff,code(custBranch(self)));
     setCutoffTime(aCutOff,0);
     setCustAdjTime(aCutOff,0);
   endif;
   acctCurrency:=currency(Currency:late,ccyCode(custAcct(self)));
   if size(xCcyCode(self))>0 cor instType(self)=FOREIGN_CCY_WIRE then
     /* Add two days for all cross currency transactions */
     tempDate:=asDate(current(Date)+ 2);
     xCcy:=currency(Currency:late,ccyCode(custAcct));
   else
     tempDate:=asDate(current(Date)+defaultDaysFwd(aCutOff));
   endif;

/* Now keep advancing the date if necessary, until it is a business day
       for the branch, and not a currency holiday for the account holding
currency
       and, if there is one, the cross currency */
   loop
   while /*not(isBusinessDay?(custBranch,tempDate)) or*/
         not(isBusinessDay?(acctCurrency,tempDate)) or
         (size(xCcyCode(self))>0 cand not(isBusinessDay?(xCcy,tempDate)))
     begin tempDate:=next(tempDate);
   endLoop;
   ^tempDate;

}
``` calcAndSetNumApprReq(self | value baseAmount mgr amountAndCode)

2/13/1992 13:59 Dick Clark Calculates the number of approvals required for a non-repetitive payment.

```
{ if size(setupUsed(self)) = 0
  then
    value := 0;
    amountAndCode := xCcyAmtOrAmountAndCode(self);
    baseAmount := inBaseCurrency(Currency:late, amountAndCode[0],
amountAndCode[1]);
    mgr := UPCServices[#fundsXferConfiguration];
    if baseAmount > nonRepMaxAmt1(mgr)
    then
      if baseAmount > nonRepMaxAmt2(mgr)
      then value := 2;
      else value := 1;
      endif;
    endif;
    setNumApprReq(self, value);
  endif;
}
```

* problem comment and header * currStatus(self)

```
{
  ^record[#currStatus];
}
``` cutOff(self,aOfficial? |aCutOff,aTuple, acctCurrency, xCcyCurrency, aTuple2)
Compute & return cutoff date & time 10/21/1991 Changed 5/11/92 to use credit currency

```
{
  /* Use the effective date as the default cutoff date */
  setCutOffDate(self,effDate(self) cor current(Date));
  acctCurrency:=currency(custAcct(self));
  if not(isBlank(xCcyCode(self))) then
    xCcyCurrency:=currency(Currency,xCcyCode(self));
  endif;

/* Get the official cutoff & adjustment times */ aCutOff :=
  cutOff(CutOff,code(custBranch(self)),instType(self),summCcyCode(self));
  if not(aCutOff) then
    aCutOff:=new(CutOff);
    setCurrency(aCutOff,summCcyCode(self));
    setInstType(aCutOff,instType(self));
    setBranchCode(aCutOff,code(custBranch(self)));
  endif;
  /* If either of the necessary values is missing, make it 0 */
  if not(cutoffTime(aCutOff))
    setCutoffTime(aCutOff,0);
  endif;
  if not(custAdjTime(aCutOff))
    setCustAdjTime(aCutOff,0);
  endif;

/* Official or Unofficial (Adjusted) cutoff wanted? */
  if aOfficial?
    setCutOffTime(self, cutoffTime(aCutOff));
  else
    setCutOffTime(self, cutoffTime(aCutOff) + custAdjTime(aCutOff));
  endif;
  /* if cutoff time is negative backup the cutoff date */
  if cutOffTime(self)<0 then
      aTuple:=backup(CutOff:late, cutOffDate(self),
  abs(cutOffTime(self)),acctCurrency,xCcyCurrency);
      setCutOffTime(self,aTuple[0]);
      setCutOffDate(self,aTuple[1]);
  endif;
  /* Now make sure that the calculated cutoff date is a business day for the branch. */
  loop
  while not(isBusinessDay?(custBranch(self),asDate(cutOffDate(self))))
  begin
    setCutOffDate(self, previous(cutOffDate(self)));
  endLoop;

if timeZone(custBranch(self))==timeZone(UPCServices[#systemConfiguration])
  then
      ^tuple(cutOffDate(self),asTime(cutOffTime(self)));
  else /* First, convert customer's time & date to GMT values */
  aTuple :=
  toGMT(query(TimeZone,timeZone(custBranch(self))),cutOffDate(self),cutOffTime(self),
                 daylightSavings?(custBranch(self)));

/* Now convert GMT date & time to local zone's date & time and return values */
  aTuple2 :=
  fromGMT(query(TimeZone,timeZone(UPCServices[#systemConfiguration])),
  aTuple[0],aTuple[1],daylightSavings?(UPCServices[#systemConfiguration]));
    ^aTuple2;
  endif;

}
``` cutOffDate(self)

```
{
    ^record[#cutOffDate];
}
``` cutOffTime(self)

```
{
    ^record[#cutOffTime];
}
``` details(self)
> Return the details ivar.

```
{
    ^details;
}
``` determineCodeTypes(self, partyType | branch ccy instType)
> 2/24/1992 15:41 Determines the proper ordered collection of route codes using attributes of self. Party is a string, and should be either "beneficiary", "bank", or "intermediaryBank".

```
{ branch := branchCode(custAcct(self));
  ccy := summCcyCode(self);
  instType := instType(self);
  ^routeCodes(class(self))[tuple(branch, instType, ccy)][partyType]
}
``` docRefNum(self)
> Return the docRefNum ivar as a String.

```
{
    ^record[#docRefNum];
}
``` effDate(self)

```
{
    ^record[#effDate];
}
``` entererId(self)

```
{
    ^record[#entererId];
}
``` firstApproverId(self)

```
{
    ^record[#firstApproverId];
}
``` hasAddendaOrDetails?(self)
> 7/14/1992 21:24

```
{ ^record[#hasAddendaOrDetails?];
}
``` hostSetupName(self)

Return the hostSetupName ivar.

```
{
    ^record[#hostSetupName];
}
``` imported?(self)

```
{ ^record[#imported?]
}
``` init(self | tmp)

11/6/91 This no longer obtains the next XferRefNum Send xferRefNum message to the CLASS, if creating an xFer that needs one (transaction browser, import, etc.)

```
{
  init(self:ancestor);
  setCurrStatus(self,NULLSTR);
  setDbOrCr(self, DB);
  setOtherParty(self,newPhantom(Party));
  setOtherPartyBank(self,newPhantom(Bank));
  setIntermediary(self,newPhantom(Bank));
}
``` initSetup(self)

Initialize a setup.

```
{
  init(self);
  setNumApprReq(self,
defaultNumRepApprovals(UPCServices[#fundsXferConfiguration]));
}
``` inSetupCurrency(self)

PAL 8/10/1992 9:22 Returns the amount value in the setup's currency, makeing the necessary conversions

```
{
    ^inSetupCurrency(class(self), xCcyAmt(self), amount(self),
xCcyCode(self),
                                          custAcct(self) cand
acctNum(custAcct(self)));
}
``` instType(self)

```
{
    ^record[#instType];
}
``` intermediary(self)

```
    ^intermediary;
}
``` isACH(self)
Fall-through method. Non-ACH FundsXfers return false.

```
{
  ^nil
}
``` isChipsWire?(self)

```
{
  if (mustBeChips?(self))
  /* REMOVE REFERENCE TO THIS LITERAL */
  cand (partyId(otherPartyBank(self)) = loadString(4327) /* FNBC NEW YORK
*/ )
    ^0;
  else
    ^nil;
  endif;
}
``` isDrawDown(self)

```
{ ^dbOrCr(self)= CREDIT  cand size(hostSetupName(self)) > 0
}
``` isHostRepetitive(self | aStr)
Return non-nil if created from a host setup.

```
{
  if (aStr := hostSetupName(self)) cand (not(isBlank(aStr)))
    ^0;
  else
    ^nil;
  endif;
}
``` isHostSetup(self)
1/8/1992 8:56

```
{ ^setupName(self) cand hostSetupName(self)
}
``` isImported(self)
Was this FundsXfer imported?

```
{
  ^imported?(self);
}
``` isNonRepetitive(self)
Return non-nil if created from scratch.

```
{
  if setupUsed(self)
    ^nil;
  else
    ^0;
  endif;
}
``` isRepetitive(self)
Return non-nil if created from a setup.

```
{
  if setupUsed(self)
    ^0;
  else
    ^nil;
  endif;
}
``` isSetup(self)
10/16/1991 8:56

```
{
  ^setupName(self)
}
``` isUsedByGroupMember(self)

Returns true if the receiver is referenced by any Trasaction Group member. Returns false otherwise or if an error occures. If no error occures getError(dbQuery(< <receiver> >)) = false.

```
{
  dbQuery := new(DBTrGrpMem:late);
  ^isSetupUsed(dbQuery, primaryKey(self));
}
``` isUsedByPendingTrans(self)
8/12/1992 16:28

```
{ if isSetup(self) then
    ^isUsedByPendingTrans(new(DBFundsXfer),setupName(self))
  else
    ^nil
  endif;
}
``` isValid?(self)

xferRefNum may be assigned here or in the Transaction Browser or in the Transaction Group Browser

```
{ if isSetup(self) then
      ^isValidSetup?(UPCServices[#dataChecker],self,false)
  else
    if not(xferRefNum(self)) then
       setXferRefNum(self, next(UPCServices[#BBS], loadString(4321) /* fundsXferRefNumber */ ));
    endif;
    ^isValidXfer?(UPCServices[#dataChecker],self)
  endif;
}
``` isValidForSetupGroup?(self)

```
{ if isSetup(self) then
      ^isValidSetup?(UPCServices[#dataChecker],self, true)
  else
    ^nil
  endif;
}
``` lengthHostText(self)

Returns stored length of text (details) from host setup

```
{
  ^record[#lengthHostText];
}
``` makeDTM(self, aStrm, segments | aStr, anInt, negative)
Create the DTM segment and place it in the Collection.

```
{
  /* DTM01 */
  nextPutAll(aStrm, loadString(4332) /* DTM*106* */ );

/* DTM02 */
  nextPutAll(aStrm, asX12(cutOffDate(self)));
  nextPutAll(aStrm, ASTERISK);

/* DTM03 */
  nextPutAll(aStrm, asX12(cutOffTime(self)));
  nextPutAll(aStrm, ASTERISK);

/* DTM04 - improvement here? */
  if timeZone(UPCServices[#systemConfiguration]) < 0
    nextPutAll(aStrm, asString('-'));
  else
    nextPutAll(aStrm, asString('+'));
  endif;
  nextPutAll(aStrm,
asPaddedString(abs(timeZone(UPCServices[#systemConfiguration])), 2));

add(segments, asSegment(aStrm));
}
``` makeSE(self, aStrm, segments)
Create the SE segment and place it in the Collection.

```
{
  nextPutAll(aStrm, loadString(4342) /* SE* */ );
  nextPutAll(aStrm, asString(size(segments)+1) + ASTERISK);
  nextPutAll(aStrm, asPaddedString(xferRefNum(self), 6));
  add(segments, asSegment(aStrm));
}
``` makeST(self, aStrm, segments)
Create the ST segment and place it in the Collection.

```
{
  nextPutAll(aStrm, loadString(4343) /* ST*820* */ );
  nextPutAll(aStrm, asPaddedString(xferRefNum(self), 6));
  add(segments, asSegment(aStrm));
  ^segments;
}
``` makeTRN(self, aStrm, segments | aStr)
Create the TRN segment and place it in the Collection.

```
{
  /* TRN01-TRN03 */
  nextPutAll(aStrm, loadString(4334) /* TRN*1*PR*ZZ* */ );

/* TRN04 */
  aStr := pcId(UPCServices[#systemConfiguration]);
  aStr := subString(aStr, 0, (size(aStr) - 2));
  nextPutAll(aStrm, aStr + ASTERISK);

/* TRN05, TRN06, TRN07 */
  nextPutAll(aStrm, loadString(4335) /* *** */ );

/* TRN08 */
  nextPutAll(aStrm, loadString(4336) /* ZZ* */ );
```

```
/* TRN09 */
nextPutAll(aStrm, asPaddedString(xferRefNum(self), 6));

add(segments, asSegment(aStrm));
}
``` maxAmtAllowed(self)

Returns maximum amount allowed for the transaction.

```
{
  ^record[#maxAmtAllowed]
}
``` mustBeChips?(self)

Return the mustBeChips? ivar.

```
{
  ^record[#mustBeChips?];
}
``` mustBeFedwire?(self)

Return the mustBeFedwire? ivar.

```
{
  ^record[#mustBeFedwire?];
}
``` numApprReq(self)

Returns number of approvals required for the transaction.

```
{
  ^record[#numApprReq];
}
``` officialCutOff(self)

Get Official (without adjustment) cutoff time 11/13/1991

```
{
  ^cutOff(self,YES );
}
``` origPcRefNum(self)

11-19-1991 AWH

```
{ ^record[#origPcRefNum]
}
``` otherParty(self)

Return the otherParty ivar.

```
{
  ^otherParty;
}
``` otherPartyAcct(self)

Return the otherPartyAcct ivar.

```
{
  ^record[#otherPartyAcct];
``` otherPartyBank(self)
   Return the otherPartyBank ivar.

```
{
  ^otherPartyBank;
}
``` primaryKey(self)
   Return the primary key.

```
{
  ^xferRefNum(self) cor setupName(self);
}
``` rejectCode(self)
   Return the rejectCode ivar.

```
{
  ^record[#rejectCode];
}
``` rejectReason(self)
   Return the rejectReason ivar.

```
  ^record[#rejectReason];
}
``` resetAllOperators(self)
   2/17/1992 14:29 Dick Clark Sets the enterer and approver id's to nil.

```
{ setEntererId(self, nil);
  setFirstApproverId(self, nil);
  setSecondApproverId(self, nil);
}
``` routeCodes(self, partyType | possibleCodes anOD aValue aParty)
   2/21/1992 10:29 returns an OrderedDictionary of associations label->value for all route codes for which value is non-nil e.g. routeCodes(anXfer,"bank")

```
{ /* get a Sorted Collection of possible codes*/
  possibleCodes:=
    routeCodes(FundsXfer:late)
  [tuple(code(custBranch(self)),instType(self),ccyCode(custAcct(self)))][part
yType];
  anOD:=new(OrderedDictionary,4);
  aParty:=perform(self,partyFromPartyType(FundsXfer:late,partyType));
  size(possibleCodes)>0 cand
  do(possibleCodes,
  {using(codeName)
      aValue:=perform(aParty,getMethod(FundsXfer:late,codeName));
      aValue cand aValue<>NULLSTR cand add(anOD,codeName,aValue);
  });
  ^anOD;

}
``` runMorePage(self, par)
   Runs the more page dialog on the receiver.

```
{
  ^runModal(MorePage, par, self);
}
``` runMorePageViewOnly(self, par)
    3/11/1992 14:50 Runs the view only version of the more details form.

```
{ ^runModal(ViewMorePage:late, par, self);
}
``` secondApproverId(self)

```
{
   ^record[#secondApproverId];
}
``` sessionNum(self)
    Return the sessionNum ivar.

```
{
   ^record[#sessionNum];
}
``` setAddDtlsIdx(self, aValue)
    11-6-1991 AWH

```
{ addDirtyFld(self, #addDtlsIdx);
  ^record[#addDtlsIdx] := aValue;
}
``` setConditionalPmt(self, setting)
    Fall-through method. Descendants override where applicable.

```
{
  ^nil;
}
``` setCurrStatus(self, aValue)
    11-6-1991 AWH

```
{ addDirtyFld(self, #currStatus);
  ^record[#currStatus] := aValue;
}
``` setCustInfoByStr(self, longAcctNum | acctKey aBranch anAcct)
    Update the custAcct and custBranch. aStr is presumed to be a long account number which may or may not contain a branch code in the first two positions.

```
{
  acctKey := keyFromLongAcctNum(Account, longAcctNum);

if (anAcct := query(Account, acctKey[0], acctKey[1])) cand
     (aBranch := query(Branch, acctKey[1]))
    setCustAcct(self, anAcct);
    setCustBranch(self, aBranch);
  endif;

^anAcct cand aBranch;
}
``` setCutOffDate(self, aValue)
    11-6-1991 AWH

```
{ addDirtyFld(self, #cutOffDate);
  ^record[#cutOffDate] := aValue;
}
``` setCutOffTime(self, aValue)
11-6-1991 AWH

```
{ addDirtyFld(self, #cutOffTime);
  ^record[#cutOffTime] := aValue;
}
``` setDeductCorrCharges(self, setting)
Fall-through method. Descendants override as needed.

```
{
  ^nil;
}
``` setDeductFromBene(self, setting)
Fall-through method. Descendants override as needed.

```
{
  ^nil;
}
``` setDetails(self, aValue)
05/01/92 AWH

```
{ addDirtyFld(self, #details);
  addDirtyFld(self, #hasAddendaOrDetails?);
  if aValue then
      setHasAddendaOrDetails?(self,'Y')
  else setHasAddendaOrDetails?(self,nil);
  endif;
  ^details := aValue cand evenOutLines(aValue,70);
}
``` setDocRefNum(self, aValue)
11-6-1991 AWH

```
{ addDirtyFld(self, #docRefNum);
  ^record[#docRefNum] := aValue;
}
``` setEffDate(self, aValue)

```
{ addDirtyFld(self, #effDate);
  ^record[#effDate] := aValue;
}
``` setEntererId(self, aValue)
11-6-1991 AWH

```
{ addDirtyFld(self, #entererId);
  ^record[#entererId] := aValue;
}
``` setFirstApproverId(self, aValue)
11-6-1991 AWH

```
{ addDirtyFld(self, #firstApproverId);
  ^record[#firstApproverId] := aValue;
}
``` setHasAddendaOrDetails?(self, aValue)

```
{
  addDirtyFld(self, #hasAddendaOrDetails?);
  ^record[#hasAddendaOrDetails?] := aValue;
}
``` setHostSetupName(self, aValue | dtls)
11-6-1991 AWH

```
{
  addDirtyFld(self, #hostSetupName);
  dtls := details(self);

/* if hostSetupName is being set to non-nil */
  if aValue
     /* if this is a setup, calculate the length of the details */
     isSetup(self) cand setLengthHostText(self, dtls cand
  byteSizeNoCRLF(details(self)) cor 0);
  else
     /* otherwise set length to zero */
     record[#lengthHostText] := 0;
  endif;

^record[#hostSetupName] := aValue;
``` setImported(self, aValue)
Turn the imported flag on (the FundsXfer was imported).

```
{
  addDirtyFld(self, #imported?);
  ^record[#imported?] := aValue;
}
``` setImported?(self, aValue)
11-6-1991 AWH

```
{ addDirtyFld(self, #imported?);
  ^record[#imported?] := aValue;
}
``` setInitialSetupStatus(self)
2/13/1992 11:20 Sets the initial status of a setup.

```
{ setCurrStatus(self, #(ACT PFA
P1A)[numSetupApprovals(UPCServices[#fundsXferConfiguration])]);
}
``` setInstType(self, aValue)
11-6-1991 AWH

```
{ addDirtyFld(self, #instType);
  ^record[#instType] := aValue;
}
``` setIntermediary(self, aValue)
11-6-1991 AWH

```
{ addDirtyFld(self, #intermediary);
  ^intermediary := aValue;
}
``` setIntermediaryByAba(self, abaNum | aQuery, aBank)

Fetch a Bank object from the database using an ABA number as the search key, then update the intermediary ivar. Update the intermediary ivar with a phantom Bank if the Bank was not in the database.

```
{
  aQuery := new(DBBank);
  if not(isBlank(abaNum)) cand (aBank := queryOnAba(aQuery, abaNum))
    setIntermediary(self, aBank);
    ^self;
  endif;

/* It's not in the database, so update the phantom. */
  setAbaNum(intermediary(self), abaNum);
}
``` setIntermediaryByChipsUid(self, chipsUid | aQuery, aBank)

Fetch a Bank object from the database using a chipsUid as the search key, then update the otherPartyBank ivar. Update the otherPartyBank ivar with a phantom Bank if the Bank was not in the database.

```
{
  aQuery := new(DBBank);
  if not(isBlank(chipsUid)) cand (aBank := queryOnChipsUid(aQuery,
chipsUid))
    setIntermediary(self, aBank);
    ^self;
  endif;

/* It's not in the database, so update the phantom. */
  setChipsUid(intermediary(self), chipsUid);
}
``` setIntermediaryById(self, anId | aBank)

Fetch a Bank object from the database using a partyId as the search key, then update the intermediary ivar. Update the intermediary ivar with a phantom Bank if the Bank was not in the database.

```
{
  if not(isBlank(anId)) cand (aBank := query(Bank, asUpperCase(anId)))
    cand isFinancialInst?(aBank)
    setIntermediary(self, aBank);
    ^aBank;
  endif;

/* It's not in the database, so update the phantom. */
  setName(intermediary(self), anId);
  ^nil;
}
``` setIntermediaryByLocalClrCode(self, localClrCode | aQuery, aBank)

Fetch a Bank object from the database using a localClrCode as the search key, then update the otherPartyBank ivar. Update the intermediary ivar with a phantom Bank if the Bank was not in the database.

```
{
  aQuery := new(DBBank);
  if not(isBlank(localClrCode)) cand (aBank :=
queryOnLocalClrCode(aQuery, localClrCode))
    setIntermediary(self, aBank);
    ^self;
  endif;

/* It's not in the database, so update the phantom. */
  setLocalClrCode(intermediary(self), localClrCode);
}
``` setIntermediaryBySwift(self, swiftId | aQuery, aBank)
Fetch a Bank object from the database using a SWIFT ID as the search key, then update the intermediary ivar. Update the intermediary ivar with a phantom Bank if the Bank was not in the database.

```
{
  aQuery := new(DBBank);
  if not(isBlank(swiftId)) cand (aBank := queryOnSwiftId(aQuery,
asUpperCase(swiftId)))
     setIntermediary(self, aBank);
     ^self;
  endif;

/* It's not in the database, so update the phantom. */
  setSwiftId(intermediary(self), swiftId);
}
``` setLengthHostText(self, len)
Sets stored length of text (details) from host setup

```
{
  ^record[#lengthHostText]:=len;
}
``` setMaxAmtAllowed(self, aValue)
11-6-1991 AWH

```
{ addDirtyFld(self, #maxAmtAllowed);
  ^record[#maxAmtAllowed] := aValue;
}
``` setMustBeChips?(self, aValue)
11-6-1991 AWH

```
{ addDirtyFld(self, #mustBeChips?);
  ^record[#mustBeChips?] := aValue;
}
``` setMustBeFedwire(self, setting)
Fall-through method. Descendants override where applicable.

```
{
  ^nil;
}
``` setMustBeFedwire?(self, aValue)
11-6-1991 AWH

```
{ addDirtyFld(self, #mustBeFedwire?);
  ^record[#mustBeFedwire?] := aValue;
}
``` setNumApprReq(self, aValue)
11-6-1991 AWH

```
{ addDirtyFld(self, #numApprReq);
  ^record[#numApprReq] := aValue;
}
``` setOrigPcRefNum(self, aValue)
11-6-1991 AWH

```
{ addDirtyFld(self, #origPcRefNum);
  ^record[#origPcRefNum] := aValue;
}
``` setOtherParty(self, aValue)
   11-6-1991 AWH

```
{ addDirtyFld(self, #otherParty);
  ^otherParty := aValue;
}
``` setOtherPartyAcct(self, aValue)
   11-6-1991 AWH

```
{ addDirtyFld(self, #otherPartyAcct);
  ^record[#otherPartyAcct] := aValue;
}
``` setOtherPartyBank(self, aValue)
   11-6-1991 AWH

```
{ addDirtyFld(self, #otherPartyBank);
  ^otherPartyBank := aValue;
}
``` setOtherPartyBankByAba(self, abaNum | aQuery, aBank)
   Fetch a Bank object from the database using an ABA number as the search key, then update the otherPartyBank ivar. Update the otherPartyBank ivar with a phantom Bank if the Bank was not in the database.

```
{
  aQuery := new(DBBank);
  if not(isBlank(abaNum)) cand (aBank := queryOnAba(aQuery, abaNum))
    setOtherPartyBank(self, aBank);
    ^self;
  endif;

/* It's not in the database, so update the phantom. */
  setAbaNum(otherPartyBank(self), abaNum);
}
``` setOtherPartyBankByChipsUid(self, chipsUid | aQuery, aBank)
   Fetch a Bank object from the database using a chipsUid as the search key, then update the otherPartyBank ivar. Update the otherPartyBank ivar with a phantom Bank if the Bank was not in the database.

```
{
  aQuery := new(DBBank);
  if not(isBlank(chipsUid)) cand (aBank:=queryOnChipsUid(aQuery, chipsUid))
    setOtherPartyBank(self, aBank);
    ^self;
  endif;

/* It's not in the database, so update the phantom. */
  setChipsUid(otherPartyBank(self), chipsUid);
}
``` setOtherPartyBankById(self, anId | aBank)
   Fetch a Bank object from the database using a partyId as the search key, then update the otherPartyBank ivar. Update the otherPartyBank ivar with a phantom Bank if the Bank was not in the database.

```
{
```

```
    if not(isBlank(anId)) cand (aBank := query(Bank, asUpperCase(anId)))
       cand isFinancialInst?(aBank)
      setOtherPartyBank(self, aBank);
      ^aBank;
    endif;

/* It's not in the database, so update the phantom. */
    setName(otherPartyBank(self), anId);
    ^nil;
``` setOtherPartyBankByLocalClrCode(self, localClrCode | aQuery, aBank)

Fetch a Bank object from the database using a localClrCode as the search key, then update the otherPartyBank ivar. Update the otherPartyBank ivar with a phantom Bank if the Bank was not in the database.

```
{
  aQuery := new(DBBank);
  if not(isBlank(localClrCode)) cand (aBank:=queryOnLocalClearCode(aQuery,
localClrCode))
     setOtherPartyBank(self, aBank);
     ^self;
  endif;

/* It's not in the database, so update the phantom. */
  setLocalClrCode(otherPartyBank(self), localClrCode);
}
``` setOtherPartyBankBySwift(self, swiftId | aQuery, aBank)

Fetch a Bank object from the database using a SWIFT ID as the search key, then update the otherPartyBank ivar. Update the otherPartyBank ivar with a phantom Bank if the Bank was not in the database.

```
{
  aQuery := new(DBBank);
  if not(isBlank(swiftId)) cand (aBank:=queryOnSwiftId(aQuery,
asUpperCase(swiftId)))
     setOtherPartyBank(self, aBank);
     ^self;
  endif;

/* It's not in the database, so update the phantom. */
  setSwiftId(otherPartyBank(self), swiftId);
}
``` setOtherPartyByAba(self, abaNum | aQuery, aBank)

Fetch a Bank object from the database using an ABA number as the search key, then update the otherPartyBank ivar. Update the otherPartyBank ivar with a phantom Bank if the Bank was not in the database.

```
{ aQuery := new(DBBank);
  if not(isBlank(abaNum)) cand (aBank := queryOnAba(aQuery, abaNum))
    then setOtherParty(self, aBank);
    else setOtherParty(self, newPhantom(Bank));
     setAbaNum(otherParty(self), abaNum);  /* It's not in the database, so
update the phantom. */
  endif;
}
``` setOtherPartyByChipsUid(self, chipsUid | aQuery, aBank)

Fetch a Bank object from the database using a chipsUid as the search key, then update the otherPartyBank ivar. Update the otherParty ivar with a phantom Bank if the Bank was not in the database.

```
{
  aQuery := new(DBBank);
  if not(isBlank(chipsUid)) cand (aBank := queryOnChipsUid(aQuery,
chipsUid))
     setOtherParty(self, aBank);
     ^self;
  endif;
```

```
        /* It's not in the database, so update the phantom. */
        setChipsUid(otherParty(self), chipsUid);
}
``` setOtherPartyById(self, anId | aParty, aBank)

Fetch a Party object from the database using a partyId as the search key, then update the otherParty ivar. Update the phantom in the otherParty ivar, if the Party was not in the database.

```
{
  if not(isBlank(anId)) cand (aParty := query(Party, asUpperCase(anId)))
    setOtherParty(self, aParty);
    ^aParty;
  endif;
  if not(isBlank(anId)) cand (aBank := query(Bank, asUpperCase(anId)))
    setOtherParty(self, aBank);
    ^aBank;
  endif;

/* It's not in the database, so update the phantom. */
  setName(otherParty(self), anId);
  ^nil;
}
``` setOtherPartyByIndivId(self, anId | aQuery, aParty, aBank)

Fetch a Party object from the database using a partyId as the search key, then update the otherParty ivar. Update the phantom in the otherParty ivar, if the Party was not in the database.

```
{
  if not(isBlank(anId)) cand (aParty := queryOnIndivId(new(DBParty), anId))
    setOtherParty(self, aParty);
    ^aParty;
  endif;

/* It's not in the database, so update the phantom. */
  setAchId(otherParty(self), anId);
  ^nil;
}
``` setOtherPartyByLocalClearCode(self, localClrCode | aQuery, aBank)

Fetch a Bank object from the database using a localClrCode as the search key, then update the otherPartyBank ivar. Update the otherParty ivar with a phantom Bank if the Bank was not in the database.

```
{
  aQuery := new(DBBank);
  if not(isBlank(localClrCode)) cand (aBank :=
queryOnLocalClearCode(aQuery, localClrCode))
    setOtherParty(self, aBank);
    ^self;
  endif;

/* It's not in the database, so update the phantom, but make sure it's
  a phantom bank, not a phantom party. */
  setOtherParty(self, asBank(otherParty(self)));
  setLocalClrCode(otherParty(self), localClrCode);
}
``` setOtherPartyBySwift(self, swiftId | aQuery, aBank)

Fetch a Bank object from the database using a SWIFT ID as the search key, then update the otherParty ivar. Update the otherPartyBank ivar with a phantom Bank if the Bank was not in the database.

```
{
```

```
        aQuery := new(DBBank);
        if not(isBlank(swiftId)) cand (aBank := queryOnSwiftId(aQuery,
    asUpperCase(swiftId)))
            setOtherParty(self, aBank);
            ^self;
        endif;

/* It's not in the database, so update the phantom, but make sure it's
        a phantom bank, not a phantom party. */
        setOtherParty(self, asBank(otherParty(self)));
        setSwiftId(otherParty(self), swiftId);
    }
``` setPriorityProc(self, setting)
Fall-through method. Descendants override where applicable.

```
    {
      ^nil;
    }
``` setRejectCode(self, aValue)
11-6-1991 AWH

```
    { addDirtyFld(self, #rejectCode);
      ^record[#rejectCode] := aValue;
    }
``` setRejectReason(self, aValue)
11-6-1991 AWH

```
    { addDirtyFld(self, #rejectReason);
      ^record[#rejectReason] := aValue;
    }
``` setRouteCode(self,name,value, partyType | aParty)
2/21/1992 9:59 e.g. setRoutecode(anXfer,"ABA","07100015,"bank")

```
    { aParty:=perform(self,partyFromPartyType(FundsXfer:late,partyType));
      perform(aParty, value, setMethod(FundsXfer:late,name));
    }
``` setSecondApproverId(self, aValue)
11-6-1991 AWH

```
    { addDirtyFld(self, #secondApproverId);
      ^record[#secondApproverId] := aValue;
    }
``` setSessionNum(self, aValue)
11-6-1991 AWH

```
    { addDirtyFld(self, #sessionNum);
      ^record[#sessionNum] := aValue;
    }
``` setSetupName(self, aValue)
Assigns setup name to <aValue>. Sends setSetupName to each detail.

```
    { addDirtyFld(self, #setupName);
      ^record[#setupName] := aValue;
```

```
            if details
              do(details,
              {using(aDetail)
                setSetupName(aDetail, aValue);
              });
            endif;
        }
``` setSetupUsed(self, aValue)
11-6-1991 AWH

```
{ addDirtyFld(self, #setupUsed);
  ^record[#setupUsed] := aValue;
}
``` setTrGroupMemId(self, aValue)
11-6-1991 AWH

```
{ addDirtyFld(self, #trGroupMemId);
  ^record[#trGroupMemId] := aValue;
}
``` setTrGroupName(self, aValue)
11-22-1991 AWH

```
{ addDirtyFld(self, #trGroupName);
  ^record[#trGroupName] := aValue;
}
``` setupName(self)
Return the setupName ivar.

```
{
  ^record[#setupName];
}
``` setupUsed(self)
Return the setupUsed ivar.

```
{
  ^record[#setupUsed];
}
``` setValueDate(self, aDate)

```
{
  setEffDate(self,aDate)
}
``` setXCcyAmt(self, aValue)
11-6-1991 AWH

```
{ addDirtyFld(self, #xCcyAmt);
  ^record[#xCcyAmt] := aValue;
}
``` setXCcyCode(self, aValue)
11-6-1991 AWH

```
{ addDirtyFld(self, #xCcyCode);
  ^record[#xCcyCode] := aValue;
}
``` setXCcyRate(self, aValue)
11-6-1991 AWH

```
{ addDirtyFld(self, #xCcyRate);
  ^record[#xCcyRate] := aValue;
}
``` setXferRefNum(self, aValue)
Assigns xferRefNum to <aValue>

```
{ addDirtyFld(self, #xferRefNum);
  ^record[#xferRefNum] := aValue;
}
``` summAmount(self)
Returns the amount or, if there is a crosscurrency amount returns that for display in summary areas

```
{
  ^summAmount(class(self), xCcyCode(self), xCcyAmt(self), amount(self));
}
``` summCcyCode(self)
Returns the currency code display string.

```
{
  ^summCcyCode(FundsXfer:late, xCcyCode(self),
          custAcct(self) cand acctNum(custAcct(self))));
}
``` trGroupMemId(self)

```
{
  ^record[#trGroupMemId];
}
``` trGroupName(self)

```
{
  ^record[#trGroupName];
}
``` unOfficialCutOff(self)
Get unOfficial (with adjustment) cutoff time 11/13/1991

```
{
  ^cutOff(self,nil);
}
``` x12AsUpperCase(self, segments | newSegs)
Convert all of the Strings in the segments Collection to upper case.

```
{
  newSegs := collect(segments,
                {using(aStr) asUpperCase(aStr)}
              );
  ^newSegs;
}
``` x12WithCR_LF(self, segments | newSegs)
   Append CR_LF to all of the Strings in the segments Collection.

```
{
  newSegs := collect(segments,
                  {using(aStr) aStr := aStr + CR_LF}
              );
  ^newSegs;
}
``` xCcyAmt(self)
   Return the xCcyAmt ivar.

```
{
  ^record[#xCcyAmt];
}
``` xCcyAmtOrAmountAndCode(self)
   KM 8/6/92 Return the cross-currency amount and code if both are present. Otherwise, return amount and the ccyCode from the account used or USD. Needed for calculating non-repetitive approvals and operator daily and per transaction limits.

```
^xCcyAmtOrAmountAndCode(class(self), xCcyAmt(self), amount(self),
xCcyCode(self),                                    custAcct(self) cand
acctNum(custAcct(self)));
}
``` xCcyCode(self)
   Return the xCcyCode ivar.

```
{
  ^record[#xCcyCode];
}
``` xCcyRate(self)
   Return the xCcyRate ivar.

```
{
  ^record[#xCcyRate];
}
``` xferRefNum(self)
   Return the xferRefNum ivar.

```
{
  ^record[#xferRefNum];
}
```

ACH

Source file:            ACH.CLS

Inherits from:          Object BusinessObject Instruction FundsXfer

Inherited by:           CCD CTP CTX PPD TXP class comment

Instance variables:

| | |
|---|---|
| dirtyFlds | (From class BusinessObject) |
| dateLastChgd | (From class BusinessObject) |
| dateLastUsed | (From class BusinessObject) |
| lastChangedTime | (From class BusinessObject) |
| oldKey | (From class BusinessObject) |
| stamp | (From class BusinessObject) |
| dbQueryLock | (From class BusinessObject) |
| dbQuery | (From class BusinessObject) |
| record | (From class BusinessObject) |
| custAcct | (From class Instruction) |
| custBranch | (From class Instruction) |
| otherParty | (From class FundsXfer) |
| otherPartyBank | (From class FundsXfer) |
| intermediary | (From class FundsXfer) |
| details | (From class FundsXfer) |
| addenda | collection of addenda objects |

Class variables:

| | |
|---|---|
| $DisplayRules | (From class BusinessObject) |
| $NonDisplayIvars | (From class BusinessObject) |
| $ReviewLvls | (From class Instruction) |
| $FieldsNotApplicable | (From class FundsXfer) |
| $PartySelectTbl | (From class FundsXfer) |
| $InstTypes | (From class FundsXfer) |
| $RouteCodes | (From class FundsXfer) |
| $CutOffTimeTbl | (From class FundsXfer) |
| $StatusGrpTbl | (From class FundsXfer) |
| $SetupSources | (From class FundsXfer) |
| $ACHTranCodes | ACH transaction codes |
| $DBACH | DBQuery for ACH |

Class methods:

achTranCodes(self)

Return the $ACHTranCodes Dictionary.

```
{
    ^$ACHTranCodes;
}
``` achTranCodeStrings(self | anSC, aDict, aStr)

Return the $ACHTranCodes as a SortedCollection of Strings.

```
{
    anSC := new(SortedCollection, 8);
    aDict := achTranCodes(self);
    keysDo(aDict,
        {using(aKey)
          aStr := asString(aKey) + SPACE + aDict[aKey];
          add(anSC, aStr);
        }
    );
    ^anSC;
}
``` fillACHTranCodes(self, aBox | aDict aStr)
Retrieve the $ACHTranCodes and fill them to the specified form field..

```
{
  clearField(aBox);
  aDict := achTranCodes(self);
  keysDo(aDict,
  { using(aKey)
    aStr := asString(aKey) + SPACE + aDict[aKey];
    addString(aBox, aStr);
  });
}
``` init(self)
Initialize the ACH class.

```
{
  loadAchTranCodes(self);
}
``` loadAchTranCodes(self)
Load ACH tran codes from the database.

```
$ACHTranCodes := %Dictionary(22->"Chkg Credit Transfer"
                             23->"Chkg Credit Prenote"
                             27->"Chkg Debit Transfer"
                             28->"Chkg Debit Prenote"
                             32->"Svgs Credit Transfer"
                             33->"Svgs Credit Prenote"
                             37->"Svgs Debit Transfer"
                             38->"Svgs Debit Prenote");
}
``` parseAchTranCodeString(self, aStr | aCode, aDesc)
Parse the ACH transaction code String.

```
{
  aCode := asInt(subString(aStr, 0, 2), 10);
  aDesc := subString(aStr, 3, size(aStr));
  ^tuple(aCode, aDesc);
}
``` query(self, aNum | aQuery)
Read an ACH record from the database, and return an ACH object.

```
{
  aQuery := new(DBACH);
  ^query(aQuery, aNum);
}
```

Object methods:

achCompanyId(self)

```
{
  ^record[#achCompanyId];
}
``` achCompanyName(self)
Return the achCompanyName ivar.

```
{
    ^record[#achCompanyName];
}
``` achGroupId(self)
Return the achGroupId ivar.

```
{
    ^record[#achGroupId];
}
``` achTranCode(self)
Return the achTranCode ivar.

```
{
    ^record[#achTranCode];
}
``` addenda(self)
Return the addenda ivar.

```
{
    ^addenda;
}
``` asFundsXfer(self | aFundsXfer)
Make a fundsxfer and set additional ach info.

```
{
    aFundsXfer := asFundsXfer(self:ancestor);
    setAchInfo(aFundsXfer);

^aFundsXfer;
}
``` asInstType(self, anInstType | fundsXfer hostSetupId)
The original was one of the ACH types and, if it is staying as an ACH type, we need to set the hostSetupName back to the original. i.e. we don't want to make it a host non-repetitive.

```
{ /* Next statement will cause hostSetupName to be nil*/
    fundsXfer :=asInstType(self:ancestor, anInstType);
    if isACH(fundsXfer)
    then hostSetupId := hostSetupName(self); /* Since changing ACH type does not cause a host
        repetitive to become a non-repetitive the next statement restores the value, if any, of
        hostSetupName */
        setVar(fundsXfer, #hostSetupName, hostSetupId)
    endif;
    ^fundsXfer;
}
``` assimBPR(self, flds| aTranCode)
Assimilate the BPR segment into self.

```
{
    /* BPR10 */
    setAchCompanyId(self, flds[9]);

/* BPR13 */
    setOtherPartyBankByAba(self, flds[12]);
```

```
/* BPR14 */
/* set ACHTranCode */
if not(aTranCode := tranCodeByBPR14(self, flds[13]))
    ^nil
endif;

setAchTranCode(self, aTranCode);

/* BPR15 */
setOtherPartyAcct(self, flds[14]);
}
``` assimIndivOrBatch(self, flds | aStr)
1/8/1992 15:32

```
{
    aStr := subString(flds[2], 0, 1);
    if (aStr[0] = 'I') cor (aStr[0] = 'B')
        setGenerateOffset(self, 0);
        setIndivOrBatch(self, aStr[0]);
    else
        setGenerateOffset(self, nil);
        setIndivOrBatch(self, nil);
    endif;
    setAchGroupId(self, subString(flds[2], 1, size(flds[2])));
}
``` assimN1(self, flds)
Assimilate an N1 segment into self.

```
{
 if flds[0] = loadString(3504) /* PE */  /* Segment contains payee
information. */
     /* This is a bit tricky.  Since the ACHTranCode is not part
     of the X12 String, we cannot use the "isCredit" or "isDebit"
     methods to test the N102 segment.  Instead we must interrogate
     the dbOrCr ivar directly and reverse its meaning. */
     if dbOrCr(self) = CREDIT
        setName(otherParty(self), flds[1]);
     else
        setAchCompanyName(self, flds[1]);
     endif;
   else /* Segment contains payor information. */
     if dbOrCr(self) = DB
        setName(otherParty(self), flds[1]);
     else
        setAchCompanyName(self, flds[1]);
     endif;
   endif;
}
``` assimREF(self, flds, entityId)
Assimilate a REF segment into self. Since no REF segments follow an N-segment for ACH, the entityId is ignored.

```
{
    select
      case flds[0] = RP
        setHostSetupName(self, flds[1]);
      endCase
      case flds[0] = loadString(3508) /* IA */
        if flds[1][1] = YES[0]
          setReviewed?(self, 0);
        else
          setReviewed?(self, nil);
        endif;
      endCase
      case flds[0] = loadString(3510) /* AN */
        setDocRefNum(self, flds[1]);
```

```
        assimIndivOrBatch(self, flds);
      endCase
      case flds[0] = loadString(3511) /* CR */
        setAchId(otherParty(self), flds[1]);
        assimIndivOrBatch(self, flds);
      endCase
      default
    endSelect;
}
``` asX12(self, operatorID | aStrm, segments, hostRepetitive, aFile)
Convert self to an X12-formatted String for transmission.

```
{
  segments := new(TextCollection, 8);
  aStrm := new(X12Stream:late);
  if isHostRepetitive(self)
    hostRepetitive := 0;
  endif;

makeST(self, aStrm, segments);
  makeBPR(self, aStrm, segments, hostRepetitive);
  makeTRN(self, aStrm, segments);
  makeREFs(self, aStrm, segments, hostRepetitive, operatorID);
  makeDTM(self, aStrm, segments);
  if not(hostRepetitive)
    makeN1s(self, aStrm, segments);
  endif;
  makeFromAddenda(self, aStrm, segments);
  makeSE(self, aStrm, segments);

^segments;
}
``` batchOffsets?(self)
Return non-nil if batch offsets are to be generated.

```
{
  if indivOrBatch(self) = 'B'
    ^0;
  else
    ^nil;
  endif;
}
``` copyFlds(self, aPmt)
3/5/1992 8:48 The aPmt argument is the new payment. We are interested in preserving ivar's when the instruction type changes from one type of ACH to another.

```
{ copyFlds(self:ancestor, aPmt);
  if not(isACH(aPmt))
  then ^self;
  endif;
  setVar(aPmt, #achTranCode, achTranCode(self)); /* ACH zone */
  setVar(aPmt, #discretionaryData, discretionaryData(self));
  setVar(aPmt, #achCompanyId, achCompanyId(self));
  setVar(aPmt, #achCompanyName, achCompanyName(self));
  setVar(aPmt, #achGroupId, achGroupId(self));
  setVar(aPmt, #hasAddendaOrDetails?, nil); /* setVar(aPmt, #addenda, addenda); ie, can't
      convert addenda */
  setVar(aPmt, #generateOffset?, generateOffset?(self));
  setVar(aPmt, #indivOrBatch, indivOrBatch(self));
}
``` discretionaryData(self)
Return the discretionaryData ivar.

```
{
  ^record[#discretionaryData];
}
``` generateOffset?(self)

```
{
  ^record[#generateOffset?];
}
``` individualOffsets?(self)

Return non-nil if individual offsets are to be generated.

```
{
  if indivOrBatch(self) = 'I'
    ^0;
  else
    ^nil;
  endif;
}
``` indivOrBatch(self)

Return the indivOrBatch flag.

```
{
  ^record[#indivOrBatch];
}
``` initAddenda(self)

Initializes addenda to its default value.

```
{
  ^addenda(self) cand setAddenda(self, nil);
}
``` isACH(self)

Returns true indicating that the receiver is an ACH funds transfer.

```
{
  ^true
}.
``` isCredit(self)

Returns non-nil if credit.

```
{
  if find(at(achTranCodes(class(self)), achTranCode(self)),
              loadString(3515) /* Credit */ , 0)
    ^0;
  else
    ^nil;
  endif;
}
``` isDda(self)

Returns non-nil if otherPartyAcct is DDA.

```
{
  if find(at(achTranCodes(class(self)), achTranCode(self)),
  loadString(3513) /* Chkg */ , 0)
```

```
        ^0;
      else
        ^nil;
      endif;
    }
``` isDebit(self)
Returns non-nil if debit.

```
    {
      if find(at(achTranCodes(class(self)), achTranCode(self)),
    loadString(3514) /* Debit */ , 0)
        ^0;
      else
        ^nil;
      endif;
    }
``` isPreNote(self)
Return non-nil if self is a pre-note.

```
    {
      if amount(self) = 0.0 cand achTranCode(self) in %Set(23,28,38,33)
        ^0;
      else
        ^nil;
      endif;
    }
``` isSavings(self)
Returns non-nil if otherPartyAcct is Savings.

```
    {
      if find(at(achTranCodes(class(self)), achTranCode(self)),
    loadString(3512) /* Savings */ , 0)
        ^0;
      else
        ^nil;
      endif;
    }
``` isValid?(self | ok )
3/12/1992 11:05 Overrides funds transfer method to also check addenda.
7/27/92: Removed the call to checkAmounts in the addenda loop. ADC,
7/27/92.

```
    { ok:=isValid?(self:ancestor);

if class(addenda) in asSet(descendants(ACHAddendum))
        then check(addenda);
          checkAmounts(addenda, amount(self) cor 0);
        else do(addenda,
          { using(anAddenda) check(anAddenda);
          });
        endif;
      /* checking the addenda may have added error messages via the data
    checker. If so,
         the ACH transaction is not valid */
      ^ok(UPCServices[#dataChecker]);
    }
``` makeBPR(self, aStrm, segments, repetitive | anAmt, anAcct, aStr)
Create the BPR segment and place it in the Collection.

```
    {
      /* BPR01 */
      if isPreNote(self)
        nextPutAll(aStrm, loadString(3524) /* BPR*P* */ );
      else
```

```
        nextPutAll(aStrm, loadString(3525) /* BPR*X* */ );
    endif;

/* BPR02 */
    anAmt := summAmount(self);
    nextPutAll(aStrm, asX12Currency(anAmt, ccyCode(custAcct)));
    nextPutAll(aStrm, ASTERISK);

/* BPR03 */
    if isDebit(self)
        nextPutAll(aStrm, loadString(3526) /* D* */ );
    else
        nextPutAll(aStrm, loadString(3527) /* C* */ );
    endif;

/* BPR04 */
    nextPutAll(aStrm, loadString(3528) /* ACH* */ );

/* BPR05 */
    nextPutAll(aStrm, asBPR05(self));
    nextPutAll(aStrm, ASTERISK);

/* BPR06, BPR07, BPR08 */
    nextPutAll(aStrm, loadString(3529) /* 01*071000013*DA* */ );

/* BPR09 */
    nextPutAll(aStrm, code(custBranch(self)));
    nextPutAll(aStrm, SPACE);
    nextPutAll(aStrm, acctNum(custAcct(self)));
    anAcct := custAcct(self);
    if not(hasSubBranch?(anAcct))
        nextPutAll(aStrm, PERIOD);
        nextPutAll(aStrm, PERIOD);
    endif;
    nextPutAll(aStrm, ASTERISK);

/* BPR10 */
    nextPutAll(aStrm, achCompanyId(self));
    nextPutAll(aStrm, ASTERISK);

/* BPR11 */
    nextPutAll(aStrm, ASTERISK);

/* BPR12 */
    nextPutAll(aStrm, loadString(3531) /* 01* */ );

/* BPR13 */
    nextPutAll(aStrm, abaNum(otherPartyBank(self)));
    nextPutAll(aStrm, ASTERISK);

/* BPR14 */
    if isDda(self)
        nextPutAll(aStrm, loadString(3501) /* DA */);
    else
        nextPutAll(aStrm, loadString(3533) /* SG */);
    endif;
    nextPutAll(aStrm, ASTERISK);

/* BPR15 */
    nextPutAll(aStrm, otherPartyAcct(self));
    nextPutAll(aStrm, ASTERISK);

/* BPR16 */
    nextPutAll(aStrm, asX12(effDate(self)));

add(segments, asSegment(aStrm));
}
``` makeFromAddenda(self, aStrm, segments | aColl)
    Create segments from addenda and place them in the Collection.

```
{
    /* Case 1: The X12 strings already exist as a Collection in the
       details ivar. */
    if not(isBlank(details(self)))
```

```
            if not(isBlank(hostSetupName(self))) cand
    not(isBlank(lengthHostText(self)))
            aColl := removeBytes(details(self), lengthHostText(self));
            (size(aColl) > 0) cand reformatNTE(self, aColl);
        else
            aColl := details(self);
        endif;
        if (aColl cand (byteSize(aColl) > 0))
            add(segments, loadString(4615) /* ENT*001 */ + CR_LF );
            do(aColl,
                {using(aLine) add(segments, aLine + CR_LF)}
                );
        endif;

^self;
    endif;

/* Case 2: The addenda ivar contains a Collection of Addenda objects. */
    if isAncestor(class(addenda(self)), Collection) cand
        not(isBlank(addenda(self)))
        add(segments, loadString(4615) /* ENT*001 */ + CR_LF );
        do(addenda(self),
            {using(addendum) asX12(addendum, aStrm, segments)}
        );
        ^self;
    endif;

/* Case 3: The addenda ivar contains a single Addendum object. */
    if not(isBlank(addenda(self)))
        add(segments, loadString(4615) /* ENT*001 */ + CR_LF );
        asX12(addenda(self), aStrm, segments);
    endif;
}
``` makeN1s(self, aStrm, segments)

Create the N1 segments and place them in the Collection.

```
{
    /* N101, N102 - payee identification */
    nextPutAll(aStrm, loadString(3522) /* N1*PE* */ );
    if isCredit(self)
        nextPutAll(aStrm, name(otherParty(self)));
    else
        nextPutAll(aStrm, achCompanyName(self));
    endif;
    add(segments, asSegment(aStrm));

/* N101, N102 - payor identification */
    nextPutAll(aStrm, loadString(3523) /* N1*PR* */ );
    if isDebit(self)
        nextPutAll(aStrm, name(otherParty(self)));
    else
        nextPutAll(aStrm, achCompanyName(self));
    endif;
    add(segments, asSegment(aStrm));
}
``` makeREFs(self, aStrm, segments, repetitive, operatorID | aStr)

Create the REF segments and place them in the Collection.

```
{
    /* REF01, REF02 - first occurrence */
    if repetitive
        nextPutAll(aStrm, loadString(3516) /* REF*RP* */ +
    (hostSetupName(self) cor NULLSTR));
        add(segments, asSegment(aStrm));
    endif;

/* REF01, REF02, REF03 - second occurrence */
    nextPutAll(aStrm, loadString(3517) /* REF*IA* */ );
    nextPutAll(aStrm, operatorID);
```

```
    nextPutAll(aStrm, ASTERISK);
    nextPutAll(aStrm, NO);
    if reviewed?(self)
      nextPutAll(aStrm, YES);
    else
      nextPutAll(aStrm, NO);
    endif;
    add(segments, asSegment(aStrm));

/* REF01, REF02, REF03 - third occurrence */
    nextPutAll(aStrm, loadString(3518) /* REF* */);
    nextPutAll(aStrm, asREF01(self));
    nextPutAll(aStrm, ASTERISK);
    nextPutAll(aStrm, asREF02(self) cor NULLSTR);
    nextPutAll(aStrm, ASTERISK);
    if isBlank(indivOrBatch(self))
      nextPutAll(aStrm, NO);
    else
      nextPutAll(aStrm, indivOrBatch(self));
    endif;
    nextPutAll(aStrm, achGroupId(self));

add(segments, asSegment(aStrm));
}
``` reformatNTE(self, aDtlColl | sizeOfCollection, idx)

7/30/1992 13:45 When the host sends down text in the details we need to strip it from the details we send (done in an earlier method) and pre-pend the text the user enters with NTE*PMT* and make sure it is only 60 chars long in each case.

```
{
  idx := 0;
  sizeOfCollection := size(aDtlColl);

loop
  while (idx < sizeOfCollection)
  begin
    if isBlank(aDtlColl[idx])
        remove(aDtlColl, idx);
        idx := idx;
        sizeOfCollection := sizeOfCollection - 1;
    else
        if size(aDtlColl[idx]) > 60
            insert(aDtlColl, NULLSTR, idx+1) cand (sizeOfCollection :=
sizeOfCollection + 1);
            aDtlColl[(idx + 1)] := aDtlColl[(idx + 1)] + copyFrom(aDtlColl[idx],
60, size(aDtlColl[idx]));
            aDtlColl[idx] := copyFrom(aDtlColl[idx], 0, 60);
        endif;
        aDtlColl[idx] := "NTE*PMT*" + aDtlColl[idx];
        idx := idx + 1;
    endif;
  endLoop;
  ^aDtlColl
}
``` setAchCompanyId(self, aValue)

```
{ addDirtyFld(self, #achCompanyId);
  ^record[#achCompanyId] := aValue;
}
``` setAchCompanyName(self, aValue)
11-5-1991 AWH

```
{ addDirtyFld(self, #achCompanyName);
  record[#achCompanyName] := aValue;
}
``` setAchGroupId(self, aValue)
11-5-1991 AWH

```
{ addDirtyFld(self, #achGroupId);
  ^record[#achGroupId] := aValue;
}
``` setAchInfo(self | sourceForAch)
1/10/1992 11:33 Sent to when a funds transfer is transforming itself into an ACH.

```
{ /* if there is a transaction group name, query for it */
  if size(trGroupName(self))>0
  then sourceForAch:=query(TrGroup, trGroupName(self)) cor
       /* the query fails so use custAcct */
       sourceForAch:=custAcct(self);
  else /* no transaction group name */
       sourceForAch:=custAcct(self);
  endif;
  setIndivOrBatch(self, indivOrBatch(sourceForAch));
  setAchCompanyId(self, achCompanyId(sourceForAch));
  setAchCompanyName(self, achCompanyName(sourceForAch));
  setAchGroupId(self, achGroupId(sourceForAch));
  setGenerateOffset(self, generateOffset?(sourceForAch));
}
``` setAchInfoFromGroup(self, sourceForAch)

```
{
  setIndivOrBatch(self, individualOrBatch(sourceForAch));
  setAchCompanyId(self, achCompanyId(sourceForAch));
  setAchCompanyName(self, achCompanyName(sourceForAch));
  setAchGroupId(self, achGroupId(sourceForAch));
  setGenerateOffset(self, generateOffset?(sourceForAch));
}
``` setAchTranCode(self, aValue)
11-5-1991 AWH

```
{ addDirtyFld(self, #achTranCode);
  ^record[#achTranCode] := aValue;
}
``` setAchTranCodeByStr(self, aStr | aTuple)
Derive the ACH tran code from the tran code String, then update the achTranCode ivar. Return nil if the update fails.

```
{
  aTuple := parseAchTranCodeString(ACH, aStr);
  setAchTranCode(self, aTuple[0]);

if find(aTuple[1], loadString(3534) /* Debit */ , 0)
    setDbOrCr(self, DB);
  else
    setDbOrCr(self, CREDIT);
  endif;
}
``` setAddenda(self, aValue)
6-8-92 KAM

```
{ addDirtyFld(self, #addenda);
  addDirtyFld(self, #hasAddendaOrDetails?);
```

```
    if size(aValue)>0
      isSetup(self) cand
          setSetupName(aValue, setupName(self)) cor
          setXferRefNum(aValue, xferRefNum(self));
      setHasAddendaOrDetails?(self,true);
    else
      setHasAddendaOrDetails?(self, false);
    endif;
    ^addenda := aValue;
}
``` setAddendaSetupName(self)

```
{ addenda(self) cand setSetupName(addenda, setupName(self));
}
``` setDetails(self, aValue)
6/2/92 ACH details will no longer be evened out but will be stored in "lines" according to the way they were typed in to the multi-line edit control. Changed 7/17/92 by ADC. Was not properly setting the hasAddendaOrDetails flag.

```
{ addDirtyFld(self, #details);
  addDirtyFld(self, #hasAddendaOrDetails?);
  aValue cand setHasAddendaOrDetails?(self,'Y')
        cor setHasAddendaOrDetails?(self,nil);
  ^details := aValue ;
}
``` setDiscretionaryData(self, aValue)
11-5-1991 AWH

```
{ addDirtyFld(self, #discretionaryData);
  ^record[#discretionaryData] := aValue;
}
``` setGenerateOffset(self, arg)

```
{ setGenerateOffset?(self, arg)
}
``` setGenerateOffset?(self, aValue)

```
{ addDirtyFld(self, #generateOffset?);
  ^record[#generateOffset?] := aValue;
}
``` setIndivOrBatch(self, aValue)
11-5-1991 AWH

```
{ addDirtyFld(self, #indivOrBatch);
  ^record[#indivOrBatch] := aValue;
}
``` setOtherPartyBankByAba(self, abaNum | aQuery, aBank)
Fetch a Bank object from the database using an ACHRoutingNumber, then ABA number as the search key, then update the otherPartyBank ivar. Update the otherPartyBank ivar with a phantom Bank if the Bank was not in the database.

```
{
  aQuery := new(DBBank);
  if not(isBlank(abaNum)) cand aBank := queryOnAchRoutingNum(aQuery,
abaNum) cor
    aBank := queryOnAba(aQuery, abaNum)
    setOtherPartyBank(self, aBank);
    ^self
  endif;

/* It's not in the database, so update the phantom. */
  setAbaNum(otherPartyBank(self), abaNum);
}
``` setSetupName(self, aValue)
Sends setSetupName to ancestor and to each addenda.

```
{
  setSetupName(self:ancestor, aValue);

if addenda
    addDirtyFld(self, #addenda);
    if kindOf(addenda(self), ACHAddendum)
      setSetupName(addenda(self), aValue);
    else
      do(addenda(self),
      {using(anAddendum)
        setSetupName(anAddendum, aValue);
      });
    endif;
  endif;
}
``` setXferRefNum(self, aValue)
Sends setXferRefNum to ancestor and to each addenda.

```
{
  setXferRefNum(self:ancestor, aValue);

if addenda
    addDirtyFld(self, #addenda);
    if kindOf(addenda(self), ACHAddendum)
      setXferRefNum(addenda, xferRefNum(self));
    else
      do(addenda(self),
      {using(anAddendum)
        setXferRefNum(anAddendum, xferRefNum(self));
      });
    endif;
  endif;
}
``` tranCodeByBPR14(self, bpr14 | achTranNo)
5/21/1992 12:27

```
{
  achTranNo := %Dictionary("DA"->22 "SG"->32)[bpr14];
  if achTranNo
    dbOrCr(self) = DB cand achTranNo := achTranNo + 5;
    isPreNote(self) cand achTranNo := achTranNo + 1;
    ^achTranNo
  else
    ^nil;
  endif;
}
``` tranCodeFromBPR14(self, bpr14 | aStrm, achTranName)
5/21/1992 12:27

```
{
 aStrm := streamOver(stringOf(' ', 25));
 achTranName := $Dictionary("DA"->"DDA ", "SG"->"Savings ")[bpr14];
 if achTranName
    nextPutAll(aStrm, achTranName);
    nextPutAll(aStrm, $Dictionary("DB"->"Debit ", "CR"-
>"Credit")[dbOrCr(self)]);
    nextPutAll(aStrm, (isPreNote(self) cand loadString(3502) /* Prenote */
}
        cor loadString(3503) /* Transfer */ );
    ^trimBlanks(collection(aStrm));
 else
    ^nil;
 endif;
}
```

ACHAddendum

Source file:                ACHADDEN.CLS

Inherits from:              Object BusinessObject

Inherited by:               CCDAddendum CTXAddendum
                            PPDAddendum CTPAddendum
                            TXPAddendum class comment Instance variables:

dirtyFlds                   (From class BusinessObject)
dateLastChgd                (From class BusinessObject)
dateLastUsed                (From class BusinessObject)
lastChangedTime             (From class BusinessObject)
oldKey                      (From class BusinessObject)
stamp                       (From class BusinessObject)
dbQueryLock                 (From class BusinessObject)
dbQuery                     (From class BusinessObject)
record                      (From class BusinessObject)

Class variables:

$DisplayRules               (From class BusinessObject)
$NonDisplayIvars            (From class BusinessObject)

Class methods:              (none)

Object methods:

checkAmounts(self, total )
        descendants must override this method to add the appropriate amounts

```
{ ^true;
}
``` checkChars(self, ivarName, aStr )
        Per Ben, 7-14-92 ACH fields no longer checker for illegal characters

```
{ ^true;
  if size(aStr) >0
  then (aStr[0] in invalidFirstChars(UPCServices[#dataChecker])) cand
      addError(UPCServices[#dataChecker],
               LIS_DATA_ERROR,5208, loadString(3565) /* in */
+asDisplayString(ivarName)+SPACE+aStr);
  endif;
  if size(aStr) >0
  then overlap(extract(invalidChars(UPCServices[#dataChecker]),{using(ch)
ch<>'*'}),aStr) cand
      addError(UPCServices[#dataChecker], LIS_DATA_ERROR,5206,
loadString(3565) /* in */
                +asDisplayString(ivarName)+SPACE+aStr);
  endif;

}
``` isValid?(self)

```
{
 ^isValidAddendum?(UPCServices[#dataChecker],self)
}
``` msgType(self)
Returns type of warning message

```
{
  if xferRefNum(self) then
   ^LIS_DATA_ERROR
  else ^LIS_DATA_WARNING
  endif;
}
``` primaryKey(self)
Returns primary key value or Array containing primary key values.

```
{
    ^xferRefNum(self) cor setupName(self);
}
``` setSetupName(self, aValue)
11-6-1991 AWH

```
{ addDirtyFld(self, #setupName);
  ^record[#setupName] := aValue;
}
``` setupName(self)
11/6/1991 11:05

```
{ ^record[#setupName];
}
``` setXferRefNum(self, aValue)
11-6-1991 AWH

```
{ addDirtyFld(self, #xferRefNum);
  ^record[#xferRefNum] := aValue;
}
``` size(self)
        Size is 1

{
            ^1;
        } xferKey(self)
        Returns the key of the xfer that owns receiver.

{
            ^xferRefNum(self) cor setupName(self);
        } xferRefNum(self)
        11/6/1991 11:05

{ ^record[#xferRefNum];
        }

BranchPmt

Source file:                        BRANCHPM.CLS

Inherits from:                      Object BusinessObject Instruction FundsXfer

Inherited by:                       (no descendants)

Payments initiated from: GCU, London, HongKong, Geneva, Tokyo, Seoul, and Sydney. Includes CHIPS, SWIFT, and CHAPS.

Instance variables:

| | |
|---|---|
| dirtyFlds | (From class BusinessObject) |
| dateLastChgd | (From class BusinessObject) |
| dateLastUsed | (From class BusinessObject) |
| lastChangedTime | (From class BusinessObject) |
| oldKey | (From class BusinessObject) |
| stamp | (From class BusinessObject) |
| dbQueryLock | (From class BusinessObject) |
| dbQuery | (From class BusinessObject) |
| record | (From class BusinessObject) |
| custAcct | (From class Instruction) |
| custBranch | (From class Instruction) |
| otherParty | (From class FundsXfer) |
| otherPartyBank | (From class FundsXfer) |
| intermediary | (From class FundsXfer) |
| details | (From class FundsXfer) |

Class variables:

| | |
|---|---|
| $DisplayRules | (From class BusinessObject) |
| $NonDisplayIvars | (From class BusinessObject) |
| $ReviewLvls | (From class Instruction) |
| $FieldsNotApplicable | (From class FundsXfer) |
| $PartySelectTbl | (From class FundsXfer) |
| $InstTypes | (From class FundsXfer) |

$RouteCodes (From class FundsXfer)
$CutOffTimeTbl (From class FundsXfer)
$StatusGrpTbl (From class FundsXfer)
$SetupSources (From class FundsXfer)
$DBBrPmt DBQuery for BranchPmt Class methods: (none)

Object methods:

assimBPR(self, flds)
5/22/1992 13:56 Pass through, processing was handled at Xfer level earlier.

```
{
  if flds[3] = SWT /* This is a cross currency Payment */
      setXCcyAmt(self, amount(self));
      setAmount(self, 0.0);
  endif

}
``` assimCUR(self, flds)
Assimilate a CUR segment into self.

```
{
  /* CUR02 - We should be able to ignore this field.  Presumably, the
      ccyCode of custAcct is already in the Account object. */

/* CUR03 */
  not(isBlank(flds[2])) cand
  setXCcyRate(self, flds[2]);

/* CUR05 */
  not(isBlank(flds[4])) cand
  setXCcyCode(self, flds[4]);
}
``` assimN1(self, flds)
Assimilate the N1 segment into self.

```
{
  select
    case flds[0] = loadString(3620) /* C1 */
      /* Segment contains information about the intermediary. */
      setName(intermediary(self), flds[1]);
    endCase
    case flds[0] = loadString(3621) /* RB */
      setName(otherPartyBank(self), flds[1]);
    endCase
    case flds[0] = loadString(3622) /* PE */
      setName(otherParty(self), flds[1]);
      if flds[2] = loadString(3623) /* ZZ */
        setOtherPartyAcct(self, flds[3])
      endif;
    endCase
  endSelect;
}
``` assimN2(self, flds, entityId | cityStateCty, sizeCSC, aParty)
Assimilate the N2 segment into self.

```
{
  select
    case entityId = loadString(3620) /* C1 */
      /* Segment contains information about the intermediary. */
```

```
              aParty := intermediary(self);
          endCase
          case entityId = loadString(3621) /* RB */
              aParty := otherPartyBank(self);
          endCase
          case entityId = loadString(3622) /* PE */
              aParty := otherParty(self);
          endCase
        endSelect;

if aParty
          setAddress(aParty, flds[0]);
          cityStateCty := fieldsFrom((flds[1] cor NULLSTR), COMMA);
          sizeCSC := size(cityStateCty);
          sizeCSC > 0 cand setCity(aParty, trimLeading(cityStateCty[0], %Set('
')));
          sizeCSC > 1 cand setStateCode(aParty, trimLeading(cityStateCty[1], %Set('
')));
          sizeCSC > 2 cand setCountryCode(aParty, trimLeading(cityStateCty[2],
%Set(' ')));
         endif;
        }
``` assimNTE(self, flds)
Assimilate an NTE segment into self.

```
    { select
          case flds[0] = loadString(3630) /* PMT */
            not(details(self)) cand setDetails(self, new(TextCollection, 1));
            add(details(self), flds[1]);
          endCase
          case flds[0] = loadString(3631) /* SPH */
            setInstToFnbc(self, flds[1]);
          endCase
          case flds[0] = loadString(3632) /* ORI */
            setInstToBeneBank(self, flds[1]);
          endCase
        endSelect;

}
``` assimREF(self, flds, entityId | aStr)
Assimilate a REF segment into self.

```
    { if entityId
        select
          case entityId = loadString(3620) /* Cl */
            /* do nothing? */
          endCase
          case entityId = loadString(3621) /* RB */
            /* do nothing? */
          endCase
          case entityId = loadString(3622) /* PE */ cand (flds[0] =
loadString(3623) /* ZZ */ )
            aStr := subString(flds[1], 1, 2);
            select
              case aStr = loadString(3624) /* R */  /* charges for beneficiary
is No */
                setDeductFromBene?(self, NO );
              endCase
              case aStr = loadString(3626) /* B */  /* charges for beneficiary
is Yes */
                setDeductFromBene?(self, YES );
              endCase
              default /* charges for beneficary not specified */
                setDeductFromBene?(self, nil);
            endSelect;
            aStr := subString(flds[1], 2, 3);
            select
```

```
            case aStr = loadString(3624) /* R */ /* correspondent charge is
No */
               setDeductCorrCharges?(self, NO );
            endCase
            case aStr = loadString(3626) /* B */ /* correspondent charge is
Yes */
               setDeductCorrCharges?(self, YES );
            endCase
            default /* correspondent charge not specified */
               setDeductCorrCharges?(self, nil);
         endSelect;
         if subString(flds[1], 3, 4) /* test conditional payment */
            setConditionalPmt?(self, YES );
         else
            setConditionalPmt?(self, nil);
         endif;
         if flds[2] cand not(isBlank(flds[2]))
            setAmount(self, asReal(flds[2]));
         endif;
      endCase;
   endSelect;
else /* the REF segment does not follow an N1 segment */
   select
      case flds[1] = RP
         setHostSetupName(self, flds[1]);
      endCase
      case flds[1] = loadString(3623) /* ZZ */
         setDocRefNum(self, flds[1]);
      endCase
      case flds[1] = loadString(3629) /* IA */
         if flds[1][2] = YES[0]
            setReviewed?(self, 0);
         else
            setReviewed?(self, nil);
         endif;
      endCase
   endSelect;
endif;

}
``` asX12(self, operatorID | aStrm, segments, hostRepetitive)
Convert self to an X12-formatted String for transmission.

```
{
  segments := new(TextCollection, 8);
  aStrm := new(X12Stream:late);
  if isHostRepetitive(self)
     hostRepetitive := 0;
  endif;

makeST(self, aStrm, segments);
  makeBPR(self, aStrm, segments, hostRepetitive);
  makeNTEs(self, aStrm, segments);
  makeTRN(self, aStrm, segments);
  makeCUR(self, aStrm, segments);
  makeREFs(self, aStrm, segments, hostRepetitive, operatorID);
  makeDTM(self, aStrm, segments);
  makeN1s(self, aStrm, segments, hostRepetitive);
  makeSE(self, aStrm, segments);

^segments;
}
``` conditionalPmt?(self)

```
{
  ^record[#conditionalPmt?];
}
``` deductCorrCharges?(self)

```
        {
            ^record[#deductCorrCharges?];
        } deductFromBene?(self)

{
            ^record[#deductFromBene?];
        } instToBeneBank(self)
        3/31/1992 9:04

{
            ^record[#specialInstructions];
        } instToFnbc(self)

{
            ^record[#instToFnbc];
        } makeBPR(self, aStrm, segments, repetitive | anAcct, aStr)
        Create the BPR segment and place it in the Collection.

{
            /* BPR01 */
            nextPutAll(aStrm, loadString(3653) /* BPR*X* */ );

/* BPR02 */
            nextPutAll(aStrm, asX12Currency(summAmount(self), xCcyCode(self)));
            nextPutAll(aStrm, ASTERISK);

/* BPR03 */
            nextPutAll(aStrm, loadString(3654) /* C* */ );

/* BPR04 - Need improvement here. */
            select
              case instType(self) = DRAFT
                nextPutAll(aStrm, loadString(3656) /* PBD* */ );
              endCase
              case instType(self) = BOOK_TRANSFER
                nextPutAll(aStrm, loadString(3658) /* BKW* */ );
              endCase
              case instType(self) = SWIFT  cor instType(self) = FOREIGN_CCY_WIRE
                nextPutAll(aStrm, loadString(3661) /* SWT* */ );
              endCase
              case (code(custBranch(self)) = loadString(3633) /* NY */ ) cand
                    mustBeFedwire?(self)
                nextPutAll(aStrm, loadString(3662) /* FWN* */ );
              endCase
              default
                nextPutAll(aStrm, loadString(3663) /* CWT* */ );
            endSelect;

/* BPR05, BPR06, BPR07 */
            nextPutAll(aStrm, loadString(3664) /* *** */ );

/* BPR08 */
            nextPutAll(aStrm, loadString(3665) /* DA* */ );

/* BPR09 */
            nextPutAll(aStrm, code(custBranch(self)));
            nextPutAll(aStrm, SPACE);
```

```
        nextPutAll(aStrm, acctNum(custAcct(self)));
        if not(hasSubBranch?(custAcct(self)))
            nextPutAll(aStrm, PERIOD);
            nextPutAll(aStrm, PERIOD);

endif;
        nextPutAll(aStrm, ASTERISK);

/* BPR10, BPR11, BPR12, BPR13, BPR14, BPR15 */
        nextPutAll(aStrm, loadString(3667) /* ****** */ );

/* BPR16 */
        nextPutAll(aStrm, asX12(effDate(self)));

add(segments, asSegment(aStrm));
    }.
``` makeCUR(self, aStrm, segments | hostRate, calcAmount, factAmount)
Create the CUR segment and place it in the Collection.

```
    {
    if not(isBlank(xCcyCode(self)))
        if not(isBlank(xCcyRate(self))) cand ((xCcyRate(self) <> TBD) cor
           (asReal(xCcyRate(self)) <> 0))
            factAmount := 10.0**decimalPlaces(Currency, ccyCode(self));
            if isDebit(self)
                calcAmount := xCcyAmt(self) / asReal(xCcyRate(self));
            else
                calcAmount := xCcyAmt(self) * asReal(xCcyRate(self));
            endif;
            if amount(self) = asReal(asLong(calcAmount * factAmount + .5)) /
    factAmount
                hostRate := asRealString(FloatField, 1.0/asReal(xCcyRate(self)),
    5);
            else
                hostRate := asRealString(FloatField, asReal(xCcyRate(self)), 5);
            endif;
        endif;

nextPutAll(aStrm, loadString(3649) /* CUR*PB* */);   /* CUR01 */
        nextPutAll(aStrm, ccyCode(custAcct(self)));          /* CUR02 */
        nextPutAll(aStrm, ASTERISK);
        hostRate cand nextPutAll(aStrm, hostRate);           /* CUR03 */
        nextPutAll(aStrm, ASTERISK);
        nextPutAll(aStrm, ASTERISK);
        nextPutAll(aStrm, xCcyCode(self));                   /* CUR05 */
        add(segments, asSegment(aStrm));
    endif;
    }
``` makeIntermediaryInfo(self, aStrm, segments, aParty | anId)
Create REF segments for an Intemediary and place them in the Collection.

```
    {
    /* REF01, REF02 - for ABA */
    if not(isBlank(abaNum(aParty)))
      nextPutAll(aStrm, loadString(3638) /* REF*01* */);
      nextPutAll(aStrm, abaNum(aParty));
      add(segments, asSegment(aStrm));
    endif;

/* REF01, REF02 - for SWIFT */
    if not(isBlank(swiftId(aParty)))
      nextPutAll(aStrm, loadString(3634) /* REF*02* */);
      nextPutAll(aStrm, swiftId(aParty));
      add(segments, asSegment(aStrm));
    endif;

/* REF01, REF02 - for UK Sort Code */
    if not(isBlank(localClrCode(aParty)))
      nextPutAll(aStrm, loadString(3635) /* REF*21* */);
      nextPutAll(aStrm, localClrCode(aParty));
      add(segments, asSegment(aStrm));
    endif;
```

} makeN1s(self, aStrm, segments, repetitive | aParty, aStr, acctNum, flag, anAmt)
Create the N1 segments and place them in the Collection.

```
{
      if not(repetitive)

/* N101, N102 - Intermediary */
        aParty := intermediary(self);
        if (aStr := name(aParty)) cand (not(isBlank(aStr)))
          nextPutAll(aStrm, loadString(3641) /* N1*C1* */ );
          nextPutAll(aStrm, aStr);
          add(segments, asSegment(aStrm));
          /* N201, N202 - Intermediary */
          makeN2s(self, aStrm, segments, aParty);
          /* REF01, REF02 - Intermediary */
          makeIntermediaryInfo(self, aStrm, segments, aParty);
        endif;

/* N101, N102 - OtherPartyBank */
        aParty := otherPartyBank(self);
        if (aStr := name(aParty)) cand (not(isBlank(aStr)))
          nextPutAll(aStrm, loadString(3642) /* N1*RB* */ );
          nextPutAll(aStrm, aStr);
          add(segments, asSegment(aStrm));
          /* N201, N202 - OtherPartyBank */
          makeN2s(self, aStrm, segments, aParty);
          /* REF01, REF02 - OtherPartyBank */
          makeOtherPartyBankInfo(self, aStrm, segments, aParty);
        endif;

endif;

/* N101, N102 - OtherParty */
      aParty := otherParty(self);
      nextPutAll(aStrm, loadString(3643) /* N1*PE* */ );
      if not(repetitive)
        nextPutAll(aStrm, name(aParty));
        /* N103, N104 - OtherParty */
        if not(isBlank(otherPartyAcct(self)))
          nextPutAll(aStrm, loadString(3644) /* *ZZ* */);
          nextPutAll(aStrm, otherPartyAcct(self));
        endif;
        /* moved add outside this loop 8/29/92 to get the CRLF on a PE for
 repetitive - AWH */
      endif;
      add(segments, asSegment(aStrm));
      /* N201, N202 - OtherParty */
      if not(repetitive)
        makeN2s(self, aStrm, segments, aParty);
      endif;

/* REF01, REF02, REF03 - OtherParty */
      nextPutAll(aStrm, loadString(3637) /* REF*ZZ* */ );
      if class(aParty) = Bank
        nextPutAll(aStrm, YES);
      else
        nextPutAll(aStrm, NO);
      endif;

if deductFromBene?(self)
        nextPutAll(aStrm, loadString(3626) /* B */ );
      else
        nextPutAll(aStrm, loadString(3624) /* R */ );
      endif;

if deductCorrCharges?(self)
        nextPutAll(aStrm, loadString(3626) /* B */ );
      else
        nextPutAll(aStrm, loadString(3624) /* R */ );
      endif;

if conditionalPmt?(self)
        nextPutAll(aStrm, YES);
```

```
    else
      nextPutAll(aStrm, NO);
    endif;

/* REF03 */
    if not(isBlank(amount(self))) cand not(isBlank(xCcyCode(self)))
        nextPutAll(aStrm, ASTERISK);
        nextPutAll(aStrm, asX12Currency(amount(self), ccyCode(custAcct)));
    else
    endif;
    add(segments, asSegment(aStrm));

/* REF01, REF02 - otherParty */
    if not(repetitive)
      makeOtherPartyInfo(self, aStrm, segments, aParty);
    endif;
}
``` makeN2s(self, aStrm, segments, aParty | aStr)
Create the N2 segments and place them in the Collection.

```
{
    /* N201, N202 */
    nextPutAll(aStrm, loadString(3639) /* N2* */ );
    nextPutAll(aStrm, subString(address(aParty), 0, 35));
    nextPutAll(aStrm, ASTERISK);
    nextPutAll(aStrm, city(aParty));
    if not(isBlank(stateCode(aParty)))
      nextPutAll(aStrm, COMMA);
      nextPutAll(aStrm, SPACE);
      nextPutAll(aStrm, stateCode(aParty));
    endif;
    if not(isBlank(countryCode(aParty)))
        nextPutAll(aStrm, COMMA);
        nextPutAll(aStrm, SPACE);
        nextPutAll(aStrm, countryCode(aParty));
    endif;
    if size(aStr := asSegment(aStrm)) > 6
        add(segments, aStr);
    endif;
}
``` makeNTEs(self, aStrm, segments | aColl, aStr)
Create the NTE segments and place them in the Collection.

```
{
    if not(isBlank(hostSetupName(self))) cand
not(isBlank(lengthHostText(self)))
        aColl := removeBytes(details(self), lengthHostText(self));
    else
        aColl := details(self);
    endif;

if size(aColl) > 0

/* NTE01, NTE02 - first occurrence */
        nextPutAll(aStrm, loadString(3650) /* NTE*PMT* */ );
        nextPutAll(aStrm, aColl[0]);
        add(segments, asSegment(aStrm));

/* NTE01, NTE02 - second occurrence */
        if size(aColl) > 1
          nextPutAll(aStrm, loadString(3650) /* NTE*PMT* */ );
          nextPutAll(aStrm, aColl[1]);
          add(segments, asSegment(aStrm));
        endif;

endif;

/* NTE01, NTE02 - third occurrence */
    if (aStr := instToFnbc(self)) cand not(isBlank(aStr))
      nextPutAll(aStrm, loadString(3651) /* NTE*SPH* */ );
      nextPutAll(aStrm, aStr);
```

```
        add(segments, asSegment(aStrm));
      endif;

/* NTE01, NTE02 - fourth occurrence */
      if (aStr := instToBeneBank(self)) cand not(isBlank(aStr))
        nextPutAll(aStrm, loadString(3652) /* NTE*ORI* */ );
        nextPutAll(aStrm, aStr);
        add(segments, asSegment(aStrm));
      endif;
    }
``` makeOtherPartyBankInfo(self, aStrm, segments, aParty | anId)
    Create REF segments for an OtherPartyBank and place them in the
    Collection.

```
    {
      /* REF01, REF02 - for Fedwire ABA */
      if (anId := abaNum(aParty)) cand not(isBlank(anId))
        nextPutAll(aStrm, loadString(3638) /* REF*01* */ + anId);
        add(segments, asSegment(aStrm));
      endif;

/* REF01, REF02 - for SWIFT */
      if (anId := swiftId(aParty)) cand not(isBlank(anId))
        nextPutAll(aStrm, loadString(3634) /* REF*02* */ + anId);
        add(segments, asSegment(aStrm));
      endif;

/* REF01, REF02 - for UK Sort Code */
      if (anId := localClrCode(aParty)) cand not(isBlank(anId))
        nextPutAll(aStrm, loadString(3635) /* REF*21* */ + anId);
        add(segments, asSegment(aStrm));
      endif;

/* REF01, REF02 - for CHIPS UID */
      if (anId := chipsUid(aParty)) cand not(isBlank(anId))
        nextPutAll(aStrm, loadString(3636) /* REF*22* */ + anId);
        add(segments, asSegment(aStrm));
      endif;
    }
``` makeOtherPartyInfo(self, aStrm, segments, aParty | anId)
    Create REF segments for an OtherParty and place them in the Collection.

```
    {
      /* REF01, REF02 - for SWIFT */
      if (anId := swiftId(aParty)) cand not(isBlank(anId))
        nextPutAll(aStrm, loadString(3634) /* REF*02* */ + anId);
        add(segments, asSegment(aStrm));
      endif;

/* REF01, REF02 - for UK Sort Code */
      if (anId := localClrCode(aParty)) cand not(isBlank(anId))
        nextPutAll(aStrm, loadString(3635) /* REF*21* */ + anId);
        add(segments, asSegment(aStrm));
      endif;

/* REF01, REF02 - for CHIPS UID */
      if (anId := chipsUid(aParty)) cand not(isBlank(anId))
        nextPutAll(aStrm, loadString(3636) /* REF*22* */ + anId);
        add(segments, asSegment(aStrm));
      endif;

}
``` makeREFs(self, aStrm, segments, repetitive, operatorID | aStr)
    Create the REF segments and place them in the Collection.

```
    {
      /* REF01, REF02 - first occurrence */
      if repetitive
```

```
        nextPutAll(aStrm, loadString(3646) /* REF*RP* */ +
hostSetupName(self));
    add(segments, asSegment(aStrm));
  endif;

/* REF01, REF02 - second occurrence */
  if (aStr := docRefNum(self)) cand (not(isBlank(aStr)))
    nextPutAll(aStrm, loadString(3637) /* REF*ZZ* */ );
    nextPutAll(aStrm, docRefNum(self));
    add(segments, asSegment(aStrm));
  endif;

/* REF01, REF02, REF03 - third occurrence */
  nextPutAll(aStrm, loadString(3647) /* REF*IA* */ );
  nextPutAll(aStrm, operatorID + ASTERISK);
  nextPutAll(aStrm, NO);
  if reviewed?(self)
    nextPutAll(aStrm, YES);
  else
    nextPutAll(aStrm, NO);
  endif;
  add(segments, asSegment(aStrm));
}
``` setConditionalPmt(self, aValue)

```
{ setConditionalPmt?(self, aValue)
}
``` setConditionalPmt?(self, setting)
Update the conditionalPmt flag.

```
{
  addDirtyFld(self, #conditionalPmt?);
  ^record[#conditionalPmt?] := setting;
}
``` setDeductCorrCharges(self, aValue)

```
{ setDeductCorrCharges?(self, aValue)
}
``` setDeductCorrCharges?(self, aValue)

```
{ addDirtyFld(self, #deductCorrCharges?);
  ^record[#deductCorrCharges?] := aValue;
}
``` setDeductFromBene(self, aValue)

```
{ setDeductFromBene?(self, aValue)
}
``` setDeductFromBene?(self, aValue)

```
{ addDirtyFld(self, #deductFromBene?);
  ^record[#deductFromBene?] := aValue;
}
``` setInstToFnbc(self, aValue)
> 11-6-1991 AWH 3-19-1992 DH Revised to pass-through to setSpecialInstructions. 6-19-1992 AWH Revised to put it back the way it was

```
{
  addDirtyFld(self, #instToFnbc);
  ^record[#instToFnbc] := aValue;
}
``` setSpecialInstructions(self, aValue)

```
{ addDirtyFld(self, #specialInstructions);
  ^record[#specialInstructions] := aValue;
}
``` specialInstructions(self)
> Return the specialInstructions ivar as a String.

```
{
  ^record[#specialInstructions];
}
```

CCD

Source file:   CCD.CLS

Inherits from:   Object BusinessObject Instruction FundsXfer ACH

Inherited by:   (no descendants)

ACH Corporate Collection or Disbursement. This class can also be used to create ACH Tax Payments (TXP).

Instance variables:

| | |
|---|---|
| dirtyFlds | (From class BusinessObject) |
| dateLastChgd | (From class BusinessObject) |
| dateLastUsed | (From class BusinessObject) |
| lastChangedTime | (From class BusinessObject) |
| oldKey | (From class BusinessObject) |
| stamp | (From class BusinessObject) |
| dbQueryLock | (From class BusinessObject) |
| dbQuery | (From class BusinessObject) |
| record | (From class BusinessObject) |
| custAcct | (From class Instruction) |
| custBranch | (From class Instruction) |
| otherParty | (From class FundsXfer) |
| otherPartyBank | (From class FundsXfer) |
| intermediary | (From class FundsXfer) |
| details | (From class FundsXfer) |
| addenda | (From class ACH) |

Class variables:

$DisplayRules          (From class BusinessObject)
$NonDisplayIvars       (From class BusinessObject)
$ReviewLvls            (From class Instruction)
$FieldsNotApplicable   (From class FundsXfer)
$PartySelectTbl        (From class FundsXfer)
$InstTypes             (From class FundsXfer)
$RouteCodes            (From class FundsXfer)
$CutOffTimeTbl         (From class FundsXfer)
$StatusGrpTbl          (From class FundsXfer)
$SetupSources          (From class FundsXfer)
$ACHTranCodes          (From class ACH)

$DBACH                 (From class ACH)
$CCDTypes              Allowable values for ccdType Class methods:

dbQuery(self)
10/14/1991 21:17

```
{
  ^new(DBCCD);
}
``` init(self)
3/24/1992 8:51

```
{
  $CCDTypes := %Set("CCD", "CTP", "TXP");
}
```

Object methods:

asBPR05(self)
Return the BPR05 representation of self.

```
{
  if addenda(self) cor
      (details(self) cand (byteSize(details(self)) > (lengthHostText(self)
cor 0)))
    ^loadString(4006) /* CCP */ ;
  else
    ^loadString(4007) /* CCD */ ;
  endif;
}
``` asREF01(self)
Return the REF01 (third occurrence) representation of self.

```
{
  ^CREDIT ;
}
``` asREF02(self)
Return the REF02 (third occurrence) representation of self.

```
{
  ^indivId(self);
}
``` indivId(self)
Return the indivId.

```
{
  ^achId(otherParty(self));
}
``` indivName(self)
Return the indivName.

```
{
  ^name(otherParty(self));
}
``` runMorePage(self, par)
Runs the CCD addenda dialog on the receiver.

```
{ ^runModal(MoreCCD:late, par, self);
}
``` runMorePageViewOnly(self, par)
3/11/1992 14:50 Runs the view only version of the more CCD form.

```
{ ^runModal(ViewCCD:late, par, self);
}
```

CCDAddendum

| | |
|---|---|
| Source file: | CCDADDEN.CLS |
| Inherits from: | Object BusinessObject ACHAddendum |
| Inherited by: | CTXAddendum PPDAddendum |

A CCDAddendum is attached to a generic CCD to create a CCD+. Also used in CTX as an ivar that is a SortedCollection of CCDAddenda.

Instance variables:

| | |
|---|---|
| dirtyFlds | (From class BusinessObject) |
| dateLastChgd | (From class BusinessObject) |
| dateLastUsed | (From class BusinessObject) |
| lastChangedTime | (From class BusinessObject) |
| oldKey | (From class BusinessObject) |
| stamp | (From class BusinessObject) |
| dbQueryLock | (From class BusinessObject) |
| dbQuery | (From class BusinessObject) |
| record | (From class BusinessObject) |

Class variables:

| | |
|---|---|
| $DisplayRules | (From class BusinessObject) |
| $NonDisplayIvars | (From class BusinessObject) |
| $RefCodes | Reference codes |
| $DBCCDAddendum | DBQuery for CCDAddendum |
| $AdjCodes | Adjustment codes |
| $RefQuals | Reference qualifiers |

$CCDAddReqFlds                     CCDAddendum required fields
$DateQuals                         Date qualifiers Class methods:

dbQuery(self)
    Returns an instance of receiver's associated DBQuery class

```
{
    ^new(DBCCDAddendum:late);
}
``` init(self)
    11/14/1991 15:33

```
{
    $RefCodes:=nil;
    $AdjCodes:=nil;
    $RefQuals:=nil;
    $DateQuals:=nil;
}
``` loadData(self)
    Initialize the CCDAddendum reference tables.

```
{
   errorBox(self,loadString(4015) /* Programming error */ ,loadString(4016)
/* No need to send loadData message */ )
}
```

Object methods:

adjAmt(self)
    Return the adjAmt ivar.

```
{
  ^record[#adjAmt];
}
``` adjCode(self)
    Return the adjCode ivar.

```
{
  ^record[#adjCode];
}
``` amtPaid(self)
    Return the amtPaid ivar.

```
{
  ^record[#amtPaid];
}
``` asX12(self, aStrm, segments)
    Converts the CCDAddendum ivars to the X12 format.

```
{
   hasNTE?(self) cand makeNTE(self, aStrm, segments);
   hasREF?(self) cand makeREF(self, aStrm, segments);
   hasDTM?(self) cand makeDTM(self, aStrm, segments);
   hasRMR?(self) cand makeRMT(self, aStrm, segments);
   ^segments;
}
``` check(self | anX12 aTc aStrm tooBig numChars )

4/10/92 7/23/92: PPDAddendum no longer inherits this method. ADC, 7/23/92.

```
{ tooBig:=false;
  if class(self)=CCDAddendum
  then aTc:=new(TextCollection,5);
    aStrm:=new(X12Stream:late);
    anX12:=asX12(self,aStrm,aTc);
    numChars:=byteSizeNoCRLF(aTc);
    if numChars>80
    then tooBig:=true;
        addError(UPCServices[#dataChecker], msgType(self), 5223,
asString(numChars)
        + loadString(4030) /*   characters */
        );
    endif;
  endif;
  if not(tooBig)
  then checkDTM(self);
    checkNTE(self);
    checkREF(self);
    checkRMT(self);
    checkCharsForAllFields(self);
  endif;
  ^ok(UPCServices[#dataChecker]);
}
``` checkCharsForAllFields(self |temp aStr)

```
    {
      do(tuple(#rmtRefNum,#rmtDescription,#refNum,
               #description,#information ),
      {using(elem) aStr:=record[elem];
               checkChars(self,elem,aStr);
      });

}
``` checkDTM(self )

3/11/1992 14:37

```
{ if size(dateQual1(self))>0 cor date1(self) cor firstTime(self)
  then
      if isBlank(dateQual1(self))
      then addError(UPCServices[#dataChecker], msgType(self),
5201,loadString(4026)); /*
        Date Qualifier (1st) */
      endif;
      if date1(self)=nil
      then addError(UPCServices[#dataChecker], msgType(self),
5201,loadString(4027)); /*
        Date (1st) */
      endif;
  endif;
  if size(dateQual2(self))>0 cor date2(self) cor secondTime(self)
  then
      if isBlank(dateQual2(self))
      then addError(UPCServices[#dataChecker], msgType(self),
5201,loadString(4028)); /*
        Date Qualifier (2nd) */
      endif;
```

```
    if date2(self)=nil
    then addError(UPCServices[#dataChecker], msgType(self),
5201,loadString(4029)); /*
       Date (2nd) */
    endif;
  endif;
}
``` checkNTE(self)

3/11/1992 14:37

```
{
  if size(refCode(self))>0 and isBlank(information(self))
    then addError(UPCServices[#dataChecker], msgType(self),
5201,loadString(4024) /* NTE Information */ );
       ^nil;
    endif;
  if size(information(self))>0 and isBlank(refCode(self))
    then addError(UPCServices[#dataChecker], msgType(self),
5201,loadString(4025) /* NTE Reference Code */ );
       ^nil;
    endif;

}
``` checkREF(self)

3/11/1992 14:37

```
{
  if size(refQual(self))>0 cor size(refNum(self))>0 cor
size(description(self))>0 then
    if isBlank(refQual(self))
    then addError(UPCServices[#dataChecker], msgType(self),
5201,loadString(4021) /* Reference Qualifier */ );

endif;
    if isBlank(refNum(self))
    then addError(UPCServices[#dataChecker], msgType(self),
5201,loadString(4023) /* Reference Number */ );
    endif;
  endif;
}
``` checkRMT(self)

```
{
  if rmtFieldFilled?(self) cor class(self)=CTXAddendum then
    if isBlank(rmtRefQual(self))
    then addError(UPCServices[#dataChecker], msgType(self),
5201,loadString(4021) /* Reference Qualifier */ );
    endif;
    if isBlank(rmtRefNum(self))
    then addError(UPCServices[#dataChecker], msgType(self),
5201,loadString(4022) /* RMT Ref Number */ );
    endif;
  endif;
}
``` date1(self)

Return the date1 ivar.

```
{
  ^record[#date1];
}
``` date2(self)
> Return the date2 ivar.

```
{
  ^record[#date2];
}
``` dateQual1(self)
> Return the dateQual1 ivar.

```
{
  ^record[#dateQual1];
}
``` dateQual2(self)
> Return the dateQual2 ivar.

```
{
  ^record[#dateQual2];
}
``` description(self)
> Return the description ivar.

```
{
  ^record[#description];
}
``` discAmtDue(self)
> Return the discAmtDue ivar.

```
{
  ^record[#discAmtDue];
}
``` firstTime(self)
> 2/4/1992 10:21

```
{ ^record[#firstTime]
}
``` hasADX?(self | aStr, aDate)
> Determine if self has data for ADX segment.

```
{
  ^adjAmt(self) cand (adjAmt(self) > 0)
}
``` hasDTM?(self | aStr, aDate)
> Determine if self has data for DTM segment.

```
{
  ^not(isBlank(dateQual1(self))) cor
   not(isBlank(dateQual2(self))) cor
   not(isBlank(date1(self))) cor
```

```
      not(isBlank(date2(self))) cor
      not(isBlank(firstTime(self))) cor
      not(isBlank(secondTime(self))));
}
``` hasNTE?(self | aStr)
Determine if self has data for NTE segment.

```
{
  ^not(isBlank(refCode(self))) cor not(isBlank(information(self)));
}
``` hasREF?(self | aStr)
Determine if self has data for REF segment.

```
{
  ^not(isBlank(refQual(self))) cor
   not(isBlank(refNum(self))) cor not(isBlank(description(self))) ;
}
``` hasRMR?(self | aStr)
Determine if self has data for RMR segment.

```
{
  ^not(isBlank(rmtRefQual(self))) cor not(isBlank(rmtRefNum(self)));
}
``` information(self)
Return the information ivar.

```
{
  ^record[#information];
}
``` invoiceAmt(self)
Return the invoiceAmt ivar.

```
{
  ^record[#invoiceAmt];
}
``` makeADX(self, aStrm, segments)

```
{
  /* ADX01, ADX02 */
  nextPutAll(aStrm, loadString(4019) /* ADX* */);
  nextPutAll(aStrm, asRealString(FloatField, adjAmt(self), 2));
  nextPutAll(aStrm, ASTERISK);
  adjCode(self) cand nextPutAll(aStrm, adjCode(self));
  add(segments, asSegment(aStrm));
}
``` makeDTM(self, aStrm, segments)
Create the DTM segment and place it in the Collection.

```
{
  if not(isBlank(dateQual1(self)))
      nextPutAll(aStrm, loadString(4032) /* DTM* */ );
      not(isBlank(dateQual1(self))) cand nextPutAll(aStrm,
  asString(dateQual1(self)));
```

```
        nextPutAll(aStrm, ASTERISK);
        not(isBlank(date1(self))) cand nextPutAll(aStrm, asX12(date1(self)));
        if not(isBlank(firstTime(self)))
            nextPutAll(aStrm, ASTERISK);
            nextPutAll(aStrm, asX12(firstTime(self)));
        endif;
        add(segments, asSegment(aStrm));
    endif;

if not(isBlank(dateQual2(self)))
        nextPutAll(aStrm, loadString(4032) /* DTM* */ );
        not(isBlank(dateQual2(self))) cand nextPutAll(aStrm,
asString(dateQual2(self)));
        nextPutAll(aStrm, ASTERISK);
        not(isBlank(date2(self))) cand nextPutAll(aStrm, asX12(date2(self)));
        if not(isBlank(secondTime(self)))
            nextPutAll(aStrm, ASTERISK);
            nextPutAll(aStrm, asX12(secondTime(self)));
        endif;
        add(segments, asSegment(aStrm));
    endif;
}
``` makeNTE(self, aStrm, segments)
Create the NTE segment and place it in the Collection.

```
{
    nextPutAll(aStrm, loadString(4034) /* NTE* */);
    not(isBlank(refCode(self))) cand nextPutAll(aStrm,
asString(refCode(self)));
    nextPutAll(aStrm, ASTERISK);
    nextPutAll(aStrm, asString(information(self)));
    add(segments, asSegment(aStrm));
}
``` makeREF(self, aStrm, segments| putSomething)
Create the REF segment and place it in the Collection.

```
{
    nextPutAll(aStrm, loadString(4017) /* REF* */);
    not(isBlank(refQual(self))) cand nextPutAll(aStrm, putSomething :=
asString(refQual(self)));
    nextPutAll(aStrm, ASTERISK);
    not(isBlank(refNum(self))) cand  nextPutAll(aStrm, putSomething :=
asString(refNum(self)));
    nextPutAll(aStrm, ASTERISK);
    not(isBlank(description(self))) cand nextPutAll(aStrm, putSomething :=
asString(description(self)));
    (putSomething cand add(segments, asSegment(aStrm))) cor asSegment(aStrm);
}
``` makeRMR(self, aStrm, segments)
Create the RMR segment and place it in the Collection.

```
{
    /* RMR01 - RMR06 */
    nextPutAll(aStrm, loadString(4033) /* RMR* */);
    not(isBlank(rmtRefQual(self))) cand nextPutAll(aStrm,
asString(rmtRefQual(self)));
    nextPutAll(aStrm, ASTERISK);
    not(isBlank(rmtRefNum(self))) cand nextPutAll(aStrm,
asString(rmtRefNum(self)));
    nextPutAll(aStrm, ASTERISK);
    nextPutAll(aStrm, ASTERISK);
    amtPaid(self) cand (amtPaid(self) <> 0)
        cand nextPutAll(aStrm, asRealString(FloatField, amtPaid(self), 2));
    nextPutAll(aStrm, ASTERISK);
    invoiceAmt(self) cand (invoiceAmt(self) <> 0)
        cand nextPutAll(aStrm, asRealString(FloatField, invoiceAmt(self), 2));
    nextPutAll(aStrm, ASTERISK);
    not(isBlank(discAmtDue(self)))
```

```
        cand nextPutAll(aStrm, asRealString(FloatField, discAmtDue(self), 2));
      add(segments, asSegment(aStrm));
  }
``` makeRMT(self, aStrm, segments)
    Create the RMR segment and place it in the Collection.

```
  {
    makeRMR(self, aStrm, segments);

/* REF01, REF03 */
    if not(isBlank(rmtDescription(self)))
        nextPutAll(aStrm, loadString(4017) /* REF* */);
        nextPutAll(aStrm, asString(rmtRefQual(self)));
        nextPutAll(aStrm, ASTERISK);
        nextPutAll(aStrm, ASTERISK);
        nextPutAll(aStrm, asDisplayString(rmtDescription(self)));
        add(segments, asSegment(aStrm));
    endif;

hasADX?(self) cand makeADX(self, aStrm, segments);
  }
``` makeTXP(self, aStrm, segments)
    Create the TXP segment and place it in the Collection.

```
  {
    nextPutAll(aStrm, loadString(4031) /* TXP* */ );
    add(segments, asSegment(aStrm));
  }
``` refCode(self)
    Return the refCode ivar.

```
  {
    ^record[#refCode];
  }
``` refNum(self)
    Return the refNum ivar.

```
  {
    ^record[#refNum];
  }
``` refQual(self)
    Return the refQual ivar.

```
  {
    ^record[#refQual];
  }
``` rmtDescription(self)
    Return the rmtDescription ivar.

```
  {
    ^record[#rmtDescription];
  }
``` rmtFieldFilled?(self)
    Revised 4/14 to use size rather than NULLSTR and eliminate referecnes to BLANKREAL

```
{ ^size(rmtDescription(self))>0 cor size(rmtRefNum(self))>0 cor
size(rmtRefQual(self))>0 cor
    (invoiceAmt(self) cand invoiceAmt(self)>0) cor
    (adjAmt(self) cand adjAmt(self)>0) cor
    (amtPaid(self) cand amtPaid(self)>0) cor
    (termsDiscAmt(self) cand termsDiscAmt(self)>0) cor
    size(adjCode(self))>0;
}
``` rmtRefNum(self)

Return the rmtRefNum ivar.

```
{
   ^record[#rmtRefNum];
}
``` rmtRefQual(self)

Return the rmtRefQual ivar.

```
{
   ^record[#rmtRefQual];
}
``` secondTime(self)

2/4/1992 10:21

```
{ ^record[#secondTime]
}
``` setAdjAmt(self, aValue)

11-5-1991 AWH

```
{ addDirtyFld(self, #adjAmt);
   ^record[#adjAmt] := aValue;
}
``` setAdjCode(self, aValue)

11-5-1991 AWH

```
{ addDirtyFld(self, #adjCode);
   ^record[#adjCode] := aValue;
}
``` setAdjCodeByStr(self, aStr | aCode)

Update the adjCode ivar. aStr is presumed to be a String which contains an adjustment code in the first two positions.

```
{
   aCode := subString(aStr, 0, 2);
   setAdjCode(self, aCode);
}
``` setAmtPaid(self, aValue)

11-5-1991 AWH

```
{ addDirtyFld(self, #amtPaid);
   ^record[#amtPaid] := aValue;
```

} setDate(self, aDate, aNum)
Update a date ivar.

```
{
  if aNum == 1
    setDate1(self, aDate);
  else
    setDate2(self,aDate);
  endif;
}
``` setDate1(self, aValue)
11-5-1991 AWH

```
{ addDirtyFld(self, #date1);
  ^record[#date1] := aValue;
}
``` setDate2(self, aValue)
11-5-1991 AWH

```
{ addDirtyFld(self, #date2);
  ^record[#date2] := aValue;
}
``` setDateQual(self, aStr, aNum)
Update a dateQual ivar.

```
{ if aNum == 1
  then setDateQual1(self, aStr);
  else setDateQual2(self, aStr);
  endif;
}
``` setDateQual1(self, aValue)
11-5-1991 AWH

```
{ addDirtyFld(self, #dateQual1);
  ^record[#dateQual1] := aValue;
}
``` setDateQual2(self, aValue)
11-5-1991 AWH

```
{ addDirtyFld(self, #dateQual2);
  ^record[#dateQual2] := aValue;
}
``` setDateQualByStr(self, aStr, aNum | aQual)
Update a dateQual ivar. aStr is presumed to be a String which contains a date qualifier in the first three positions. aNum is used to differentiate 1 or 2.

```
{
  aQual := subString(aStr, 0, 3);
  setDateQual(self, aQual, aNum);
}
``` setDescription(self, aValue)
    11-5-1991 AWH

```
{ addDirtyFld(self, #description);
  ^record[#description] := aValue;
}
``` setDiscAmtDue(self, aValue)
    11-5-1991 AWH

```
{ addDirtyFld(self, #discAmtDue);
  ^record[#discAmtDue] := aValue;
}
``` setFirstTime(self, aValue)
    2-4-92

```
{ addDirtyFld(self, #firstTime);
  ^record[#firstTime] := aValue;
}
``` setInformation(self, aValue)
    11-5-1991 AWH

```
{ addDirtyFld(self, #information);
  ^record[#information] := aValue;
}
``` setInvoiceAmt(self, aValue)
    11-5-1991 AWH

```
{ addDirtyFld(self, #invoiceAmt);
  ^record[#invoiceAmt] := aValue;
}
``` setRefCode(self, aValue)
    11-5-1991 AWH

```
{ addDirtyFld(self, #refCode);
  ^record[#refCode] := aValue;
}
``` setRefCodeByStr(self, aStr | aCode)
    Update the refCode ivar. aStr is presumed to be a String which contains a
    reference code in the first two positions.

```
{
  aCode := subString(aStr, 0, 3);
  setRefCode(self, aCode);
}
``` setRefNum(self, aValue)
    11-5-1991 AWH

```
{ addDirtyFld(self, #refNum);
  ^record[#refNum] := aValue;
}
``` setRefQual(self, aValue)
    11-5-1991 AWH

```
{ addDirtyFld(self, #refQual);
  ^record[#refQual] := aValue;
}
``` setRefQualByStr(self, aStr | aQual)
Update the refQual ivar. aStr is presumed to be a String which contains a reference code in the first two positions.

```
{
  aQual := subString(aStr, 0, 2);
  setRefQual(self, aQual);
}
``` setRmtDescription(self, aValue)
11-5-1991 AWH

```
{ addDirtyFld(self, #rmtDescription);
  ^record[#rmtDescription] := aValue;
}
``` setRmtRefNum(self, aValue)
11-5-1991 AWH

```
{ addDirtyFld(self, #rmtRefNum);
  ^record[#rmtRefNum] := aValue;
}
``` setRmtRefQual(self, aValue)
11-5-1991 AWH

```
{ addDirtyFld(self, #rmtRefQual);
  ^record[#rmtRefQual] := aValue;
}
``` setRmtRefQualByStr(self, aStr | aQual)
Update the rmtRefQual ivar. aStr is presumed to be a String which contains a reference code in the first two positions.

```
{
  aQual := subString(aStr, 0, 2);
  setRmtRefQual(self, aQual);
}
``` setSecondTime(self, aValue)
2-4-92

```
{ addDirtyFld(self, #secondTime);
  ^record[#secondTime] := aValue;
}
``` setSubjToDiscAmt(self, aValue)
11-5-1991 AWH

```
{ addDirtyFld(self, #subjToDiscAmt);
  ^record[#subjToDiscAmt] := aValue;
}
``` setTermsDiscAmt(self, aValue)
11-5-1991 AWH

```
{ addDirtyFld(self, #termsDiscAmt);
  ^record[#termsDiscAmt] := aValue;
}
``` subjToDiscAmt(self)
    Return the subjToDiscAmt ivar.

```
{
  ^record[#subjToDiscAmt];
}
``` termsDiscAmt(self)
    Return the termsDiscAmt ivar.

```
{
  ^record[#termsDiscAmt];
}
```

CTP

| | |
|---|---|
| Source file: | CTP.CLS |
| Inherits from: | Object BusinessObject Instruction FundsXfer ACH |
| Inherited by: | (no descendants) |

ACH Corporate Trade Payment

Instance variables:

| | |
|---|---|
| dirtyFlds | (From class BusinessObject) |
| dateLastChgd | (From class BusinessObject) |
| dateLastUsed | (From class BusinessObject) |
| lastChangedTime | (From class BusinessObject) |
| oldKey | (From class BusinessObject) |
| stamp | (From class BusinessObject) |
| dbQueryLock | (From class BusinessObject) |
| dbQuery | (From class BusinessObject) |
| record | (From class BusinessObject) |
| custAcct | (From class Instruction) |
| custBranch | (From class Instruction) |
| otherParty | (From class FundsXfer) |
| otherPartyBank | (From class FundsXfer) |
| intermediary | (From class FundsXfer) |
| details | (From class FundsXfer) |
| addenda | (From class ACH) |

Class variables:

| | |
|---|---|
| $DisplayRules | (From class BusinessObject) |
| $NonDisplayIvars | (From class BusinessObject) |
| $ReviewLvls | (From class Instruction) |

$FieldsNotApplicable        (From class FundsXfer)
$PartySelectTbl             (From class FundsXfer)
$InstTypes                  (From class FundsXfer)
$RouteCodes                 (From class FundsXfer)
$CutOffTimeTbl              (From class FundsXfer)
$StatusGrpTbl               (From class FundsXfer)
$SetupSources               (From class FundsXfer)
$ACHTranCodes               (From class ACH)
$DBACH                      (From class ACH)

Class methods:

dbQuery(self)
10/14/1991 21:17

```
{
   ^new(DBCTP);
}
```

Object methods:

addAddendum(self, addendum)
Add a CTPAddendum object to the addenda collection.

```
{ add(addenda(self), primSeqNum(addendum), addendum);
  addDirtyFld(self, #addenda);
  setHasAddendaOrDetails?(self,'Y');
  addDirtyFld(self, #hasAddendaOrDetails?);
  if isSetup(self)
     setSetupName(addendum,setupName(self))
  else setXferRefNum(addendum,xferRefNum(self))
  endif;
}
``` addendaCount(self | count)
Count the primary and secondary addenda. 11/20/91 max of 450

```
{ count := 0;
  do(addenda,
   { using(addendum) count := count + 1 + secondaryAddendaCount(addendum);
  });
  ^count
}
``` asBPR05(self)
Return the BPR05 representation of self.

```
{
   ^loadString(4061) /* CTP */
}
``` asREF01(self)
Return the REF01 (third occurrence) representation of self.

```
{
   ^loadString(4060) /* AN */ ;
}
``` asREF02(self)
> Return the REF02 (third occurrence) representation of self.

```
{
    ^docRefNum(self);
}
``` atAddendum(self, idx)
> Return the CTPAddendum object specified by idx.

```
{
    ^at(addenda(self), idx);
}
``` fillSummary(self, aBox)
> Fill the summary area.

```
{
    do(addenda(self),
        {using(addendum) addString(aBox, asDisplayX12(addendum))}
    );
}
``` init(self)
> Initialize self.

```
{
    init(self:ancestor);
    initAddenda(self);
}
``` initAddenda(self)
> Initializes addenda to default value.

```
{
    ^addenda := new(IdentityDictionary, asInt(450*1.3));
}
``` isValid?(self | ok, sum )
> Check that the sum of the net amounts agrees with the transaction amount.
> ADC, 7/22/92. 7/29/92 ADC: Handle the case where the user doesn't
> bother to enter an amount, ie, amount(self) is nil. 7/31/92 ADC: Suspends
> the test if the size of the addenda collection is 0, meaning there are no
> addenda. 8/5/92 ADC: Imbalance is a warning for setups.

```
{ ok:=isValid?(self:ancestor);

if ok /* ok so far.  Apply test for non-setups and setups with amounts */
    cand (not(isSetup(self)) cor (amount(self) cand amount(self) <> 0))
then sum := 0.0;
    do(addenda,
    { using(anAddendum) sum := sum + (netAmt(anAddendum) cor 0);
    });

if (size(addenda) > 0) cand (notEqualTo(sum, amount(self)))
    then addError(UPCServices[#dataChecker], msgType(self), 5232,
        asCurrencyString(sum, USD));
    endif;
endif; /* checking the addenda may have added error messages via the
    data checker. If so, the ACH transaction is not valid */
^ok(UPCServices[#dataChecker]);
}
``` msgType(self)
    8/5/92 ADC: Returns type of warning message

```
{ if xferRefNum(self)
  then ^LIS_DATA_ERROR
  else ^LIS_DATA_WARNING
  endif;
}
``` nextSeqNum(self | count)
    Get the next available sequence number for an addendum. 11/20/91 max of 450

```
{
  if (count := addendaCount(self)) < 450
    do(over(1, 450),
    {using(i)
      if not(addenda[i])
        ^i;
      endif;
    });
  endif;

errorBox(loadString(4062) /* CTP:nextSeqNum */ ,
    "Total primary and secondary addenda count is now " +
    asString(count) +
    ". No more sequence numbers are available.");

^nil;
}
``` removeAddendum(self, addendum)
    Remove a CTPAddendum object from the addenda collection.

```
{ remove(addenda(self), primSeqNum(addendum));
  setDirtyFld(self, #addendum);
  size(addenda) = 0 cand setHasAddendaOrDetails?(self,nil);
  addDirtyFld(self, #hasAddendaOrDetails?);
}
``` runMorePage(self, par)
    Runs the CTP addenda dialog on the receiver.

```
{
  ^runModal(MoreCTP, par, self);
}
``` runMorePageViewOnly(self, par)
    3/11/1992 14:50 Runs the view only version of the more CTP form.

```
{ ^runModal(ViewCTP:late, par, self);
}
``` setAddendaSetupName(self)
    2/19/1992 15:44 Sets the key of all the addenda.

```
{ do(addenda,
  { using(addendum) setSetupName(addendum, setupName(self));
  });
}
```

CTPAddendum

Source file:	CTPADDEN.CLS

Inherits from:	Object BusinessObject ACHAddendum

Inherited by:	(no descendants)

ACH CTPAddendum object. Can be used to generate both Primary and Secondary Addenda Records.

Instance variables:

| | |
|---|---|
| dirtyFlds | (From class BusinessObject) |
| dateLastChgd | (From class BusinessObject) |
| dateLastUsed | (From class BusinessObject) |
| lastChangedTime | (From class BusinessObject) |
| oldKey | (From class BusinessObject) |
| stamp | (From class BusinessObject) |
| dbQueryLock | (From class BusinessObject) |
| dbQuery | (From class BusinessObject) |
| record | (From class BusinessObject) |
| note | free form text |
| adjustments | adjustment pairs |
| hasNotes? | has free form text |
| hasAdjustments? | whether or not this addendum has code amy adjustment pairs |

Class variables:

| | |
|---|---|
| $DisplayRules | (From class BusinessObject) |
| $NonDisplayIvars | (From class BusinessObject) |
| $CTPAdjCodes | CTPAddendum adjustment codes |
| $DBCTPAddendum | DBQuery for CTPAddendum |
| $RefDocs | Reference doument codes |
| $CTPAddReqFlds | CTPAddendum required fields |
| $APmtTypes | ACH payment types |

Class methods:

aPmtTypes(self)

Returns a dictionary of ACH payment type structs keyed by the numeric value of the payment code type.

```
{
    ^$APmtTypes cor $APmtTypes:=aPmtTypes(new(DBCTPAddendum));
}
``` dbQuery(self)

Returns an instance of receiver's associated DBQuery class

```
{
    ^new(DBCTPAddendum:late);
}
``` init(self)

```
{ $CTPAdjCodes:=$RefDocs:=$APmtTypes:=nil;
}
``` loadData(self)

Initialize the CTPAddendum reference tables.

```
{ errorBox(self,loadString(4070) /* Programming error */ ,loadString(4071)
/* No need to send loadData message */ );
/*  loadRefDocs(self);
    loadAPmtTypes(self);
    loadAdjCodes(self);*/
}
``` new(self)

Create an instance of CTPAddendum. Do automatic initialization.

```
{
    ^init(new(self:Behavior));
}
``` refDocs(self)

Returns a dictionary of reference document code structs keyed by the numeric value of the reference doc code.

```
{
    ^$RefDocs cor $RefDocs:=refDocs(new(DBCTPAddendum));
}
```

Object methods:

adjAmt(self)

```
{
    ^record[#adjAmt];
}
``` adjCode(self)

Return the adjCode ivar.

```
{
    ^record[#adjCode];
}
``` adjustments(self)

Return the adjustments ivar.

```
{
    ^adjustments;
}
``` anyFieldFilled?(self)

3/11/1992 17:34

```
{
    ^size(pmtType(self))>0 cor
      size(refDoc(self))>0  cor
      size(refNum(self))>0  cor
      docAmt(self) cor refDate(self) cor
      discAmt(self) cor adjAmt(self) cor size(adjustments(self))>0
}
``` asX12(self, aStrm, segments)
    Converts the CTPAddendum ivars to the X12 format.

```
{
    makeRMR(self, aStrm, segments);
    makeNTEs(self, aStrm, segments);
    makeREF(self, aStrm, segments);
    makeDTM(self, aStrm, segments);
    makeADX(self, aStrm, segments);
    ^segments;
}
``` availBytesForNote(self | totPairs, filler, bytesAvail, numLines)
    Return the number of bytes available for the note. NOTE: Need constant
    for 711. 711 represents the total number of bytes available for the
    secondary addenda. This happens to be 9 lines of 79 characters each.
    Since each adjustment pair takes up 12 bytes, this allow a maximum of 6
    adjustment pairs per line (secondary addenda line), with 7 bytes remaining.
    Any freeform note must be placed in the remaining bytes following the
    adjustment pairs. To determine the number of available bytes for a note:
    1) Get the current number of adjustment pairs already defined. 2)
    Compute the number of filler bytes remaining for each secondary addenda
    line. Since each ajustment pair uses 12 bytes, then a maximum of 6
    adjustment pairs are allowed in each line, leaving 7 free bytes.
    Unfortunately, these bytes cannot be used for anything. Thus from the
    total number of adjustment pairs, determine how many lines will be
    needed by dividing the total pairs by 6 and truncating the value. Since the
    remaining bytes of the last line to contain adjustment pairs can be used for
    notes, this line should not be counted. (That's why the truncation method
    is used). Once the number of lines has been calculated, multiply by 7
    (bytes) to determine the unused bytes per line. 3) For each primary
    addenda uses a maximum of 10 lines of 79 chars each or 790 bytes. Since
    the first or primary addenda record uses the first line, only 9 lines remain
    or 711 bytes. Subtract the amount of bytes used by the adjustment pairs
    including the unused bytes to determine the total number of bytes left for
    the note.

```
{
    totPairs := numAdjPairs(self);
    numLines := totPairs / 6;

/************************************************************
        Unfortunately the above calculation works fine unless
        the total adjustment pairs is a multiple of 6. In
        this case, the last line to hold adjustment pairs
        will be included in the count. So the line count should
        one less than calculated, because the last
        seven bytes of that line can be used for notes.
    ************************************************************/
    if (totPairs mod 6) = 0
        numLines := numLines - 1;
    endif;
    filler := numLines * 7;
    ^bytesAvail := 711 - ((totPairs * 12) + filler);
}
``` calcAvailNoteText(self | tmpNum noteSize)
    8/14/1991 10:52 Calculate the available amount of note text based on the
    number of adjCode/adjAmt pairs + 7 characters of slack not usable per
    secondary addenda except for the last one.

```
{ tmpNum := numAdjPairs(self);
  noteSize := 711 - ((tmpNum/6)*7) - (tmpNum*12);
  if (tmpNum mod 6) == 0 cand (tmpNum -= 0)
  then
    noteSize := noteSize + 7;
  endif;
  ^noteSize;
}
``` calcNetAmt(self | amt1, amt2, amt3, anAmt)
Calculate the net amount.

```
{
  amt1 := docAmt(self) cor amt1 := 0.0;
  amt2 := discAmt(self) cor amt2 := 0.0;
  amt3 := adjAmt(self) cor amt3 := 0.0;
  anAmt := amt1 - amt2 - amt3;
  setNetAmt(self, anAmt);
}
``` check(self)
3/11/1992 17:26

```
{
  if anyFieldFilled?(self) then
    if size(pmtType(self))=0
    then addError(UPCServices[#dataChecker], msgType(self),
5201,loadString(4072) /* Payment Type */ );
    endif;
    if size(refNum(self))=0
    then addError(UPCServices[#dataChecker], msgType(self),
5201,loadString(4073) /* Reference Number */ );
    endif;
    if size(refDoc(self))=0
    then addError(UPCServices[#dataChecker], msgType(self),
5201,loadString(4074) /* Reference Document */ );
    endif;
    if refDate(self)=nil
    then addError(UPCServices[#dataChecker], msgType(self),
5201,loadString(4075) /* Reference Date */ );
    endif;
    if docAmt(self)=nil
    then addError(UPCServices[#dataChecker], msgType(self),
5201,loadString(4076) /* Document Amount */ );
    endif;
  endif;
  checkCharsForAllFields(self);
  checkAdjustments(self);
  ^ok(UPCServices[#dataChecker]);
}
``` checkAdjustments(self | maxNoteSize, totalAdjust)
3/12/1992 8:06 7/27/92: Revisited by ADC. Was not doing this test
correctly. Was only applying the comparison of the adjustment amount to
the adjustment total when the total of adjustments was greater than zero.
Fixed. ADC, 7/27/92. 7/27/92: Reinstated the test of totalAdjust > 0.
The idea is that users are free to enter an adjustment amount in the
adjAmt field without all the detailed adjustment entries, but once they
make a detailed adjustment entry, the total of all such entries must equal
the adjAmt field. ADC, 7/27/92.

```
{ totalAdjust := 0.0;
  do(adjustments,
  { using(elem)
    if size(elem[0]) > 0 cand (not(elem[1]) cor elem[1]=0)
    then addError(UPCServices[#dataChecker], msgType(self), 5201,
loadString(4077) /*
```

```
     Adjustment Amount for Adjustment Code   */
       + asCurrencyString(elem[0], USD));
     endif;
     if (elem[1] cand elem[1] > 0) cand isBlank(elem[0])
       then addError(UPCServices[#dataChecker], msgType(self), 5201,
loadString(4079) /*
       Adjustment Code for   */
       + asCurrencyString(elem[1], USD) + loadString(4078)); /*  Adjustment
Amount */
     endif; /* if there is an adjustment amount, add it to the total */
     elem[1] cand totalAdjust:=totalAdjust+elem[1];
   }); /* Compare the total of adjustments to adjAmt */
   if totalAdjust > 0 cand (notEqualTo(totalAdjust, adjAmt(self)))
     then addError(UPCServices[#dataChecker], msgType(self), 5224,
asCurrencyString(totalAdjust,
       USD));
   endif;
   maxNoteSize:=calcAvailNoteText(self);
   if noteSize(self) > maxNoteSize
     then addError(UPCServices[#dataChecker], msgType(self), 5213,
loadString(4083) /* by */
       + asString(noteSize(self) - maxNoteSize) + loadString(4084)); /*
characters */
   endif;
}
``` checkCharsForAllFields(self | temp aStr)

```
{
  do(tuple(#refNum),
   {using(elem) aStr:=getVar(self,elem);
               checkChars(self,elem,aStr);
   });

}
``` copy(self | copy)

12/13/1991 17:00 Makes a copy of self.

```
{ copy := copy(self:ancestor);
  setAdjustments(copy, copy(adjustments(self)));
  ^copy;
``` dateQualByRefDoc(self, aCode | aDict, aNumericCode)

Look up a date qualifier using reference document code as a search
argument.

```
{
  aDict := refDocs(class(self));
  aNumericCode := asInt(aCode, 10);

^aDict[aNumericCode][#dtm01];
}
``` deleteAdjustPair(self, adjCode, adjAmt | idx, exitFlag, adjTot)

Delete an adjustment pair.

```
{
   idx := 0;
   loop
   while (exitFlag == nil)
     if (adjustments[idx][0] = adjCode) cand (adjustments[idx][1] = adjAmt)
       /*
       adjTot := adjAmt(self) - adjAmt;
       setAdjAmt(self, adjTot);
       */
       remove(adjustments, idx);
       exitFlag := 0;
     else
       idx := idx + 1;
     endif;
   endLoop;
   addDirtyFld(self,#adjustments);
``` deleteAdjustPairByStr(self, aStr | adjCode, adjAmt)
    Delete an adjustment pair given a String. aStr is presumed to contain an adjustment code in the first 2 positions, followed by a space, followed by the amount.

```
{
  adjCode := subString(aStr, 0, 2);
  adjAmt := asReal(subString(aStr, 3, size(aStr)));
  deleteAdjustPair(self, adjCode, adjAmt);
}
``` discAmt(self)
    Return the discAmt ivar.

```
{
  ^record[#discAmt];
}
``` docAmt(self)
    Return the docAmt ivar.

```
{
  ^record[#docAmt];
}
``` fillAdjustPairs(self, aBox | blankString, aStrm)
    Fill the ComboBox with adjustment Strings.

```
{
  blankString := stringOf(' ', 45);
  aStrm := streamOver(blankString);
  do(adjustments,
     {using(aTuple)
       nextPutAll(aStrm, asString(aTuple[0]));
       setPosition(aStrm, 3);
       nextPutAll(aStrm, asString(aTuple[1]));
       addString(aBox, collection(aStrm));
       setCollection(aStrm, blankString);
       reset(aStrm);
     }
  );
}
``` hasAdjustments?(self)
    3/16/1992 14:43

```
{ ^hasAdjustments?
}
``` hasNotes?(self)
    3/16/1992 14:43

```
{ ^hasNotes?
}
``` init(self)
    Initialze the primary corporate addenda record.

```
{ init(self:ancestor);
  record[#docAmt] := record[#discAmt]
        := record[#adjAmt] := record[#netAmt] := 0.0;
  adjustments := new(OrderedCollection, 8);
}
``` insertAdjustPair(self, adjCode, adjAmt, idx | aTuple)

Add an adjustment pair. For each primary addendum there can be 9 secondary addenda. For each secondary addenda, there can be at most 6 adjCode/AdjAmt pairs. 6 X 9 = 54 pairs maximum. NOTE: Need constant for 54. 8/14/92 ADC: Eliminated an ancient error message that limited the number of pairs to 54. It is the responsibility of the calling method to test the limit.

```
{ aTuple := tuple(adjCode, adjAmt);
  if idx
  then put(adjustments, aTuple, idx);
  else add(adjustments, aTuple);
    hasAdjustments?:=true;
    addDirtyFld(self,#adjustments);
  endif;
}
``` makeADX(self, aStrm, segments)

Create the ADX segment and place it in the Collection.

```
{
  if size(adjustments(self)) > 0
    nextPutAll(aStrm, loadString(4092) /* ADX* */ );
    nextPutAll(aStrm, asRealString(FloatField, adjAmt(self), 2));
    nextPutAll(aStrm, ASTERISK);
    nextPutAll(aStrm, loadString(4093) /* ZZ */ );
    add(segments, asSegment(aStrm));
  endif;
}
``` makeDTM(self, aStrm, segments)

Create the DTM segment and place it in the Collection.

```
{
  nextPutAll(aStrm, loadString(4094) /* DTM* */ );

if pmtType(self)
    nextPutAll(aStrm, dateQualByRefDoc(self, refDoc(self)) + ASTERISK);
    nextPutAll(aStrm, asX12(refDate(self)));
  endif;

add(segments, asSegment(aStrm));
}
``` makeNTEs(self, aStrm, segments | blank7, pairCtr, strmSize, begIdx, endIdx)

Create the NTE segments and place them in the Collection. Each NTE segment corresponds to a CTP secondary addendum.

```
    if size(adjustments(self)) > 0
      blank7 := stringOf(' ', 7);
      pairCtr := 0;
      do(adjustments(self),
        {using(aPair | aStr)
          pairCtr := pairCtr + 1;
          nextPutAll(aStrm, right(aPair[0], 2, ZERO));
          nextPutAll(aStrm, subString(asPaddedString((aPair[1] * 100),
                                                     12), 0, 10));
          if ((pairCtr mod 6) == 0) cand pairCtr < size(adjustments(self))
            nextPutAll(aStrm, blank7);
          endif;}
        );
    endif;

not(isBlank(note(self))) cand nextPutAll(aStrm, asString(note(self)));

if position(aStrm) > 0
      strmSize := position(aStrm);
      begIdx := 0;
```

```
            endIdx := min(strmSize, 60);
            loop
                add(segments, loadString(3650) /* NTE*PMT* */ +
                            subString(collection(aStrm), begIdx, endIdx) + CR_LF);
                begIdx := endIdx;
                endIdx := endIdx + 60;
                endIdx := min(strmSize, endIdx);
            while (begIdx < strmSize)
            endLoop;

reset(aStrm);
        endif;
    }
``` makeREF(self, aStrm, segments)
Create the REF segment and place it in the Collection.

```
    {
        nextPutAll(aStrm, loadString(4095) /* REF* */ );
        if pmtType(self)
            nextPutAll(aStrm, refQualByPmtType(self, pmtType(self)) + ASTERISK);
            nextPutAll(aStrm, pmtType(self));
        endif;

add(segments, asSegment(aStrm));
    }
``` makeRMR(self, aStrm, segments | aStr, aReal)
Create the RMR segment and place it in the Collection.

```
    {
        nextPutAll(aStrm, loadString(4096) /* RMR* */ );

/* RMR01 */
        not(isBlank(refDoc(self))) cand
            nextPutAll(aStrm, refQualByRefDoc(self, refDoc(self)));

nextPutAll(aStrm, ASTERISK);

/* RMR02 */
        not(isBlank(refNum(self))) cand
            nextPutAll(aStrm, asString(refNum(self)));
        nextPutAll(aStrm, ASTERISK);
        nextPutAll(aStrm, ASTERISK);

/* RMR04 */
        not(isBlank(netAmt(self))) cand
            nextPutAll(aStrm, asRealString(FloatField, netAmt(self), 2));
        nextPutAll(aStrm, ASTERISK);

/* RMR05 */
        not(isBlank(docAmt(self))) cand
            nextPutAll(aStrm, asRealString(FloatField, docAmt(self), 2));
        nextPutAll(aStrm, ASTERISK);

/* RMR06 */
        not(isBlank(discAmt(self))) cand
            nextPutAll(aStrm, asRealString(FloatField, discAmt(self), 2));

add(segments, asSegment(aStrm));
    }
``` netAmt(self)
Return the netAmt ivar.

```
    {
        calcNetAmt(self);
        ^record[#netAmt];
    }
``` note(self)

Return the note ivar.

```
{
  ^note;
}
``` noteAsString(self | aStrm)

3/12/1992 9:50

```
{ aStrm:=streamOver(NULLSTR);
  do(note,
  {using(line)
    nextPutAll(aStrm,asDisplayString(line));
  });
  ^collection(aStrm);
``` noteSize(self | noteSize)

1/13/1992 16:02 Returns the note size.

```
{ noteSize := 0;
  do(note,
  { using(line) noteSize := noteSize + size(line);
  });
  ^noteSize;
}
``` numAdjPairs(self)

Return the number of adjCode/amount pairs. NOTE: Requested by KathyM 9/18. May not be necessary once functionality for calculating length of free-form text is added.

```
{
  ^size(adjustments(self));
}
``` pmtType(self)

Return the pmtType ivar.

```
{
  ^record[#pmtType];
}
``` primaryKey(self)

11/6/1991 11:09

```
{ ^tuple(primaryKey(self:ancestor), primSeqNum(self) );
}
``` primSeqNum(self)

Return the primSeqNum ivar.

```
{
  ^record[#primSeqNum];
}
``` refDate(self)

Return the refDate ivar.

```
{
  ^record[#refDate];
}
``` refDoc(self)
> Return the refDoc ivar.

```
{
  ^record[#refDoc];
}
``` refNum(self)
> Return the refNum ivar.

```
{
  ^record[#refNum];
}
``` refQualByPmtType(self, aCode | aDict codeKey)
> Look up a reference qualifier using payment method code as a search argument.

```
{
  aDict := aPmtTypes(class(self));
  codeKey := asInt(aCode, 10);
  ^aDict[codeKey][#ref01];
}
``` refQualByRefDoc(self, aCode | aDict codeKey)
> Look up a reference qualifier using reference document code as a search argument.

```
{
  aDict := refDocs(class(self));
  codeKey := asInt(aCode, 10);
  ^aDict[codeKey][#rmr01];
}
``` secondaryAddendaCount(self | count)
> 1/13/1992 16:02 Returns the count of secondary addenda the addendum requires. 789 is 711 bytes available plus 78, 1 byte short of the amount of space on a single secondary addendum record. This is used to avoid the trucation error when only one line is partially used. If 711 was used, the number of secondary addenda records returned will be in error because any number less than one will be truncated to zero, which in fact will be wrong. The only time zero should be returned is when all bytes are available. This includes the secondary addenda record that is partially used.

```
{ count := (789 - availBytesForNote(self) + noteSize(self))/79;
  ^count;
}
``` setAdjAmt(self, aValue)
> 11-5-1991 AWH

```
{ addDirtyFld(self, #adjAmt);
  ^record[#adjAmt] := aValue;
}
``` setAdjustments(self, aValue)
> 11-5-1991 AWH

```
{ addDirtyFld(self, #adjustments);
  hasAdjustments?:=true;
  ^adjustments := aValue;
}
``` setDiscAmt(self, aValue)
11-5-1991 AWH

```
{ addDirtyFld(self, #discAmt);
  ^record[#discAmt] := aValue;
}
``` setDocAmt(self, aValue)
11-5-1991 AWH

```
{ addDirtyFld(self, #docAmt);
  ^record[#docAmt] := aValue;
}
``` setHasAdjustments?(self, trueOrFalse)
3/16/1992 14:43

```
{ addDirtyFld(self, #hasAdjustments?);
  hasAdjustments?:=trueOrFalse;
}
``` setNetAmt(self, aValue)
11-5-1991 AWH

```
{ addDirtyFld(self, #netAmt);
  ^record[#netAmt] := aValue;
}
``` setNote(self, aValue)
11-5-1991 AWH

```
{ addDirtyFld(self, #note);
  hasNotes?:=true;
  ^note := aValue;
}
``` setPmtType(self, aValue)
11-5-1991 AWH

```
{ addDirtyFld(self, #pmtType);
  ^record[#pmtType] := aValue;
}
``` setPmtTypeByStr(self, aStr | aType)
Update the pmtType ivar. aStr is presumed to be a String which contains an ACH payment type in the first two positions.

```
{
  aType := subString(aStr, 0, 2);
  setPmtType(self, aType);
}
``` setPrimSeqNum(self, aValue)
11-5-1991 AWH

```
{ addDirtyFld(self, #primSeqNum);
  ^record[#primSeqNum] := aValue;
}
``` setRefDate(self, aValue)
11-5-1991 AWH

```
{ addDirtyFld(self, #refDate);
  ^record[#refDate] := aValue;
}
``` setRefDoc(self, aValue)
11-5-1991 AWH

```
{ addDirtyFld(self, #refDoc);
  ^record[#refDoc] := aValue;
}
``` setRefDocByStr(self, aStr | aCode)
Update the refDoc ivar. aStr is presumed to be a String which contains a reference document code in the first two positions.

```
{
   aCode := subString(aStr, 0, 2);
   setRefDoc(self, aCode);
}
``` setRefNum(self, aValue)
11-5-1991 AWH

```
{ addDirtyFld(self, #refNum);
  ^record[#refNum] := aValue;
}
``` updateAdjPair(self,anAmt,anIdx)
11/25/1991

```
{
 if not(anIdx) cor (anIdx > numAdjPairs(self))
   errorBox(loadString(4085) /* CTPAddendum:insertAdjustPair */ ,
          "Temporary error message:" + CR_LF +
          loadString(4086) /* Adjustment pair index must be 1 - 54. */ );
   ^nil;
 endif;
 insertAdjPair(self,adjCode(self),anAmt,anIdx);
}
```

CTX

| | |
|---|---|
| Source file: | CTX.CLS |
| Inherits from: | Object BusinessObject Instruction FundsXfer ACH |
| Inherited by: | (no descendants) |

ACH Corporate Trade Payment (EDI)

Instance variables:

| | |
|---|---|
| dirtyFlds | (From class BusinessObject) |
| dateLastChgd | (From class BusinessObject) |
| dateLastUsed | (From class BusinessObject) |
| lastChangedTime | (From class BusinessObject) |
| oldKey | (From class BusinessObject) |
| stamp | (From class BusinessObject) |

| | |
|---|---|
| dbQueryLock | (From class BusinessObject) |
| dbQuery | (From class BusinessObject) |
| record | (From class BusinessObject) |
| custAcct | (From class Instruction) |
| custBranch | (From class Instruction) |
| otherParty | (From class FundsXfer) |
| otherPartyBank | (From class FundsXfer) |
| intermediary | (From class FundsXfer) |
| details | (From class FundsXfer) |
| addenda | (From class ACH) |

Class variables:

| | |
|---|---|
| $DisplayRules | (From class BusinessObject) |
| $NonDisplayIvars | (From class BusinessObject) |
| $ReviewLvls | (From class Instruction) |
| $FieldsNotApplicable | (From class FundsXfer) |
| $PartySelectTbl | (From class FundsXfer) |
| $InstTypes | (From class FundsXfer) |
| $RouteCodes | (From class FundsXfer) |
| $CutOffTimeTbl | (From class FundsXfer) |
| $StatusGrpTbl | (From class FundsXfer) |
| $SetupSources | (From class FundsXfer) |
| $ACHTranCodes | (From class ACH) |
| $DBACH | (From class ACH) |

Class methods:

dbQuery(self)

10/14/1991 21:17

```
{
  ^new(DBCTX);
}
```

Object methods:

addAddendum(self, addendum)

Add a CTXAddendum object to the addenda collection.

```
{ add(addenda(self), primSeqNum(addendum), addendum);
  addDirtyFld(self, #addenda);
  setHasAddendaOrDetails?(self,'Y');
  addDirtyFld(self, #hasAddendaOrDetails?);
  if isSetup(self)
    setSetupName(addendum,setupName(self))
  else setXferRefNum(addendum,xferRefNum(self))
  endif;
}
``` asBPR05(self)

Return the BPR05 representation of self.

```
{
  ^loadString(4106) /* CTX */
}
``` asREF01(self)

Return the REF01 (third occurrence) representation of self.

```
{
  ^loadString(4105) /* AN */ ;
}
``` asREF02(self)
Return the REF02 (third occurrence) representation of self.

```
{
  ^docRefNum(self);
}
``` atAddendum(self, idx)
Return the CTPAddendum object specified by idx.

```
{
  ^at(addenda(self), idx);
}
``` fillSummary(self, aBox)
Fill the summary area.

```
{
  do(addenda(self),
    {using(addendum) addString(aBox, asDisplayX12(addendum))}
  );
}
``` init(self)
Initialize self.

```
{
  init(self:ancestor);
  initAddenda(self);
}
``` initAddenda(self)
Initializes addenda to default value.

```
{
  ^addenda := new(IdentityDictionary, asInt(100*1.3));
}
``` nextSeqNum(self)
Get the next available sequence number for an addendum.

```
{ /* AWH 8/18/92 changed 60 to 61 to accomodate Actor stopping
     at one less than the ending number */
  do(over(1,61),
  {using(i)
    if not(addenda[i])
      ^i;
    endif;
  });

errorBox(loadString(4107) /* CTX:nextSeqNum */ ,
    "Only 60 CTX Addenda allowed" );

^nil; /* Indicates no numbers available */
}
``` removeAddendum(self, addendum)
Remove a CTXAddendum object from the addenda collection.

```
{ remove(addenda(self), primSeqNum(addendum));
  setDirtyFld(self, #addendum);
  size(addenda) = 0 cand setHasAddendaOrDetails?(self,nil);
  addDirtyFld(self, #hasAddendaOrDetails?);
``` runMorePage(self, par)
   Runs the CTX addenda dialog on the receiver.

```
{ ^runModal(MoreCTX, par, self);
}
``` runMorePageViewOnly(self, par)
   3/11/1992 14:50 Runs the view only version of the more CTX form.

```
{ ^runModal(ViewCTX:late, par, self);
}
``` setAddendaSetupName(self)
   2/19/1992 15:44 Sets the key of all the addenda.

```
{ do(addenda,
    { using(addendum) setSetupName(addendum, setupName(self)};
    });
}
```

CTXAddendum

| | |
|---|---|
| Source file: | CTXADDEN.CLS |
| Inherits from: | Object BusinessObject ACHAddendum CCDAddendum |
| Inherited by: | (no descendants) | comment

Instance variables:

| | |
|---|---|
| dirtyFlds | (From class BusinessObject) |
| dateLastChgd | (From class BusinessObject) |
| dateLastUsed | (From class BusinessObject) |
| lastChangedTime | (From class BusinessObject) |
| oldKey | (From class BusinessObject) |
| stamp | (From class BusinessObject) |
| dbQueryLock | (From class BusinessObject) |
| dbQuery | (From class BusinessObject) |
| record | (From class BusinessObject) |

Class variables:

| | |
|---|---|
| $DisplayRules | (From class BusinessObject) |
| $NonDisplayIvars | (From class BusinessObject) |
| $RefCodes | (From class CCDAddendum) |
| $DBCCDAddendum | (From class CCDAddendum) |
| $AdjCodes | (From class CCDAddendum) |
| $RefQuals | (From class CCDAddendum) |
| $CCDAddReqFlds | (From class CCDAddendum) |
| $DateQuals | (From class CCDAddendum) |

Class methods:

dbQuery(self)
   Returns an instance of receiver's associated DBQuery class

```
{
  ^new(DBCTXAddendum:late);
}
```

Object methods:

asDisplayX12(self | aStrm, segments)
Return the sequence number plus the X12 string.

```
{
  aStrm := streamOver(stringOf(' ', 70));
  nextPutAll(aStrm, asPaddedString(primSeqNum(self), 2));
  setPosition(aStrm, 3);
  segments := asX12(self);
  do(segments,
    {using(aStr)
     nextPutAll(aStrm, aStr);
     setPosition(aStrm, size(collection(aStrm) + 1));
    }
  );
  ^collection(aStrm);
}
``` asX12(self, aStrm, segments)
Converts the CTXAddendum ivars to the X12 format.

```
{
  hasRMR?(self) cand makeRMR(self, aStrm, segments);
  hasNTE?(self) cand makeNTE(self, aStrm, segments);
  (hasREF?(self) cor hasRMR?(self)) cand makeREF(self, aStrm, segments);
  hasDTM?(self) cand makeDTM(self, aStrm, segments)
     cand hasADX?(self) cand makeADX(self, aStrm, segments);
  ^segments;
}
``` makeREF(self, aStrm, segments)
6/24/1992 11:29

```
{
  /* REF01, REF03 */
  if not(isBlank(rmtDescription(self)))
     nextPutAll(aStrm, loadString(4017) /* REF* */);
     not(isBlank(rmtRefQual(self))) cand nextPutAll(aStrm,
asString(rmtRefQual(self)));
     nextPutAll(aStrm, ASTERISK);
     nextPutAll(aStrm, ASTERISK);
     nextPutAll(aStrm, asDisplayString(rmtDescription(self)));
     add(segments, asSegment(aStrm));
  endif;

hasREF?(self) cand makeREF(self:ancestor, aStrm, segments);
}
``` primaryKey(self)
11/6/1991 11:09

```
{ ^tuple(primaryKey(self:ancestor), primSeqNum(self));
}
``` primSeqNum(self)
Return the primSeqNum ivar.

```
{
  ^record[#primSeqNum];
}
``` setPrimSeqNum(self, aValue)
    11-5-1991 AWH

```
{ addDirtyFld(self, #primSeqNum);
  ^record[#primSeqNum] := aValue;
}
```

PPD

Source file:                    PPD.CLS

Inherits from:                  Object BusinessObject Instruction FundsXfer
                                ACH Inherited by:                   (no descendants)

ACH Personal Payment

Instance variables:

| | |
|---|---|
| dirtyFlds | (From class BusinessObject) |
| dateLastChgd | (From class BusinessObject) |
| dateLastUsed | (From class BusinessObject) |
| lastChangedTime | (From class BusinessObject) |
| oldKey | (From class BusinessObject) |
| stamp | (From class BusinessObject) |
| dbQueryLock | (From class BusinessObject) |
| dbQuery | (From class BusinessObject) |
| record | (From class BusinessObject) |
| custAcct | (From class Instruction) |
| custBranch | (From class Instruction) |
| otherParty | (From class FundsXfer) |
| otherPartyBank | (From class FundsXfer) |
| intermediary | (From class FundsXfer) |
| details | (From class FundsXfer) |
| addenda | (From class ACH) |

Class variables:

| | |
|---|---|
| $DisplayRules | (From class BusinessObject) |
| $NonDisplayIvars | (From class BusinessObject) |
| $ReviewLvls | (From class Instruction) |
| $FieldsNotApplicable | (From class FundsXfer) |
| $PartySelectTbl | (From class FundsXfer) |
| $InstTypes | (From class FundsXfer) |
| $RouteCodes | (From class FundsXfer) |
| $CutOffTimeTbl | (From class FundsXfer) |
| $StatusGrpTbl | (From class FundsXfer) |
| $SetupSources | (From class FundsXfer) |
| $ACHTranCodes | (From class ACH) |
| $DBACH | (From class ACH) |

Class methods:

dbQuery(self)
    10/14/1991 21:17

```
{
  ^new(DBPPD);
}
```

Object methods:

asBPR05(self)
> Return the BPR05 representation of self.

```
{
  if (details(self) cor addenda(self))
    ^loadString(4456) /* PPP */ ;
  else
    ^loadString(4457) /* PPD */ ;
  endif;
}
``` asREF01(self)
> Return the REF01 (third occurrence) representation of self.

```
{
  ^CREDIT;
}
``` asREF02(self)
> Return the REF02 (third occurrence) representation of self.

```
{
  ^indivId(self);
}
``` indivId(self)
> Return the indivId.

```
{
  ^achId(otherParty(self));
}
``` indivName(self)
> Return the indivName.
```
{
  ^name(otherParty(self));
}
``` runMorePage(self, par)
> Runs the PPD addenda dialog on the receiver.

```
{
  ^runModal(MorePPD, par, self);
}
``` runMorePageViewOnly(self, par)
> 3/11/1992 14:50 Runs the view only version of the more PPD form.

```
{ ^runModal(ViewPPD:late, par, self);
}
```

PPDAddendum

Source file:         PPDADDEN.CLS

Inherits from:       Object BusinessObject ACHAddendum CCDAddendum

Inherited by: (no descendants)

class comment

Instance variables:

| | |
|---|---|
| dirtyFlds | (From class BusinessObject) |
| dateLastChgd | (From class BusinessObject) |
| dateLastUsed | (From class BusinessObject) |
| lastChangedTime | (From class BusinessObject) |
| oldKey | (From class BusinessObject) |
| stamp | (From class BusinessObject) |
| dbQueryLock | (From class BusinessObject) |
| dbQuery | (From class BusinessObject) |
| record | (From class BusinessObject) |

Class variables:

| | |
|---|---|
| $DisplayRules | (From class BusinessObject) |
| $NonDisplayIvars | (From class BusinessObject) |
| $RefCodes | (From class CCDAddendum) |
| $DBCCDAddendum | (From class CCDAddendum) |
| $AdjCodes | (From class CCDAddendum) |
| $RefQuals | (From class CCDAddendum) |
| $CCDAddReqFlds | (From class CCDAddendum) |
| $DateQuals | (From class CCDAddendum) |

Class methods:

dbQuery(self)

Returns an instance of receiver's associated DBQuery class

```
{
  ^new(DBPPDAddendum:late);
}
```

Object methods:

asX12(self, aStrm, segments)

Converts the CCDAddendum ivars to the X12 format.

```
{
  hasNTE?(self) cand makeNTE(self, aStrm, segments);
  hasDTM?(self) cand makeDTM(self, aStrm, segments);
  ^segments;
}
``` check(self)

7/23/92: PPDAddendum no longer inherits this method from CCDAddendum. ADC, 7/23/92.

```
{ checkDTM(self);
  checkNTE(self);
  checkCharsForAllFields(self);
  ^ok(UPCServices[#dataChecker]);
}
``` checkCharsForAllFields(self | aStr)

7/23/92: Implemented separately for PPDAddendum. ADC, 7/23/92.

```
{ do(tuple[#information],
  { using(elem) aStr := record[elem];
    checkChars(self, elem, aStr);
  });
}
```

TXP

Source file:                TXP.CLS

Inherits from:              Object BusinessObject Instruction FundsXfer ACH

Inherited by:               (no descendants)

class comment

Instance variables:

| | |
|---|---|
| dirtyFlds | (From class BusinessObject) |
| dateLastChgd | (From class BusinessObject) |
| dateLastUsed | (From class BusinessObject) |
| lastChangedTime | (From class BusinessObject) |
| oldKey | (From class BusinessObject) |
| stamp | (From class BusinessObject) |
| dbQueryLock | (From class BusinessObject) |
| dbQuery | (From class BusinessObject) |
| record | (From class BusinessObject) |
| custAcct | (From class Instruction) |
| custBranch | (From class Instruction) |
| otherParty | (From class FundsXfer) |
| otherPartyBank | (From class FundsXfer) |
| intermediary | (From class FundsXfer) |
| details | (From class FundsXfer) |
| addenda | (From class ACH) |

Class variables:

| | |
|---|---|
| $DisplayRules | (From class BusinessObject) |
| $NonDisplayIvars | (From class BusinessObject) |
| $ReviewLvls | (From class Instruction) |
| $FieldsNotApplicable | (From class FundsXfer) |
| $PartySelectTbl | (From class FundsXfer) |
| $InstTypes | (From class FundsXfer) |
| $RouteCodes | (From class FundsXfer) |
| $CutOffTimeTbl | (From class FundsXfer) |
| $StatusGrpTbl | (From class FundsXfer) |
| $SetupSources | (From class FundsXfer) |
| $ACHTranCodes | (From class ACH) |
| $DBACH | (From class ACH) |

Class methods:

dbQuery(self)
   10/14/1991 21:17

```
{
  ^new(DBTXP);
}
```

Object methods:

asBPR05(self)
Return the BPR05 representation of self.

```
{
  ^loadString(4605) /* CCP */
}
``` asREF01(self)
Return the REF01 (third occurrence) representation of self.

```
{
  ^CREDIT ;
}
``` asREF02(self)
Return the REF02 (third occurrence) representation of self.

```
{
  ^achId(otherParty(self));
}
``` runMorePage(self, par)
Runs the TXP addenda dialog on the receiver.

```
{
  ^runModal(MoreTXP, par, self);
}
``` runMorePageViewOnly(self, par)
3/11/1992 14:50 Runs the view only version of the more TXP

```
{ ^runModal(ViewTXP:late, par, self);
}
```

TXPAddendum

| | |
|---|---|
| Source file: | TXPADDEN.CLS |
| Inherits from: | Object BusinessObject ACHAddendum |
| Inherited by: | (no descendants) |

ACH TXPAddendum object.

Instance variables:

| | |
|---|---|
| dirtyFlds | (From class BusinessObject) |
| dateLastChgd | (From class BusinessObject) |
| dateLastUsed | (From class BusinessObject) |
| lastChangedTime | (From class BusinessObject) |
| oldKey | (From class BusinessObject) |
| stamp | (From class BusinessObject) |
| dbQueryLock | (From class BusinessObject) |
| dbQuery | (From class BusinessObject) |
| record | (From class BusinessObject) |

Class variables:

$DisplayRules            (From class BusinessObject)
$NonDisplayIvars         (From class BusinessObject)
$TaxCodes                Tax codes
$CurrentState            Current State being worked on
$StateTaxFmts            Tax formats by state
$AmtCodes                Amount codes
$DBTXPAddendum           DBQuery for TXPAddendum
$TXPFormatFields         Dictionary for one state format fieldName-
                         >aTXPField $CurrentFormat           Format name being worked on Class methods:

amtTypes(self, aState, aFormat)
    This can definitely be optimized, but we chose to leave it for now so this
    can work.

```
{
   ^amtCodes(new(DBTXPAddendum), aState, aFormat);
}
``` dbQuery(self)
    Returns an instance of receiver's associated DBQuery class

```
{
   ^new(DBTXPAddendum:late);
}
``` formatTxpFields(self, aFormat)
    Return the TXP field formatting rules.

```
{
  if not($CurrentFormat = aFormat)
      ($TXPFormatFields := formatTxpFields(new(DBTXPField:late), aFormat))
cand
      $CurrentFormat := aFormat;
  endif;
  ^$TXPFormatFields;
}
``` init(self)
    11/14/1991 15:35

```
{  $AmtCodes:=nil;
   $TaxCodes:=nil;
   $StateTaxFmts:=nil;
   $CurrentState := tuple(nil, nil);
   $TXPFormatFields:=nil;
   $CurrentFormat:=nil;
}
``` new(self)
    Create a new instance of TXPAddendum. Do automatic initialization.

```
{
   ^init(new(self:Behavior));
}
``` query(self, aNum | aQuery)
    Read a TXP addendum record from the database, and return a
    TXPAddendum object.

```
{
  aQuery := new(DBTXPAddendum);
  ^query(aQuery, aNum);
}
``` stateTaxFmts(self)

Return the state tax formats as a SortedCollection of Strings.

```
{ ^$StateTaxFmts cor $StateTaxFmts:=stateTaxFmts(new(DBTXPAddendum));
}
``` taxCodes(self, stateCode, taxFormat | newCollect)

Return the tax codes

```
{
  if stateCode <> $CurrentState[0]
    $CurrentState[0] := stateCode;
    $CurrentState[1] := stateTaxCodes(new(DBTXPAddendum:late), stateCode);
  endif;

^newCollect:= extract($CurrentState[1],
    {using(aFormat) (aFormat[0] = taxFormat)
                    });
}
```

Object methods:

amounts(self)

Return all of the amounts in an Array.

```
{
  ^tuple(amt1(self), amt2(self), amt3(self), amt4(self)};
}
``` amt1(self)

Return the Amount.

```
{
  ^record[#amt1];
}
``` amt2(self)

Return the Amount.

```
{
  ^record[#amt2];
}
``` amt3(self)

Return the Amount.

```
{
  ^record[#amt3];
}
``` amt4(self)

Return the Amount.

```
{
  ^record[#amt4];
}
``` amtType1(self)
> Return the Amount Type.

```
{
  ^record[#amtType1];
}
``` amtType2(self)
> Return the Amount Type.

```
{
  ^record[#amtType2];
}
``` amtType3(self)
> Return the Amount Type.

```
{
  ^record[#amtType3];
}
``` amtType4(self)
> Return the Amount Type.

```
{
  ^record[#amtType4];
}
``` amtTypes(self | aTuple)
> Return all of the amount types in an Array.

```
{
  ^tuple(amtType1(self), amtType2(self), amtType3(self), amtType4(self));
}
``` asX12(self, aStrm, segments | formatRules, just, aString, justDict)
> Converts the TXPAddendum ivars to the X12 format.

```
{
 formatRules := formatTxpFields(class(self), stateTaxFmt(self));
 justDict := %Dictionary('L'->#left, 'R'->#right, 'b'->' ', 'B'->' ', '0'-
>'0');
 nextPutAll(aStrm, loadString(4616) /* TXP* */);

makeTXPItem(self, aStrm, justDict, formatRules[#taxpayerId], #taxpayerId);
 makeTXPItem(self, aStrm, justDict, formatRules[#taxType], #taxType);

if not(isBlank(otherEndDate(self)))
    makeTXPItem(self, aStrm, justDict, formatRules[#periodEndDate],
#otherEndDate);
 else
    makeTXPItem(self, aStrm, justDict, formatRules[#periodEndDate],
#periodEndDate);
 endif;

do(tuple(tuple(#amtType1, #amt1), tuple(#amtType2, #amt2),
                     tuple(#amtType3, #amt3)),
   {using(pair)
    if not(isBlank(perform(self, pair[0]))) cor
       (not(isBlank(perform(self, pair[1]))) cand (perform(self, pair[1]) >
0))
```

```
            makeTXPItem(self, aStrm, justDict, formatRules[pair[0]], pair[0]);
            makeTXPItem(self, aStrm, justDict, formatRules[pair[1]], pair[1]);
         else
            nextPutAll(aStrm, ASTERISK);
            nextPutAll(aStrm, ASTERISK);
         endif;
      });

formatRules[#amtType4]
         cand makeTXPItem(self, aStrm, justDict, formatRules[#amtType4],
      #amtType4);
      formatRules[#amt4]
         cand makeTXPItem(self, aStrm, justDict, formatRules[#amt4], #amt4);

formatRules[#taxpayerVerif]
         cand makeTXPItem(self, aStrm, justDict, formatRules[#taxpayerVerif],
      #taxpayerVerif);

add(segments, asSegment(aStrm));
      ^segments;
   }
``` check(self )
    3/12/1992

```
   {
      checkRequired(self);
      checkCharsForAllFields(self);
      ^ok(UPCServices[#dataChecker]);
   }
``` checkAmounts(self, total | sum)
    Individual amounts must equal transaction amount. 7/27/92: Added the sum of the transaction amounts to the error message to make it prettier. ADC, 7/27/92. 8/13/92 ADC: Comparison of total to sum is fixed.

```
   { sum := 0;
      do( amounts(self),
      { using(elem) elem cand (sum := sum + elem);
      });
      if notEqualTo(total,sum)
      then addError(UPCServices[#dataChecker], msgType(self), 5232,
         asCurrencyString(sum, USD));
      endif;
   }
``` checkCharsForAllFields(self |temp aStr)

```
   {
      do(tuple(#taxpayerId,#otherEndDate,#taxpayerVerif),
      {using(elem) aStr:=getVar(self,elem);
                   checkChars(self,elem,aStr);
      });
   }
``` checkRequired(self | rules, ok)
    4/3/1992 7:52

```
   {
      not(stateTaxFmt(self)) cand
         addError(UPCServices[#dataChecker],msgType(self),5201,
                  loadString(4611) /* : */
      +displayLabel(self,#stateTaxFmt));

not(taxType(self)) cand
         addError(UPCServices[#dataChecker],msgType(self),5201,
                  loadString(4611) /* : */ +displayLabel(self,#taxType));
```

```
        if ok(UPCServices[#dataChecker])
          rules:=formatTxpFields(TXPAddendum:late,stateTaxFmt(self));
          assocsDo(rules,
            {using(elem)

if mandOrOpt(value(elem))= 'R' cand isBlank(getVar(self,key(elem)))
              then
                if key(elem)<>#periodEndDate cor isBlank(getVar(self,
  #otherEndDate))
                then
                  addError(UPCServices[#dataChecker]
  ,msgType(self),5201,loadString(4611) /* : */
  +displayLabel(self,key(elem))));
              endif;
            endif;
          });
        endif ;

}
``` fillAllStateTaxFmts(self, aBox | blankString, aStrm, aCode)
Return all stateTaxFmts in aBox.

```
    {
      blankString := stringOf(' ', 36);
      aStrm := streamOver(blankString);

do(stateTaxFmts(TXPAddendum),
        {using(aTuple)
          nextPutAll(aStrm, aTuple[0]); /* state code */
          setPosition(aStrm, 3);
          nextPutAll(aStrm, aTuple[1]); /* name of state tax format */
          addString(aBox, collection(aStrm));
          setCollection(aStrm, blankString);
          reset(aStrm);
        }
      );
    }
``` fillAmtTypes(self, aBox | blankString, aStrm, aDict)
Fills the combo box with amount type codes and descriptions for this stateCode, stateTaxFormat, and taxTypeCode (which may be "ANY").

```
    {
      blankString := stringOf(' ', 36);
      aStrm := streamOver(blankString);
      aDict := amtTypes(TXPAddendum, stateCode(self), stateTaxFmt(self));

keysDo(aDict, /* Loads the class variable if it's nil */
        { using(aKey)
          if (taxType(self) = aKey[0]) cor (aKey[0] = loadString(4610) /* ANY */
        )
          nextPutAll(aStrm, aKey[1]); /* amount code */
          setPosition(aStrm, 3);
          nextPutAll(aStrm, aDict[aKey]); /* amount code description */
          addString(aBox, collection(aStrm));
          setCollection(aStrm, blankString);
          reset(aStrm);
        endif;
      });
    }
``` fillOneAmtTypes(self, aBox, aCode | blankString, aStrm, aDict)
Fills the combo box with single amount type and descriptions for this stateCode, stateTaxFormat, and taxTypeCode (which may be "ANY").

```
    { blankString := stringOf(' ', 36);
      aStrm := streamOver(blankString);
      aDict := amtTypes(TXPAddendum, stateCode(self), stateTaxFmt(self));
      keysDo(aDict, /* Loads the class variable if it's nil */
        { using(aKey)
```

```
            if (taxType(self) = aKey[0]) cor (aKey[0] = loadString(4610) /* ANY */
        ) cand aCode = aKey[1]
          then nextPutAll(aStrm, aKey[1]); /* amount code */
            setPosition(aStrm, 3);
            nextPutAll(aStrm, aDict[aKey]); /* amount code description */
            addString(aBox, collection(aStrm));
            ^0;
          endif;
        });
    }
``` fillOneStateTaxFmts(self, aBox | blankString, aStrm)
Return one stateTaxFmts in aBox.

```
    { blankString := stringOf(' ', 36);
      aStrm := streamOver(blankString);
      do(stateTaxFmts(TXPAddendum),
        { using(aTuple)
          if stateCode(self) = aTuple[0] /* must match */
            cand (not(stateTaxFmt(self)) cor stateTaxFmt(self) = aTuple[1])
          then nextPutAll(aStrm, aTuple[0]); /* state code */
            setPosition(aStrm, 3);
            nextPutAll(aStrm, aTuple[1]); /* name of state tax format */
            addString(aBox, collection(aStrm));
            ^0;
          endif;
        });
    }
``` fillOneTaxTypes(self, aBox | blankString, aStrm)
Returns a single tax type in the list box

```
    { blankString := stringOf(' ', 36);
      aStrm := streamOver(blankString);
      do(taxCodes(TXPAddendum, stateCode(self), stateTaxFmt(self)),
        { using(anElem)
          if anElem[1] = taxType(self)
          then nextPutAll(aStrm, anElem[1]);
            setPosition(aStrm, 6);
            nextPutAll(aStrm, anElem[2]);
            addString(aBox, collection(aStrm));
            ^0;
          endif;
        });
    }
``` fillStateTaxFmts(self, aBox | blankString, aStrm, aCode)
Return stateTaxFmts in aBox. If self has a stateCode, return only those stateTaxFmts belonging to that state. Otherwise, return all of them.

```
    {
      blankString := stringOf(' ', 36);
      aStrm := streamOver(blankString);
      if aCode := stateCode(self)
        do(stateTaxFmts(TXPAddendum),
            {using(aTuple)
              if (aCode = aTuple[0])
                nextPutAll(aStrm, aTuple[0]);
                setPosition(aStrm, 3);
                nextPutAll(aStrm, aTuple[1]);
                addString(aBox, collection(aStrm));
                setCollection(aStrm, blankString);
                reset(aStrm);
              endif;
            }
        );
      else
        do(stateTaxFmts(TXPAddendum),
            {using(aTuple)
              nextPutAll(aStrm, aTuple[0]);
              setPosition(aStrm, 3);
              nextPutAll(aStrm, aTuple[1]);
              addString(aBox, collection(aStrm));
```

```
                setCollection(aStrm, blankString);
                reset(aStrm);
            }
        );
    endif;
} fillTaxTypes(self, aBox | blankString, aStrm)
    Return the tax type codes

{ blankString := stringOf(' ', 36);
      aStrm := streamOver(blankString);
      do(taxCodes(TXPAddendum, stateCode(self), stateTaxFmt(self)),
        { using(anElem) nextPutAll(aStrm, anElem[1]);
          setPosition(aStrm, 6);
          nextPutAll(aStrm, anElem[2]);
          addString(aBox, collection(aStrm));
          setCollection(aStrm, blankString);
          reset(aStrm);
        });
    } formatName(self)

{
      ^record[#stateTaxFmt];
    } makeTXPItem(self, aStrm, justDict, formatRule, aSymbol| aString, justification,
padSize, aVal, bVal)
    7/16/1992 19:12

{
    nextPutAll(aStrm, ASTERISK);
    if formatRule
        if not(isBlank(aString := perform(self, aSymbol))) cor
           (size(aString) < minSize(formatRule))
           cor (minSize(formatRule) = maxSize(formatRule))
           { (minSize(formatRule) = maxSize(formatRule))
             cor
             (size(aString) < minSize(formatRule))
             ) cand (padSize := minSize(formatRule));
           if (size(justification := justify(formatRule)) < 2)
             if not(fieldFormat(formatRule) = loadString(4617) /* ALPHA */)
                justification := loadString(4618) /* R0 */;
             else
                justification := loadString(4619) /* RB */
             endif;
           endif;
           if aString
             if not(class(aString) = String)
                if class(aString) = Char
                   if asInt(aString) <> 0
                      aString := asString(aString);
                   else
                      aString := NULLSTR;
                   endif;
                else
                   padSize := nil;
                   (aString := asX12(aString));
                   ( (minSize(formatRule) = maxSize(formatRule))
                     cor
                     (size(aString) < minSize(formatRule))
                     ) cand (padSize := minSize(formatRule));
                endif;
             endif;
           else
             aString := NULLSTR;
           endif;
           aString := perform(aString,
```

```
                                       padSize cor size(aString),
                                       justDict[justification[1]] cor justification[1],
                                       justDict[justification[0]] cor justification[0]);
              (size(aString) > 0) cand
                nextPutAll(aStrm, aString);
            else
              ^nil;
          endif;
       endif;
    }
``` otherEndDate(self)

Return the otherEndDate ivar

```
{
   ^record[#otherEndDate];
}
``` periodEndDate(self)

Return the periodEndDate ivar

```
{
   ^record[#periodEndDate];
}
``` setAmt(self, anAmt, fieldID)

Update an amount. 7/31/92 ADC: Caller passes id of field instead of an index.

```
{ if class(fieldID) == Int
  then fieldID := #(amt1 amt2 amt3 amt4)[fieldID - 1];
  endif;
  addDirtyFld(self, fieldID);
  record[fieldID] := anAmt;
}
``` setAmtType(self, aType, fieldID)

Update an amtType. 7/31/92 ADC: caller passes either a field id or a number.

```
{ if class(fieldID) == Int
  then fieldID := #(amtType1 amtType2 amtType3 amtType4)[fieldID - 1];
  endif;
  addDirtyFld(self, fieldID);
  record[fieldID] := aType;
}
``` setAmtTypeByStr(self, aStr, idx | aCode)

Update an amtType. aStr is presumed to be a String which contains an amount type code in the first position.

```
{
  aCode := subString(aStr, 0, 1);
  setAmtType(self, aCode, idx);
}
``` setOtherEndDate(self, aValue)

12-13-92 DH

```
{
  addDirtyFld(self, #otherEndDate);
  ^record[#otherEndDate] := aValue;
}
``` setPeriodEndDate(self, aValue)
    11-5-1991 AWH

```
{ addDirtyFld(self, #periodEndDate);
  ^record[#periodEndDate] := aValue;
}
``` setStateCode(self, aValue)

```
{ addDirtyFld(self, #stateCode);
  ^record[#stateCode] := aValue;
}
``` setStateTaxFmt(self, aValue)
    11-5-1991 AWH

```
{
  addDirtyFld(self, #stateTaxFmt);
  ^record[#stateTaxFmt] := aValue;
}
``` setStateTaxFmtByStr(self, aStr | aCode, aName)
    Update the stateCode and formatName ivars given the state tax format
    String. aStr is presumed to contain a state code in the first two positions.

```
{
  aCode := subString(aStr, 0, 2);
  aName := subString(aStr, 3, size(aStr));
  setStateCode(self, aCode);
  setStateTaxFmt(self, aName);
}
``` setTaxpayerId(self, aValue)
    11-5-1991 AWH

```
{ addDirtyFld(self, #taxpayerId);
  ^record[#taxpayerId] := aValue;
}
``` setTaxpayerVerif(self, aValue)
    11-5-1991 AWH

```
{ addDirtyFld(self, #taxpayerVerif);
  ^record[#taxpayerVerif] := aValue;
}
``` setTaxType(self, aValue)
    11-5-1991 AWH

```
{ addDirtyFld(self, #taxType);
  ^record[#taxType] := aValue;
}
``` setTaxTypeByStr(self, aStr | aCode)
    Update the taxType ivar. aStr is presumed to be a String which contains a
    tax type code in the first five positions.

```
{
  aCode := subString(aStr, 0, 5);
  setTaxType(self, aCode);
}
``` stateCode(self)
    Return the stateCode ivar

{
        ^record[#stateCode];
    } stateTaxFmt(self)
    Return the stateTaxFmt ivar

{
        ^record[#stateTaxFmt];
    } taxpayerId(self)
    Return the taxpayerId ivar

{
        ^record[#taxpayerId];
    } taxpayerVerif(self)
    Return the taxpayerVerif ivar

{
        ^record[#taxpayerVerif];
    } taxType(self)
    Return the taxType ivar

{
        ^record[#taxType];
    } taxTypes(self, aBox | blankString, aStrm)
    Return the tax type codes for this stateCode and stateTaxFmt {
        blankString := stringOf(' ', 36);
        aStrm := streamOver(blankString);
        keysDo($TaxCodes,
            {using(aKey)
                if ((stateCode(self) = aKey[0])
                cand (stateTaxFmt(self) = aKey[1]))
                    nextPutAll(aStrm, aKey[2]);
                    setPosition(aStrm, 6);
                    nextPutAll(aStrm, $TaxCodes[aKey]);
                    addString(aBox, collection(aStrm));
                    setCollection(aStrm, blankString);
                    reset(aStrm);
                endif;
            }
        );
    }

WillReceive

Source file:              WILLRECE.CLS

Inherits from:            Object BusinessObject Instruction FundsXfer

Inherited by:             (no descendants)

Can be initiated from GCU or London.

Instance variables:

| | |
|---|---|
| dirtyFlds | (From class BusinessObject) |
| dateLastChgd | (From class BusinessObject) |
| dateLastUsed | (From class BusinessObject) |
| lastChangedTime | (From class BusinessObject) |
| oldKey | (From class BusinessObject) |
| stamp | (From class BusinessObject) |
| dbQueryLock | (From class BusinessObject) |
| dbQuery | (From class BusinessObject) |
| record | (From class BusinessObject) |
| custAcct | (From class Instruction) |
| custBranch | (From class Instruction) |
| otherParty | (From class FundsXfer) |
| otherPartyBank | (From class FundsXfer) |
| intermediary | (From class FundsXfer) |
| details | (From class FundsXfer) |

Class variables:

| | |
|---|---|
| $DisplayRules | (From class BusinessObject) |
| $NonDisplayIvars | (From class BusinessObject) |
| $ReviewLvls | (From class Instruction) |
| $FieldsNotApplicable | (From class FundsXfer) |
| $PartySelectTbl | (From class FundsXfer) |
| $InstTypes | (From class FundsXfer) |
| $RouteCodes | (From class FundsXfer) |
| $CutOffTimeTbl | (From class FundsXfer) |
| $StatusGrpTbl | (From class FundsXfer) |
| $SetupSources | (From class FundsXfer) |
| $DBWillReceive | DBQuery for WillReceive |

Class methods: (none)

Object methods:

assimBPR(self, flds)
    7/2/1992 14:47 Pass through handled and fundsxfer level.

{

} assimN1(self, flds)
    Assimilate the N1 segment into self.

{
```
if flds[0] = loadString(4685) /* C1 */
/* Segment contains information about the otherPartyBankName. */
   setName(otherPartyBank(self), flds[1]);
else
/* Segment contains information about the remitter. */
   setName(otherParty(self), flds[1]);
endif;
```
    } assimN2(self, flds, entityId | cityStateCty, sizeCSC, aParty)
    Assimilate the N2 segment into self.

{

```
if entityId = loadString(4685) /* C1 */
/* Segment contains information about the intermediary. */
    aParty := otherPartyBank(self);
else
/* Segment contains information about the remitter. */
    aParty := otherParty(self);
endif;

setAddress(aParty, flds[0]);
cityStateCty := fieldsFrom((flds[1] cor NULLSTR), COMMA);
sizeCSC := size(cityStateCty);
sizeCSC > 0 cand setCity(aParty, trimLeading(cityStateCty[0], %Set('
')));
sizeCSC > 1 cand setStateCode(aParty, trimLeading(cityStateCty[1], %Set('
')));
sizeCSC > 2 cand setCountryCode(aParty, trimLeading(cityStateCty[2],
%Set(' ')));
}
``` assimREF(self, flds, entityId | aParty anIDType)

Assimilate a REF segment into self. Since the REF segment can only follow one type of N-segment for WillReceives, entityId is ignored.

```
if entityId
    if entityId = loadString(4685) /* C1 */  /* Segment follows an N1 */
        /* Segment contains information about the intermediary. */
        aParty := otherPartyBank(self);
    else
        /* Segment contains information about the remitter. */
        aParty := otherParty(self);
    endif;
    anIDType := asInt(flds[0], 10);
    select
        case anIDType = 1
        is setAbaNum(aParty, flds[1]);
        endCase
        case anIDType = 2
        is setSwiftId(aParty, flds[1]);
        endCase
        case anIDType = 21
        is setLocalClrCode(aParty, flds[1]);
        endCase
        case anIDType = 22
        is setChipsUid(aParty, flds[1]);
        endCase
    endSelect;
else
    select
        case flds[0] = loadString(4689) /* ZZ */
            setDocRefNum(self, flds[1]);
        endCase
        case flds[0] = loadString(4690) /* IA */ cand size(flds[1]) = 2
            if flds[1][1] = YES[0]
                setReviewed?(self, 0);
            else
                setReviewed?(self, nil);
            endif;
        endCase
    endSelect;
endif;
}
``` asX12(self, operatorID | aStrm, segments, hostRepetitive)

Convert self to an X12-formatted String for transmission.

```
{
    segments := new(TextCollection, 8);
    aStrm := new(X12Stream:late);
    if isHostRepetitive(self)
        hostRepetitive := 0;
    endif;

makeST(self, aStrm, segments);
    makeBPR(self, aStrm, segments, hostRepetitive);
```

```
        makeTRN(self, aStrm, segments);
        makeREFs(self, aStrm, segments, operatorID);
        makeDTM(self, aStrm, segments);
        makeN1s(self, aStrm, segments, hostRepetitive);
        makeSE(self, aStrm, segments);

^segments;
``` export(self, aFormat)
    Convert self to a record of the type sepecified by aFormat.

```
        { }
``` makeBPR(self, aStrm, segments, repetitive | anAmt, anAcct, aStr)
    Create the BPR segment and place it in the Collection.

```
        {
        /* BPR01 */
        nextPutAll(aStrm, loadString(4705) /* BPR*I* */ );

/* BPR02 */
        /* BPR02 */
        nextPutAll(aStrm, asX12Currency(summAmount(self), ccyCode(custAcct(self))
        ));
        nextPutAll(aStrm, ASTERISK);

/* BPR03, BPR04 */
        nextPutAll(aStrm, loadString(4706) /* C*ZZZ* */ );

/* BPR05, BPR06, BPR07 */
        nextPutAll(aStrm, loadString(4707) /* *** */ );

/* BPR08 */
        nextPutAll(aStrm, loadString(4708) /* DA* */ );

/* BPR09 */
        nextPutAll(aStrm, code(custBranch(self)));
        nextPutAll(aStrm, SPACE);
        nextPutAll(aStrm, acctNum(custAcct(self)));
        if not(hasSubBranch?(custAcct(self)))
            nextPutAll(aStrm, PERIOD);
            nextPutAll(aStrm, PERIOD);
        endif;
        nextPutAll(aStrm, ASTERISK);

/* BPR10, BPR11, BPR12, BPR13, BPR14, BPR15 */
        nextPutAll(aStrm, loadString(4710) /* ***** */ );

/* BPR16 */
        nextPutAll(aStrm, asX12(effDate(self)));

add(segments, asSegment(aStrm));
        }
``` makeIntermediaryInfo(self, aStrm, segments, aParty | anId)
    Create REF segments for an Intemediary and place them in the Collection.

```
        {
        /* REF01, REF02 - for ABA */
        if not(isBlank(abaNum(aParty)))
            nextPutAll(aStrm, loadString(4711) /* REF* */);
            nextPutAll(aStrm, asPaddedString(1,2));
            nextPutAll(aStrm, ASTERISK);
            nextPutAll(aStrm, abaNum(aParty));
            add(segments, asSegment(aStrm));
        endif;

/* REF01, REF02 - for SWIFT */
        if not(isBlank(swiftId(aParty)))
            nextPutAll(aStrm, loadString(4711) /* REF* */);
            nextPutAll(aStrm, asPaddedString(2,2));
            nextPutAll(aStrm, ASTERISK);
```

```
          nextPutAll(aStrm, swiftId(aParty));
          add(segments, asSegment(aStrm));
        endif;

/* REF01, REF02 - for UK Sort Code */
        if not(isBlank(localClrCode(aParty)))
          nextPutAll(aStrm, loadString(4711) /* REF* */);
          nextPutAll(aStrm, asPaddedString(22,2));
          nextPutAll(aStrm, ASTERISK);
          nextPutAll(aStrm, localClrCode(aParty));
          add(segments, asSegment(aStrm));
        endif;
      }
``` makeN1s(self, aStrm, segments, repetitive | aParty, aStr)
  Create the N1 segments and place them in the Collection.

```
      {
        if not(repetitive)

aParty := otherPartyBank(self);
          if (aStr := name(aParty)) cand (not(isBlank(aStr)))
            /* N101, N102 - Intermediary */
            nextPutAll(aStrm, loadString(4695) /* N1*C1* */ );
            nextPutAll(aStrm, aStr);
            add(segments, asSegment(aStrm));
            /* N201, N202 - Other Party Bank */
            makeN2s(self, aStrm, segments, aParty);
            /* REF01, REF02 - Intermediary */
            makeIntermediaryInfo(self, aStrm, segments, aParty);
          endif;

endif;

/* N101, N102 - Remitter */
        aParty := remitter(self);
        nextPutAll(aStrm, loadString(4698) /* N1*PR* */ );
        nextPutAll(aStrm, name(aParty));
        add(segments, asSegment(aStrm));

/* N201, N202 - Remitter */
        makeN2s(self, aStrm, segments, aParty);

/* REF01, REF02 - Remitter */
        nextPutAll(aStrm, loadString(4702) /* REF*ZZ* */ );
        if class(remitter(self)) = Bank
          nextPutAll(aStrm, YES);
        else
          nextPutAll(aStrm, NO);
        endif;
        add(segments, asSegment(aStrm));
      }
``` makeN2s(self, aStrm, segments, aParty | aStr)
  Create the N2 segments and place them in the Collection.

```
      {
        /* N201, N202 */
        nextPutAll(aStrm, loadString(3639) /* N2* */ );
        nextPutAll(aStrm, subString(address(aParty), 0, 35));
        nextPutAll(aStrm, ASTERISK);
        nextPutAll(aStrm, city(aParty));
        if not(isBlank(stateCode(aParty)))
          nextPutAll(aStrm, COMMA);
          nextPutAll(aStrm, SPACE);
          nextPutAll(aStrm, stateCode(aParty));
        endif;
        if not(isBlank(countryCode(aParty)))
          nextPutAll(aStrm, COMMA);
          nextPutAll(aStrm, SPACE);
          nextPutAll(aStrm, countryCode(aParty));
        endif;
        if size(aStr := asSegment(aStrm)) > 6
          add(segments, aStr);
        endif;
      }
``` makeREFs(self, aStrm, segments, operatorID | aStr)
Create the REF segments and place them in the Collection.

```
{
  /* REF01, REF02 - first occurrence */
  if (aStr := docRefNum(self)) cand (not(isBlank(aStr)))
    nextPutAll(aStrm, loadString(4703) /* REF*ZZ* */ );
    nextPutAll(aStrm, docRefNum(self));
    add(segments, asSegment(aStrm));
  endif;

/* REF01, REF02, REF03 - second occurrence occurrence */
  nextPutAll(aStrm, loadString(4704) /* REF*IA* */ );
  nextPutAll(aStrm, operatorID + ASTERISK);
  nextPutAll(aStrm, NO);
  if reviewed?(self)
    nextPutAll(aStrm, YES);
  else
    nextPutAll(aStrm, NO);
  endif;
  add(segments, asSegment(aStrm));
}
``` remitBank(self)
8/1/1991 14:16

```
{
  ^otherPartyBank(self);
}
``` remitter(self)
8/1/1991 14:16

```
{
  ^otherParty(self);
}
``` setRemitBank(self, aBank)
8/1/1991 14:16

```
{
  ^setOtherPartyBank(self, aBank);
}
``` setRemitBankByAba(self, abaNum)
8/1/1991 14:16

```
{
  ^setOtherPartyBankByAba(self, abaNum);
}
``` setRemitBankById(self, anId)
8/1/1991 14:16

```
{
  ^setOtherPartyBankById(self, anId);
}
``` setRemitBankBySwift(self, swiftId)
8/1/1991 14:16

```
    {
        ^setOtherPartyBankBySwift(self, swiftId);
    }
``` setRemitter(self, aParty)
    8/1/1991 14:16

```
    {
        ^setOtherParty(self, aParty);
    }
``` setRemitterById(self, anId)
    8/1/1991 14:16

```
    {
        ^setOtherPartyById(self, anId);
    }
```

Wire

Source file:                WIRE.CLS

Inherits from:              Object BusinessObject Instruction FundsXfer

Inherited by:               (no descendants)

Instances of the Wire Class represent international wires (e.g., Swift) and domestic same-day wires (e.g., Fedwire). note: Should all dual-purpose setups exist in this class?

Instance variables:

| | |
|---|---|
| dirtyFlds | (From class BusinessObject) |
| dateLastChgd | (From class BusinessObject) |
| dateLastUsed | (From class BusinessObject) |
| lastChangedTime | (From class BusinessObject) |
| oldKey | (From class BusinessObject) |
| stamp | (From class BusinessObject) |
| dbQueryLock | (From class BusinessObject) |
| dbQuery | (From class BusinessObject) |
| record | (From class BusinessObject) |
| custAcct | (From class Instruction) |
| custBranch | (From class Instruction) |
| otherParty | (From class FundsXfer) |
| otherPartyBank | (From class FundsXfer) |
| intermediary | (From class FundsXfer) |
| details | (From class FundsXfer) |

Class variables:

| | |
|---|---|
| $DisplayRules | (From class BusinessObject) |
| $NonDisplayIvars | (From class BusinessObject) |
| $ReviewLvls | (From class Instruction) |
| $FieldsNotApplicable | (From class FundsXfer) |

| | |
|---|---|
| $PartySelectTbl | (From class FundsXfer) |
| $InstTypes | (From class FundsXfer) |
| $RouteCodes | (From class FundsXfer) |
| $CutOffTimeTbl | (From class FundsXfer) |
| $StatusGrpTbl | (From class FundsXfer) |
| $SetupSources | (From class FundsXfer) |
| $DBWire | DBQuery for Wire |
| $InvalidChars | Invalid characters for Fedwire payments |

Class methods:  (none)

Object methods:

assimBPR(self, flds | anAcct aDbOrCr aBank)
Assimilate the BPR segment into self.

```
{

/* BPR03 - This is a bit tricky: If the payment is a debit to the
       customer's account, it's a credit to the receiver's account. */
    if (aDbOrCr := %Dictionary("C"->DB, "D"->CREDIT)[flds[2]])
      setDbOrCr(self, aDbOrCr);
    else
      ^nil;
    endif;

/* BPR13 -- Account-With-Bank-ID */
    if flds[11] = loadString(4728) /* 02 */  /* otherPartyBank identifier is
SWIFT ID */
      /* Don't bother reconstructing the mustBeChips? flag */
      /* setSwiftId(otherPartyBank(self), flds[12]); */
      if not(aBank := queryOnSwiftId(new(DBBank), flds[12]))
        setSwiftId(otherPartyBank(self), flds[12])
      endif;
    else
      /* setAbaNum(otherPartyBank(self), flds[12]); */
      if not(aBank := queryOnAba(Bank, flds[12]))
        setAbaNum(otherPartyBank(self), flds[12])
      endif;
    endif;
    aBank cand setOtherPartyBank(self, aBank);

/* BPR15 */
    setOtherPartyAcct(self, flds[14]);
}
``` assimN1(self, flds)
Assimilate an N1 segment into self.

```
{
    if flds[0] = loadString(4727) /* RB */  /* it's the otherPartyBank */
      setName(otherPartyBank(self), flds[1]);
    else /* it's the beneficiary */
      setName(otherParty(self), flds[1]);
    endif;
}
``` assimN4(self, flds)
Assimilate an N4 segment into self.

```
{
    setStateCode(otherPartyBank(self), flds[1]);
}
``` assimNTE(self, flds)

Assimilate an NTE segment into self. For Wires, disregard the ctr argument. Each String is appended to the details Collection.

```
{
  not(details(self)) cand setDetails(self, new(TextCollection, 1));
  add(details(self), flds[1]);
}
``` assimREF(self, flds, entityId)

Assimilate a REF segment into self. Since no REF segments follow an N-segment for Wires, the entityId is ignored.

```
{
  select
    case flds[0] = RP
      setHostSetupName(self, flds[1]);
    endCase
    case flds[0] = loadString(4722) /* AN */
      setDocRefNum(self, flds[1]);
    endCase
    case flds[0] = loadString(4723) /* IA */
      if flds[1][1] = YES[0]
        setReviewed?(self, 0);
      else
        setReviewed?(self, nil);
      endif;
    endCase
    case flds[0] = loadString(4725) /* PH */
      if flds[1] = loadString(4726) /* H */
        setPriorityProc(self, 0);
      else
        setPriorityProc(self, nil);
      endif;
    endCase
  endSelect;
}
``` asX12(self, operatorID | aStrm, segments, hostRepetitive)

Convert self to a Collection of X12-formatted Strings for transmission.

```
{
  segments := new(TextCollection, 8);
  aStrm := new(X12Stream:late);
  if isHostRepetitive(self)
    hostRepetitive := 0;
  endif;

makeST(self, aStrm, segments);
  makeBPR(self, aStrm, segments, hostRepetitive);
  makeTRN(self, aStrm, segments);
  makeREFs(self, aStrm, segments, hostRepetitive, operatorID);
  makeDTM(self, aStrm, segments);
  if not(hostRepetitive)
    makeN1s(self, aStrm, segments);
  endif;
  makeSE(self, aStrm, segments);

^segments;
}
``` bankToBankInfo(self)

WRJ 7/9/1992 11:27

```
{
  ^record[#bankToBankInfo];
}
``` confirmed(self)

```
{
  ^record[#confirmed]
}
``` dtlsKey(self)
    WRJ 4/27/1992 22:34

```
{
  ^tuple(effDate(self), targetIcn(self), dbOrCr(self));
}
``` export(self, aFormat)
    Convert self to a record of the type sepecified by aFormat.

```
{ }
``` isChipsWire?(self)
    12/18/1991 15:51

```
{
  if (mustBeChips?(self))
  /* REMOVE REFERENCE TO THIS LITERAL */
  cand not(partyId(otherPartyBank(self)) = loadString(4720) /* FNBC NEW
YORK */ )
      ^0;
  else
      ^nil;
  endif;
}
``` makeBPR(self, aStrm, segments, repetitive | nyParty, anID)
    Create the BPR segment and place it in the Collection.

```
{
  /* BPR01 */
  nextPutAll(aStrm, loadString(4737) /* BPR*X* */ );

/* BPR02 */
  nextPutAll(aStrm, asX12Currency(summAmount(self), ccyCode(custAcct(self))
));
  nextPutAll(aStrm, ASTERISK);

/* BPR03 - This is a bit tricky: If the payment is a debit to the
      customer's account, it's a credit to the receiver's account. */
  if isDrawDown(self)
    nextPutAll(aStrm, loadString(4740) /* D* */ ); /* "D" for drawdowns */
  else
    nextPutAll(aStrm, loadString(4738) /* C* */ ); /* "C" for regular wires
*/
  endif;

/* BPR04 */
  if repetitive
    nextPutAll(aStrm, loadString(4742) /* FEW* */ ); /* "FEW" for
repetitives */
  else
    nextPutAll(aStrm, loadString(4744) /* FWT* */ ); /* "FWT" for non-
repetitives */
  endif;

/* BPR05, BPR06, BPR07, BPR08 */
  nextPutAll(aStrm, loadString(4746) /* **** */ );
```

```
    /* BPR09 */
    /* BPR09 */
    nextPutAll(aStrm, code(custBranch(self)));
    nextPutAll(aStrm, SPACE);
    nextPutAll(aStrm, acctNum(custAcct(self)));
    if not(hasSubBranch?(custAcct(self)))
        nextPutAll(aStrm, PERIOD);
        nextPutAll(aStrm, PERIOD);
    endif;
    nextPutAll(aStrm, ASTERISK);

/* BPR10, BPR11 */
    nextPutAll(aStrm, loadString(4748) /* ** */ );

/* BPR12, BPR13 */
      if mustBeChips?(self)
        nextPutAll(aStrm, loadString(4749) /* 02* */);
        ((nyParty := query(Party, loadString(4720) /* FNBC NEW YORK */)) /*
We have FNBC NEW YORK swiftId */
            cand (anID := swiftId(nyParty))) cor (anID := "FNBCUS33");
        nextPutAll(aStrm, anID);
      else if not(isBlank(abaNum(otherPartyBank(self))))
            nextPutAll(aStrm, loadString(4750) /* 01* */);
            nextPutAll(aStrm, abaNum(otherPartyBank(self)));
        else
            if not(isBlank(swiftId(otherPartyBank(self))))
                nextPutAll(aStrm, loadString(4749) /* 02* */);
                nextPutAll(aStrm, swiftId(otherPartyBank(self)));
            else
                nextPutAll(aStrm, ASTERISK);
            endif;
        endif;
      endif;
    nextPutAll(aStrm, ASTERISK);

/* BPR14 */
    nextPutAll(aStrm, ASTERISK);

/* BPR15 */
    if not(repetitive)
       if mustBeChips?(self) cand not(partyId(otherPartyBank(self)) =
loadString(4720) /* FNBC NEW YORK */ )
          not(isBlank(chipsUid(otherPartyBank(self)))) cand
            nextPutAll(aStrm, loadString(4752) /* /CH */) cand
              nextPutAll(aStrm, chipsUid(otherPartyBank(self)));
       else
          not(isBlank(otherPartyAcct(self))) cand nextPutAll(aStrm,
otherPartyAcct(self));
       endif;
    endif;

nextPutAll(aStrm, ASTERISK);

/* BPR16 */
    nextPutAll(aStrm, asX12(effDate(self)));

add(segments, asSegment(aStrm));
} makeChipsNTEs(self, aStrm, segments, aColl| /* segCtr ,*/ aStr, aString, idx)
    Create the NTE segments and place them in the Collection.

{
        aString := new(X12Stream);

nextPutAll(aStrm, loadString(4729) /* NTE*PMT* */);

if not(isBlank(otherPartyAcct(self)))
            nextPutAll(aString, "AC-");
            nextPutAll(aString, trimTrailing(otherPartyAcct(self), %Set(' ')));
            nextPutAll(aString, SPACE);
        endif;
```

```
        if not(isBlank(name(otherParty(self))))
            nextPutAll(aString, "BNF:");
            nextPutAll(aString, name(otherParty(self)));
            nextPutAll(aString, SPACE);
        endif;

if size(aColl) > 0
            insert(aColl, asNormalString(aString), 0);
            do(aColl,
              {using(detail)
                    nextPutAll(aString, detail);
                  });

nextPutAll(aStrm, copyFrom(aString, 0, min(position(aString), 60)));
            add(segments, asSegment(aStrm));
            if (position(aString) > 60)
                nextPutAll(aStrm, loadString(4729) /* NTE*PMT* */);
                nextPutAll(aStrm, copyFrom(aString, 60, min(position(aString),
 120)));
                add(segments, asSegment(aStrm));
            endif;
            if (position(aString) > 120)
                nextPutAll(aStrm, loadString(4729) /* NTE*PMT* */);
                nextPutAll(aStrm, copyFrom(aString, 120, min(position(aString),
 180)));
                add(segments, asSegment(aStrm));
            endif;
            if (position(aString) > 180)
                nextPutAll(aStrm, loadString(4729) /* NTE*PMT* */);
                nextPutAll(aStrm, copyFrom(aString, 180, min(position(aString),
 240)));
                add(segments, asSegment(aStrm));
            endif;
        else
            nextPutAll(aStrm, copyFrom(aString, 0, min(position(aString), 60)));
            add(segments, asSegment(aStrm));
        endif;
    }
``` makeN1s(self, aStrm, segments | aBank aParty)
Create the N1 segments and place them in the Collection.

```
    {
        if not(isChipsWire?(self)) /* This is not a chipsWire payment*/
            /* N101, N102 - first occurrence = other party bank */
            aBank := otherPartyBank(self);
            nextPutAll(aStrm, loadString(4730) /* N1*RB* */ );
            nextPutAll(aStrm, name(aBank));
            add(segments, asSegment(aStrm));

/* N401, N402 */
            if not(isBlank(city(aBank))) cor not(isBlank(stateCode(aBank)))
                nextPutAll(aStrm, loadString(4731) /* N4* */ );
                nextPutAll(aStrm, city(aBank));
                nextPutAll(aStrm, ASTERISK);
                nextPutAll(aStrm, stateCode(aBank));
                add(segments, asSegment(aStrm));
            endif;
        endif;

/* N101, N102 - second occurrence - other party */
        if not(isChipsWire?(self))
            aParty := otherParty(self)
        else
            aParty := otherPartyBank(self)
        endif;

if not(isBlank(name(aParty)))
            nextPutAll(aStrm, loadString(4732) /* N1*PE* */ );
            nextPutAll(aStrm, name(aParty));
            add(segments, asSegment(aStrm));
        endif;
    }
``` makeNTEs(self, aStrm, segments | segCtr, aColl, aStr)
   Create the NTE segments and place them in the Collection.

```
   {
      if size(details(self)) < 1 cand not(isChipsWire?(self))
         ^nil;
      endif;

if not(isBlank(hostSetupName(self))) cand
   not(isBlank(lengthHostText(self)))
         aColl := removeBytes(details(self), lengthHostText(self));
      else
         aColl := details(self);
      endif;

if isChipsWire?(self)
         makeChipsNTEs(self, aStrm, segments, aColl);
      else
        segCtr := 0;
        do(aColl,
            {using(aStr)
               if size(trimTrailing(aStr, %Set(' ' '+'))) > 0
                  nextPutAll(aStrm, loadString(4729) /* NTE*PMT* */ + aStr);
                  add(segments, asSegment(aStrm));
                  segCtr := segCtr + 1;
                  if segCtr > 4
                     ^self;
                  endif;
               endif;
            }
        );
      endif;
   }
``` makeREFs(self, aStrm, segments, repetitive, operatorID | aStr)
   Create the REF segments and place them in the Collection.

```
   {
      /* REF01, REF02 - first occurrence */
      if repetitive
         nextPutAll(aStrm, loadString(4733) /* REF*RP* */ +
   hostSetupName(self));
         add(segments, asSegment(aStrm));
      endif;

/* REF01, REF02 - second occurrence */ if (aStrm, (docRefNum(self)) cand (not(isBlank(aStr)))
         nextPutAll(aStrm, loadString(4734) /* REF*AN* */ );
         nextPutAll(aStrm, docRefNum(self));
         add(segments, asSegment(aStrm));
      endif;

/* REF01, REF02, REF03 - third occurrence */
      nextPutAll(aStrm, loadString(4735) /* REF*IA* */ );
      nextPutAll(aStrm, operatorID);
      nextPutAll(aStrm, ASTERISK);
      nextPutAll(aStrm, NO);
      if reviewed?(self)
         nextPutAll(aStrm, YES);
      else
         nextPutAll(aStrm, NO);
      endif;
      add(segments, asSegment(aStrm));

/* REF01, REF02 - fourth occurrence */
      if priorityProc(self)
         nextPutAll(aStrm, loadString(4736) /* REF*PH*H */ );
         add(segments, asSegment(aStrm));
      endif;
   }
``` priorityProc(self)
> Return the priorityProc? ivar.

```
{
  ^record[#priorityProc?];
}
``` priorityProc?(self)
> Return the priorityProc? ivar.

```
{
  ^record[#priorityProc?];
}
``` setBankToBankInfo(self, str)
> WRJ 7/8/1992 9:18 Set the bankToBankInfo iVar from BBI seg in credit details file.

```
{
  if str addDirtyFld(self, #bankToBankInfo);
    addDirtyFld(self, #hasAddendaOrDetails?);
    setHasAddendaOrDetails?(self,'Y');

^record[#bankToBankInfo] := str;
  endif;

^nil;
}
``` setConfirmed(self, aValue)

```
{ addDirtyFld(self, #confirmed);
  ^record[#confirmed] := aValue;
}
``` setPriorityProc(self, aValue)

```
{ addDirtyFld(self, #priorityProc?);
  ^record[#priorityProc?] := aValue;
}
``` setTargetIcn(self, aValue)

```
{ addDirtyFld(self, #targetIcn);
  ^record[#targetIcn] := aValue;
}
``` setWireRefNum(self, aValue)

```
{ addDirtyFld(self, #wireRefNum);
  ^record[#wireRefNum] := aValue;
}
```

```
setWireServDate(self, aValue)

{ addDirtyFld(self, #wireServDate);
      ^record[#wireServDate] := aValue;
    } setWireServTime(self, aValue)

{ addDirtyFld(self, #wireServTime);
      ^record[#wireServTime] := aValue;
    } targetIcn(self)

{ ^record[#targetIcn]
    } wireRefNum(self)

{ ^record[#wireRefNum]
    } wireServDate(self)

{ ^record[#wireServDate]
    } wireServTime(self)

{ ^record[#wireServTime]
    }
```

We claim:

1. An interface for providing access to a plurality of payment networks comprising:

a display comprising a uniform transaction entry screen, the uniform transaction entry screen displaying to a user a plurality of data input fields common to each of the plurality of payment networks, each data input field prompting for the data necessary for initiation of a transaction over any of the plurality of payment networks;

means coupled to the display for supplying the data necessary to a particular transaction;

means coupled to the display for allowing the user to customize the transaction entry screen in order to select one of the plurality of payment networks to be employed with the particular transaction and generating a signal identifying the particular transaction and payment network selected;

means for dynamically enabling and disabling certain of the plurality of data input fields in response to data received from the user; and interface logic, coupled to the display, operative to transmit the signal and initiate the particular transaction employing the payment network selected.

2. A system for providing access to a plurality of payment networks comprising:

a central computer, the central computer operatively connected to receive signals from a remote computer, each signal representing a particular transaction for completion through one of the plurality of payment networks;

a display coupled to the remote computer, the display having a uniform transaction entry screen comprising a plurality of data input fields common to each payment network, each field prompting for and displaying data received from a user necessary for initiation of the particular transaction;

input logic coupled to the display, the input logic operative to receive from the user the specific terms of the particular transaction corresponding to the data input fields;

selection logic coupled to the display, the selection logic configured to allow the user to customize the transaction entry screen in order to select the payment network to be employed with the particular transaction and generate a signal indicative of the specific terms of the transaction and the payment network selected;

means for interactively enabling and disabling certain of the plurality of data input fields in response to data received from the use; and interface logic coupled to the central computer, the interface logic receiving the signal from the selection logic and communicating the particular transaction over the selected payment network.

3. The interface defined in claim 2, further comprising storage logic coupled to the remote computer, the storage logic for storing the data applicable to a particular transaction for subsequent transmission to the central computer.

4. The interface defined in claim 2, wherein the remote computer comprises a plurality of remote computers.

5. The interface defined in claim 2, wherein the uniform transaction entry screen further comprises dropdown lists for selecting the payment network and providing the data applicable to the particular transaction.

6. The interface defined in claim 2, further comprising means for coupling the central computer to the remote computer.

7. The interface defined in claim 6, wherein the means for coupling the central computer to the remote computer comprises a modem.

8. The interface defined in claim 2, wherein the remote computer comprises a personal computer.

9. The interface defined in claim 2, wherein the central computer comprises a mainframe computer.

10. The interface defined in claim 2, wherein the initiation of a transaction over the plurality of payment networks comprises selection of an icon appearing on the display.

11. The interface defined in claim 2, further comprising means for prompting the user for the data applicable to a particular transaction based upon the payment network selected.

12. The interface defined in claim 2, further comprising means for maintaining a summary of past transactions that have taken place on the remote computer.

13. The interface defined in claim 2, wherein he selection logic comprises a keyboard.

14. The interface defined in claim 2, wherein he selection logic comprises a mouse.

15. The interface defined in claim 2, wherein the input logic comprises a keyboard.

16. A system for providing access to a plurality of payment networks comprising:

a central computer, the central computer operatively connected to receive signals from a remote computer, each signal representing a particular transaction for completion through one of the plurality of payment networks;

means coupled to the remote computer for displaying a uniform transaction entry window comprising a plurality of data input fields common to each payment network, each field prompting for and displaying data received from a user to specify the particular transaction;

selection logic coupled to the remote computer, the selection logic to allow the user to customize the transaction entry window in order to select the payment network to be employed with the particular transaction and generating a signal indicative of the payment network selected;

data entry means coupled to the remote computer, the data entry means for receiving user supplied data identifying the specific terms of the particular transaction;

means for interactively enabling and disabling certain of the plurality of data input fields in response to data received from the input means; and communications logic coupled to the central computer, the communications logic receiving the signal from the selection logic for communication to the selected payment network.

17. The system defined in claim 16, further comprising storage logic coupled to the remote computer, the storage logic for storing the data applicable to a particular transaction for subsequent transmission to the central computer.

18. The system defined in claim 16, wherein the remote computer comprises a plurality of remote computers.

19. The system defined in claim 16, wherein the uniform transaction entry screen further comprises dropdown lists for selecting the payment network and providing the data applicable to the particular transaction.

20. The system defined in claim 16, further comprising means for coupling the central computer to the remote computer.

21. The system defined in claim 20, wherein the means for coupling the central computer to the remote computer comprises a modem.

22. The system defined in claim 16, wherein the remote computer comprises a personal computer.

23. The system defined in claim 16, wherein the central computer comprises a mainframe computer.

24. The system defined in claim 16, wherein the initiation of a transaction over one of the plurality of payment networks comprises selection of an icon appearing on the display.

25. The system defined in claim 16, further comprising means for prompting a user for the data applicable to the particular transaction based upon the payment network selected.

26. The system defined in claim 16, further comprising means for maintaining a summary of past transactions that have taken place on the remote computer.

27. The system defined in claim 16, wherein the selection logic comprises a keyboard.

28. The system defined in claim 16, wherein the selection logic comprises a mouse.

29. The system defined in claim 16, wherein the data entry means comprises a keyboard.

30. The system defined in claim 16, further comprising interface logic coupled to the central computer, the interface logic to communicate the signal to the plurality of payment networks.

31. A method for providing access to a plurality of payment networks comprising the steps of:

presenting an operator with a uniform transaction entry screen comprising a plurality of data input fields common to each of the plurality of payment networks, each data input field prompting for data from the operator necessary for initiation of a transaction over any of the plurality of payment networks;

inputting the data necessary for a particular transaction;

allowing the operator to customize the transaction entry screen in order to select a payment network to be employed with the particular transaction;

generating a signal representative of the input data and the payment network selected; and communicating the signal to the particular payment network selected.

32. The method defined in claim 31, further comprising the step of disabling certain of the data entry fields not pertinent to the payment network selected in response to the data supplied by the operator.

33. The method defined in claim 31, wherein the data supplied by the operator comprises user account data and transaction location data.

34. A method for providing access to a plurality of payment networks comprising the steps of:

displaying a uniform transaction entry window comprising a plurality of data input fields common to each of the plurality of payment networks, each field prompting for and displaying data received from a user necessary for initiation of a particular transaction over the plurality of payment networks;

supplying at the data input fields specific data relevant to a particular transaction;

dynamically enabling and disabling certain of the plurality of data input fields in response to the data received;

allowing the user to customize the transaction entry screen in order to select one of the plurality of payment networks to be employed with the transaction;

generating a signal indicating the specific data supplied and the payment network selected; and receiving the signal from the selection means and initiating the particular transaction over the payment network selected.

35. A method for providing access to a plurality of payment networks comprising the steps of:

providing a central computer, the central computer operatively connected to receive signals from a remote computer, each signal representing a particular transaction for completion through one of the plurality of payment networks;

displaying on the remote computer a uniform transaction entry screen comprising a plurality of data input fields common to each payment network, each field prompting for and displaying data received from a user to specify the particular transaction;

interactively enabling and disabling certain of the plurality of data input fields in response to the data supplied by the user;

allowing the user to customize the transaction entry screen in order to select the payment network to be employed with the particular transaction and generating a signal indicative of the particular payment network selected;

supplying data applicable to the particular transaction; and providing communications logic coupled to the central computer, the communications logic receiving the signal from the selection logic for communication to a payment network.

36. The method defined in claim 35, further comprising the step of providing storage logic coupled to the remote computer, the storage logic for storing the data applicable to a particular transaction for subsequent transmission to the central computer.

37. The method defined in claim 35, further comprising the step of providing at the uniform transaction entry screen lists for selecting the payment network and providing the data applicable to the particular transaction.

38. The method defined in claim 35, wherein the data supplied comprises user account data and transaction location data.

39. The method defined in claim 35, further comprising the step of prompting a user for the data applicable to a particular transaction based upon the payment network selected.

40. The method defined in claim 35, further comprising the step of maintaining a summary of past transactions that have taken place on the remote computer.

41. A system for providing access to a plurality of payment networks, said system having a uniform transaction entry screen, comprising:

a plurality of data input fields common to each of the plurality of payment networks, the plurality of data input fields providing a common protocol for communicating with the plurality of payment networks, wherein each of the data input fields is capable of displaying data received from a user to specify a particular payment transfer for completion over a selected payment network;

means for customizing the transaction entry screen to allow the user to select one of the plurality of payment networks for completion of a specific payment transfer;

means for receiving data pertinent for a particular payment transfer over the selected payment network;

means for dynamically enabling and disabling certain of the data input fields in response to the data received for the particular payment transfer; and means for initiating the payment transfer over the selected payment network.

* * * * *

UNITED STATES PATENT AND TRADEMARK OFFICE
CERTIFICATE OF CORRECTION

PATENT NO. : 5,424,938
DATED : June 13, 1995
INVENTOR(S) : Christopher L. Wagner et al.

It is certified that error appears in the above-indentified patent and that said Letters Patent is hereby corrected as shown below:

Column 501,

In claim 1, line 3, delete "uniforn" and substitute --uniform--.
Column 502,
In claim 2, line 27, delete "use" and substitute --user--.
Column 502,
In claim 13, line 1, delete "he" and substitute --the--.
Column 502,
In claim 14, line 1, delete "he" and substitute --the--.

Signed and Sealed this

Seventeenth Day of September, 1996

Attest:

BRUCE LEHMAN

*Attesting Officer*    *Commissioner of Patents and Trademarks*